(12) United States Patent
Coon et al.

(10) Patent No.: US 8,244,563 B2
(45) Date of Patent: Aug. 14, 2012

(54) APPRAISAL EVALUATION AND SCORING SYSTEM AND METHOD

(75) Inventors: Kathy Coon, Kemah, TX (US); Gwen Magrisso, Evanston, IL (US); Robert Dorsey, Oxford, MS (US)

(73) Assignee: FNC, Inc., Oxford, MS (US)

( * ) Notice: Subject to any disclaimer, the term of this patent is extended or adjusted under 35 U.S.C. 154(b) by 900 days.

(21) Appl. No.: 11/932,297

(22) Filed: Oct. 31, 2007

(65) Prior Publication Data

US 2008/0162224 A1      Jul. 3, 2008

Related U.S. Application Data

(60) Provisional application No. 60/863,788, filed on Oct. 31, 2006, provisional application No. 60/867,909, filed on Nov. 30, 2006.

(51) Int. Cl.
*G06Q 10/00* (2006.01)
(52) U.S. Cl. ............. 705/7.11; 705/35; 705/306
(58) Field of Classification Search ......... 705/7, 35, 705/7.11
See application file for complete search history.

(56) References Cited

U.S. PATENT DOCUMENTS

| | | | |
|---|---|---|---|
| 6,609,109 B1 | 8/2003 | Bradley et al. | |
| 7,587,348 B2 * | 9/2009 | Liao et al. | 705/35 |
| 2001/0039506 A1 * | 11/2001 | Robbins | 705/10 |
| 2002/0133371 A1 * | 9/2002 | Cole | 705/1 |
| 2003/0093366 A1 * | 5/2003 | Halper et al. | 705/38 |
| 2004/0254803 A1 | 12/2004 | Myr | |
| 2005/0154657 A1 * | 7/2005 | Kim et al. | 705/30 |
| 2005/0216292 A1 | 9/2005 | Ashlock | |
| 2006/0059073 A1 * | 3/2006 | Walzak | 705/35 |
| 2006/0085207 A1 | 4/2006 | Carey et al. | |

OTHER PUBLICATIONS eAppraiseIT offers comprehensive appraisal verification, Nov. 2002, Mortgage Banking, v63, n2, p. 95.*
Hershkowitz, Brian, A New Vision for Valuation, Oct. 2004, Mortgage Banking, v65, n1, p. 138-145.*
PCT/US2007/083215, International Search Report and Written Opinion of the International Searching Authority, Mar. 28, 2008.

* cited by examiner

*Primary Examiner* — Scott Zare
*Assistant Examiner* — Talia Crawley
(74) *Attorney, Agent, or Firm* — Wayne Edward Ramage; Baker Donelson

(57) ABSTRACT

A system and related methods for the management and evaluation of real estate appraisals comprising, a method of determining a standardized score representative of the accuracy and quality of a real estate appraisal. Data from the appraisal is extracted and evaluated according to a plurality of compliance and risk based rules applicable to the type of appraisal. Each rule is given a particular weight, and an appraisal score may be calculating by summing each instance of a rule triggered multiplied by the weight assigned to that rule. Weights may be set by experts, or determined by statistical analysis.

13 Claims, 7 Drawing Sheets

$$Score = \frac{K}{1 + e^{\sum_{j=1}^{N} w_{jj} r_j / \Gamma}}$$

Where K and Γ are constants, the $w_j$ are the weights and the $r_j$ are dummy variables that take on the value 1 if the rule fires and 0 otherwise.

$$Score = \frac{K}{1 + e^{\sum_{j=1}^{N} w_{jj} r_j / \Gamma}}$$

Where K and $\Gamma$ are constants, the $w_j$ are the weights and the $r_j$ are dummy variables that take on the value 1 if the rule fires and 0 otherwise.

FIGURE 1

$$\text{Maximize } \Psi \text{ where } \Psi = \frac{\sum_{i=1}^{N} \delta_i \text{IND}(S_i < 500)}{B} + \frac{\sum_{i=1}^{N} (1-\delta_i)\text{IND}(S_i > 500)}{(N-B)}$$

$$w_j \in \Omega$$

$$\text{where } S_i = \frac{K}{1 + e^{\sum_{J=1}^{N} \frac{w_j r_{ij}}{\Gamma}}}$$

FIGURE 2

| Decile | Minimum Score | Maximum Score | Total Number | Goods | Bads | Cummul Good | Cummul Bad | Percent Bad | Difference |
|---|---|---|---|---|---|---|---|---|---|
| 1 | 109.7528 | 397.431 | 2011 | 1928 | 83 | 9.63% | 94.32% | 4.13% | 84.69% |
| 2 | 397.4408 | 482.9877 | 2012 | 2008 | 4 | 19.65% | 98.86% | 0.20% | 79.21% |
| 3 | 482.9807 | 540.8800 | 2011 | 2010 | 1 | 29.69% | 100.00% | 0.05% | 70.31% |
| 4 | 540.9239 | 590.5381 | 2012 | 2012 | 0 | 39.74% | 100.00% | 0.00% | 60.26% |
| 5 | 590.5487 | 634.7026 | 2011 | 2011 | 0 | 49.78% | 100.00% | 0.00% | 50.22% |
| 6 | 634.7221 | 675.5829 | 2012 | 2012 | 0 | 59.82% | 100.00% | 0.00% | 40.18% |
| 7 | 675.5875 | 718.8899 | 2011 | 2011 | 0 | 69.87% | 100.00% | 0.00% | 30.13% |
| 8 | 718.9278 | 765.6831 | 2012 | 2012 | 0 | 79.91% | 100.00% | 0.00% | 20.09% |
| 9 | 765.6975 | 824.864 | 2011 | 2011 | 0 | 89.95% | 100.00% | 0.00% | 10.05% |
| 10 | 824.9007 | 1000 | 2012 | 2012 | 0 | 100.00% | 100.00% | 0.00% | 0.00% |
| Total | | | | 20027 | 88 | Max Difference | | | 84.69% |
| At Score of 500 | | | | | | 22.34% | 98.86% | | 76.52% |

FIGURE 5

| Centile | Minimum Score | Maximum Score | Total Number | Goods | Bads | Cummul Good | Cummu Bad | Percent Bad | Difference |
|---|---|---|---|---|---|---|---|---|---|
| 1 | 109.7528 | 220.5013 | 201 | 187 | 14 | 0.93% | 15.91% | 6.97% | 14.98% |
| 2 | 220.5454 | 255.7171 | 201 | 179 | 22 | 1.83% | 40.91% | 10.95% | 39.08% |
| 3 | 255.005 | 282.9262 | 201 | 183 | 18 | 2.74% | 61.36% | 8.96% | 58.62% |
| 4 | 283.1061 | 310.4929 | 201 | 193 | 8 | 3.70% | 70.45% | 3.98% | 66.75% |
| 5 | 310.5167 | 328.3784 | 202 | 197 | 5 | 4.69% | 76.14% | 2.48% | 71.45% |
| 6 | 328.7123 | 344.4305 | 201 | 198 | 3 | 5.68% | 79.55% | 1.49% | 73.87% |
| 7 | 344.5069 | 359.4152 | 201 | 197 | 4 | 6.66% | 84.09% | 1.99% | 77.43% |
| 8 | 359.559 | 371.8461 | 201 | 195 | 6 | 7.63% | 90.91% | 2.99% | 83.27% |
| 9 | 371.8586 | 384.6742 | 201 | 200 | 1 | 8.63% | 92.05% | 0.50% | 83.41% |
| 10 | 384.6872 | 397.431 | 201 | 199 | 2 | 9.63% | 94.32% | 1.00% | 84.69% |
| 11 | 397.4408 | 407.073 | 202 | 202 | 0 | 10.64% | 94.32% | 0.00% | 83.68% |
| 12 | 407.6935 | 418.1996 | 201 | 199 | 2 | 11.63% | 96.59% | 1.00% | 84.96% |
| 13 | 418.2207 | 428.1355 | 201 | 200 | 1 | 12.63% | 97.73% | 0.50% | 85.10% |
| 14 | 428.2255 | 437.0623 | 201 | 201 | 0 | 13.63% | 97.73% | 0.00% | 84.10% |
| 15 | 437.1695 | 445.7874 | 201 | 200 | 1 | 14.63% | 98.86% | 0.50% | 84.23% |
| 16 | 445.7931 | 453.8871 | 201 | 201 | 0 | 15.63% | 98.86% | 0.00% | 83.23% |
| 17 | 453.8982 | 461.6737 | 201 | 201 | 0 | 16.64% | 98.86% | 0.00% | 82.23% |
| 18 | 461.676 | 468.7506 | 202 | 202 | 0 | 17.65% | 98.86% | 0.00% | 81.22% |
| 19 | 468.7634 | 475.5299 | 201 | 201 | 0 | 18.65% | 98.86% | 0.00% | 80.21% |
| 20 | 475.5393 | 482.9877 | 201 | 201 | 0 | 19.65% | 98.86% | 0.00% | 79.21% |
| | | | Total | 20027 | 38 | | Max Difference | | 85.10% |

FIGURE 6

APPRAISAL EVALUATION AND SCORING SYSTEM AND METHOD

This application claims the benefit of and priority to U.S. Provisional Application No. 60/863,788, entitled "APPRAISAL EVALUATION AND SCORING SYSTEM AND METHOD," filed Oct. 31, 2006, and U.S. Provisional Application No. 60/867,909, entitled "APPRAISAL EVALUATION AND SCORING SYSTEM AND METHOD," filed Nov. 30, 2006, and entitled to the benefit of one or both of those filing dates, in whole or in part, for priority. The entire disclosures, specifications, drawings, appendices and attachments of U.S. Provisional Application Nos. 60/863,788 and 60/867,909 are incorporated herein by specific reference.

FIELD OF INVENTION

This invention relates to a system and method for the management and evaluation of real estate appraisals. More particularly, this invention relates to a method of determining a standardized score representative of the accuracy and quality of a real estate appraisal.

BACKGROUND OF INVENTION

Lenders underwriting residential and commercial property serving as collateral support a mortgage or loan typically requires an appraisal of the subject property to determine value and possible risks. Unfortunately, it is a very intensive and costly process for a lender to review each appraisal thoroughly and consistently. At present, lenders are not able to review appraisal with a sufficient level of detail systematically and economically. Problem appraisals, and problem areas in appraisals, may thus be overlooked, and the lenders may find substantial sums at risk.

Accordingly, what is needed is a improved, automated process of appraisal review that achieves a level of review heretofore not available on a systematic or economic basis.

SUMMARY OF INVENTION

The system of the present invention may be used to assist lenders with the process of underwriting the residential and other property collateral supporting a mortgage. It enables the lenders to achieve a consistent and very thorough review process of the appraisal. By using the GAAR, lenders are able to review to a level of detail that human reviewers cannot systematically and economically achieve. This then lets the expert reviewers focus on the problems areas of the appraisal and use their expertise and judgment to better address the issues that are beyond the scope of automated systems.

The GAAR replaces a very manual and inconsistent review process used by lenders that was heavily dependent on the expertise and thoroughness of the individual reviewer.

In one exemplary embodiment, the GAAR has two components, Compliance and Risk. The compliance rules check to ensure that the appraisal meets regulatory requirements, such as the USPAP requirements on the appraiser and the Freddie Mac and Fannie Mae guidelines. In this way the lender can document that they are complying with regulatory requirements on 100% of their mortgage production. The risk rules inform the lender about issues that may make the property unacceptable to back the mortgage. Although numerous risk issues are identified, the specific level of risk that the lender is willing to accept is a business decision that will vary from one lender to the next.

The GAAR also is used as part of an automated underwriting process used by lenders. Weights are applied to the rules that are violated and then these weights are aggregated to create a score. This score is used to automate the underwriting process at many lenders. This speeds the review process for the lenders and thus facilitates the mortgage process and reduces costs of the process.

In one exemplary embodiment, the present invention comprises a system for calculating a GAAR Score for a real estate appraisal. Data from the appraisal is extracted and a plurality of rules are tested against the information. The rules may be compliance-based, risk-based, or both. Each rule is separately weighted, and the score may be calculated as the sum of each rule that is triggered or "fired" multiplied by the weight assigned to that rule.

In one embodiment, once the rules are coded or created, their performance is tested and evaluated by a series of test runs using data files and sources representing extracted appraisal data containing a number of known issues, including issues that result from feedback from evaluation of production appraisals. Each rule for each appraisal form is tested and evaluated to ensure that it is performing correctly. Test files and scripts are built or adjusted over time to include a wide variety of issues to ensure robust performance of the system. Production appraisal evaluations also may be reviewed to identify rules or coding that results in errors or "false positives," such as may result from variations in styles used by appraisers in the field, so that the rules or coding may be modified appropriately.

Additional testing may also be performed using a large data set of production appraisals. The "firing rate" (or the rate where a particular rule is violated or results in a "positive" hit) for each rule may be tabulated, and rules that appear to be firing too frequently can be examined. This examination may include comparisons with the actual appraisals that caused a positive hit to determine whether or not the rule should have fired. If the implementation of the rule is causing inappropriate firing, then the rule may be modified appropriately.

There are additional ways in which rules can be identified for modification. For example, a number of appraisals may be randomly selected from production, and compared to the rules to ensure that none fired inappropriately, and that there were no issues in the appraisal that should have caused a rule to fire when none were fired. It also is possible that issues might be identified that are potential problems in the appraisal for which no rules exist. Problems with the rules also may be identified by reviewers in the production environment and reported back. If any of these issues or problems are identified, then rules can be added, modified, or changed as appropriate. This allows an ongoing review of the rules to ensure that the rules are up-to-date and the evaluation system is functioning properly.

In another exemplary embodiment, a GAAR Score for an appraisal is based on all of the rules in GAAR in each form, both compliance and risk rules. The data from the appraisal is extracted or entered into the system, and then is evaluated against each rule. A weight is applied to each rule, with the total score calculated by adding the weights associated with each rule that "fires." This summation may also be transformed by an appropriate formula. Accordingly, with one formula, the higher the score, the more likely the appraisal is in compliance with accepted standards and guidelines. The scale can be inverted so that high scores are generated by those appraisals with many rules that fire, and the scale can also be changed to any scale desired.

It should be noted that the weight applicable to a particular rule may be adjusted periodically in any embodiment of the present invention.

An appraiser score may also be calculated in a similar manner, using a select subset of the rules in GAAR. This may help evaluate the appraiser's performance and diligence in completing a particular appraisal.

The development of weights to be used for each rule can vary depending on a number of factors. For example, when new forms are introduced by governmental agencies or other sources, there is often no history on how these forms have been used in the past. Thus, there is no data to identify how appraisers will use them in the future, nor is there any data associated with appraisals that have resulted in bad valuations or losses to a lender. Accordingly, statistical approaches may not be appropriate since there is little or no data to work with to estimate appropriate weights. Experts may be called upon to assign initial weights for rules, based upon the seriousness of the rule.

As another example, statistical analysis can be used to re-evaluate and re-estimate appropriate weights for rules based on experience with production appraisals with problems (e.g., appraisals that may have resulted in bad valuations or losses). This allows the system to better differentiate between appraisals with value problems and the remaining production volume. In one embodiment, the appraisals are divided into two groups: those with bad valuations and those with good valuations. The rules that fire for each appraisal are used as the explanatory variable, and the two groups are used to create the dependent variable.

DESCRIPTION OF THE DRAWINGS

FIG. 1 shows an equation for one embodiment of the present invention.

FIG. 2 shows another equation for one embodiment of the present invention.

FIGS. 3-6 show data from a multiple test run in accordance with one embodiment of the present invention.

DETAILED DESCRIPTION OF THE INVENTION

Figure 3:
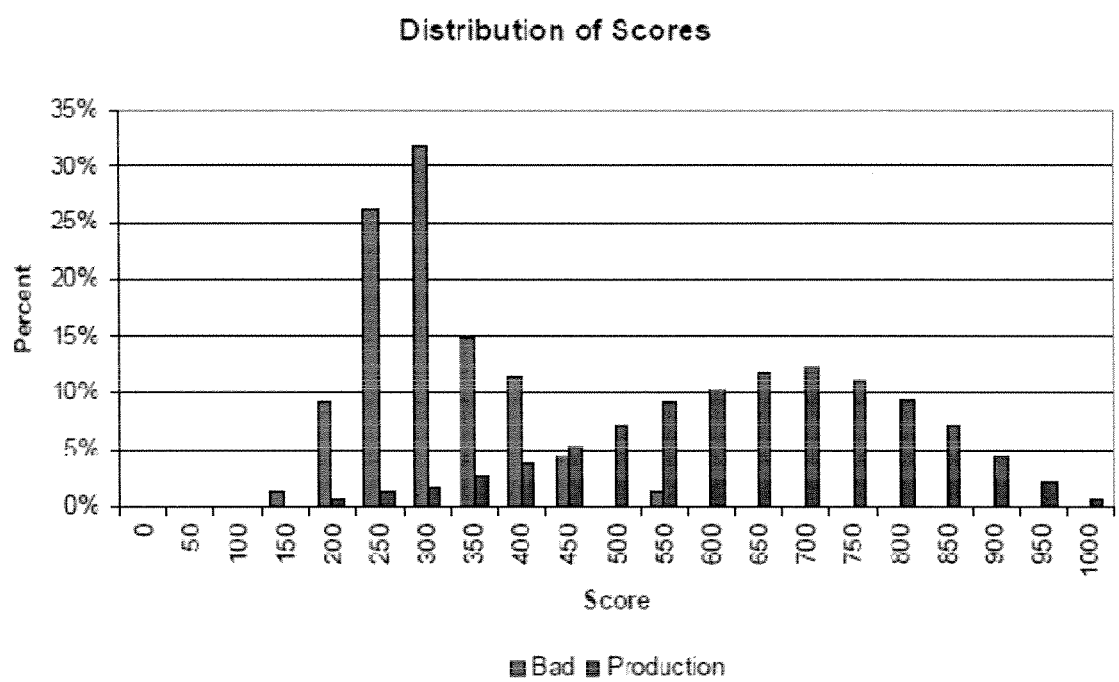
Figure 4:
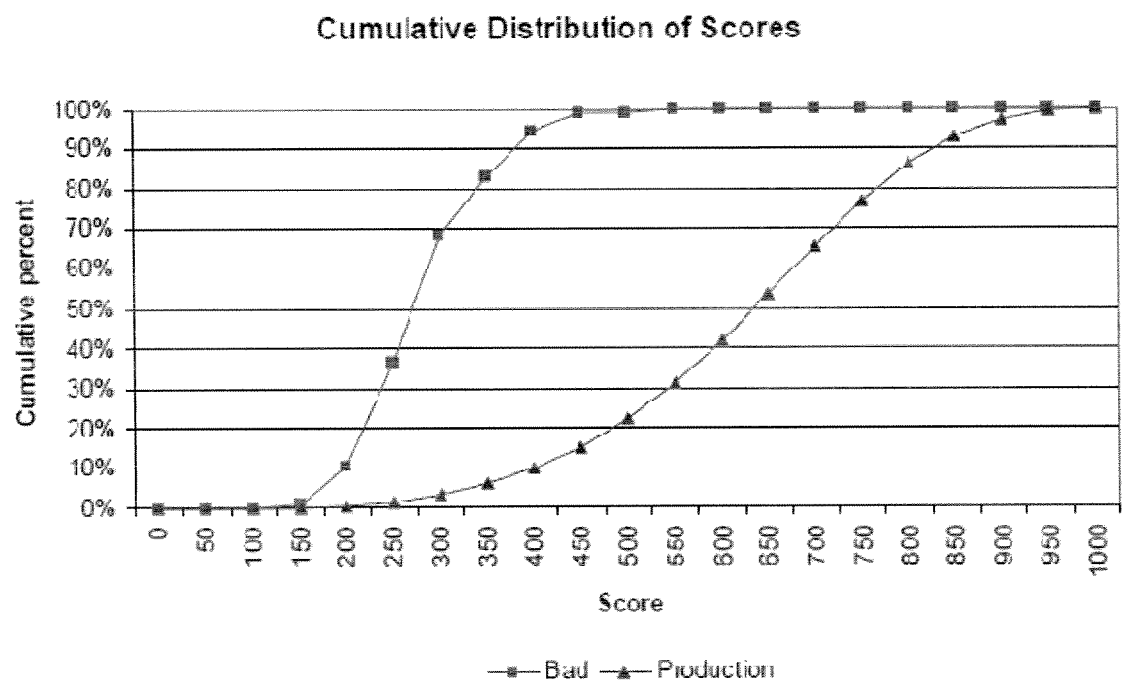

The present invention relates to a system and related methods for the management and evaluation of real estate appraisals; more particularly, a method of determining a standardized score representative of the accuracy and quality of a real estate appraisal.

In one exemplary embodiment, the score is calculated based on Generally Accepted Appraisal Rules (GAAR), and thus may be termed a GAAR Score. GAAR are detailed rules developed to evaluate the appraisal, and there are many different rules applicable to different appraisal forms.

GAAR are developed to incorporate, at least in part, appraisal industry "best of breed" or "best of industry" practices to develop a comprehensive set of rules that will thoroughly identify risk issues within appraisals that may reflect on the valuation opinion provided by the appraiser. In one exemplary embodiment, rules may be categorized into two groups: compliance and risk. The compliance rules are based in part on the Uniform Standards of Professional Appraisal Practice (USPAP) regulations, the Freddie Mac and Fannie Mae guidelines, and the rules of various regulatory agencies. Compliance rules also may be based upon guidelines and rules from applicable sources in any jurisdiction or country, such as the Canadian Uniform Standards of Professional Appraisal Practice (CUSPAP), the Appraisal Institute of Canada, the Canada Deposit Insurance Corporation, and the Canada Mortgage and Housing Corporation in Canada. Appraisals passing compliance rules in the GAAR should be in conformance with applicable guidelines and regulatory requirements.

GAAR also may be updated based on reviews of appraisals and performance with production appraisals.

An exemplary embodiment of Compliance GAAR and Risk GAAR are described below:

GAAR Compliance Rules

The following GAAR descriptions use the language of the primary guiding regulatory bodies' documentation. Not all of the regulatory requirements and guidelines apply to each rule. GAAR attempts to encompass all of the various regulatory sources. Accordingly, the present invention calls for the application and inclusion of the relevant regulatory guidelines, expectations or risk avoidance screens, as necessary and dictated by the particular element of the appraisal report being examined.

Some elements of an appraisal cannot be efficiently automated without incurring some false/positive firings, the result of nuances too slight for accurate standardized testing. GAAR should therefore not be understood to perform an absolute all-inclusive compliance audit, but is rather a tool by which the overwhelming majority of real estate appraisals can be screened for overall adherence to regulatory guidelines.

The following examples use a particular naming system, although other naming conventions or systems may be used in other embodiment. The first element ("FNC") represents a particular company name and serves to distinguish the GAAR Compliance Rules in this embodiment from other business rules. The second designation "C" references the particular rule-set in this case the GAAR "C"ompliance Rules. The third element designates a particular section of the appraisal form (e.g., SUB designates the rules applicable to the SUBJECT section of the Fannie Mae Form 1004 and Freddie Mac Form 710; IMP for IMPROVEMENTS; CA for COST APPROACH, and so on). The numbers in the fourth and fifth element corresponds to the Rule number and sections within the particular subset indicated by the two prior designations (e.g. C-SUB).

Accordingly, the rule groupings in this exemplary embodiment fall into the following categories found on the Uniform Residential Appraisal Report: Fannie Mae (1004) and Freddie Mac (70):

FNC-C-ATT-xxx-xx: Required ATTACHMENTS for appraisal reports

FNC-C-CMS-xxx-xx: CMS-Specific Rules—work in conjunction with GAAR

FNC-C-SUB-xxx-xx: The SUBJECT section
  FNC-C-CONT-xxx-xx: The CONTRACT section
  FNC-C-N-xxx-xx: The NEIGHBORHOOD section
  FNC-C-S-xxx-xx: The SITE section
  FNC-C-IMP-xxx-xx: The IMPROVEMENTS section
  FNC-C-SCA-xxx-xx: The SALES COMPARISON APPROACH section
  FNC-C-SCAHIS-xxx-xx: The SALES HISTORY section
  FNC-C-SCAVALUE-xxx-xx: The VALUE by the Sales Comparison Approach
  FNC-C-REC-xxx-xx: The RECONCILIATION section
  FNC-C-MKTVALUE-xxx-xx: The MARKET VALUE section
  FNC-C-RECDATE-xxx-xx: The EFFECTIVE DATE of the appraisal
  FNC-C-CA-xxx-xx: The COST APPROACH to value FNC-C-PUDINFO-xxx-xx: The PUD INFORMATION section FNC-C-CERT-xxx-xx: The CERTIFICATION and SIGNATURE sections Specific examples of GAAR Compliance Rules include the following:

FNC-C-SUB-003-01

Property Address: field contains a Post Office Box Number

FNC-C-SUB-003-01 scans the Subject section of the appraisal form to determine if an entry has been made in the Property Address field, A Post Office Box number is prohibited in the Property Address field. If a Post Office Box number is detected, the system flags the appraisal for follow-up action. When a Post Office Box is provided for the address, the appraiser has omitted information. Contact the appraiser to complete the form.

FNC-C-SUB-018-00

Borrower: Field is blank

FNC-C-SUB-018-00 scans the Subject section of the appraisal form to determine if an entry has been made in the Borrower field. Both Fannie Mae and Freddie Mac require the name of the borrower as a basic component to complete any appraisal report. If the Borrower field is incomplete, the system flags the appraisal for follow-up action. When this field is incomplete, the appraiser has omitted information. Contact the appraiser to complete the form.

FNC-SUB-021-00

Owner of Public Record: Field is blank

FNC-C-SUB-021-00 scans the Subject section of the appraisal form to determine if an entry has been made in the Owner of Public Record field. Both Fannie Mae and Freddie Mac require the identification of the subject property's current owner as a basic component to complete any appraisal report. If the Owner of Public Record field is incomplete, the system flaps the appraisal for follow-up action. When this field is incomplete, the appraiser has omitted information. Contact the appraiser to complete the form.

FNC-C-SUB-027-00

Legal Description: Field is blank

FNC-C-SUB-027-00 scans the Subject section of the appraisal form to determine if an entry has been made in the Legal Description field. Both Fannie Mae and Freddie Mac require the identification of the subject property's legal description as a basic component to complete any appraisal report. If the Legal Description field is incomplete, the system flags the appraisal for follow-up action. When this field is incomplete, the appraiser

FNC-C-SUB-030-00

Assessor's Parcel Number: Field is blank

FNC-C-SUB-030-00 scans the Subject section of the appraisal form to determine if an entry has been made in the Assessor's Parcel Number field. The parcel number will also define a property when the legal description is abbreviated or missing. If the Assessor's Parcel Number field is incomplete, the system flags the appraisal for follow-up action. When this field is incomplete, the appraiser has omitted information. Contact the appraiser to complete the form.

FNC-C-SUB-042-00

Map Reference: Field is blank

FNC-C-SUB-045-00

Census Tract: Field is blank

FNC-C-SUB-045-00 scans the Subject section of the appraisal form to determine if an entry has been made in the Census Tract field. Both the Home Mortgage Disclosure Act (HMDA) and the Community Reinvestment Act (CRA) regulations require tenders to report this information, making it an essential element of the appraisal form. If the Census Tract field is incomplete, the system flags the appraisal for follow-up action. When this field is incomplete, the appraiser has omitted information. Contact the appraiser to complete the form.

FNC-C-SUB-048-00

Occupant: There is no box checked

FNC-C-SUB-048-00 scans the Subject section of the appraisal form to determine if a selection has been made for the Occupant status of the subject property. The appraiser must check one of the three boxes: "Owner", "Tenant" or "Vacant". If the Occupant status is not selected, the system flags the appraisal for follow-up action. When there is no box checked, the appraiser has omitted information. Contact the appraiser to complete the form.

FNC-C-SUB-051-01

Special Assessments: Field has a numeric value

FNC-C-SUB-051-01 scans the Subject section of the appraisal form to determine if an entry has been made in the Special Assessments field. Occasionally, there will be a need for special assessments to be paid by homeowners in a particular development, project, etc. If a property is a condominium, townhouse, etc. the assessments are usually the result of a shortage in reserves for replacements of key items (example: roof replacement in project). The assessments are levied against all property owners, depending on the percentage of ownership. Assessments may also be necessary in single-family developments, sometimes known as Special Assessment Districts. They are most often established to provide water or other utilities in areas that are not served by existing city or municipal utility services. If the appraiser indicates a special assessment value, Fannie Mae and Freddie Mac require further analysis and documentation to be supplied with the appraisal report. When an entry is made in the Special Assessments field, the system flags the appraisal form for follow-up action.

FNC-C-SUB-54-01

PUD box is not checked, but any field in the PUDINFO contains an entry

FNC-C-SUB-054-01 scans the appraisal form to determine if the "PUD" box has or has not been checked. If the "PUD" box has not been checked, and the appraiser has entered information in the PUD Information Section of the appraisal, the system flags the appraisal for follow-up action. FNC-C-SUB-054-01 ensures consistent information is provided regarding whether the subject property is or is not a PUD.

FNC-C-SUB-063-00

Property Rights Appraised: There is no box checked

FNC-C-SUB-063-00 scans the Subject section of the appraisal form to determine if the subject's Property Rights are indicated. The appraiser must choose one of three options: "Fee Simple", "Leasehold" or "Other". Fannie Mae, Freddie Mac and USPAP guidelines all require an accurate assessment of Property Rights to the subject property as a basic component to complete any appraisal. If Property Rights Appraised have not been designated, the system flags the appraisal for follow-up action. When there is no box checked, the appraiser has omitted information. Contact the appraiser to complete the form.

FNC-C-SUB-063-01

Property Rights Appraised: The "Leasehold" or the "Other" box is checked

FNC-C-SUB-063-01 scans the Subject section of the appraisal form to determine it either the "Leasehold" or the "Other" box has been selected for Property Rights Appraised. When the Property Rights are designated as "Leasehold" or "Other" there are further requirements dictated by Fannie Mae, Freddie Mac, and USPAP regulations. If "Leasehold" or "Other" is selected, the system flags the appraisal for further review. Fannie Mae, Freddie Mac and USPAP guidelines all require an accurate assessment of Property Rights in regard to the subject property.

FNC-C-SUB-069-00

Assignment Type: There is no box checked

FNC-C-SUB-069-00 scans the Subject section of the appraisal form to determine if a selection has been made for the Assignment Type. The appraiser must check one of three boxes: "Purchase Transaction". "Refinance Transaction" or "Other". Fannie Mae requires the Assignment Type be specified as a basic component to complete any appraisal report. The entity that orders the appraisal report will supply the Assignment Type. If the Assignment Type is not chosen, the system flags the appraisal for follow-up action. When there is no box checked, the appraiser has omitted information. Contact the appraiser to complete the form.

FNC-C-SUB-069-01

Assignment Type: The "Other" box is checked

FNC-C-SUB-069-01 scans the Subject section of the appraisal to determine if the "Other" box has been checked for the Assignment Type. This information should be supplied by the entity that orders the appraisal. If "Other" is selected, the system flags the appraisal for further review.

FNC-C-SUB-075-00

Lender/Client: Field is blank

FNC-C-SUB-075-00 scans the Subject section of the appraisal form to determine if an entry has been made in the Lender/Client field. If the Lender/Client field is incomplete, the system flags the appraisal for follow-up action. When this field is incomplete, the appraiser has omitted information. Contact the appraiser to complete the form.

FNC-C-SUB-078-00

Lender/Client Address: Field is blank

FNC-C-SUB-081-00

Is the subject property currently offered for sale or has it been offered for sale in the twelve months prior to the effective date of the appraisal? There is no box checked FNC-C-SUB-081-00 scans the Subject section of the appraisal form to determine if a selection has been made regarding the subject property currently being offered for sale or has been offered for sale in the twelve months prior to the appraisal. The appraiser must choose one of two options: "Yes" or "No". Fannie Mae requires analysis of the previous twelve months. If a selection is not made, the system flags the appraisal for follow-up action. When there is no box checked, the appraiser has omitted information. Contact the appraiser to complete the form.

FNC-C-SUB-084-00

Report data source(s) used, offering price(s) and dates: Field is blank or contains: N/A, NA, None or Unk FNC-C-SUB-084-00 scans the Subject section of the appraisal form to determine if an entry has been made in the Report data source(s) used, offering price(s) and dates field. When this field is incomplete or contains the terms N/A, NA, None or Unk, the appraiser has omitted information. Contact the appraiser to complete the form. The appraiser must search the listing history of the subject property. Even if the subject has not been listed within the previous twelve months, the appraiser must provide the sources from which this verification was made. Therefore, the appraiser must complete the Report data source(s) used, offering price(s) and dates field.

FNC-C-CONT-003-00

I did (did not) analyze the contract for sale for the subject: There is no box checked and Assignment Type is noted as a Purchase Transaction FNC-C-CONT-003-00 scans the Contract section of the appraisal form to determine if a selection has been made for the analysis of the contract for sale if the subject is a Purchase Transaction. The appraiser must choose [I] "did" or "did not" analyze the contract for sale when the Assignment Type is noted as a Purchase Transaction. If a box is not checked, the system flags the appraisal for follow-up action. When this section is incomplete, the appraiser has omitted information. Contact the appraiser to complete the form.

FNC-C-CONT-003-01

I did (did not) analyze the contract for sale for the subject: The "did not" box is checked and Assignment Type is noted as a Purchase Transaction FNC-C-CONT-003-01 scans the Contract section of the appraisal form to determine if [I] "did not" analyze the contract for sale for the subject has been selected. All Purchase Transactions require analysis of the sales contract. If [I] "did not" analyze the contract for sale is selected, the system flags the appraisal for further review.

FNC-C-CONT-006-00

I did (did not) analyze the contract for sale for the subject purchase transaction: Description field is blank and Assignment Type is noted as a Purchase Transaction FNC-C-CONT-006-00 scans the Contract section of the appraisal form to determine if a selection has been made for the analysis of the contract for sale regarding the subject property. The system also determines if the file is marked as a Purchase Transaction under the Assignment Type. If the Description field is incomplete, the system flags the appraisal for follow-up action. When this field is incomplete, the appraiser has omitted information. Contact the appraiser to complete the form.

FNC-C-CONT-009-00

Contract Price $: Field is blank and Assignment Type is noted as a Purchase Transaction FNC-C-CONT-009-00 scans the Contract section of the appraisal form to determine if an entry has been made in the Contract Price field. If the Contract Price field is incomplete and the Assignment Type is designated a Purchase Transaction, the system flags the appraisal form for follow-up action. When this field is incomplete, the appraiser has omitted information. Contact the appraiser to complete the form.

FNC-C-CONT-012-00

Date of Contract: Field does not contain valid date and Assignment Type is noted as a Purchase Transaction FNC-C-CONT-012-00 scans the Contract section of the appraisal form to determine if an entry has been made in the Date of Contract field. If the Date of Contract field is incomplete or has an invalid date, and the Assignment Type is noted as Purchase Transaction, the system flags the appraisal form for follow-up action. When this field is incomplete, the appraiser has omitted information. Contact the appraiser to complete the form.

FNC-C-CONT-015-00

Is the property seller the owner of public record? There is no box checked and Assignment Type is noted as a Purchase Transaction FNC-C-CONT-015-00 scans the Contract section of the appraisal form to determine if a selection has been made regarding the property seller being the owner of public record when the Assignment Type is noted as a Purchase Transaction. The appraiser must check either one of two boxes: "Yes" or "No". If the status is not determined, and the Assignment Type is marked as a Purchase Transaction, the system flags the appraisal for follow-up action. When there is no box checked, the appraiser has omitted information. Contact the appraiser to complete the form.

FNC-C-CONT-015-01

Is the property seller the owner of public records? The "No" box is checked and Assignment Type is noted as a Purchase Transaction FNC-C-CONT-015-01 scans the Contract section of the appraisal form to determine if the seller is the current owner of the public record. If the "No" box is checked, and the Assignment Type is marked as a Purchase Transaction, the system flags the appraisal for further review and possible follow-up action by the appraiser.

FNC-C-CONT-018-00

Is the property seller the owner of public record? Data Source(s): Field is blank and Assignment Type is noted as a Purchase Transaction FNC-C-CONT-018-00 scans the Contract section of the appraisal form to determine if an entry has been made in the Data Sources field. If the Data Sources field is blank and the appraisal is marked as a Purchase Transaction under the Assignment Type, the system flags the appraisal for follow-up action. When this field is incomplete, the appraiser has omitted information. Contact the appraiser to complete the form.

FNC-C-CONT-021-00

Is there any financial assistance (loan charges, sale concessions, gift or down payment assistance, etc.) to be paid by any party on behalf of the borrower? There is no box checked and Assignment Type is noted as a Purchase Transaction FNC-C-CONT-021-00 scans the Contract section of the appraisal form to determine if a selection has been made regarding financial assistance to be paid on behalf of the borrower and if Purchase Transaction is selected under the Assignment Type. The appraiser must select one of two options: "Yes" or "No". If a selection is not made, the system flags the appraisal for follow-up action. When there is no box checked, the appraiser has omitted information. Contact the appraiser to complete the form.

FNC-C-CONT-021-03

Is there any financial assistance (loan charges, sale concessions, gift or down payment assistance, etc.) to be paid by any party on behalf of the borrower? The "Yes" box is checked FNC-C-CONT-021-01 scans the Contract section of the appraisal form to determine if the "Yes" box has been checked regarding financial assistance to be paid by any party on behalf of the borrower. If the "Yes" box is checked, the system flags the appraisal for further review.

FNC-C-CONT-024-01

Is there any financial assistance (loan charges, sale concessions, gift or down payment assistance, etc.) to be paid by any party on behalf of the borrower? The "Yes" box is checked and the description field is blank FNC-C-CONT-024-00 scans the Contract section of the appraisal form to determine if the "Yes" box has been checked regarding financial assistance to be paid by any party on behalf of the borrower. If "Yes" is selected and the Describe field is incomplete, the system flags the appraisal for closer review to determine if follow-up action is required by the appraiser. Concessions are costs above those paid by all sellers in a market area that is geographically defined. Fannie Mae and Freddie Mac now require more in depth descriptions of those concessions.

FNC-C-CONT-027-01

I did/did not analyze the manufacturer's invoice and subject property's age is less than 2 years: DID NOT box is checked.

FNC-C-N-003-00

Neighborhood Characteristics: Location: More than one box is checked or there is no box checked FNC-C-N-003-00 scans the Neighborhood section of the appraisal form to determine if a selection has been made for the Location of the subject property. The appraiser must choose one of three options: "Urban", "Suburban" or "Rural". One box must be selected and the indication of more than one location type requires further explanation; therefore additional documentation. If a selection is not made or there is more than one selection made, the system flags the appraisal for further review and/or follow-up action by the appraiser. When there is no box checked, the appraiser has omitted information. Contact the appraiser to complete the form.

FNC-C-N-003-01

Neighborhood Characteristics. Location: The "Rural" box is checked

FNC-C-N-003-01 scans the Neighborhood section of the appraisal form to determine if the "Rural" box has been checked with regard to Location. Rural properties must meet additional, specific requirements. Fannie Mae views an area "rural" when it "relates to the country or to any area beyond that which we define as suburban." If the "Rural" box is checked, the system flags the appraisal for further review to ensure specifications from both Fannie Mae and Freddie Mac are met.

FNC-C-N-006-00

Neighborhood Characteristics Built Up: More than one box is checked or there is no box checked FNC-C-N-006-00 scans the Neighborhood section of the appraisal form to determine if a selection has been made for the Neighborhood Characteristics, Built Up field. The appraiser must choose one of three options: "Over 75%", "25-75%" or "Under 25%". If more than one or no selection is made, the system flags the appraisal for follow-up action. When there is no box checked, the appraiser has omitted information. Contact the appraiser to complete the form.

FNC-C-N-006-00

Neighborhood Characteristics: Built Up: The "Under 25%" box is checked

FNC-C-N-006-01 scans the Neighborhood section of the appraisal form to determine if the Built-Up level or degree of development of the neighborhood is noted by the appraiser as being "Under 25%". This section relates to the percentage of improved area of all developed land types located within the subject property's neighborhood. If the "Under 25%" box is checked, the system flags the appraisal for further review.

FNC-C-N-009-00

Neighborhood Characteristics: Growth: More than one box is checked or there is no box checked FNC-C-N-009-00 scans the Neighborhood section of the appraisal form to determine if a selection has been made regarding the Growth Rate in the subject property's neighborhood. The appraiser must choose one of three options: "Rapid", "Stable" or "Slow". Only one selection is required. If more than one or no selection is made, the system flags the appraisal for follow-up action. When the appraiser indicates the existence of a unique situation in the subject's neighborhood—indicated by checking more than one box—additional documentation is required. When there is no box checked, the appraiser has omitted information. Contact the appraiser to complete the form.

FNC-C-N-009-01

Neighborhood Characteristics: Growth: The "Slow" box is checked

FNC-C-N-009-01 scans the Neighborhood section of the appraisal form to determine if the Growth Rate of residential development in the subject property's neighborhood is "Slow". When the "Slow" box is checked, the appraiser must comment on the reason for the slow Growth Rate and its effect on the value and marketability of the subject property. If the "Slow" box is checked, the system flags the appraisal for further review.

FNC-C-N-012-00

One-Unit Housing Trends: Property Values: More than one box is checked or there is no box checked FNC-C-N-012-00 scans the Neighborhood section of the appraisal form to determine if a selection has been made for the Property Values of the neighborhood. The appraiser must choose one of three options: "Increasing". "Stable", or "Declining". If the appraiser indicates the existence of a unique situation in the subject's neighborhood—indicated by checking more than one box—additional documentation is required. If more than one or no selection is made, the system flags the appraisal form for follow-up action. When there is no box checked, the appraiser has omitted information. Contact the appraiser to complete the form.

FNC-C-N-012-01

One-Unit Housing Trends: Property Values: The "Declining" box is checked

FNC-C-N-012-01 scans the Neighborhood section of the appraisal form to determine if the "Declining" box is checked for Property Values. The reason for a decline in values and the probability of its continuance are key considerations in developing a proper value estimate, and the appraisal report must contain a clear explanation of the logic behind any reflection of declining values. When the "Declining" box is checked, the appraisal is flagged for further review,

FNC-C-N-015-00

One-Unit Housing Trends: Demand/Supply: More than one box is checked or there is no box checked FNC-C-N-015-00 scans the Neighborhood section of the appraisal form to determine if a selection has been made for Demand/Supply in the subject neighborhood. The appraiser must choose one of three options: "Shortage", "Over Supply" or "In Balance". If the appraiser intentionally indicates multiple responses, supplemental documentation must be provided. The system flags the appraisal for further review when more than one or no selection is made. If the appraiser indicates the existence of a unique situation in the subject's neighborhood—indicated by checking more than one box—additional documentation is required, When there is no box checked, the appraiser has omitted information. Contact the appraiser to complete the form.

FNC-C-N-015-01

One-Unit Housing Trends: Demand/Supply: The "Over Supply" box is checked

FNC-C-N-015-01 scans the Neighborhood section of the appraisal form to determine if Demand/Supply has been rated as "Over Supply". If the appraisal indicates an over supply of properties within the subject neighborhood, the appraisal should be reviewed closely. The appraiser is required to explain clearly the reason for an over supply and its effect on the value and marketability of the property. When the "Over Supply" box is checked, the system flags the appraisal for further review. Since collateral backs every mortgage loan, the lender has specific guidelines when originating a loan on a property in a neighborhood with an abundance of properties for sale. An Over Supply of properties for sale is a direct indication of a decline in property values.

FNC-C-N-018-00

One-Unit Housing Trends: Marketing Time: More than one box is checked or there is no box checked FNC-C-N-018-00 scans the Neighborhood section of the appraisal form to determine if a selection has been made for the average Marketing Time of properties in the area of the subject property. The appraiser must choose one of three options: "Under 3 months", "3-6 months" or "Over 6 months". If no selection or more than one selection is made, the system flags the appraisal for further review. If the appraiser indicates the existence of a unique situation in the subject's neighborhood—indicated by checking more than one box—additional documentation is required. When there is no box checked, the appraiser has omitted information. Contact the appraiser to complete the form.

FNC-C-N-018-01

One-Unit Housing Trends: Marketing Time: The "Over 6 months" box is checked

FNC-C-N-018-01 scans the Neighborhood section of the appraisal form to determine if "Over 6 months" has been selected for the average Marketing Time of properties in the area of the subject property. The appraiser must choose one of three options: "Under 3 months", "3-6 months" or "Over 6 months". The appraiser must provide explanatory comments regarding the reasons behind a greater than 6 month marketing time and how these factors may influence the subject property's value. The system flags appraisals indicating "Over 6 months" for closer review. If properties in a given neighborhood are taking an extended time to sell on the open market, the lender should know this and adjust lending decisions accordingly. This does not include individual properties that may be on the market longer than six months, but rather entire neighborhoods where, on average are taking more than 6 months to sell.

FNC-C-N-021-00

One-Unit Housing PRICE: Low: Field does not contain a numeric value greater than 0

FNC-C-N-021-00 scans the Neighborhood section of the appraisal form to determine if an entry has been made in the Low field for One-Unit Housing: Price. Fannie Mae and Freddie Mac require the appraiser to provide both a price range and a predominant price for properties in the subject neighborhood. If the One-Unit Housing: Price, Low field does not contain a numeric value greater than 0, the system flags the appraisal for follow-up action. When this field is incomplete, the appraiser has omitted information. Contact the appraiser to complete the form.

FNC-C-N-021-01

One-Unit Housing PRICE: Subject market value exceeds the high end or is below the low end of the one-unit price range FNC-C-N-021-01 scans the Neighborhood section of the appraisal form to determine the price range of houses in the neighborhood (as indicated by the appraiser), comparing the sales price (or value) of the subject property against this indicated range. Fannie Mae and Freddie Mac require the appraiser to provide both a price range and a predominant price for properties in the subject neighborhood; both have requirements for those properties that fall outside of the price range. An important indicator of an atypical (for the subject neighborhood) property is a market value for the subject that exceeds the "high" end or falls below the "low" end. When the subject's sales price (or value) exceeds the "high" end or falls below the "low" end of a given neighborhood's price range, the system flags the appraisal for further review. Properties with values that fall outside of the normal range for the neighborhood can indicate problematic holdings for the lender and/or secondary marketers. The appraiser is required to explain clearly the reasoning and support for a value that is above or below the normal range. Further, the Sales Comparison Approach should be scrutinized closely for proper support of the subject's value.

FNC-C-N-024-00

One-Unit Housing PRICE: High: Field does not contain a numeric value greater than 0

FNC-C-N-024-00 scans the Neighborhood section of the appraisal form to determine if an entry has been made in the High field for One-Unit Housing: Price. Fannie Mae and Freddie Mac require the appraiser to provide both a price range and a predominant price for properties in the subject neighborhood. Fannie Mae and Freddie Mac have requirements for those properties that fall outside of the price range. If the One-Unit Housing: Price, High field does not contain a numeric value greater than 0, the appraisal is flagged for follow-up action. When this field is incomplete, the appraiser has omitted information. Contact the appraiser to complete the form.

FNC-C-N-027-00

One-Unit Housing PRICE: Pred: Field does not contain a numeric value greater than 0

FNC-C-N-027-00 scans the Neighborhood section of the appraisal form to determine if an entry has been made in the Predominant field for One-Unit Housing: Price. Fannie Mae and Freddie Mac require the appraiser to provide both a price range and a predominant price for properties in the subject neighborhood. If the One-Unit Housing: Price, Predominant field does not contain a numeric value greater than 0, the appraisal is flagged for follow-up action. When this field is incomplete, the appraiser has omitted information. Contact the appraiser to complete the form.

FNC-C-N-030-00

One-Unit Housing AGE: Low: Field is blank

FNC-C-N-030-00 scans the Neighborhood section of the appraisal form to determine if an entry has been made in the Low field for One-Unit Housing: Age. Fannie Mae and Freddie Mac require the appraiser to provide both an age range and a predominant age for properties in the subject neighborhood. If the One-Unit Housing: Age, Low field does not contain an entry, the appraisal if flagged for follow-up action. When this field is incomplete, the appraiser has omitted information. Contact the appraiser to complete the form.

FNC-C-N-030-01

One-Unit Housing AGE: The subject age exceeds the high end or is below the low end of the age range FNC-C-N-030-01 scans the Neighborhood section of the appraisal form to determine the age range of houses in the neighborhood (as indicated by the appraiser), comparing the age of the subject property against this indicated range. Fannie Mae and Freddie Mac require the appraiser to report both an age range and a predominant age for properties in the subject neighborhood: both have requirements for those properties that fall outside of the age range. If the subject's age exceeds the "high" end or is below the "low" end of the age range, the system flags the appraisal for further review.

FNC-C-N-033-00

One-Unit Housing AGE: High: Field is blank

FNC-C-N-003-00 scans the Neighborhood section of the appraisal form to determine if an entry has been made in the High field for One-Unit Housing: Age. Fannie Mae and Freddie Mac require the appraiser to provide both an age range and a predominant age for properties in the subject neighborhood, if the One-Unit Housing: Age, High field does not contain an en try, the appraisal is flagged for follow-up action. When this field is incomplete, the appraiser has omitted information. Contact the appraiser to complete the form.

FNC-C-N-036-00

One-Unit Housing AGE: Pred: Field is blank

FNC-C-N-036-00 scans the Neighborhood section of the appraisal form to determine if an entry has been made in the Predominant field for One-Unit Housing: Age. Fannie Mae and Freddie Mac require the appraiser to provide both an age range and a predominant age for properties in the subject neighborhood. If the One-Unit Housing: Age, Predominant field does not contain an entry, the appraisal is flagged for follow-up action. When this field is incomplete the appraiser has omitted information. Contact the appraiser to complete the form

FNC-C-N-075-01

Present Land Use %: Total of field entries does not equal 100%

FNC-C-N-075-01 scans Neighborhood section of the appraisal form to determine if an entry has been made in the Present Land Use Percentage field. This field provides an area for the appraiser to report the estimated percentages of different land uses within the subject property's neighborhood, with primary land use categories being One-Unit, 2-4 Unit, Multi-Family, Commercial and Other. Appraisal forms software packages may allow for other indications, including, but not limited to, such land uses as Vacant, Schools or Parks. When the present land use category is not offered on the form, it is the appraiser's responsibility to enter this use in the free text field, or explain in an attachment. FNC-C-N-075-01 calculates the total of all indicated percentages of land use; the total of these percentages must equal 100%, representing all of the neighborhood's land use. If the percentage total does not equal 100%, the appraiser has omitted information, or provided incorrect information and the appraisal is flagged for follow-up action. Contact the appraiser to complete the form.

FNC-C-N-090-00

Neighborhood Boundaries: Field is blank or contains the following terms: N/A, NA, None or Unk FNC-C-N-090-00 scans the Neighborhood section of appraisal form to determine if an entry has been made in the Neighborhood Boundaries field. If the field is incomplete, or an entry such as, N/A, NA, None or Unk is found, the system flags the appraisal form for follow-up action. When this field is incomplete, the appraiser has omitted information. Contact the appraiser to complete the form.

FNC-C-N-093-00

Neighborhood Description: Field is blank

FNC-C-N-093-00 scans the Neighborhood section of the appraisal form to determine if an entry has been made in the Neighborhood Description field. If the Neighborhood Description field is incomplete, the system flags the appraisal for follow-up action. When this field is incomplete, the appraiser has omitted information. Contact the appraiser to complete the form.

FNC-C-N-093-01

Neighborhood Description: Field contains the following term(s): Declining, Softening, Decreasing, Distressed or Slow FNC-C-N-093-01 scans the Neighborhood section of the appraisal form to determine if one of the following entries has been made: Declining, Softening, Decreasing, Distressed or Slow. If the system detects any of these terms in the Neighborhood Description field, the appraisal is flagged for further review.

FNC-C-N-096-00

Market Conditions: Field is blank

FNC-C-N-096-00 scans the Neighborhood section of the appraisal form to determine if an entry has been made in the Market Conditions field. If the Market Conditions field is incomplete, the system flags the appraisal for follow-up action. When this field is incomplete, the appraiser has omitted information. Contact the appraiser to complete the form.

FNC-C-N-096-01

Market Conditions: Field contains the following term(s): Declining, Softening, Decreasing, Distressed or Slow FNC-C-N-096-01 scans the Neighborhood section of the appraisal form to determine if a Declining market is indicated. Regardless of the reason behind a determination of declining marketability, or a soft market in general, the system flags the appraisal for further review. If the system detects Declining, Softening, Decreasing, Distressed or Slow in the Market Conditions field, the appraisal is flagged for further review. The appraiser is required to provide explanatory comments when declining or softening trends are observed, providing necessary supporting market evidence and the anticipated or resulting effect on the subject property. The Fannie Mae and Freddie Mac guidelines state that the lender should not offer maximum financing in any instance of declining property values. Both Fannie Mae and Freddie Mac require additional information in such a case. Fannie Mae dictates particular acceptable lending behavior based upon factors affecting marketability. Reasons behind declining neighborhood values and the probability of such a decline continuing are key considerations in developing a proper value estimate, and it is the appraiser's responsibility to comment on those reasons.

FNC-C-S-006-00

Area: Field does not contain numerical entry

FNC-C-S-006-00 scans the Site section of the appraisal form to determine if an entry has been made in the Area field. The field must contain the calculated site size expressed either in square feet or in acres. If the field does not contain a number, the appraisal is flagged for follow-up action. When this field is incomplete, the appraiser has omitted information. Contact the appraiser to complete the form.

FNC-C-S-015-01

Size: Field does not contain a numeric value or terms: TYP, AVG, AVE, NORM, SIM, REGU, SAME, STANDARD, CONFORMING, COMMON, GOOD, ADEQUATE, or CONDO

FNC-C-S-021-00

View: Field is blank

FNC-C-S-021-00 scans the Site section of the appraisal form to determine if an entry has been made in the View field. The view can have a positive or negative impact on the appraisal value. If this field is incomplete, the system flags the appraisal for follow-up action. When this field is incomplete the appraiser has omitted information. Contact the appraiser to complete the form.

FNC-C-S-021-01

View: Contains the following terms: Traf, Busy, Com, Gas, Hi, Hig, Hwy, Free, Inter, Trans FNC-C-S-021-01 scans the Site section of the appraisal form searching for specific text inputs indicating an undesirable View. The system accomplishes this task by searching for abbreviations of standard terms that would be indicators of a view having a negative impact on value. If an undesirable view is indicated, the system flags the appraisal for further review. FNC-C-S-021-01 scans the View field for terms such as: traffic (traf), busy streets or highways (busy), commercial influences (com), gas stations or gas easements (gas), highways (hi, hig, hwy), freeways (free), interstates (inter), and overhead transmission lines (trans). Potential buyers may consider any of these views unappealing; therefore, the view affects future marketability. When the appraisal form indicates the subject property possesses a negative view, the reviewer should verify that the appraiser has provided explanatory comments and that the negative view influence was considered in the valuation of the property. The appraiser must also consider negative view in the Sales Comparison Approach, the Cost Approach, and Income Approach, if applicable.

Note: There are no GAAR scanning for views that have a positive influence on value, such as a golf course or waterfront. Positive influences on the site do not represent a risk to the lender. The GAAR Compliance series specifically searches only for potentially negative influences in order to manage risk.

FNC-C-S-024-00

Specific Zoning Classification: Field is blank

FNC-C-S-024-00 scans the Site section of the appraisal form to determine if an entry has been made in the Specific Zoning Classification field. The zoning designation can be a critical issue in the overall valuation, as well as the acceptability of the loan for funding. When this field is incomplete, the appraiser has omitted information. Contact the appraiser to complete the form.

FNC-C-S-024-01

Specific Zoning Classification: Field contains the following terms: Commercial, Industrial, or Agriculture FNC-C-S-024-01 scans the Site section of the appraisal form searching for terms that indicate the subject site may be non-residential. The system searches for Specific Zoning Classifications such as: commercial (comme), industrial (ind), or agricultural (ag). These classifications are indicators that a subject property may not conform, in terms of zoning, to the requirements set for Fannie Mae and Freddie Mac approved residential lending. If the site is not zoned, the appraiser must enter "no zoning" in this field. If the system detects terms indicating nonconformance to Fannie Mae or Freddie Mac requirements, the appraisal is flagged for further review.

FNC-C-S-027-00

Zoning Description: Field is blank

FNC-C-S-027-00 scans the Site section of the appraisal form to determine if an entry has been made in the Zoning Description field. The particular zoning of a given subject property is an important consideration in residential lending. If the field is incomplete, the appraisal is flagged for follow-up action. When this field is incomplete, the appraiser has omitted information. Contact the appraiser to complete the form.

FNC-C-S-027-01

Zoning Description: Field contains the following terms: Commercial, Industrial or Agriculture FNC-C-S-027-01 scans the Site section of the appraisal form searching for terms indicating the subject site may be non-residential. The system is searching the Zoning Description field for the following terms: commercial (comme), industrial (ind), or agricultural (ag). These descriptions are indicators that a subject property may not conform, in terms of zoning, to the requirements set by Fannie Mae and Freddie Mac approved residential lending. If the site is not zoned, the appraiser must enter "no zoning" in this field. If the system detects terms indicating nonconformance to Fannie Mae or Freddie Mac requirements, the appraisal is flagged for further review.

FNC-C-S-027-02

Zoning Description: Field contains the following terms: Industrial or Agriculture

FNC-C-S-030-00

Zoning Compliance: There is no box checked

FNC-C-S-030-00 scans the Site section of the appraisal form to determine if a selection has been made for Zoning Compliance. The appraiser must choose one of four options: "Legal", "Legal Nonconforming (Grandfathered Use)", "No Zoning" or "Illegal". If no selection is made, the appraisal is flagged for follow-up action. When there is no box checked, the appraiser has omitted information. Contact the appraiser to complete the form.

FNC-C-S-030-01

Zoning Compliance: The "Legal Nonconforming" or the "Illegal" box is checked

FNC-C-S-030-01 scans the Site section of the appraisal form to determine if the appraiser selected either "Legal Nonconforming (Grandfathered Use)" or "Illegal" for Zoning Compliance. If a property's zoning is either "Illegal" or "Legal Nonconforming (Grandfathered Use)" the appraiser must address its effect on the subject's value and marketability. While a property with such zoning is not immediately ineligible by either Fannie Mae or Freddie Mac regulations, there are very specific requirements for exceptions to legal and conforming zoning. If "Illegal" or "Legal Nonconforming (Grandfathered Use)" is selected, the system flags the appraisal for further review. While Fannie Mae and Freddie Mac will purchase or securitize mortgages on properties with legal but nonconforming land use, the appraiser must provide details and analyze the effect such nonconforming use may have on the future marketability or value. Mortgages for properties with illegal land use will not be accepted. Freddie Mac also makes exceptions for legal but nonconforming land use.

FNC-C-S-036-01

Zoning Compliance: The "Illegal" box is checked and the description field is blank FNC-C-S-036-01 scans the Site section of the appraisal form to determine if "Illegal" has been selected for Zoning Compliance and the Describe field is blank. If the appraiser indicates the Zoning Compliance is "Illegal", the appraiser must describe its affect on the subject's value and marketability. While a property with such zoning is not immediately ineligible by either Fannie Mae or Freddie Mac regulations, there are very specific requirements for exceptions to legal and conforming zoning. If "Illegal" is selected for Zoning Compliance, and the Describe field is incomplete, the system flags the appraisal for follow-up action. Contact the appraiser to complete the form. While Fannie Mae will purchase or securitize mortgages on properties with legal but non-conforming land use, the appraiser must provide his or her analysis on the effect such nonconforming use may have on the future marketability or value. Mortgages for properties with illegal land use will not be accepted. Freddie Mac also makes exceptions for legal but nonconforming land use.

FNC-C-S-039-00

Is the highest and best use of the subject property as improved (or as proposed in the plans and specifications) the present use? There is no box checked FNC-C-S-039-00 scans the Site section of the appraisal form to determine if a selection has been made for highest and best use with regard to the present use of the subject property. The appraiser must choose one of two options: "Yes" or "No". If there is no box checked, the appraisal is flagged for follow-up action. When there is no boxed checked, the appraiser has omitted information. Contact the appraiser to complete the form.

FNC-C-S-039-01

Is the highest and best use of the subject property as improved (or as proposed in the plans and specifications) the present use? The "No" box is checked FNC-C-S-039-01 scans the Site section of the appraisal form to determine if the appraiser has indicated, by checking the "No" box, that the present use for the subject property is not the highest and best use. Fannie Mae will likely not securitize or purchase a mortgage secured by a property site that is not currently serving its highest and best use. If the "No" box is checked, the system flags the appraisal for further review. The appraiser must draw on his or her professional expertise, market awareness, and regulatory guidelines to determine if the present use of a site is the highest and best use for the subject site. If current improvements clearly do not represent the highest and best use of a given site, the appraiser must indicate this on the appraisal. In addition to Fannie Mae and Freddie Mac guidelines, USPAP has specific requirements regarding Highest and Best Use as well.

FNC-C-S-045-00

Utilities: Electricity: There is no box checked

FNC-C-S-045-00 scans the Utilities area of the appraisal form to determine if a selection has been made in the either the "Public" or "Other" box for Electricity. If no selection is made, the system flags the appraisal for follow-up action. The appraiser is required to determine the type of utilities that are connected to the subject property. When there is no box checked, the appraiser has omitted information. Contact the appraiser to complete the form.

FNC-C-S-048-01
Utilities: Electricity: The "Other" box is checked
FNC-C-S-048-01 scans the Utilities area of the appraisal form to determine if "Other" is indicated for Electricity. If "Other" is selected, the system flags the appraisal for further review. The appraiser is required to determine the type of utilities that are connected to the subject property.

FNC-C-S-054-01
Utilities: Gas: The "Other" box is checked and description field is blank or contains: N/A, NA, None or Unk
FNC-C-S-054-01 scans the Utilities area of the appraisal form to determine if the "Other" box is checked for Gas and the Describe field is blank or contains: N/A, NA, None or Unk. If "Other" is selected and the Describe field is blank or contains: N/A, NA, None or Unk, the appraisal is flagged for follow-up action. Contact the appraiser to complete the form.

FNC-C-S-057-01
Utilities: Gas: The "Other" box is checked
FNC-C-S-057-01 scans the Utilities area of the appraisal form to determine if the "Other" box is checked for Gas. If "Other" is selected, the system flags the appraisal for further review. Appraisers are required to determine the type of utilities that are connected to the subject property.

FNC-C-S-063-00
Utilities: Water: There is no box checked
FNC-C-S-063-00 scans the Utilities area of the appraisal form to determine if a selection has been made in the either the "Public" or "Other" boxes for Water. If no selection is made, the system flags the appraisal for follow-up action. Appraisers are required to determine the type of utilities that are connected to the subject property. When there is no box checked, the appraiser has omitted information. Contact the appraiser to complete the form.

FNC-C-S-066-01
Utilities: Water: The "Other" box is checked
FNC-C-S-066-01 scans the Utilities area of the appraisal form to determine if the "Other" box is checked for Water. If "Other" is selected, the system flags the appraisal for further review. Appraisers are required to determine the type of utilities that are connected to the subject property.

FNC-C-S-072-00
Utilities: Sanitary Sewer: There is no box checked
FNC-C-S-072-00 scans the Utilities area of the appraisal form to determine if a selection has been made in the either the "Public" or "Other" boxes for Sanitary Sewer. If no selection is made, the system flags the appraisal for follow-up action. Appraisers are required to determine the type of utilities that are connected to the subject property. When there is no box checked, the appraiser has omitted information. Contact the appraiser to complete the form.

FNC-C-S-075-01
Utilities: Sanitary Sewer: The "Other" box is checked and description field is blank or contains: N/A, NA, None or Unk FNC-C-S-075-01 scans the Utilities area of the appraisal form to determine if the "Other" box is checked for the Sanitary Sewer. If "Other" is selected and the Describe field contains: N/A, NA, None or Unk, the system flags the appraisal for further review. Appraisers are required to determine the type of utilities that are connected to the subject property.

FNC-C-S-084-00
Off-Site Improvements-Type: Street: There is no box checked
FNC-C-S-084-00 scans the Off-Site Improvements area of the appraisal form to determine if a selection has been made in the either the "Public" or "Private" boxes for the Street. The appraiser must choose one of the two options: "Public" or "Private". When a selection is not made, the system flags the appraisal for follow-up action. When there is no box checked, the appraiser has omitted information. Contact the appraiser to complete the form.

FNC-C-S-084-01
Off-Site Improvements-Type: Street: The "Private" box is checked
FNC-C-S-084-01 scans the Off-Site Improvements area of the appraisal form to determine if the "Private" box is checked for the Street. When the appraiser indicates the street is "Private", responsibility for maintenance of the street falls to private or community jurisdiction. If a "Private" street is indicated, the system flags the appraisal for further review. When discussing off-site improvements that may have bearing on the subject property's value or future marketability, Fannie Mae and Freddie Mac make specific reference to a situation wherein the property may face a privately or community maintained and owned street. It is the lender's responsibility to verify the existence of legal agreements for private streets.

FNC-C-S-090-01
Off-Site Improvements-Type: Alley: The "Private" box is checked
FNC-C-S-090-01 scans the Off-Site Improvements area of the appraisal form to determine if the "Private" box is checked for the Alley. When the appraiser indicates the alley is a "Private" rather than a "Public" alley, responsibility for maintenance of the alley falls to private or community jurisdiction. It is the lender's responsibility to verify the existence of legal agreements for private alleys; therefore, if a "Private" alley is indicated, the system flags the appraisal for further review. When discussing off-site improvements that may have bearing on the subject property's value or future marketability, Fannie Mae makes specific reference to a situation wherein the property may face a privately or community maintained and owned street. If the property is on such a street, rather than one publicly maintained, Fannie Mae requires that there "should be an adequate, legally enforceable agreement for the maintenance of the street."

FNC-C-S-093-00
FEMA Special Flood Hazard Area: There is no box checked
FNC-C-S-093-00 scans the Site section of the appraisal form to determine if the subject site is located in a FEMA Special Flood Hazard Area. The appraiser must choose one of two options: "Yes" or "No". If a selection is not made, the system flags the appraisal for follow-up action. When there is no box checked, the appraiser has omitted information. Contact the appraiser to complete the form.

FNC-C-S-093-01

FEMA Special Flood Hazard Area: The "Yes" box is checked

FNC-C-S-093-01 scans the Site section of the appraisal form to determine if the "Yes" box is checked in the FEMA Special Flood Hazard Area. If "Yes" is selected, the system flags the appraisal for further review. According to Fannie Mae and Freddie Mac guidelines, property in a FEMA Special Flood Hazard Area requires flood insurance. The Fannie Mae Selling Guide's Property and Appraisal Guidelines devotes an entire section to the FEMA Special Flood Hazard Area question. The appraiser is required to indicate if any part of the principal structure is located in such an area.

FNC-C-S-096-00

FEMA Flood Zone: Field is blank

FNC-C-S-096-00 scans the Site section of the appraisal form to determine if an entry has been made in the FEMA Flood Zone field. If the field is incomplete, the system flags the appraisal for follow-up action. When this field is incomplete, the appraiser has omitted information. Contact the appraiser to complete the form.

FNC-C-S-099-00

FEMA Map #: Field is blank

FNC-C-S-099-00 scans the Site section of the appraisal form to determine if an entry has been made in the FEMA Map Number field. If this field is incomplete, the system flags the appraisal for follow-up action. When this field is incomplete, the appraiser has omitted information. Contact the appraiser to complete the form.

FNC-C-S-102-00

FEMA Map Date: Field is blank

FNC-C-S-102-00 scans the Site section of the appraisal form to determine if an entry has been made in the FEMA Map Date field. If this field is incomplete, the system flags the appraisal for follow-up action. When this field is incomplete, the appraiser has omitted information. Contact the appraiser to complete the form.

FNC-C-S-105-00

Are the utilities and off-site improvements typical for the market area? There is no box checked FNC-C-S-105-00 scans the Site section of the appraisal form to determine if a selection has been made with regard to whether the utilities and off-site improvements are typical for the market area. The appraiser must choose one of two options: "Yes" or "No". If a selection is not made, the system flags the appraisal for follow-up action. When there is no box checked, the appraiser has omitted information. Contact the appraiser to complete the form.

FNC-C-S-105-01

Are the utilities and off-site improvements typical for the market area? The "No" box is checked FNC-C-S-105-01 scans the Site section of the appraisal form to determine if the "No" box is checked with regard to whether the utilities and off-site improvements [are] typical for the market area. When the appraiser checks the "No" box, an attached description is required addressing the conditions and providing comment on the impact to both value and marketability. When "No" is selected, the system flags the appraisal for closer review.

FNC-C-S-129-00

Are there any adverse site conditions or external factors (easements, encroachments, environmental conditions, land uses, etc.)? There is no box checked FNC-C-S-129-00 scans the Site section of the appraisal form to determine if an entry has been made with regard to adverse site conditions or external factors such as; easements, encroachments, environmental conditions, land uses, etc. The appraiser must choose one of two options: "Yes" or "No". If a selection is not made, the system flags the appraisal for follow-up action. When there is no box checked, the appraiser has omitted information. Contact the appraiser to complete the form.

FNC-C-S-129-01

Are there any adverse site conditions or external factors (easements, encroachments, environmental conditions, land uses, etc.)? The "Yes" box is checked FNC-C-S-129-01 scans the Site section of the appraisal form to determine if a selection has been made with regard to the presence of any adverse site conditions or external factors (easements, encroachments, environmental conditions, land uses, etc.). If the "Yes" box is checked, the system flags the appraisal for further review. Apparent adverse site conditions can take the form of easements, encroachments, environmental conditions, etc., and if the appraiser indicates the existence of such conditions, an attached description of the conditions and comment on the impact to both value and marketability is required.

FNC-C-S-132-01

Are there any adverse site conditions or external factors easements, encroachments, environmental conditions, land uses, etc.)? The "Yes" box is checked and describe field is blank or contains: NA, N/A or Unk FNC-C-S-132-01 scans the Site section of the appraisal form to determine if an entry has been made with regard to the presence of any adverse site conditions, which can influence current and future market value and/or marketability of the subject property. If "Yes" is selected, and the Describe field does not contain sufficient explanation, the system flags the appraisal for further review. The Describe field cannot be blank or contain: NA, N/A or Unk. Adverse site conditions can take the form of easements, encroachments, environmental conditions, etc.; therefore, the appraiser is required to provide a description of the conditions and comment on the impact to both value and marketability. The reviewer must also verify that any adverse condition has been considered in the Sales Comparison Approach, the Cost Approach, and the Income Approach (if applicable).

FNC-C-S-132-02

Are there any adverse site conditions or external factors (easements, encroachments, environmental conditions, land uses, etc.)? Describe field contains: TRAF, BUSY, COM, GAS, HI, HIG, HWY, FREE, INTERS, TRANS, POOR, FAIR, BELOW, EROSIO, FLOOD, DRAINAGE, SWAMP, WETLANDS, EXCESS, FIRE, FAULT, RAVINES, RADON, HAZARDOUS, SLIDES, EARTHQUAKE, FILL, ODOR, SINK, HOLE, CAVE, UNDERGROUND, TANK, DIOXIN, PIT, MINE, SUBSURFACE, INFESTATION or ENDANGERED FNC-C-S-132-02 scans the Site section of the appraisal form searching for specific text inputs indicating undesirable conditions found in the Describe field regarding any adverse site conditions or external factors (easements, encroachments, environmental conditions, land uses, etc.)? The system searches for: traffic (traff), busy streets or highways (busy), commercial influences (commercial), gas stations or gas easements (gas), highways (hi, hig, hwy), freeways (free), interstates (inter), or overhead transmission lines (trans), among other conditions. If any of these terms are found, the appraiser is required to provide explanatory comments. The system flags any appraisal indicating undesirable conditions in the Describe field for further review. Site conditions may affect future marketability and/or value of the property. The appraiser is required to provide detailed comments on undesirable conditions affecting the subject site. The reviewer must also verify that any adverse condition has been considered in the Sales Comparison Approach, the Cost Approach, and the Income Approach (if applicable).

FNC-C-IMP-009-00

GENERAL DESCRIPTION: Units: There is no box checked

FNC-C-IMP-009-00 scans the General Description area of the appraisal form to determine if a selection has been made regarding the number of Units. The appraiser must choose either: "One" or "One with Accessory Unit". If a selection is not made, the system flags the appraisal for follow-up action. When there is no box checked, the appraiser has omitted information. Contact the appraiser to complete the form.

FNC-C-IMP-009-01

GENERAL DESCRIPTION: Units: The "One with Accessory Unit" box is checked

FNC-C-IMP-009-01 scans the General Description area of the appraisal form to determine the number of Units indicated on the subject property. If "One with Accessory Unit" box is checked, the appraisal is flagged for further review.

FNC-C-IMP-018-00

GENERAL DESCRIPTION: Type: There is no box checked

FNC-C-IMP-018-00 scans General Description area of the appraisal form to determine if a selection has been made regarding the Type of Unit. The appraiser is required to check one box indicating whether the subject unit is, "Det" (Detached), "Att" (Attached), or an "S-Det/End Unit" (Semi-Detached/End Unit). If no selection is made, the system flags the appraisal for further review. When there is no box checked, the appraiser has omitted information. Contact the appraiser to complete the form.

FNC-C-IMP-018-01

GENERAL DESCRIPTION: Type: The Att. or S-Det./End Unit box is checked

FNC-C-IMP-018-01 scans General Description area of the appraisal form to determine if a selection has been made regarding the Type of Unit(s) on the subject property. The appraiser must choose one of three options: "Det." (Detached), "Att" (Attached Unit), or "S-Det./End" (Semi-Detached/End) Unit. If the system finds an indication of "Att", or "S-Det./End Unit", the appraisal is flagged for further review.

FNC-C-IMP-021-01

GENERAL DESCRIPTION: Type: Existing, Proposed or Under Construction: More than one box is checked or no box is checked FNC-C-IMP-021-01 scans the General Description area of the appraisal form to determine the selection made with regard to the property being "Existing", "Proposed" or "Under Construction". If more than one box is checked or no box is checked, the system flags the appraisal for follow-up action. Contact the appraiser to complete the form.

FNC-C-IMP-024-01

GENERAL DESCRIPTION: Design (Style): Field contains Earth, Geo, Dome, Log, Mod, Manu, MH, Mobile, Cabin, or MF FNC-C-IMP-024-01 scans the General Description area of the appraisal form to determine the Design (Style) of the subject property. The system searches for common descriptors indicating types of properties that may not represent neighborhood norms such as: Earth, Geo (Geodesic), Dome, Log, Mod (Modular), Manu or MH (Manufactured), Mobile, Cabin or MF. These property types require the appraiser to provide detailed supplemental information discussing possible effects such a home design may have on the value and/or marketability of the subject property. The reviewer must also verify that any adverse impact on value has been considered in the Sales Comparison Approach, the Cost Approach, and the Income Approach (if applicable). Therefore, the system flags appraisal reports of such property types for closer review.

FNC-C-IMP-027-00

GENERAL DESCRIPTION: Year Built: Field is blank or field does not contain a valid year FNC-C-IMP-027-00 scans the General Description area of the appraisal form checking two items. First, the system first checks if there is an entry in the Year Built field, then checks to ensure the date is valid. The year built is the actual year the subject property was built, not its age. If the field is incomplete, or the entry is invalid, the system flags the appraisal for follow-up action. When this field is incomplete, the appraiser has omitted information. Contact the appraiser to complete the form.

FNC-C-IMP-030-00

GENERAL DESCRIPTION: Effective Age (Yrs): Field is blank

FNC-C-IMP-030-00 scans General Description area of the appraisal form to determine if an entry has been made in the Effective Age field. If the field is incomplete, the appraisal is flagged for follow-up action. When this field is incomplete, the appraiser has omitted information. Contact the appraiser to complete the form.

FNC-C-IMP-030-01

GENERAL DESCRIPTION: Effective Age (Yrs): Age reported is greater than the actual age FNC-C-IMP-030-01 scans the General Description area of the appraisal form checking the Effective Age against the Year Built (actual age) reported. If the appraiser indicates an effective age that is higher than the actual age, the system flags the appraisal for further review. While not immediately disqualifying any loan, such a condition can indicate a poorly maintained property, or one which may require the addressing of some particular physical or functional issue. Therefore, a property with an effective age higher than actual age will require a closer review. By flagging appraisal reports associated with such a property, the system alerts the lender when this issue exists.

FNC-C-IMP-033-00

Foundation: Concrete Slab, Crawl Space, Full Basement, Partial Basement: There is no box checked FNC-C-IMP-033-00 scans the Foundation area of the appraisal form to determine if a selection has been made. The appraiser must choose one of four options: "Concrete Slab", "Crawl Space", "Full Basement" or "Partial Basement". If a selection is not made, the system flags the appraisal for follow-up action. When there is no box checked, the appraiser has omitted information. Contact the appraiser to complete the form.

FNC-C-IMP-039-01
Foundation: Other: Box is checked

FNC-C-IMP-066-01
FOUNDATION: Evidence of: Infestation, Dampness and/or Settlement: One or more box(es) checked
FNC-C-IMP-066-01 scans the Foundation area of the appraisal form to determine if a selection has been made indicating "Infestation", "Dampness" and/or "Settlement". When viewing the foundation, the appraiser is expected to report any evidence of infestation, dampness and/or settlement; comment on how such a factor may influence the marketability and value of the property; require correction of the problem, or request professional inspections. Therefore, when these issues exist, the system flags the appraisal for further review.

FNC-C-IMP-075-00
Exterior Description: Foundation Walls: materials/condition: Field is blank
FNC-C-IMP-075-00 scans the Exterior Description area of the appraisal form to determine if an entry has been made in the materials/condition field for Foundation Walls. If the field is incomplete, the system flags the appraisal for follow-up action. When this field is incomplete, the appraiser has omitted information. Contact the appraiser to complete the form.

FNC-C-IMP-075-01
Exterior Description: Foundation Walls: materials/condition: Contains terms: Poor, Fair, Below, Crack, See Att
FNC-C-IMP-075-01 scans the Exterior Description area of the appraisal form to determine if the Condition field of Foundation Walls contains: poor, fair, below (below average), crack or see att (indicating there are additional explanatory comments found further in the appraisal report). When viewing the foundation, the appraiser is expected to rate the Condition and comment on how such a factor may influence the marketability and value of the property; require correction of the problem; and/or, request professional inspections. Therefore, when Condition issues exist, the system flags the appraisal for further review.

FNC-C-IMP-081-00
Exterior Description: Exterior Walls: materials/condition: Field is blank
FNC-C-IMP-081-00 scans the Exterior Description area of the appraisal form to determine if an entry has been made in the materials/condition field for Exterior Walls. If the Condition field is incomplete, the system flags the appraisal for follow-up action. When this field is incomplete, the appraiser has omitted information. Contact the appraiser to complete the form.

FNC-C-IMP-081-01
Exterior Description: materials/condition: Contains terms: Poor, Fair, Below, Rot, Crack, Log, See Att
FNC-C-IMP-081-01 scans the Exterior Description area of the appraisal form to determine if the Condition field for Exterior Walls contains: poor, fair, below (below average), rot, crack, log, or see att (indicating there are additional explanatory comments found further in the appraisal report). When viewing the Exterior Walls, the appraiser is expected to rate the Condition and comment on how such a factor may influence the marketability and value of the property; require correction of the problem; and/or, request professional inspections. Therefore, when Condition issues exist, the system flags the appraisal for further review.

FNC-C-IMP-081-03
General Description: Exterior Walls: Contains terms: Poor, Fair, Below, Rot, Crack, Log, See Att FNC-C-IMP-084-00
Exterior Description Roof Surface: materials/condition: Field is blank
FNC-C-IMP-084-00 scans the Exterior Description area of the appraisal form to determine if an entry has been made in the materials/condition field for Roof. This field requires the appraiser to indicate the type and condition of the subject property's roof. If this field is incomplete, the system flags the appraisal for follow-up action. When this field is incomplete, the appraiser has omitted information. Contact the appraiser to complete the form.

FNC-C-IMP-084-01
Exterior Description: Roof Surface: materials/condition: Contains terms: Poor, Fair, Below, Worn, Leak, Crack, See Att
FNC-C-IMP-084-01 scans the Exterior Description area of the appraisal form to determine if the Condition field for Roof contains: poor, fair, below (below average), worn, leak, crack or see att (indicating there are additional explanatory comments found further in the appraisal report). The appraiser is expected to report the Materials and rate the Condition of the Roof. If any of the conditions above exist, the appraiser must comment on how such a factor may influence the marketability and value of the property; require correction of the problem; and/or, request professional inspections. Therefore, when Condition issues exist, the system flags the appraisal for further review.

FNC-C-IMP-087-00
Exterior Description: Gutters and Downspouts: materials/condition: Field is blank
FNC-C-IMP-087-00 scans the Exterior Description area of the appraisal form to determine if an entry has been made in the materials/condition field for Gutters and Downspouts. If the field is incomplete, the system flags the appraisal for follow-up action. When this field is incomplete, the appraiser has omitted information. Contact the appraiser to complete the form.

FNC-C-IMP-087-01
Exterior Description: Gutters and Downspouts: materials/condition: Contains terms: Poor, Fair, Below
FNC-C-IMP-087-01 scans the Exterior Description area of the appraisal form to determine if the Condition field for Gutters and Downspouts contains: poor, fair or below (below average). When viewing the Gutters and Downspouts, the appraiser is expected to rate the Condition and comment on how such a factor may influence the marketability and value of the property; require correction of the problem; and/or, request professional inspections. Therefore, when Condition issues exist, the system flags the appraisal for further review.

FNC-C-IMP-090-00
Exterior Description: Window Type: materials/condition: Field is blank
FNC-C-IMP-090-00 scans the Exterior Description area of the appraisal form to determine if an entry has been made in the materials/condition field for Windows. The appraiser is required to describe the type of materials and condition of the windows. If the field is incomplete, the system flags the appraisal for follow-up action. When this field is incomplete, the appraiser has omitted information. Contact the appraiser to complete the form.

FNC-C-IMP-090-01
Exterior Description: Window Type: materials/condition: Contains terms: Poor, Fair, Below, Rot, Leak, Broken, Crack, See Att
FNC-C-IMP-090-01 scans the Exterior Description area of the appraisal form to determine if the Condition field for Window Type contains: poor, fair, below (below average), rot, leak, broken, crack, or see att (indicating there are additional explanatory comments found further in the appraisal report).
When viewing the Window Type, the appraiser is expected to rate the Condition and comment on how such a factor may influence the marketability and value of the property; require correction of the problem; and/or, request professional inspections. Therefore, when Condition issues exist, the system flags the appraisal for further review.
FNC-C-IMP-093-00
Exterior Description: Storm Sash/Insulated: materials/condition: Field is blank
FNC-C-IMP-093-00 scans the Exterior Description area of the appraisal to determine if an entry has been made in the Storm Sash/Insulated field. If the field is incomplete, the system flags the appraisal for follow-up action. The appraiser is required to note if there are storm windows as well as the condition and materials associated with them. When this field is incomplete, the appraiser has omitted information. Contact the appraiser to complete the form.
FNC-C-IMP-093-01
Exterior Description: Storm Sash/Insulated: materials/condition: Contains terms: Poor, Fair, Below
FNC-C-IMP-093-01 scans the Exterior Description area of the appraisal form to determine if the Condition field for Storm Sash/Insulated contains: poor, fair, or below (below average). The appraiser is required to note if there are storm windows as well as the condition and materials associated with them. If any of the following terms: poor, fair, or below are detected, the system flags the appraisal for further review.
FNC-C-IMP-096-00
Exterior Description: Screens: materials/condition: Field is blank
FNC-C-IMP-096-00 scans Exterior Description area of the appraisal form to determine if an entry has been made in the Screens field. If the field is incomplete, the system flags the appraisal for follow-up action. The appraiser is required to note whether screens are in place on the windows. When this field is incomplete, the appraiser has omitted information. Contact the appraiser to complete the form.
FNC-C-IMP-096-01
Exterior Description: Screens: materials/condition: Contains terms: Poor, Fair, Below
FNC-C-IMP-096-01 scans the Exterior Description area of the appraisal form to determine if the Condition field for Screens contains: poor, fair, or below (below average). If the terms poor, fair, or below are detected, the system flags the appraisal for further review.
FNC-C-IMP-102-00
Interior: Floors: materials/condition: Field is blank
FNC-C-IMP-102-00 scans the Interior Description area of the appraisal form to determine if an entry has been made in the Floors field. If the field is incomplete, the system flags the appraisal for follow-up action. The appraiser is required to note the finish and condition of the property's flooring. When this field is incomplete, the appraiser has omitted information. Contact the appraiser to complete the form.
FNC-C-IMP-102-01
Interior: Floors: materials/condition: Contains terms: Poor, Fair, Below, Worn, Stain, Torn, Crack, See Att
FNC-C-IMP-102-01 scans the Interior Description area of the appraisal form to determine if the Condition field for Floors contains: poor, fair, or below (below average), worn, stain, torn, crack, see att (indicating there are additional explanatory comments found further in the appraisal report). If the system detects any of these entries; the appraisal is flagged for further review.
FNC-C-IMP-105-00
Interior: Walls: materials/condition: Field is blank
FNC-C-IMP-105-00 scans the Interior Description area of the appraisal form to determine if an entry has been made in the Walls field. If the field is incomplete, the system flags the appraisal for follow-up action. The appraiser is required to note the finish and condition of the property's walls. When this field is incomplete, the appraiser has omitted information. Contact the appraiser to complete the form.
FNC-C-IMP-105-01
Interior: Walls: materials/condition: Contains terms: Poor, Fair, Below, Worn, Stain, Crack, See Att
FNC-C-IMP-105-01 scans the Interior Description area of the appraisal form to determine if the Condition field for Walls contains: poor, fair, below (below average), worn, stain, torn, crack, see att (indicating there are additional explanatory comments found further in the appraisal form). If the system detects any of these entries, the appraisal is flagged for further review.
FNC-C-IMP-108-00
Interior: Trim/Finish: materials/condition: Field is blank
FNC-C-IMP-108-00 scans the Interior Description area of the appraisal form to determine if an entry has been made in the Trim/Finish field. If the field is incomplete, the system flags the appraisal for follow-up action. The appraiser is required to note the finish and condition of the property's Trim/Finish. When this field is incomplete, the appraiser has omitted information. Contact the appraiser to complete the form.
FNC-C-IMP-108-01
Interior: Trim/Finish: materials/condition: Contains terms: Poor, Fair, Below, Infer, See Att
FNC-C-IMP-108-01 scans the Interior Description area of the appraisal form to determine if the Condition field for Trim/Finish contains: poor, fair, below (below average), infer (inferior) or see att (indicating there are additional explanatory comments found further in the appraisal form). If the system detects any of these entries, the appraisal is flagged for further review.
FNC-C-IMP-111-00
Interior: Bath Floor: materials/condition: Field is blank
FNC-C-IMP-111-00 scans the Interior area of the appraisal form to determine if an entry has been made in the Bath Floor field. If the field is incomplete, the system flags the appraisal for further review. The appraiser is required to note the finish and condition of the property's Bath Floor. When this field is incomplete, the appraiser has omitted information. Contact the appraiser to complete the form.
FNC-C-IMP-111-01
Interior: Bath Floor: materials/condition: Contains terms: Poor, Fair, Below, Worn, Stain, Crack, See Att
FNC-C-IMP-111-01 scans the Interior Description area of the appraisal form to determine if the Condition field for Bath Floor contains: poor, fair, below (below average), worn, stain, crack, see att (indicating there are additional explanatory comments found further in the appraisal form. If the system detects any of these entries, the appraisal is flagged for further review.

FNC-C-IMP-114-00

Interior: Bath Wainscot: materials/condition: Field is blank

FNC-C-IMP-114-00 scans the Interior Description area of the appraisal form to determine if an entry has been made in the Bath Wainscot field. If the field is incomplete, the system flags the appraisal for further review. The appraiser is required to note the finish and condition of the property's Bath Wainscot. When this field is incomplete, the appraiser has omitted information. Contact the appraiser to complete the form.

FNC-C-IMP-114-01

Interior: Bath Wainscot: materials/condition: Contains terms: Poor, Fair, Below, Crack, See Att FNC-C-IMP-114-01 scans the Interior Description area of the appraisal form to determine if the Condition field for Bath Wainscot contains: poor, fair, below (below average), crack, see att indicating there are additional explanatory comments found further in the appraisal form). If the system detects any of these entries, the appraisal is flagged for further review.

FNC-C-IMP-126-00

General Description: Attic: There is no box checked

FNC-C-IMP-126-00 scans the General Description area of the appraisal form to determine if a selection is made for type of Attic. The appraiser must choose a minimum of one out of six options: "None", "Drop Stair", "Stairs", "Floor". "Scuttle", "Finished" or "Heated". If a selection is not made, the system flags the appraisal for follow-up action. When there is no box checked, the appraiser has omitted information. Contact the appraiser to complete the form.

FNC-C-IMP-126-01

General Description Attic: The "Finished" and/or the "Heated" box is checked

FNC-C-IMP-126-01 scans the General Description area of the appraisal form searching for a checkmark in the "Finished" and/or "Heated" box for Attic. If either selection is made, the system flags the appraisal for further review. The appraiser should provide complete details regarding the attic improvements. The appraiser is required to indicate whether the property has an attic and if it is "Finished". If the attic is finished and has heating and cooling this could affect the Gross Living Area calculations. The reviewer must also verify that a Finished and/or Heated attic has been considered in the Sales Comparison Approach, the Cost Approach, and the Income Approach (if applicable).

FNC-C-IMP-138-00

Heating: There is no box checked

FNC-C-IMP-138-00 scans the Improvements section of the appraisal form to determine if a selection has been made in the Heating section. The appraiser must choose one of four options: "FWA" (Forced Warm Air), "HWBB" (Hot Water Base Board), "Radiant" or "Other". If a selection is not made, the system flags the appraisal for follow-up action. When there is no box checked the appraiser has omitted information. Contact the appraiser to complete the form.

FNC-C-IMP-150-01

Heating: The "Other box is checked

FNC-C-IMP-150-01 scans the Improvements section of the appraisal form to determine if "Other" is selected in the Heating section. If "Other" is selected, the appraisal is flagged for further review. This is due to higher risk associated with wood burning, nonpermanent or other types of non-modern methods for heating and may have an impact upon final value. Appraisers are required to report the type and condition of the heating system installed in the subject property.

FNC-C-IMP-255-00

Finished Area Above Grade: Field(s) for Rooms, Bedrooms, Bath(s) and/or Square Feet of Gross Living Area does not contain a numeric value FNC-C-IMP-255-00 scans the Improvements section of the appraisal form checking the Finished Area Above Grade fields for entries in the Rooms, Bedrooms, Baths and Square Feet of Gross Living Area Above Grade. If these fields do not contain entries, the system flags the appraisal for follow-up action. When these fields are incomplete, the appraiser has omitted information. Contact the appraiser to complete the form.

FNC-C-IMP-276-00

Model Year: Field is blank and subject property's age is less than 2 years

FNC-C-IMP-276-01

Model Year Field is blank and subject property's age is less than 2 years

FNC-C-IMP-309-00

Describe the condition of the property (including needed repairs, deterioration, renovations, remodeling, etch) and data source(s): Field is blank or contains terms: N/A, NA, or Unk FNC-C-IMP-309-00 scans the Improvements section of the appraisal form searching for specific text inputs in the Condition. Describe field regarding the condition of the property (including needed repairs, deterioration, renovations, remodeling, etc.) and data source(s). If this field does not contain an entry or contains the terms: N/A, NA or Unk, the system flags the appraisal for follow-up action. When this field is incomplete, the appraiser has omitted information. Contact the appraiser to complete the form.

FNC-C-IMP-309-01

Describe the condition of the property (including needed repairs, deterioration, renovations, remodeling, etc.): Field contains terms: Poor, Fair, Below, Rot, Damage, Stain, Leak, Crack, Settle, Water, Damp, Odor, Mold, Rust, Peel or Cost to Cure.

FNC-C-IMP-309-01 scans the Improvements section of the appraisal form searching for text inputs indicating undesirable conditions found in the Describe field regarding the condition of the property (including needed repairs, deterioration, renovations, remodeling, etc.) and data source(s). Size system searches for negative indicators such as: poor, fair, below, rot, damage, stain, leak, crack, settle, water, damp, odor or mold. If any of these terms are found in the field, the system flags the appraisal for further review. The appraiser is required to note any repairs needed, renovations needed, deterioration and remodeling recently added.

FNC-C-IMP-309-02

Describe the condition of the property (including needed repairs, deterioration, renovations, remodeling, etc.): Field is blank or contains terms: N/A, NA or UNK.

FNC-C-IMP-309-03

Describe the condition of the property (including needed repairs, deterioration, renovations, remodeling, etc.):

Field contains terms: Poor, Fair, Below, Rot, Damage, Stain, Leak, Crack, Settle, Water, Damp, Odor, Mold, Rust, Peel or Cost to Cure.

FNC-C-IMP-312-00

Are there any physical deficiencies or adverse conditions that affect the livability, soundness, or structural integrity of the property? There is no box checked FNC-C-IMP-312-00 scans the Improvements section of the appraisal form to determine if a selection has been made regarding physical deficiencies or adverse conditions affecting the livability, soundness or structural integrity of the subject property. The appraiser must choose one of two options: "Yes" or "No". If there is no box checked, the system flags the appraisal for follow-up action. When there is no box checked, the appraiser has omitted information. Contact the appraiser to complete the form.

FNC-C-IMP-312-01

Are there any physical deficiencies or adverse conditions that affect the livability, soundness, or structural integrity of the property? The "Yes" box is checked FNC-C-IMP-312-01 scans the Improvements area of the appraisal form to determine if the "Yes" box is checked regarding any physical deficiencies or adverse conditions that affect the livability, soundness, or structural integrity of the property. If "Yes" is selected, the system flags the appraisal for further review. The appraiser is required to describe and provide detailed information regarding any physical deficiencies or adverse conditions that affect the livability, soundness, or structural integrity of the property. The reviewer must also verify that any adverse condition has been considered in the Sales Comparison Approach, the Cost Approach, and the Income Approach (if applicable).

FNC-C-IMP-315-02

Are there any physical deficiencies or adverse conditions that affect the livability, soundness, or structural integrity of the property? The Describe field contains: Fair, Poor, Below, Rot, Damage, Stain, Leak, Crack, Settle, Water, Damp, Odor, or Mold FNC-C-IMP-315-02 scans the Improvements section of the appraisal form regarding any physical deficiencies or adverse conditions that affect the livability, soundness, or structural integrity of the property. The system checks the Describe field for the following negative terms: fair, poor, below, rot, damage, stain, leak, crack, settle, water, damp, odor or mold. If any of these terms are detected, the system flags the appraisal for further review. The appraiser is required to describe and provide detailed information regarding any physical deficiencies or adverse conditions that affect the livability, soundness, or structural integrity of the property using the Describe field. The reviewer must also verify that any adverse condition has been considered in the applicable).

FNC-C-IMP-318-00

Does the property generally conform to the neighborhood (functional utility, style, condition, use, construction, etc.)? There is no box checked FNC-C-IMP-318-00 scans the Improvements section of the appraisal form to determine if the property generally conforms to the neighborhood (functional utility, style, condition, use, construction, etc.). If a selection is not made, the system flags the appraisal for follow-up action. When there is no box checked, the appraiser has omitted information. Contact the appraiser to complete the form.

FNC-C-IMP-318-01

Does the property generally conform to the neighborhood (functional utility, style, condition, use, construction, etc.)? The "No" box is checked FNC-C-IMP-318-01 scans the Improvements section of the appraisal form searching for a "No" selection regarding the subject property's conformance to the neighborhood. If "No" is selected, the system flags the appraisal for closer review. The appraiser must provide an explanation of the property's lack of conformance to the neighborhood. The reviewer must also verify that the lack of conformity has been considered in the Sales Comparison Approach, the Cost Approach, and the Income Approach (if applicable).

FNC-C-SCA-003-00

There are _____ comparable properties currently offered for sale in the subject neighborhood ranging in price from _____ to _____. One or more of the fields is blank or contains: NA, N/A, None, NN or Unk FNC-C-SCA-003-00 scans the first part of the Sales Comparison Approach section of the appraisal form checking all three fields on this line for numerical entries or any of the following terms: NA, N/A, None, NN or Unk. If any of the fields are incomplete, or any of the previous notations are detected, the system flags the appraisal for follow-up action. Appraisers are required to report on the current state of the housing supply in the subject property's market area. When these fields are incomplete, the appraiser has omitted information. Contact the appraiser to complete the form.

FNC-C-SCA-012-00

There are _____ comparable SALES in the subject neighborhood within the past 12 months ranging in sale price from _____ to _____. One or more of the fields is blank or contains: NA, N/A, None, NN or Unk FNC-C-SCA-012-00 scans the first part of the Sales Comparison Approach section of the appraisal form checking all three fields on this line for numerical entries or any of the following terms: NA, N/A, None, NN or Unk. If any of the fields are incomplete, or any of the previous notations are detected, the system flags the appraisal for follow-up action. Appraisers are required to report on the current state of the housing supply in the subject property's market area. When these fields are incomplete, the appraiser has omitted information. Contact the appraiser to complete the form.

FNC-C-SCA-036-00

Comparable Address: field is blank

FNC-C-SCA-081-00

Data and/or Verification Sources: COMPARABLE SALE field(s) is blank

FNC-C-SCA-081 scans the Comparable Sales area of the appraisal form to determine if an entry has been made in the Data and/or Verification Sources fields. If the fields are incomplete, the system flags the appraisal for follow-up action. When these fields are incomplete, the appraiser has omitted information. Contact the appraiser to complete the form.

FNC-C-SCA-087-00

Sales or Financing Concessions: DESCRIPTION: Field for COMPARABLE SALE is blank

FNC-C-SCA-087-00 scans the Comparable Sales area of the appraisal form to determine if an entry has been made in the Description field for Sales or Financing Concessions. If any of these fields are incomplete, the system flags the appraisal for follow-up action. The appraiser is required to research, verify and report the financing details for all comparable sales. When these fields are incomplete, the appraiser has omitted information. Contact the appraiser to complete the form.

FNC-C-SCA-087-01

Sales or Financing Concessions: Description Field(s) for Comparable Sale contains the terms UNK, TYP or NORMAL.

FNC-C-SCA-087-02

Sales or Financing Concessions: Description Field(s) for Comparable Sale contains NA, N/A, or NONE and does not contain terms Conv, FHA, VA, USDA, or Cash.

FNC-C-SCA-087-01 and -02 scan Comparable Sales area of the appraisal form to determine if the appraiser has included a Description of sales or financing concessions which include the terms: Unk, Typ, Normal, NA, N/A or None and does not contain additional descriptive terms such as: Conv, FHA, VA, USDA or Cash. If the appraiser enters Unk, Typ, Normal, NA, N/A or None and the above noted criteria are not met, the system flags the appraisal for further review. This rule is reacting to a situation where the appraiser has verified the "type" of financing; however, either there are no seller concessions, or, the information on seller concessions cannot be verified. It is unacceptable to use a comparable sale if the "type" i.e., Conv, FHA, VA, USDA, or Cash is unknown; therefore, the system alerts the reviewer when that circumstance occurs. Since sales and financing concessions can have a significant impact on the final value, the reviewer must verify that the appraisal report contains the necessary information to comply with Sales or Financing and Concessions requirements.

FNC-C-SCA-090-01

Sales or Financing Concessions: Adjustment field(s) for COMPARABLE SALE has positive entry FNC-C-SCA-090-01 scans the Comparable Sales area of the appraisal form checking the comparables and the Adjustment grid for numeric entries in the Sales or Financing Concessions field. Should a positive adjustment be found, the system flags the appraisal for further review. If the comparable sales involved the seller paying any type of sales or financing concessions (an interest rate buydown, for example, or closing costs usually paid by the borrower having been absorbed by the seller) the appraiser should include such information in the Sales of Financing Concessions field, and make appropriate negative adjustments in the Adjustment grid. Freddie Mac requires proof be provided by the lender of any concession or buydown. Fannie Mae's Selling Guide goes into detail about how an appraiser is expected to handle sales or financing concessions. Positive adjustments to the comparable sales for sales or financing concessions are not acceptable. Should the appraiser report any sales concessions, and enter a positive (upward) adjustment to the affected comparable, this adjustment will be flagged.

FNC-C-SCA-099-00

Date of Sale/Time: Field for any comparable is blank

FNC-C-SCA-099-00 scans the Comparable Sales area of the appraisal form to determine if an entry has been made in the Date of Sale/Time field for all comparables. If the Date of Sale/Time field is incomplete, the system flags the appraisal for follow-up action. When this field is incomplete, the appraiser has omitted information. Contact the appraiser to complete the form.

FNC-C-SCA-099-01

Date of Sale/Time: Field for any comparable 1-3 does not contain a valid date

FNC-C-SCA-099-01 scans the Comparable Sales area of the appraisal form checking the given comparables to make certain the Dates of Sale are valid. If the Date of Sale entered is not a valid date, the system flags the appraisal for further review.

FNC-C-SCA-099-02

Date of Sale/Time: Field for any comparable 1-3 does not reflect a closed sale date FNC-C-SCA-099-02 scans the Comparable Sales area of the appraisal form to verify that Comparables 1-3 reflect a Closed Date of Sale. Both Fannie Mae and Freddie Mac have specific requirements for the selection of valid comparable sales. If any of the comparables 1-3 are not closed sales, the rule will flag the appraisal report for further review and/or follow-up action by the appraiser.

FNC-C-SCA-099-03

Date of Sale/Time: Field for any comparable 1-3 is more than 6 months old

FNC-C-SCA-099-03 scans the Comparable Sales area of the appraisal form to verify that Comparables 1-3 reflect a Closed Date of Sale within 6 months of the effective date of the appraisal. Generally, both Freddie Mac and Fannie Mae require comparable sales be less than 12 months old. The appraiser must comment on reasons for using a comparable sale that is greater than 6 months old. The rule searches for any instance of a comparable sale over 6 months old; if detected, the appraisal is flagged for further review. While there are circumstances when a comparable sale over 6 months old would still be valid for use in determining the value of a subject property, the appraiser should provide explanatory comments and Date of Sale adjustments if warranted.

FNC-C-SCA-102-01

Date of Sale/Time: Entry in field for any comparable reflects a positive adjustment FNC-C-SCA-102-01 scans the Comparable Sales area of the appraisal form to determine if any comparable reflects a positive numeric entry in the Adjustment grid for Date of Sale/Time. Given the substantial impact of a positive adjustment, resulting in inflated values, or even appraisal fraud, such time adjustments must be well supported by the appraiser. FNC-C-SCA-102-01 guards against such an occurrence by flagging those appraisal reports with positive time adjustments for further review. This rule does not prohibit positive adjustments, but rather flags the appraisal for closer review to determine if the increase is supported. For example, if property values are truly increasing, it is expected that comparable sales with recent closing dates would be available. If comparables with closing dates older than 6 months are used, the support for increasing property values is questionable.

FNC-C-SCA-105-01

Location: SUBJECT field contains: Fair, Poor, Inferior, Traf, Busy, Comme, Gas, Hi, Hig, Hwy, Free, Inters or Trans FNC-C-SCA-105-01 scans the Sales Comparison Approach section of the appraisal form to determined if Subject's Location field contains the following terms: fair, poor, inferior, traffic (traf), busy streets or highways (busy), commercial influences (comme), gas stations or gas easements (gas), highways (hi, hig, hwy), freeways (free), interstates (inters), or overhead transmission lines (trans). Different locations are characterized and influenced by a variety of specific conditions. The appraiser must consider the effect such conditions will have on the marketability of the subject. In addition to the adjustments in the Sales Comparison Approach, the reviewer must also verify that any adverse condition affecting the Subject's Location has been considered in the Cost Approach, as well as the Income Approach (if applicable). Therefore, when the above terms are found, the system flags the appraisal for further review.

FNC-C-SCA-114-01

Leasehold/Fee Simple: Field contains: Leasehold

FNC-C-SCA-114-01 scans the Sales Comparison Approach section of the appraisal form to determine if the Leasehold/Fee Simple field contains Leasehold for the property rights appraised. Specifically, the system searches the Leasehold/Fee Simple field for the subject property to determine whether the appraiser has used the term Lease. The system flags those appraisal reports for closer review, including determining the presence of required supplementary documentation by the appraiser. In addition, Fannie Mae has specific requirements regarding mortgages secured by leasehold estates and expects the appraiser to "develop (and attach as an addendum to the appraisal report form) a thorough, clear, and detailed narrative that identifies the terms, restrictions, and conditions of the lease agreement or ground lease and discusses what effect, if any, they have on the value and marketability of the subject property."

FNC-C-SCA-159-00

Site: SUBJECT field does not contain numeric value

FNC-C-SCA-159-00 scans the Sales Comparison Approach section of the appraisal form to determine if a numerical entry is made in the Subject Site field. If a number is not detected in the field, the system flags the appraisal for follow-up action. Appraisers must provide the site size of the subject property to analyze and make market-related adjustments for differences between the subject's site and those of the comparables sales. When this field is incomplete, the appraiser has omitted information. Contact the appraiser to complete the form.

FNC-C-SCA-162-00

Site: Comparables: Field does not contain a numeric value

FNC-C-SCA-162-00 scans the Sales Comparison Approach section of the appraisal form to determine if entries have been made in the Comparables Site fields. If a number is not detected in the Site fields for all comparables, the system flags the appraisal for follow-up action. When these fields are incomplete, the appraiser has omitted information. Contact the appraiser to complete the form.

FNC-SCA-168-01

View: SUBJECT field contains: Fair, Poor, Inferior, Traf, Busy, Comme, Gas, Hi, Hig, Hwy, Free, Inters or Trans FNC-C-SCA-168-01 scans the Sales Comparison Approach section of the appraisal form to determine if the Subject's View field contains the following terms: fair, poor, inferior, traffic (traf), busy streets or highways (busy), commercial influences (comme), gas stations or gas easements (gas), highways (hi, hig, hwy), freeways (free), interstates (inters), or overhead transmission lines (trans). Any of these views can affect value and/or marketability, and must be taken into account when selecting and/or adjusting comparable sales. Should the appraisal report indicate that the subject property possesses such a view, the reviewer should insure that the View was considered in the Sales Comparison Approach, the Cost Approach, and the Income Approach (if applicable). Therefore, when the above terms are found, the system flags the appraisal for further review.

FNC-C-SCA-177-01

Design (Style): Subject field contains Earth, Geo, Dome, Log, Mod, Man, MH, Mobile, Fair, Poor, Inf, MF, or Cabin.

FNC-C-SCA-177-01 scans Sales Comparison Approach section of the appraisal form to determine if the Design (Style) field of the subject property contains the terms: Earth, Geo (Geodesic), Dome, Log, Mod (Modular), Manu or MH (Manufactured), Mobile, Fair, Poor, or Inf (Inferior). These property types require the appraiser to attach detailed supplemental information detailing and discussing any possible effect such a home design may have on the value and/or marketability of the subject property. Further, a rating of fair, poor, or inferior for the subject's Design (Style) must also be explained and the effect on marketability analyzed. If the system detects any of the previous terms in the Design (Style) field, the appraisal is flagged for further review.

FNC-C-SCA-177-02

Design (Style): Subject field does not contain Man, MH, MF, Mobile, Double, Triple, Singlewide, or Ranch.

FNC-C-SCA-186-01

Quality of Construction: SUBJECT field contains: Inferior, Poor, Fair, Below

FNC-C-SCA-186-01 scans the Sales Comparison Approach section of the appraisal form to determined if the Subject Quality of Construction field contains the following terms: inferior, poor, fair, or below (below average). The rule looks for common terms the appraiser may have used to indicate an inferior quality of construction. If the appraiser indicates inferior, poor, fair, or below, the appraisal is flagged for further review. Further, a rating of inferior, poor, fair, or below (below average) for the subject's Quality of Construction must also be explained and the effect on value and marketability analyzed.

FNC-C-SCA-204-01

Condition: SUBJECT field contains: Inferior, Poor, Fair, Below

FNC-C-SCA-204-01 scans the Sales Comparison Approach section of the appraisal form to determine if the Subject Condition field contains the terms inferior, poor, fair or below (below average). If the appraiser indicates detrimental aspects of the property's condition, an explanation must be included regarding the specifics of that condition and needed repairs or existent inadequacies. A rating of inferior, poor, fair or below for the subject's Condition must also be explained and the effect on value and marketability analyzed. Further, the reviewer may have to clear any "subject to" conditions of the appraisal found in the Reconciliation section. Therefore, when these terms exist, the appraisal is flagged for further review.

FNC-C-SCA-264-01

Functional Utility: SUBJECT field contains: Inferior, Poor, Fair, Below

FNC-C-SCA-264-01 scans the Sales Comparison Approach section of the appraisal form to determine if the Subject Functional Utility field contains the terms: inferior, poor, fair or below (below average). The Sales Comparison Approach grid requires the reporting/rating of any Functional Obsolescence, previously noted in other sections of the form, in the Functional Utility field of the grid. Further, a rating of fair, poor, or inferior for the subject's Functional Utility must also be explained and the effect on value and marketability analyzed. If the system detects any of the previous terms in the Functional Utility field, the appraisal is flagged for further review.

FNC-C-SCA-348-00

Adjusted Sales Price of Comparables: Net Adj.: The Net adjustment field for any comparable does not contain a numeric entry.

FNC-C-SCA-348-01

Adjusted Sales Price of Comparables: The Net Adjustment for any comparable exceeds 15 percent of the unadjusted sales price FNC-C-SCA-348-01 scans the Comparable Sales area of the appraisal form to determine if the Net adjustment for any comparable sale exceeds 15% of the unadjusted sales price. Fannie Mae and Freddie Mac have established guidelines which state that the dollar amount of the net adjustment for each comparable should not exceed 15% of the sales price of the comparable sale. If the adjustments to any comparable exceed 15%, the appraiser must provide an explanation for the adjustment and why a more similar comparable is not (or can not be) used. Appraisal reports containing comparable sales with net adjustments over 15% must be reviewed closely. The reviewer must make certain the appraiser has provided acceptable explanatory comments as to why the adjustments exceed the recommended guidelines. Therefore, the system will calculate the adjustments and flag the appraisal report if any comparable exceeds the 15% net guideline.

FNC-C-SCA-351-00

Adjusted Sales Price of Comparables: The Gross adjustment for any comparable exceeds 25 percent of the unadjusted sales price.

FNC-C-SCA-351-01

Adjusted Sales Price of Comparables: The Gross Adjustment for any comparable exceeds 25 percent of the unadjusted sales price FNC-C-SCA-351-01 scans the Comparable Sales area of the appraisal form to determine if the Gross Adjustment for any comparable sale exceeds 25% of the unadjusted sales price Fannie Mae and Freddie Mac have established guidelines which state that the dollar amount of the gross adjustment for each comparable should not exceed 25% of the sales price of the comparable sale. If the gross adjustments to any comparable exceed 25%, the appraiser must provide an explanation for the adjustment and why a more similar comparable is not (or can not be) used. Appraisal reports which contain comparable sales with gross adjustments over 25% must be reviewed closely. The reviewer must make certain the appraiser has provided acceptable explanatory comments as to why the adjustments exceed the recommended guidelines. Therefore, the system will calculate the adjustments and flag, the appraisal report if the gross adjustment to any comparable exceeds the 25% gross guideline.

FNC-C-SCA-399-00

Rent Control: Comparable Sales: There is no box checked.

FNC-C-SCAHIS-003-00

I did/did not research the sale or transfer history of the subject property and comparable sales: There is no box checked FNC-C-SCAHIS-003-00 scans the History area of the appraisal form to determine if a selection has been made regarding the appraiser researching the sale or transfer history of the subject property and comparable sales. The appraiser must choose one of two options: [I] "did" or "did not" research the sale or transfer history. If a selection is not made, the system flags the appraisal for follow-up action. When there is no box checked, the appraiser has omitted information. Contact the appraiser to complete the form.

FNC-C-SCAHIS-003-01

I did/did not research the sale or transfer history of the subject property and comparable sales: The "did not" box is checked FNC-SCAHIS-003-01 scans the History area of the appraisal form checking the sale or transfer history of the Subject Property. If the [I] "did not" box is checked, the appraisal is flagged for further review. Appraisers are required to state that they have researched the subject and comparable sales. USPAP regulations state that a three-year search for market history of the subject and comparables is required.

FNC-C-SCAHIS-006-01

I did/did not research the sale or transfer history of the subject property and comparable sales: The "did not" box is checked and the explanation field is blank FNC-C-SCAHIS-006-01 scans the History area of the appraisal form when the [I] "did not" box is checked to determine if there is an entry in the Explanation field. If the appraiser selects "did not" concerning researching the sale or transfer history of the subject property and comparable sales, an explanation must be provided. If the [I] "did not" box is checked and the Explanation field is incomplete, the system flags the appraisal for follow-up action. Contact the appraiser to complete the form.

FNC-C-SCAHIS-009-00

My research did/did not reveal any prior sales or transfers of the subject property for the three years prior to the effective date of the appraisal: There is no box checked FNC-C-SCAHIS-009-00 scans the History area of the appraisal form to determine if an entry has been made with regard to the research revealing prior sales or transfers of the subject property for three years prior to the effective date of the appraisal. The appraiser must choose one of two options: [My research] "did" or "did not" reveal prior sales or transfers for the three years prior to the effective date of the appraisal. If a selection is not made, the system flags the appraisal for follow-up action. When there is no box checked, the appraiser has omitted information. Contact the appraiser to complete the form.

FNC-C-SCAHIS-009-01

My research did/did not reveal any prior sales or transfers of the subject property for the three years prior to the effective date of the appraisal: The "did" box is checked FNC-C-SCAHIS-009-01 scans the History area of the appraisal form to determine if the [I] "did" box is checked, indicating that the appraiser found prior sales or transfers of the subject property within the last three years. This statement is designed to directly ask the appraiser to certify and verify that they have specifically found or not found any sales or transfers. When prior sales are noted, the appraisal must be reviewed closely to determine the relationship of the prior sales prices to the current opinion of value. Therefore, when the [I] "did" box is checked, the system flags the appraisal for further review.

FNC-C-SCAHIS-012-01

My research did/did not reveal any prior sales or transfers of the subject property for the three years prior to the effective date of the appraisal: Data source(s): Field is blank FNC-C-SCAHIS-012-01 scans the History area of the appraisal form to determine if an entry has been made in the Data Sources field with regard to the prior sales or transfers of the subject property. Along with certifying and verifying that they have specifically found or not found any sales or transfers, the appraiser must provide their Data Sources relied upon for this research. If the field is incomplete, the system flags the appraisal for follow-up. Contact the appraiser to complete the form.

FNC-C-SCAHIS-015-00

My research did/did not reveal any prior sales or transfers of the comparable sales for the year prior to the date of sale of the comparable sale: There is no box checked FNC-C-SCAHIS-015-00 scans the History area of the appraisal form to determine if a selection has been made for the prior sales or transfers of the comparable sales for the year prior to the date of sale of the comparable sales. The appraiser must choose one of two options: [My research] "did" or "did not" reveal prior sales or transfers of the comparable sales for the year prior to the date of sale of the comparable sale. If a selection is not made, the system flags the appraisal for follow-up action. When there is no box checked, the appraiser has omitted information. Contact the appraiser to complete the form.

FNC-C-SCAHIS-015-01

My research did/did not reveal any prior sales or transfers of the comparable sales for the year prior to the date of sale of the comparable sale: The "did" box is checked FNC-C-SCAHIS-015-01 scans the History area of the appraisal form to determine if the [I] "did" box is checked, indicating that the appraiser found prior sales or transfers of the comparable sales within one year prior to the date of sale of the comparable sale. This statement is designed to directly ask the appraiser to certify and verify that they have specifically found or not found any sales or transfers of any comparable sales within the year prior to the date of sale. When prior sales are noted, the appraisal Sales Comparison Approach section must be reviewed closely to determine the relationship of a prior sales price to the sales price currently reported on the appraisal form for that same comparable. Therefore, when the "did" is checked, the system flags the appraisal for further review.

FNC-C-SCAHIS-018-01

My research did/did not reveal any prior sales or transfers of the comparable sales for the year prior to the date of sale of the comparable sale: Data source(s): Field is blank FNC-C-SCAHIS-018-01 scans the History area of the appraisal form to determine if an entry has been made in the Data Sources field with regard to the prior sales or transfers of the Comparable Sales. Along with certifying and verifying that they have specifically found or not found any sales or transfers, the appraiser must provide their Data Sources for this research. If the field is incomplete, the system flags the appraisal for follow-up. Contact the appraiser to complete the form.

FNC-C-SCAHIS-021-01

SUBJECT: DATE of Prior Sale/Transfer: Field contains date within 3 years of effective date of appraisal or field contains: See or Refer FNC-C-SCAHIS-021-01 scans the History area of the appraisal form to determine if there is an entry for the Date of the subject property's prior sale(s) if within 3 years of the current date of value; and/or if the field contains the terms: See or Refer indicating an associated attachment, narrative, or further documentation regarding Date of Prior Sale/Transfer. If the terms See or Refer are found, the system flags the appraisal for further review. It is the responsibility of the reviewer to carefully read all additional comments and attachments for possible History information on the Subject Property.

FNC-C-SCAHIS-024-01

COMPARABLES: DATE of Prior Sale/Transfer: Field contains date for the year prior to the date of sale of the comparable sale FNC-C-SCAHIS-024-01 scans the History area of the appraisal form to determine if there is an entry for any Date of prior sale(s) within one year prior to the date of sale of the comparable sale (as reported by the appraiser in the Sales Comparison Approach field Date of Prior Sale/Transfer). If this field contains a date for the year prior to the date of sale of the comparable sale, the appraisal is flagged for further review.

FNC-C-SCAHIS-024-02

COMPARABLES: Date, Price and/or Data Source . . . : (COMPARABLES): Fields contains: See or Refer FNC-C-SCAHIS-024-02 scans the History area of the appraisal form for the terms See or Refer regarding the Comparables, indicating an associated attachment, narrative, or further documentation regarding Date, Price, and/or Data Source. If the terms See or Refer are found, the system flags the appraisal for further review. It is the responsibility of the reviewer to carefully read all additional comments and attachments for possible History information on Comparables.

FNC-C-SCAHIS-027-01

SUBJECT: PRICE of Prior Sale/Transfer: Field contains sales price within 3 years of effective date of appraisal or field contains: See or Refer FNC-C-SCAHIS-027-01 scans the History area of the appraisal form to determine if there is an entry for the Price of the subject property's prior sale(s) if within 3 years of the effective date of the appraisal; and/or if the field contains the terms: See or Refer indicating an associated attachment, narrative, or further documentation regarding Date of Prior Sale/Transfer. If the Price field contains an entry and/or the terms See or Refer are found, the system flags the appraisal for further review. It is the responsibility of the reviewer to carefully read all additional comments and attachments for possible History information on the subject property.

FNC-C-SCAHIS-027-02

SUBJECT: DATE of Prior Sale/Transfer: Field contains date within 3 years of effective date of appraisal and fields for PRICE or DATA SOURCE or EFFECTIVE DATE OF DATA SOURCE contains: N/A, NA, None, Unk, See, Refer or field is blank FNC-C-SCAHIS-027-02 scans the History area of the appraisal form to determine if a Date entry has been made in the Date of Prior Sale/Transfer field for the subject property. If a Date has been entered, the system checks for terms or abbreviations such as: N/A, NA, None, Unk, See or Refer. If any of these terms are found, the system flags the appraisal for further review. If the field is incomplete, this also causes the appraisal to be flagged for follow-up action. If this field is incomplete, contact appraiser to complete the form.

FNC-C-SCAHIS-030-01

COMPARABLES: PRICE of Prior Sale/Transfer: Field contains sales price for the year prior to the date of sale of the comparable sale FNC-C-SCAHIS-030-01 scans the History area of the appraisal form to determine if there is an entry for Price of prior sale(s) within one year prior to the date of sale of the comparable sale (as reported by the appraiser in the Sales Comparison Approach field Date of Prior Sale/Transfer). If a prior Price is found, the appraisal is flagged for further review.

FNC-C-SCAHIS-045-01

Analysis of prior sale or transfer of history of the subject property and comparable sales: A box is checked to indicate a prior sale and field is blank or contains: N/A, NA, None or Unk FNC-C-SCAHIS-045-01 scans the History area of the appraisal form to determine if the field for Analysis of a prior sale or transfer of the subject or comparable sales is blank or contains N/A, NA, None or Unk. If the system indicates any of these entries, the appraisal is flagged for further review and/or follow-up action. Contact the appraiser to complete the form.

FNC-C-SCAVALUE-000-01

Indicated Value by: Sales Comparison Approach: Field is blank

FNC-C-SCAVALUE-000-01 scans the Sales Comparison Approach section of the appraisal form to determine if an entry has been made in the Indicated Value by Sales Comparison Approach field. If the field is incomplete, the system flags the appraisal for follow-up action. Contact the appraiser to complete the form.

FNC-C-REC-001-00

This Appraisal Is Made: There is no box checked

FNC-C-REC-001-00 scans the Reconciliation section of the appraisal form to determine if a selection has been made in the This Appraisal Is Made area of the form. In the Reconciliation section, the appraiser must indicate whether the appraisal is made "as is" or "subject to" specific conditions. If the appraiser fails to make a selection, the system flags the appraisal for follow up action. When there is no box checked, the appraiser has omitted information. Contact the appraiser to complete the form.

FNC-C-REC-001-01

The Appraisal is Made: Box is checked for one or more of the following: "Subject to completion per plans and specifications..." or "Subject to the following repairs or alteration . . . ", or "Subject to the following required inspection . . ."

FNC-C-REC-001-01 scans the Reconciliation section of the appraisal form to determine if the appraiser has selected any of the "subject to . . ." boxes. If a "subject to" selection is made, the appraiser must provide specific details regarding the required repairs or conditions. The system flags this type of appraisal for further review. The "subject to" boxes alert the reviewer that the appraisal has additional requirements such as inspections, repairs required, etc. The appraisal report form allows for three designations, "subject to repairs..." "subject to inspection . . ." and "subject to completion . . . ". It is the responsibility of the reviewer to "clear" any conditions set forth in this area of the appraisal form.

FNC-C-MKTVALUE-000-01

Opinion of Market Value: Field does not contain a numeric value greater than 0

FNC-C-MKTVALUE-000-01 scans the Sales Comparison Approach section of the appraisal form to determine if a numeric entry has been made in the Opinion of Market Value field. If the field is incomplete, the system flags the appraisal for follow-up action. Contact the appraiser to complete the form.

FNC-C-MKTVALUE-000-02

Opinion of Market Value: Appraised value is $1 million or higher. The appraiser must be State Certified if the transaction value is $1 million or higher FNC-C-MKTVALUE-000-02 scans the Sales Comparison Approach section of the appraisal form to determine if the Opinion of Market Value field contains an entry of $1 million or more, and if the State Certification # field is complete. If the Opinion of Market Value field contains an entry of $1 million or higher, the system flags the appraisal when the State Certified field is incomplete.

FNC-C-MKTVALUE-000-03

Opinion of Market Value: Field does not equal Value by Sales Comparison Approach FNC-C-MKTVALUE-000-03 scans the Sales Comparison Approach section of the appraisal form to determine if the Opinion of Market Value field is equal to the Indicated Value by Sales Comparison Approach. If these two values differ, the system flags the appraisal for further review and follow-up action by the appraiser. This rule is designed to detect inconsistency throughout the appraisal.

FNC-C-RECDATE-000-00 of appraisal: Field is blank

FNC-C-RECDATE-000-00 scans the Sales Comparison Approach section of the appraisal form to determine if an entry has been made in the Effective date of appraisal field. If the Date field is incomplete, the system flags the appraisal for follow-up action. When this field is incomplete, the appraiser has omitted information. Contact the appraiser to complete the form.

FNC-C-RECDATE-000-01

Date of Inspection and the Effective Date of this Appraisal: Field does not contain a valid date FNC-C-RECDATE-000-01 scans the Sales Comparison Approach section of the appraisal form to determine if a valid date has been entered in the Date of Inspection and the Effective Date of this Appraisal field. If the appraiser enters an invalid date in the Date field provided, the system flags the appraisal for follow-up action. Dates that do not contain the full date or only contain the month and year are considered incomplete. Contact the appraiser to complete the form.

FNC-C-RECDATE-000-02

Effective Date of the Appraisal: Field contains date that is more than 120 days older than current date FNC-C-RECDATE-000-02 scans Sales Comparison Approach section of the appraisal form to compare the entry made in the Effective Date field with the current date. If the Effective Date is 120 days or older than the current date, the system flags the appraisal for further review.

FNC-C-CA-003-00

Support for the opinion of site value: Field is blank and field Indicated Value by Cost Approach contains a value FNC-C-CA-003-00 scans the Cost Approach section of the appraisal form to determine if an entry is made in the Support for the opinion of site value field. If the Indicated Value by Cost Approach contains a numeric entry, the Support for the opinion of the site value must be complete. If this field is incomplete, the system flags the appraisal for follow-up action. When this field is incomplete, the appraiser has omitted information. Contact the appraiser to complete the form.

FNC-C-CA-003-01

Support for the opinion of site value: Field is blank and field Opinion of Site Value contains a value

FNC-C-CA-006-00

Estimated Reproduction or Replacement Cost New: There is no box checked and field Indicated Value by Cost Approach field contains a value FNC-C-CA-006-00 scans the Cost Approach section of the appraisal form to determine if a selection has been made in the Estimated Reproduction or Replacement Cost New area of the form if the Indicated Value by Cost Approach contains a numeric entry. The appraiser is required to select one of two options: "Reproduction" or "Replacement Cost New" when the Indicated Value field contains a numeric entry. If a selection is not made, the system flags the appraisal for follow-up action. When there is no box checked, the appraiser has omitted information. Contact the appraiser to complete the form.

FNC-C-CA-009-00

Source of Cost Data: Field is blank and Indicated Value by Cost Approach contains a value FNC-C-CA-009-00 scans the Cost Approach section of the appraisal form to determine if an entry has been made in the Source of Cost Data field when the field for Indicated Value by Cost Approach contains a numeric entry. The form requires the appraiser to indicate the Source of Cost Data when completing the Cost Approach. If the Source of Cost Data field is incomplete and the Indicated Value field contains a numeric entry the system flags the appraisal for follow-up action. When this field is incomplete, the appraiser has omitted information. Contact the appraiser to complete the form.

FNC-C-CA-012-00

Quality Rating from Cost Service: Field is blank or contains NA, N.A. or N/A, and Indicated Value by Cost Approach contains a value FNC-C-CA-012-00 scans the Cost Approach section of the appraisal form to determine if an entry has been made in the Quality Rating from Cost Service field and the field for Indicated Value by Cost Approach contains a numeric entry. If the Quality Rating from Cost Service field is incomplete and the Indicated Value by Cost Approach field contains a numeric entry, the system flags the appraisal for follow-up action. When this field is incomplete, the appraiser has omitted information. Contact the appraiser to complete the form.

FNC-C-CA-015-00

Effective Date of Cost Data: Field is blank or contains NA, N.A. or N/A, and Indicated Value by Cost Approach contains a value FNC-C-CA-015-00 scans the Cost Approach section of the appraisal form to determine if an entry has been made in the Effective Date of Cost Data field and the field for Indicated Value by Cost Approach contains a numeric entry. If the Effective Date of the Cost Data is incomplete and the Indicated Value by Cost Approach field contains a numeric entry, the system flags the appraisal for follow-up action. When this field is incomplete, the appraiser has omitted information. Contact the appraiser to complete the form.

FNC-C-CA-102-01

Depreciation: Functional: Field contains a numeric entry other than 0

FNC-C-CA-102-01 scans the Cost Approach section of the appraisal form to determine if the appraiser has entered a numeric value greater than zero in the Functional Depreciation field. If a value greater than zero is entered, the system flags the appraisal for further review. If the appraiser has reported Functional Obsolescence, the appraisal should be reviewed carefully for explanatory comments. Further, the reviewer should verify that the Functional Obsolescence has been considered in the Sales Comparison Approach and the Income Approach, if applicable. Therefore, when there is an entry greater than 0 in the Functional Depreciation field, the appraisal is flagged for further review.

FNC-C-CA-105-01

Depreciation: External: Field contains a numeric entry other than 0

FNC-C-CA-105-01 scans the Cost Approach section of the appraisal form to determine if the appraiser has entered a numeric value greater than zero in the External Depreciation field. If a value greater than zero is entered, the system flags the appraisal for further review. If the appraiser has reported External Obsolescence, the appraisal should be reviewed carefully for explanatory comments. Further, the reviewer should verify that the External Obsolescence has been considered in the Sales Comparison Approach and the Income Approach, if applicable. Therefore, when there is an entry greater than 0 in the External Depreciation field, the appraisal is flagged for further review.

FNC-C-PUDINFO-003-00

Project Information for PUDS: Is the developer/builder in control of the Homeowner's Association (HOA)? There is no box checked and the PUD box in subject section is checked FNC-C-PUDINFO-003-00 scans the PUD Information section of the appraisal form to determine if a selection has been made in regard to the developer/builder being in control of the Homeowner's Association if the "PUD" box in the Subject section is checked. When the appraiser indicates the subject property is part of a planned unit development, then one of two options must be selected: "Yes" or "No" as to whether the developer or builder is in control of the Homeowner's Association. If a selection is not made, the system flags the appraisal for follow-up action. When there is no box checked, the appraiser has omitted information. Contact the appraiser to complete the form.

FNC-C-PUDINFO-003-01

Project Information for PUDS: Is the developer/builder in control of the Homeowner's Association (HOA)? The "Yes" box is checked FNC-C-PUDINFO-003-01 scans the PUD Information section of the appraisal form to determine if the "Yes" box is marked indicating the development's Homeowners' Association (HOA) is controlled by the developer/builder.

If the "Yes" box is checked, along with the Unit Type being noted as "Attached" in this section, the appraiser is required to complete the remaining items in the PUD section. Therefore, the system flags the appraisal for further review.

FNC-C-PUDINFO-006-00

Unit Type(s): There is no box checked and the PUD box in Subject section is checked FNC-C-PUDINFO-006-00 scans the PUD Information section of the appraisal form to determine if a selection has been made in the Unit Type(s) area of the form and the "PUD" box in the Subject section is checked. When the appraiser indicates that the property is part of a planned unit development in the Subject section of the appraisal, but in the PUD section has not indicated the Unit Type, either as "Detached" or "Attached", the system will flag the appraisal for follow-up action. When no box is checked for Unit Type the appraiser has omitted information. Contact the appraiser to complete the form.

FNC-C-PUDINFO-006-01

Unit Type(s): The "Attached" box is checked

FNC-C-PUDINFO-006-01 scans the PUD Information section of the appraisal form to determine if "Attached" is selected in regard to the Unit Type(s). Fannie Mae has very specific requirements around PUDs and the appraisal of individual units within them. Therefore, if "Attached" is selected, the system flags the appraisal for further review.

FNC-C-CERT-003-00

APPRAISER Signature: Field is blank

FNC-C-CERT-003-00 scans the Certification area of the appraisal form to determine if a signature has been entered in the Appraiser Signature field of the form. If the Signature field is incomplete, the system flags the appraisal for follow-up action. When this field is incomplete, the appraiser has omitted information. Contact the appraiser to complete the form.

FNC-C-CERT-006-00

APPRAISER Name: Field is blank

FNC-C-CERT-006-00 scans the Certification area of the appraisal form to determine if a name has been entered in the Appraiser Name field. If the Appraiser Name field is incomplete, the system flags the appraisal for follow-up action. When this field is incomplete, the appraiser has omitted information. Contact the appraiser to complete the form.

FNC-C-CERT-009-00

APPRAISER Company Name: Field is blank

FNC-C-CERT-009-00 scans the Certification area of the appraisal form to determine if an entry has been made in the Appraiser Company Name field. If the Company Name field is incomplete, the system flags the appraisal for follow-up action. When this field is incomplete, the appraiser has omitted information. Contact the appraiser to complete the form.

FNC-C-CERT-012-00

APPRAISER Company Address: Field is blank

FNC-C-CERT-012-00 scans the Certification area of the appraisal form to determine if an entry has been made in the Appraiser Company Address field. If the Company Address field is incomplete, the system flags the appraisal for follow-up action. When this field is incomplete, the appraiser has omitted information. Contact the appraiser to complete the form.

FNC-C-CERT-024-00

APPRAISER Telephone Number: Field is blank

FNC-C-CERT-024-00 scans the Certification area of the appraisal form to determine if any entry has been made in the Appraiser Telephone Number field. If the Telephone Number field is incomplete, the system flags the appraisal for follow-up action.

FNC-C-CERT-030-00

APPRAISER Date of Signature and Report: Field is blank

FNC-C-CERT-030-00 scans the Certification area of the appraisal form to determine if an entry has been made in the Appraiser Date of Signature and Report field. If the Date of Signature and Report field is incomplete, the appraisal if flagged for follow-up action. When this field is incomplete, the appraiser has omitted information. Contact the appraiser to complete the form.

FNC-C-CERT-030-01

APPRAISER Date of Signature and Report: Field does not contain a valid date

FNC-C-CERT-030-01 scans the Certification area of the appraisal form to determine if an entry has been made in the Date of Signature and Report field. If the date is invalid, the appraisal is flagged for further review.

FNC-C-CERT-036-00

APPRAISER State Certification # or State License#: Field must be complete

FNC-C-CERT-036-00 scans the Certification area of the appraisal form to determine if an entry has been made in the Appraiser State Certification # or the State License # field. If both fields are incomplete, the system flags the appraisal for follow-up action. When these fields are incomplete, the appraiser has omitted information. Contact the appraiser to complete the form.

FNC-C-CERT-042-01

APPRAISER State License or Certification number, Other (describe): Field contains an entry FNC-C-CERT-042-01 scans the Certification area of the appraisal form to determine if Other in the appraiser's state license/certification number field contains an entry. If the Other field contains an entry, the system flags the appraisal for further action. The reviewer must verify that the appraiser has a proper license/certification.

FNC-C-CERT-048-00

APPRAISER State: Field is blank

FNC-C-CERT-048-00 scans the Certification area of the appraisal form to determine if an entry has been made in the Appraiser State field. If the State field is incomplete, the system flags the appraisal for follow-up action. When this field is incomplete, the appraiser has omitted information. Contact the appraiser to complete the form.

FNC-C-CERT-048-01

APPRAISER State Certification # or State License #: State entered does not equal the state for the property address FNC-C-CERT-048-01 scans the Certification area of the appraisal form to determine if the appraiser's state license or certification information matches the state entered in the subject property's address. If the appraiser's license or certification state does not match the state of the subject property, the system flags the appraisal for follow-up action.

FNC-C-CERT-051-01

APPRAISER Expiration Date of Certification or License: Field is blank or date precedes effective date of the appraisal FNC-C-CERT-051-01 scans the Certification area of the appraisal form to verify that the appraiser's Expiration Date of Certification or License has not expired as of the effective date of the appraisal, and that the field is not blank. If the expiration date of the appraiser's license precedes the effective date of the appraisal; and/or the field is incomplete, the system flags the appraisal for follow-up action. Contact the appraiser.

FNC-C-CERT-072-01

SUPERVISORY APPRAISER (Only if Required): Signature: Field is blank and the Name field contains an entry FNC-C-CERT-072-01 scans the Certification area of the appraisal form to determine if an entry has been made in the Supervisory Appraiser Name field. If there is an entry in the Name field then the Supervisory Appraiser Signature field must be completed. If the signature field is incomplete, the system flags the appraisal for follow-up action. Contact the appraiser to complete the form.

FNC-C-CERT-075-01

SUPERVISORY APPRAISER (Only if Required): Name: Field is blank and the Signature field contains an entry FNC-C-CERT-075-01 scans the Certification area of the appraisal form to determine if an entry has been made in the Supervisory Appraiser Signature field. If there is an entry in the Signature field then the Supervisory Appraiser Name field must be completed. If the Supervisory Appraiser Name field is incomplete, the system flags the appraisal for follow-up action.

FNC-C-CERT-078-00

SUPERVISORY APPRAISER Company Name: Field is blank and Supervisor Signature field contains an entry FNC-C-CERT-078-00 scans the Certification area of the appraisal form to determine if an entry has been made in the Supervisory Appraiser Company Name field. If there is an entry in the Supervisor Signature field, then the Supervisory Appraiser Company Name field must be complete. If the Company Name field is incomplete, the system flags the appraisal for follow-up action. When this field is incomplete, the appraiser has omitted information. Contact the appraiser to complete the form.

FNC-C-CERT-081-00

SUPERVISORY APPRAISER Company Address: Field is blank and Supervisor Signature field contains an entry FNC-C-CERT-081-00 scans the Certification area of the appraisal form to determine if an entry has been made in the Supervisory Appraiser Company Address field. If there is an entry in the Supervisor Signature field, then the Supervisory Appraiser Company Address must be present. If the Company Address field is incomplete, the system flags the appraisal for follow-up action. When this field is incomplete, the appraiser has omitted information. Contact the appraiser to complete the form.

FNC-C-CERT-093-00

SUPERVISORY APPRAISER Telephone Number: Field is blank and Supervisor Signature field contains an entry FNC-C-CERT-093-00 scans the Certification area of the appraisal form to determine if an entry has been made in the Supervisory Appraiser Telephone Number field. If there is an entry in the Supervisor Signature field then the Supervisory Appraiser Telephone Number field must be complete. If the Telephone Number field is incomplete, the system flags the appraisal for follow-up action. When this field is incomplete, the appraiser has omitted information. Contact the appraiser to complete the form.

FNC-C-CERT-099-00

SUPERVISORY APPRAISER Date of Signature: Field is blank and the Supervisor Signature field contains an entry FNC-C-CERT-099-00 scans the Certification area of the appraisal form to determine if an entry has been made in the Supervisory Appraiser Date of Signature field. If there is an entry in the Supervisor Signature field then the Supervisory Appraiser Date of Signature must be completed. If the Date of Signature field is incomplete, the system flags the appraisal for follow-up action. When this field is incomplete, the appraiser has omitted information. Contact the appraiser to complete the form.

FNC-C-CERT-099-01

SUPERVISORY APPRAISER Date of Signature: Field does not contain a valid date and Supervisor Signature field contains an entry FNC-C-CERT-099-01 scans the Certification area of the appraisal form for an entry in the Supervisory Appraiser Date of Signature field. If there is an entry in the Supervisor Signature field then the Supervisory Appraiser Date of Signature must contain a valid date. If the Date of Signature is invalid, the system flags the appraisal for follow-up action.

FNC-C-CERT-102-00

SUPERVISORY APPRAISER State Certification # or State License#: Field is blank and Supervisor Signature field contains an entry FNC-C-CERT-102-00 scans the Certification area of the appraisal form to determine if an entry has been made in the State Certification # or State License # field when the Supervisory Appraiser Signature field contains an entry. If the field is incomplete, the system flags the appraisal for follow-up action. When both fields are incomplete, the appraiser has omitted information. Contact the appraiser to complete the form.

FNC-C-CERT-108-00

SUPERVISORY APPRAISER State: Field is blank and Supervisor Signature field contains an entry FNC-C-CERT-108-00 scans the Certification area of the appraisal form to determine if an entry has been made in the Supervisory Appraiser State field. If the State field is incomplete and there is an entry in the Supervisor Signature field, the system flags the appraisal for follow-up action. According to Fannie Mae guidelines, the Supervisory Appraiser must be licensed or certified in the same state as the subject property. When this field is incomplete, the appraiser has omitted information. Contact the appraiser to complete the form.

FNC-C-CERT-108-01

SUPERVISORY APPRAISER State Certification # or State License #: State field does not equal the state for the property address FNC-C-CERT-108-01 scans the Certification area of the appraisal form to determine if the Supervisory Appraiser is licensed or certified in the same state as the subject property. If the Supervisory Appraiser is not licensed or certified in the same state of the property, the system flags the appraisal for follow-up action.

FNC-C-CERT-111-01

SUPERVISORY APPRAISER Expiration Date of Certification or License: Field is blank or precedes effective date of the appraisal and Supervisor Signature field contains an entry FNC-C-CERT-111-01 scans the Certification area of the appraisal form to verify that the Supervisory Appraiser's license/certification information has not expired as of the effective date of the appraisal; and/or the field is blank. If the expiration date of the Supervisory Appraiser's license is before the effective date, or the field is incomplete, the system flags the appraisal for follow-up action. Contact the appraiser to complete the form.

FNC-C-ATT-000-01

Subject Front Photo Attachment is missing

FNC-C-ATT-000-01 scans the Attachment area of the appraisal form for the inclusion of the subject Front Photo. If the Front Photo is missing, the system flags the appraisal for follow-up action. Contact the appraiser to provide the missing photographs.

FNC-C-ATT-000-02

Subject Rear Photo Attachment is missing

FNC-C-ATT-000-02 scans the Attachments area of the appraisal form for the inclusion of the subject Rear Photo. If the Rear Photo is missing, the system flags the appraisal for follow-up action. Contact the appraiser to provide the missing photographs.

FNC-C-ATT-000-03

Subject Street View Photo Attachment is missing

FNC-C-ATT-000-03 scans the Attachments area of the appraisal form for the inclusion of the subject Street View Photo. If the Street View Photo is missing, the system flags the appraisal for follow-up action. Contact the appraiser to provide the missing photographs.

FNC-C-ATT-000-04

Comparable Photo Attachment is missing

FNC-C-ATT-000-04 scans the Attachments area of the appraisal form for the inclusion of the Comparable Photos. If any Comparable Photo is missing, the system flags the appraisal for follow-up action. Contact the appraiser to provide the missing photographs.

FNC-C-ATT-000-05

Building Sketch Attachment is missing

FNC-C-ATT-000-05 scans the Attachment area of the appraisal form for the inclusion of the Building Sketch. If the Building Sketch is missing, the system flags the appraisal for follow-up action. Contact the appraiser to provide the missing Building Sketch.

FNC-C-ATT-000-06

Location Map Attachment is missing

FNC-C-ATT-000-06 scans the Attachments area of the appraisal form for the inclusion of the Location Map. If the Location Map is missing, the system flags the appraisal for follow-up action. Contact the appraiser to provide the missing Location Map.

FNC-C-CMS-000-01

The appraiser or the supervisory appraiser is on lender watch list or exclusionary list FNC-C-CMS-000-01 scans the Certification area of the appraisal form, comparing the appraiser and/or supervisory appraiser's names with the lender's watch or exclusionary lists. If the appraiser's and/or supervisory appraiser's name are found on these lists the system flags the appraisal for further review.

FNC-C-CMS-000-02

Appraisal form/service received does not equal type requested

FNC-C-CMS-000-02 scans the appraisal form checking the appraisal form received against the requested service. If the system detects a different form compared to the original order, the appraisal is flagged for further review and/or possible follow-up action by the appraiser.

FNC-C-CMS-000-03

Appraiser's license state or certification state should equal the state of the subject property address (checks zip code)

FNC-C-CMS-000-03 scans the appraisal form checking the appraiser's license or certification against the state of the subject property.

FNC-C-CMS-000-04

Appraisal property address does not equal address requested on application

FNC-C-CMS-000-04 scans the Subject section of the appraisal form checking the subject property address against the address requested on the application. If the addresses do not match, the system flags the appraisal for further review.

With regard to an embodiment of the above rules, certain assumptions apply:

Assumption 1

GAAR® Compliance set checks information contained within the appraisal report.

Assumption 2

GAAR® Compliance set checks the SUBJECT section of the appraisal to determine if the subject property's zip code matches the APPRAISER'S CERTIFICATION/state field. (note: for GAAR rules that run on CMS platform—zip code entered in appraisal is checked against state designation entered in CMS)

FNC-C-CMS-000-03: Appraiser's license state or certification state should equal the state of the subject property address (checks zip code)

Assumption 3

GAAR® Compliance set defines a valid year as a numeric entry ranging from 1700 to 2100. Further, the terms, new or under-construction are considered a valid year.

FNC-C-IMP-027-00 GENERAL DESCRIPTION: Year Built: Field is blank or field does not contain a valid year Assumption 4

GAAR® Compliance set calculates a year as 365 days.

FNC-C-SCAHIS-024-01 COMPARABLES: DATE of Prior Sale/Transfer: Field contains date for the year prior to the date of sale of the comparable sale Assumption 5

GAAR® Compliance calculates 3 years as 1095 days.

FNC-C-SCAHIS-027-02 SUBJECT: DATE of Prior Sale/Transfer: Field contains date within 3 years of effective date of appraisal and fields for PRICE or DATA SOURCE or EFFECTIVE DATE OF DATA SOURCE contains N/A, NA, NONE, UNK, SEE, REFER or field is blank Assumption 6

GAAR® Compliance set calculates 6 months as 180 days.

FNC-C-SCA-099-03 Date of Sale/Time: Field for any comparable 1-3 is more than 6 months old.

Assumption 7

GAAR® Compliance set calculates date functions based on the mos/day/year noted in the appraisal. In those situations when the appraisal provides only month and year, calculations are based on first day of the month. e.g. 4/2006=4/01/06.

FNC-C-SCA-099-03 Date of Sale/Time: Field for any comparable 1-3 is more than 6 months old FNC-C-SCAHIS-027-02 SUBJECT: DATE of Prior Sale/Transfer: Field contains date within 3 years of effective date of appraisal and fields for PRICE or DATA SOURCE or EFFECTIVE DATE OF DATA SOURCE contains N/A, NA, NONE, UNK, SEE, REFER or field is blank FNC-C-SCAHIS-024-01 COMPARABLES: DATE of Prior Sale/Transfer: Field contains date for the year prior to the date of sale of the comparable sale Assumption 8

GAAR® Compliance set considers a Comparable Sale as closed if its reported Date of Sale precedes the effective date of the appraisal.

FNC-C-SCA-099-02 Date of Sale/Time: Field for any comparable 1-3 does not reflect a closed sale date Assumption 9

GAAR® Compliance set calculates current date as date appraisal is run through rules set.

FNC-C-RECDATE-000-02 Effective Date of the Appraisal: Field contains date that is more than 120 days older than current date Assumption 10

GAAR® Compliance set calculates Transaction Value as the appraiser's Opinion of Market Value.

FNC-C-MKTVALUE-000-02 Opinion of Market Value: Appraised value is $1 million or higher. The appraiser must be state certified if the transaction value is $1 million or more GAAR Risk Rules Naming conventions are similar to those discussed above for GAAR Compliance Rules. The exemplary GAAR Risk Rules for particular appraisal report forms are described below:

FNMA 1004/FHLMC 70:

FNC-R-CMS-000-01 Opinion of Market Value: Appraised value is less than the sale's price in CMS FNC-R-CMS-000-02 Opinion of Market Value: For sales transactions, the final value of the SUBJECT is greater than 105% of the sale's price in CMS FNC-R-SUB-003-01 Property Address: Property street includes term: Rural Route, RR, County, C.R. or CR and SITE is reported in acres and LOCATION is not checked RURAL FNC-R-SUB-039-00 Neighborhood Name: Field is blank FNC-R-SUB-048-01 Occupant: ASSIGNMENT TYPE is not a PURCHASE TRANSACTION and TENANT or VACANT box is checked FNC-R-SUB-060-01 HOA$: Per year; per month: Field contains value and there is no box checked FNC-R-SUB-063-01 Property Rights Appraised: OTHER box is checked and DESCRIBE field is blank FNC-R-SUB-069-01 Assignment Type: OTHER box is checked and DESCRIBE field is blank FNC-R-SUB-081-01 Is the subject property currently offered for sale or has it been offered for sale in the twelve months prior to the effective date of the appraisal? The YES box is checked FNC-R-SUB-084-01 Is the SUBJECT currently offered for sale or has it been offered for sale in the 12 months prior to the effective date of the appraisal? The YES box is checked and value contained in REPORT DATA SOURCE(S) USED, OFFERING PRICE(S) AND DATE(S) is less than the CONTRACT PRICE or MARKET VALUE FNC-R-SUB-084-02 Report data source(s) used, offering price(s), and date(s): does not contain term(s) ML, M.L, MRIS, MULTI, REALTRANS, REALLINK or REDLINK FNC-R-CONT-009-01 Contract Price $: For sales transactions, OPINION OF MARKET VALUE is less than the CONTRACT PRICE FNC-R-CONT-009-02 Contract Price $: For sales transactions, the OPINION OF MARKET VALUE is greater than 105% of the CONTRACT PRICE FNC-R-CONT-012-01 Contract Date: Field reflects DATE OF SALE after the EFFECTIVE DATE OF APPRAISAL FNC-R-CONT-012-01 Contract Date: Date of Contract is greater than 60 days prior to the EFFECTIVE DATE OF APPRAISAL FNC-R-CONT-024-01 Is there any financial assistance (loan charges, sale concessions, gift downpayment assistance, etc.) to be paid by any party on behalf of the borrower? Field for REPORT THE DOLLAR AMOUNT AND DESCRIBE THE ITEMS TO BE PAID contains numeric value greater than $500, and/or TERMS: pts, points, percentage, %

FNC-R-N-012-01 Property Values: INCREASING box is checked and DATE OF SALE/TIME of 2 of the first 3 comparables is greater than 90 days old FNC-R-N-012-02 Property Values: INCREASING box is checked and DATE OF SALE for 2 of the first 3 comps is greater than 90 days old and DATE OF SALE/TIME field does not contain a positive time adjustment FNC-R-N-012-03 Property Values: INCREASING box is checked and terms STABLE or STABILIZED found in NEIGHBORHOOD DESCRIPTION or MARKET CONDITIONS fields FNC-R-N-027-01 Single Family Housing PRICE: The OPINION OF MARKET VALUE and/or SALES PRICE of the SUBJECT exceeds the predominant ONE-UNIT HOUSING price by more than 5 percent FNC-R-N-075-01 Present Land Use: ONE-UNIT field contains value less than 60%

FNC-R-N-093-01 Neighborhood Description: Contains terms: PRIDE, POOR, CRIME, BULLETS, GRAFFITI or DESIRABLE FNC-R-N-096-01 Market Conditions: Contains terms: PRIDE, POOR, CRIME, BULLETS, GRAFFITI or DESIRABLE FNC-R-S-006-01 Subject Site Size (Site Area): Field contains exactly 5 acres (217,800 sq ft)

FNC-R-S-009-00 Shape: Field is blank

FNC-R-S-009-01 Site Shape: Field contains the terms Flag or Easement

FNC-R-S-042-01 Is the Highest and Best Use of the subject property as improved (or as proposed in the plans and specifications) the present use? The NO box is checked and DESCRIBE field is blank FNC-R-S-048-01 Utilities: Electricity: OTHER BOX is checked and SITE is reported in acres and LOCATION box is checked URBAN or SUBURBAN FNC-R-S-051-01 Utilities: Electricity: OTHER box is checked and DESCRIBE field is blank FNC-R-S-066-01 Utilities: Water: OTHER box is checked and SITE is reported in acres and LOCATION box is checked URBAN or SUBURBAN FNC-R-S-069-01 Utilities: Water: OTHER box is checked and DESCRIBE field is blank FNC-R-S-075-01 Utilities: Sanitary Sewer: OTHER box is checked and SITE is reported in acres and LOCATION box is checked URBAN or SUBURBAN FNC-R-S-078-01 Utilities: Sanitary Sewer: OTHER box is checked and DESCRIBE field is blank FNC-R-S-081-01 Off Site Improvements: Street: Field contains DIRT, GRAVEL or SHELL FNC-R-S-084-01 Off-Site Improvements: Street: PRIVATE box is checked and SITE is reported in acres and Location box is checked URBAN or SUBURBAN FNC-R-S-108-01 Are the utilities and off-site improvements typical for the market area? The NO box is checked and DESCRIBE field is blank FNC-R-IMP-012-00 GENERAL DESCRIPTION: # of Stories: Field is blank FNC-R-IMP-021-01 GENERAL DESCRIPTION: PROPOSED OR UNDER CONSTRUCTION box is checked and AS IS box is checked in RECONCILIATION FNC-R-IMP-027-01 GENERAL DESCRIPTION: Age: SUBJECT is less than 30 years old and the difference between the ACTUAL and EFFECTIVE ages is more than 10 years FNC-R-IMP-027-02 GENERAL DESCRIPTION: Age: SUBJECT is greater than 30 years and less than or equal to 60 years and the difference between the ACTUAL and EFFECTIVE ages is more than 15 years FNC-R-IMP-027-03 GENERAL DESCRIPTION: Age: SUBJECT is greater than 60 years and there is more than a 20 year difference between the ACTUAL and EFFECTIVE ages FNC-R-IMP-043-01 Foundation: Basement: FULL BASEMENT or PARTIAL BASEMENT box is checked and more than 1 of the first 3 comparables contains upward adjustment for BASEMENT AND FINISHED ROOMS BELOW GRADE FNC-R-IMP-048-01 FOUNDATION: Basement Area: Field does not contain numeric entry and FULL BASEMENT or PARTIAL BASEMENT box is checked FNC-R-IMP-051-01 FOUNDATION: Basement Finish: Field does not contain numeric entry and FULL BASEMENT or PARTIAL BASEMENT box is checked FNC-R-IMP-063-01 Foundation: SUMP PUMP box is checked FNC-R-IMP-066-01 Foundation: Evidence of INFESTATION or DAMPNESS or SETTLEMENT box is checked and AS IS box is checked in RECONCILIATION FNC-R-IMP-075-01 Exterior Description: Foundation Walls: Field contains terms: POOR, FAIR, BELOW, CRACKS, SEE ATT and AS IS box is checked in RECONCILIATION FNC-R-IMP-081-01 Exterior Description: Exterior Walls: Field contains terms: POOR, FAIR, BELOW, CRACKS or SEE ATT and AS IS box is checked in RECONCILIATION FNC-R-IMP-084-01 Exterior Description: Roof Surface: Field contains terms: POOR, FAIR, BELOW, WORN, LEAK, CRACKS or SEE ATT and AS IS box is checked in RECONCILIATION FNC-R-IMP-087-01 Exterior Description: Gutters and Downspouts: Field contains terms: POOR, FAIR, BELOW or SEE ATT and AS IS box is checked in RECONCILIATION FNC-R-IMP-090-01 Exterior Description: Window Type: Field contains terms: POOR, FAIR, BELOW, ROT, LEAK, BROKEN, CRACKS, BOARDED or SEE ATT and AS IS box is checked in RECONCILIATION FNC-R-IMP-093-01 Exterior Description: Storm Sash/Insulated: Field contains terms: POOR, FAIR, BELOW, ROT, LEAK, BROKEN, CRACKS, BOARDED or SEE ATT and AS IS box is checked in RECONCILIATION FNC-R-IMP-096-01 Exterior Description: Screens: Field contains terms: POOR, FAIR, BELOW, TORN, HOLES, TEARS, RIPS or SEE ATT and AS IS box is checked in RECONCILIATION FNC-R-IMP-102-01 Interior Description: Floors: Field contains terms: POOR, FAIR, BELOW, WORN, STAINED, TORN, CRACKS or SEE ATT and AS IS box is checked in RECONCILIATION FNC-R-IMP-105-01 Interior Description: Walls: Field contains terms: POOR, FAIR, BELOW, WORN, HOLES, CRACKS or SEE ATT and AS IS box is checked in RECONCILIATION FNC-R-IMP-108-01 Interior Description: Trim/Finish: Field contains terms: POOR, FAIR, BELOW, INFERIOR or SEE ATT and AS IS box is checked in RECONCILIATION FNC-R-IMP-111-01 Interior Description: Bath Floor: Field contains terms: POOR, FAIR, BELOW, WORN or SEE ATT and AS IS box is checked in RECONCILIATION FNC-R-IMP-114-01 Interior Description: Bath Wainscot: Field contains terms: POOR, FAIR, BELOW or SEE ATT and AS IS box is checked in RECONCILIATION FNC-R-IMP-153-01 Heating: Fuel: Field contains terms: WD, WOOD, PROP, UNK, NO, NN, N.N.

FNC-R-IMP-198-00 CAR STORAGE: There is no box checked

FNC-R-IMP-204-01 CAR STORAGE: DRIVEWAY box is checked and field for # of Cars is blank FNC-R-IMP-207-01 CAR STORAGE: Driveway Surface: Field is blank and DRIVEWAY box is checked FNC-R-IMP-213-01 CAR STORAGE: GARAGE box is checked and field for # of Cars is blank FNC-R-IMP-219-01 CAR STORAGE: CARPORT box is checked and field for # of Cars is blank FNC-R-IMP-222-01 CAR STORAGE: GARAGE or CARPORT box is checked and no box for ATTACHED, DETACHED OR BUILT-IN is checked FNC-R-IMP-252-01 APPLIANCES: OTHER box is checked and field is blank FNC-R-IMP-258-01 Finished area above grade: Bedrooms: Field does not contain 1 to 5 bedrooms FNC-R-IMP-261-01 Finished area above grade: Bathrooms: Field contains less than one bathroom FNC-R-IMP-264-01 Finished Area: Square Feet of Gross Living Area: Square footage contained in IMP does not equal square footage contained in GROSS LIVING AREA in SCA FNC-R-IMP-309-01 Describe the condition of the property (including needed repairs, deterioration, renovations, remodeling, etc.): Field contains terms: FAIR, POOR, BELOW, ROT, DAMAGE, STAIN, LEAK, CRACK, SETTLE, WATER, DAMP, ODOR, MOLD, RUST, PEEL or COST TO CURE and AS IS box is checked in RECONCILIATION FNC-R-IMP-309-03 Describe the condition of the property and data source(s) (including apparent needed repairs, deterioration, renovations, remodeling, etc.): Field contains terms: FAIR, POOR, BELOW, ROT, DAMAGE, STAIN, LEAK, CRACK, SETTLE, WATER, DAMP, ODOR, MOLD, RUST, PEEL or COST TO CURE and AS IS box is checked in RECONCILIATION FNC-R-IMP-312-01 Are there any physical deficiencies or adverse conditions that affect the livability, soundness, or structural integrity of the property? The YES box is checked and AS IS box is checked in RECONCILIATION FNC-R-IMP-315-01 Are there any physical deficiencies or adverse conditions that affect the livability, soundness, or structural integrity of the property? The YES box is checked and DESCRIBE field is blank FNC-R-IMP-315-02 Are there any physical deficiencies or adverse conditions that affect the livability, soundness, or structural integrity of the property? Field contains terms: FAIR, POOR, BELOW, ROT, DAMAGE, STAIN, LEAK, CRACK, SETTLE, WATER, DAMP, ODOR or MOLD and AS IS box is checked in RECONCILIATION FNC-R-IMP-321-01 Does the property generally conform to the neighborhood (functional utility, style, condition, use, construction, etc.)? The NO box is checked and DESCRIBE field is blank FNC-R-SCA-003-01 There are _____ COMPARABLE PROPERTIES CURRENTLY OFFERED FOR SALE in the subject neighborhood ranging in price ranging in price from $_____ to $_____: Numeric entry in field for number of PROPERTIES OFFERED FOR SALE is greater than numeric entry in field for number of COMPARABLE SALES FNC-R-SCA-006-01 There are _____ COMPARABLE PROPERTIES CURRENTLY OFFERED FOR SALE in the subject neighborhood ranging in price ranging in price from $_____ to $_____: The SUBJECT'S OPINION OF MARKET VALUE is outside (lower or higher) the numeric entries in field for range of PROPERTIES OFFERED FOR SALE FNC-R-SCA-015-01 There are _____ COMPARABLE SALES in the subject neighborhood within the past twelve months ranging in SALE PRICE from $_____ to $_____: The SUBJECT'S OPINION OF MARKET VALUE is outside (lower or higher) the numeric entries in field for range of COMPARABLE SALES FNC-R-SCA-063-00 Proximity: Field must have a value for all comparables FNC-R-SCA-063-01 Proximity to Subject: Any of the comparables indicate proximity to SUBJECT is greater than 12 blocks or 1 mile and neighborhood LOCATION box is checked URBAN FNC-R-SCA-063-02 Proximity to Subject: Any of the comparables indicate proximity to SUBJECT is greater than 2 miles and the neighborhood LOCATION box is checked URBAN or SUBURBAN FNC-R-SCA-063-03 Proximity to Subject: More than 2 of the COMPARABLES are greater than 2 miles from subject and LOCATION box is checked URBAN or SUBURBAN FNC-R-SCA-063-04 Proximity to Subject: Any of the comparables indicate proximity to SUBJECT is greater than 5 miles and the neighborhood LOCATION box is checked RURAL FNC-R-SCA-069-01 Sales Price: Unadjusted sales prices of 1st 3 comparables do not bracket subject's OPINION OF MARKET VALUE FNC-R-SCA-069-02 Sales Price: 2 of 1st 3 comparables have sales prices less than subject's OPINION OF MARKET VALUE by more than 10 percent FNC-R-SCA-069-03 Sales Price: 2 of 1st 3 comparables have sales prices less than subject's OPINION OF MARKET VALUE FNC-R-SCA-069-03 Sales Price: 2 of 1st 3 comparables have sales prices greater than subject's OPINION OF MARKET VALUE FNC-R-SCA-081-01 Data Source(s) and/or Verification Source(s): IMP: Year built field indicates age greater than 0 and at least 2 of the first 3 comparables do not contain any of the following terms as data source: ML, MLS, M.L., MRIS, MULTI, REALTRANS, REALLINK, REDLINK, FARES, NDC, REALQUEST, METROSCAN, FIRSTAM, DATAQUICK, BOARD, NCD, AIRESIDENTIAL, AIRD, CMDC, FNC, or NDC FNC-R-SCA-081-02 Data Source(s) and/or Verification Source(s): More than 1 of the first 3 comparables reflects the term APPRAISERS FILES FNC-R-SCA-081-03 Data Source(s) and/or Verification Source(s): Field contains UNK, N/A, NA, TYP, CONF, NN, NONE or NORMAL for any comp FNC-R-SCA-081-04 Data Source(s) and/or Verification Source(s): Any of the 1st of the first 3 comparables contains the term PRIVATE SALE FNC-R-SCA-081-05 Data Source(s) and/or Verification Source(s): IMP: Year built field indicates age 0, NEW or PROPOSED and more than 2 of the first 3 comparables reflect terms SALES OFFICE, MANAGER, MGMNT, DEVELOPER, BUILDER or APPRAISAL FILES FNC-R-SCA-081-06 Data Source(s) and/or Verification Source(s): SCA: Age field contains numeric value greater than 0 and at least 2 of the first 3 comparables do not contain any of the following terms as data source: ML, MLS, M.L., MRIS, MULTI, REALTRANS, REALLINK, REDLINK, FARES, NDC, REALQUEST, METROSCAN, FIRSTAM, DATAQUICK, BOARD, NCD, AIRESIDENTIAL, AIRD, CMDC, FNC, or NDC FNC-R-SCA-087-01 Concessions: A numeric value between 1000 and 20000 or points or percent is found in Sales or Financing fields, and negative adjustment is not found in Adjustment field for Sales or Financing Concessions FNC-R-SCA-090-01 Sale or Financing Concessions: Comparables: Line item adjustment for any comparable is greater than 10% of the comparable's sale price FNC-R-SCA-090-02 Sales or Financing Adjustments: Comparables: Comparables 1-3 contain NEGATIVE (−) adjustments across the board FNC-R-SCA-099-01 Date of Sale/Time: Comparables: Fields for any comparables contain NEGATIVE adjustments and are closed sales FNC-R-SCA-102-01 Date of Sale/Time: Comparables: Line item adjustment for any comparable is greater than 10% of the comparable's sale price FNC-R-SCA-102-02 Date of Sale/Time: Comparables: Comparables 1-3 contain POSITIVE (+) adjustments across the board FNC-R-SCA-102-03 Date of Sale/Time: Comparables: Comparables 1-3 contain NEGATIVE (−) adjustments across the board FNC-R-SCA-105-01 Location: SUBJECT contains terms GOOD, AVERAGE or SUPERIOR and minimum of 2 of the first 3 comparables do not contain same terms FNC-R-SCA-111-01 Location: Comparables: Line item adjustment for any comparable is greater than 10% of the comparable's sale price FNC-R-SCA-111-02 Location: Comparables: Comparables 1-3 contain POSITIVE (+) adjustments across the board FNC-R-SCA-111-03 Location: Comparables: Comparables 1-3 contain NEGATIVE (−) adjustments across the board FNC-R-SCA-111-04 Location: 2 of 1st 3 comparables contain positive or negative adjustments for Location FNC-R-SCA-120-01 Leasehold/Fee Simple: Comparables: Line item adjustment for any comparable is greater than 10% of the comparable's sale price FNC-R-SCA-120-02 Leasehold/Fee Simple: Comparables: Comparables 1-3 contain POSITIVE (+) adjustments across the board FNC-R-SCA-120-03 Leasehold/Fee Simple: Comparables: Comparables 1-3 contain NEGATIVE (−) adjustments across the board FNC-R-SCA-159-01 Site: Comparables: Size of 2 of the 1st 3 comparables are not within 30 percent of the SUBJECT'S site size FNC-R-SCA-159-02 Site: SUBJECT: Site size is greater than 1 acre and is not bracketed by comparables 1-3

FNC-R-SCA-159-03 Site: SUBJECT: Site size is 1 acre or greater and 2 of the 1st 3 comparables do not contain a site size of 0.5 acre or more FNC-R-SCA-159-04 Site: SUBJECT: Site size is 1-5 acres and the site size of 2 of the 1st 3 comparables vary by more than 2 acres FNC-R-SCA-159-05 Site: SUBJECT: Site size is greater than 5 acres and less than or equal to 10 acres and 2 of the 1st 3 comparables vary by more than 3 acres FNC-R-SCA-159-06 Site: SUBJECT: Site size is greater than 10 acres and less than or equal to 20 acres and 2 of the 1st 3 comparables vary by more than 5 acres FNC-R-SCA-159-07 Site: SUBJECT: Site size is greater than 20 acres and 2 of the 1st 3 comparables vary by more than 7.5 acres FNC-R-SCA-159-08 Site: SUBJECT field contains terms GOOD, AVERAGE or SUPERIOR and minimum of 2 of the first 3 comparables do not contain same terms FNC-R-SCA-159-09 Site: COMPARABLES field contains terms: GOLF, WATER, RIVER, OCEAN, CREEK, MOUNTAIN, LAKE, INTRA, POND, BEACH, GULF and none of these words is found in SUBJECT'S SITE FNC-R-SCA-165-01 Site: Comparables: Line item adjustment for any comparable is greater than 10% of the comparable's sale price FNC-R-SCA-165-02 Site: Comparables: Comparables 1-3 contain POSITIVE (+) adjustments across the board FNC-R-SCA-165-03 Site: Comparables: Comparables 1-3 contain NEGATIVE (−) adjustments across the board FNC-R-SCA-168-01 View: SUBJECT field contains terms GOOD, AVERAGE or SUPERIOR and minimum of 2 of the first 3 comparables do not contain same terms FNC-R-SCA-168-02 View: COMPARABLES field contains terms: GOLF, WATER, RIVER, OCEAN, CREEK, MOUNTAIN, LAKE, INTRA, POND, BEACH, GULF and none of these words is found in SUBJECT'S SITE FNC-R-SCA-174-01
View: 2 of the first 3 comparables contain positive or negative adjustments for VIEW FNC-R-SCA-174-02 View: Comparables: Line item adjustment for any comparable is greater than 10% of the comparable's sale price FNC-R-SCA-174-03 View: Comparables: Comparables 1-3 contain POSITIVE (+) adjustments across the board FNC-R-SCA-174-04 View: Comparables: Comparables 1-3 contain NEGATIVE (−) adjustments across the board FNC-R-SCA-177-01 Design (Style): SUBJECT field contains terms GOOD, AVERAGE or SUPERIOR and minimum of 2 of the first 3 comparables do not contain same terms FNC-R-SCA-180-01 GENERAL DESCRIPTION: Type: ATT or S-DET/END UNIT box is checked and more than 1 of the first 3 comparables does not contain terms: ATT or S-DET or TH, TOWNHOME in SCA DESIGN (STYLE) field FNC-R-SCA-183-01 Design (Style): 2 of the first 3 comparables contain positive or negative adjustments for DESIGN FNC-R-SCA-183-02 Design (Style): Comparables: Line item adjustment for any comparable is greater than 10% of the comparable's sale price FNC-R-SCA-183-03 Design (Style): Comparables: Comparables 1-3 contain POSITIVE (+) adjustments across the board FNC-R-SCA-183-04 Design (Style): Comparables: Comparables 1-3 contain NEGATIVE (−) adjustments across the board FNC-R-SCA-183-05 GENERAL DESCRIPTION: Type: ATT or S-DET/END UNIT box is checked and 2 of the first 3 comparables contain adjustments for DESIGN (STYLE)

FNC-R-SCA-186-01 Quality of Construction: SUBJECT field contains terms GOOD, AVERAGE or SUPERIOR and minimum of 2 of the first 3 comparables do not contain same terms FNC-R-SCA-186-02 Quality of Construction: SUBJECT contains term BRICK and at least 2 of the first 3 comparables do not contain same term FNC-R-SCA-186-03 Quality of Construction: SUBJECT contains term CONC, BLOCK, BLK, WOOD, WD, FRAME, ALUMINIUM or VINYL and more than 1 of first three comparables contain term BRICK or STUCCO FNC-R-SCA-192-01 Quality of Construction: 2 of the first 3 comparables contain positive or negative adjustments for QUALITY OF CONSTRUCTION FNC-R-SCA-192-02 Quality of Construction: Comparables: Line item adjustment for any comparable is greater than 10% of the comparable's sale price FNC-R-SCA-192-03 Quality of Construction: Comparables: Comparables 1-3 contain POSITIVE (+) adjustments across the board FNC-R-SCA-192-04 Quality of Construction: Comparables: Comparables 1-3 contain NEGATIVE (−) adjustments across the board FNC-R-SCA-195-00 Actual Age: Field for SUBJECT does not contain numeric entries or terms NEW, PROPOSED or UNDER CONSTRUCTION FNC-R-SCA-195-01 Actual Age: SUBJECT is greater than 2 years old and more than 1 comparable contains term NEW or O FNC-R-SCA-195-02 Actual Age: SUBJECT is greater than 10 years old and any of the 1st 3 comparables contains terms NEW or O FNC-R-SCA-195-03 Actual Age: SUBJECT: Field contains 0, NEW, PROPOSED, U/C and age of 2 of 1st 3 comparables are greater than 1 year FNC-R-SCA-195-04 Actual Age: SUBJECT: Field contains 0, NEW, PROPOSED, U/C and age of any comparable is greater than 5 years FNC-R-SCA-195-05 Actual Age: SUBJECT: Field contains 1-5 years and age of 2 of 1st 3 comparables are 0 or NEW FNC-R-SCA-195-06 Actual Age: SUBJECT: Field contains 1-2 years and age of 2 of 1st 3 comparables are greater than 4 years FNC-R-SCA-195-07 Actual Age: SUBJECT: Field contains 1-2 years and age of any comparable is greater than 6 years FNC-R-SCA-195-08 Actual Age: SUBJECT: Field contains 3-5 years and age of 2 of 1st 3 comparables are less than 2 years or greater than 8 years FNC-R-SCA-195-09 Actual Age: SUBJECT: Field contains 3-5 years and age of any of comparable is greater than 12 years FNC-R-SCA-195-10 Actual Age: SUBJECT: Field contains 6 years or greater and age of any comparable is 0 or NEW FNC-R-SCA-195-11 Actual Age: SUBJECT: Field contains 6-10 years and age of 2 of the 1st 3 comparables are less than 4 years or greater than 12 years FNC-R-SCA-195-12 Actual Age: SUBJECT: Field contains 6-10 years and age of any comparable is greater than 15 years FNC-R-SCA-195-13 Actual Age: SUBJECT: Field contains 11-15 years and age of 2 of the 1st 3 comparables are less than 6 years or greater than 18 years FNC-R-SCA-195-14 Actual Age: SUBJECT: Field contains 11-15 years and age of any comparable is greater than 22 years FNC-R-SCA-195-15 Actual Age: SUBJECT: Field contains 16-20 years and age of 2 of 1st 3 comparables is less than 10 years or greater than 25 years
FNC-R-SCA-195-16 Actual Age: SUBJECT: Field contains 16-20 years and age of any comparable is greater than 28 years
FNC-R-SCA-195-17 Actual Age: SUBJECT: Field contains 21-30 years and age of 2 of 1st 3 comparables is less than 12 years or greater than 35 years
FNC-R-SCA-195-18 Actual Age: SUBJECT: Field contains 21-30 years and age of any comparable is greater than 39 years
FNC-R-SCA-195-19 Actual Age: SUBJECT: Field contains 31-40 years and age of 2 of 1st 3 comparables is less than 15 years or greater than 48 years
FNC-R-SCA-195-20 Actual Age: SUBJECT: Field contains 31-40 years and age of any comparable is greater than 50 years
FNC-R-SCA-195-21 Actual Age: SUBJECT: Field contains 41-55 years and age of 2 of 1st 3 comparables is less than 25 years or greater than 62 years
FNC-R-SCA-195-22 Actual Age: SUBJECT: Field contains 41-55 years and age of any comparable is greater than 65 years
FNC-R-SCA-195-23 Actual Age: SUBJECT: Field contains 56-69 years and age of 2 of 1st 3 comparables is less than 40 years or greater than 76 years
FNC-R-SCA-195-24 Actual Age: SUBJECT: Field contains 56-69 years and age of any comparable is greater than 79 years
FNC-R-SCA-195-25 Actual Age: SUBJECT: Field contains 70-90 years and age of any comparable has variance of more than 20 years
FNC-R-SCA-195-26 Actual Age: SUBJECT: Field contains 91-105 years and age of any comparable has variance of more than 25 years
FNC-R-SCA-195-27 Actual Age: SUBJECT: Field contains 106 years or greater and age of any comparable has variance of more than 30 years
FNC-R-SCA-198-01 Actual Age: Comparables: Comparables 1-3 contains terms: NEW or 0
FNC-R-SCA-198-02 Actual Age: Comparables: Field of any COMPARABLE contains terms NEW or 0 and positive adjustments are found in AGE field
FNC-R-SCA-198-03 Actual Age: Comparables: Field of any COMPARABLE contains terms NEW or 0 and positive adjustments are found in CONDITION field
FNC-R-SCA-201-01 Actual Age: Comparables: Line item adjustment for any comparable is greater than 10% of the comparable's sale price
FNC-R-SCA-201-02 Actual Age: Comparables: Comparables 1-3 contain POSITIVE (+) adjustments across the board
FNC-R-SCA-201-03 Actual Age: Comparables: Comparables 1-3 contain NEGATIVE (−) adjustments across the board
FNC-R-SCA-204-01 Condition: SUBJECT: Field contains terms GOOD, AVERAGE or SUPERIOR and minimum of 2 of the first 3 comparables do not contain same term
FNC-R-SCA-210-01 Condition: 2 of the first 3 comparables contain positive or negative adjustments for CONDITION
FNC-R-SCA-210-02 Condition: Comparables: Line item adjustment for any comparable is greater than 10% of the comparable's sale price
FNC-R-SCA-210-03 Condition: Comparables: Comparables 1-3 contain POSITIVE (+) adjustments across the board
FNC-R-SCA-210-04 Condition: Comparables: Comparables 1-3 contain NEGATIVE (−) adjustments across the board
FNC-R-SCA-213-01 Above Grade: Comparables: Line item adjustment for any comparable is greater than 10% of the comparable's sale price
FNC-R-SCA-213-02 Above Grade: Comparables: Comparables 1-3 contain POSITIVE (+) adjustments across the board
FNC-R-SCA-213-03 Above Grade: Comparables: Comparables 1-3 contain NEGATIVE (−) adjustments across the board
FNC-R-SCA-219-01 Bedrooms: SUBJECT: Field contains numeric entry less than 1 or greater than 5 bedrooms
FNC-R-SCA-219-02 Bedrooms: SUBJECT: For 1 bedroom, 2 of the first 3 comparables have more than 1 bedroom
FNC-R-SCA-219-03 Bedrooms: SUBJECT: For 1 bedroom any of the comparables exceeds 2 bedrooms
FNC-R-SCA-219-04 Bedrooms: SUBJECT: For 2 bedroom, 2 of the first 3 comparables have less than or more than 2 bedrooms
FNC-R-SCA-219-05 Bedrooms: SUBJECT: For 2 bedroom, any of the comparables exceeds 3 bedrooms
FNC-R-SCA-219-06 Bedrooms: SUBJECT: For 3 bedroom, any of the comparables has 1 bedroom
FNC-R-SCA-219-07 Bedrooms: SUBJECT: For 3 bedroom, 2 of the first 3 comparables have less than 3 bedrooms
FNC-R-SCA-219-08 Bedrooms: SUBJECT: For 3 bedroom, 2 of the first 3 comparables have more than 3 bedrooms
FNC-R-SCA-219-09 Bedrooms: SUBJECT: For 4 bedroom, any of the comparables has less than 3 bedrooms
FNC-R-SCA-219-10 Bedrooms: SUBJECT: For 4 bedroom, 2 of the first 3 comparables have less than 4 bedrooms
FNC-R-SCA-219-11 Bedrooms: SUBJECT: For 4 bedroom, 2 of the first 3 comparables have more than 4 bedrooms
FNC-R-SCA-219-12 Bedrooms: SUBJECT: For 5 Bedroom, 2 of the first 3 comparables has less than 4 bedrooms
FNC-R-SCA-219-13 Bedrooms: SUBJECT: For 5 Bedroom, 2 of the first 3 comparables has more than 6 bedrooms
FNC-R-SCA-219-14 Bedrooms: SUBJECT: For 4 Bedroom, BATHROOM field contains 1
FNC-R-SCA-219-15 Bedrooms: SUBJECT: For 5 Bedroom, BATHROOM field contains 2 or less
FNC-R-SCA-222-01 Bathrooms: SUBJECT: For 1 bathroom, 2 of the first 3 comparables have more than 1 bathroom
FNC-R-SCA-222-02 Bathrooms: SUBJECT: For 1 bathroom, any of the comparables has more than 2 bathrooms
FNC-R-SCA-222-03 Bathrooms: SUBJECT: For 1.5 bathrooms, 2 of the first 3 comparables have more than 1.5 bathrooms
FNC-R-SCA-222-04 Bathrooms: SUBJECT: For 1.5 bathrooms, any of the first 3 comparables has more than 2 bathrooms FNC-R-SCA-222-05 Bathrooms: SUBJECT: For 2 bathrooms, 2 of 1st 3 comparables has less than 2 Bathrooms FNC-R-SCA-222-06 Bathrooms: SUBJECT: For 2 bathrooms, any of the 1st 3 comparables has less than 1.5 or greater than 3 bathrooms FNC-R-SCA-222-07 Bathrooms: SUBJECT: For 2.5 bathrooms, any of the first 3 comparables has less than 2 or more than 3.5 bathrooms FNC-R-SCA-222-08 Bathrooms: SUBJECT: For 3 bathrooms, any of 1st 3 comparables has less than 2 or more than 4 bathrooms FNC-R-SCA-222-09 Bathrooms: SUBJECT: For 3.5 bathrooms, any of the 1st 3 comparables has less than 2.5 or more than 4.5 bathrooms FNC-R-SCA-222-10 Bathrooms: SUBJECT: For 4 bathrooms or greater, any comparable has variance of more than 2 bathrooms FNC-R-SCA-234-01 Room Count: Comparables: Line item adjustment for any comparable is greater than 10% of the comparable's sale price FNC-R-SCA-234-02 Room Count: Comparables: Comparables 1-3 contain POSITIVE (+) adjustments across the board FNC-R-SCA-234-03 Room Count: Comparables: Comparables 1-3 contain NEGATIVE (−) adjustments across the board FNC-R-SCA-237-01 Gross Living Area: Subject: Less then 750 sq ft, variance for 2 of the 1st 3 comparables is greater than 100 sq ft FNC-R-SCA-237-02 Gross Living Area: Subject: Greater than or equal to 750 sq ft and less than 1000 sq ft, variance for 2 of the 1st 3 comparables is greater than 200 sq ft FNC-R-SCA-237-03 Gross Living Area: Subject: Greater than or equal to 1000 sq ft and less than 1250 sq ft, variance for 2 of the 1st 3 comparables is greater than 250 sq ft FNC-R-SCA-237-04 Gross Living Area: Subject: Greater than or equal to 1250 sq ft and less than 1500 sq ft, variance for 2 of the 1st 3 comparables is greater than 300 sq ft FNC-R-SCA-237-05 Gross Living Area: Subject: Greater than or equal to 1500 sq ft and less than 1800 sq ft, variance for 2 of the 1st 3 comparables is greater than 350 sq ft FNC-R-SCA-237-06 Gross Living Area: Subject: Greater than or equal to 1800 sq ft and less than 2200 sq ft, variance for 2 of the 1st 3 comparables is greater than 400 sq ft FNC-R-SCA-237-07 Gross Living Area: Subject: Greater than or equal to 2200 sq ft and less than 3000 sq ft, variance for 2 of the 1st 3 comparables is greater than 450 sq ft FNC-R-SCA-237-08 Gross Living Area: Subject: Greater than or equal to 3000 sq ft and less than 4000 sq ft, variance for 2 of the 1st 3 comparables is greater than 500 sq ft FNC-R-SCA-237-09 Gross Living Area: Subject: Greater than or equal to 4000 sq ft and less than 5000 sq ft, variance for 2 of the 1st 3 comparables is greater than 750 sq ft FNC-R-SCA-237-10 Gross Living Area: Subject: Greater than or equal to 5000 sq ft and less than 6000 sq ft, variance for 2 of the 1st 3 comparables is greater than 1000 sq ft FNC-R-SCA-237-11 Gross Living Area: Subject: Greater than or equal to 6000 sq ft and less than 7500 sq ft, variance for 2 of the 1st 3 comparables is greater than 1250 sq ft FNC-R-SCA-237-12 Gross Living Area: Subject: Greater than or equal to 7500 sq ft and less than 10000 sq ft, variance for 2 of the 1st 3 comparables is greater than 1500 sq ft FNC-R-SCA-237-13 Gross Living Area: Subject: 10,000 sq ft or greater variance for 2 of the 1st 3 comparables is greater than 2000 sq ft FNC-R-SCA-237-14 Gross Living Area of Comparables: Subject Property's gross living area is not bracketed by the 1st 3 comparables' gross living area FNC-R-SCA-237-15 Gross Living Area: Comparables: GLA of the first 3 COMPARABLES is larger than the subject's GLA FNC-R-SCA-237-16 Gross Living Area: Comparables: GLA of the first 3 COMPARABLES is smaller than the subject's GLA FNC-R-SCA-243-01 Gross Living Area: Adjustments for all comparables vary more than 2 dollars per square foot FNC-R-SCA-243-02 Gross Living Area: Comparables: Line item adjustment for any comparable is greater than 10% of the comparable's sale price FNC-R-SCA-243-03 Gross Living Area: Comparables: Comparables 1-3 contain POSITIVE (+) adjustments across the board FNC-R-SCA-243-04 Gross Living Area: Comparables: Comparables 1-3 contain NEGATIVE (−) adjustments across the board FNC-R-SCA-246-01 Basement and Finished Rooms Below Grade: SUBJECT contains terms BASEMENT, FINISHED or PARTIAL and minimum of 2 of the first three comparables do not contain same FNC-R-SCA-252-01 Basement and Finished Rooms Below Grade: Comparables: Line item adjustment for any comparable is greater than 10% of the comparable's sale price FNC-R-SCA-252-02 Basement and Finished Rooms Below Grade: Comparables: Comparables 1-3 contain POSITIVE (+) adjustments across the board FNC-R-SCA-252-03 Basement and Finished Rooms Below Grade: Comparables: Comparables 1-3 contain NEGATIVE (−) adjustments across the board FNC-R-SCA-252-04 GENERAL DESCRIPTION: Units: ONE WITH ACCESSORY UNIT box is checked and more than 1 of the first 3 comparables contains upward adjustment for BASEMENTS AND FINISHED ROOMS BELOW GRADE FNC-R-SCA-264-01 Functional Utility: SUBJECT: Field contains terms GOOD, AVERAGE or SUPERIOR and minimum of 2 of the first 3 comparables do not contain same term FNC-R-SCA-270-01 Functional Utility: 2 of the first 3 comparables contain positive or negative adjustments for FUNCTIONAL UTILITY FNC-R-SCA-270-02 Functional Utility: Comparables: Line item adjustment for any comparable is greater than 10% of the comparable's sale price FNC-R-SCA-270-03 Functional Utility: Comparables: Comparables 1-3 contain POSITIVE (+) adjustments across the board FNC-R-SCA-270-04 Functional Utility: Comparables: Comparables 1-3 contain NEGATIVE (−) adjustments across the board FNC-R-SCA-279-01 Heating/Cooling: Comparables: Line item adjustment for any comparable is greater than 10% of the comparable's sale price FNC-R-SCA-279-02 Heating/Cooling: Comparables: Comparables 1-3 contain POSITIVE (+) adjustments across the board FNC-R-SCA-279-03 Heating/Cooling: Comparables: Comparables 1-3 contain NEGATIVE (−) adjustments across the board FNC-R-SCA-288-01 Energy Efficient Items: Comparables: Line item adjustment for any comparable is greater than 10% of the comparable's sale price FNC-R-SCA-288-02 Energy Efficient Items: Comparables: Comparables 1-3 contain POSITIVE (+) adjustments across the board FNC-R-SCA-288-03 Energy Efficient Items: Comparables: Comparables 1-3 contain NEGATIVE (−) adjustments across the board FNC-R-SCA-297-01 Garage/Carport: Comparables: Line item adjustment for any comparable is greater than 10% of the comparable's sale price FNC-R-SCA-297-02 Garage/Carport: Comparables: Comparables 1-3 contain POSITIVE (+) adjustments across the board FNC-R-SCA-297-03 Garage/Carport: Comparables: Comparables 1-3 contain NEGATIVE (−) adjustments across the board FNC-R-SCA-306-01 Porch/Patio/Deck: Comparables: Line item adjustment for any comparable is greater than 10% of the comparable's sale price FNC-R-SCA-306-02 Porch/Patio/Deck: Comparables: Comparables 1-3 contain POSITIVE (+) adjustments across the board FNC-R-SCA-306-03 Porch/Patio/Deck: Comparables: Comparables 1-3 contain NEGATIVE (−) adjustments across the board FNC-R-SCA-312-01 Unlabeled Line 1: SUBJECT field contains POOL and a minimum of 1 of first 3 comparables does not contain POOL FNC-R-SCA-312-02 Unlabeled Line 1: SUBJECT field contains terms BARN, ARENA, POND or STABLES and a minimum of 1 of first 3 COMPARABLES does not contain same terms FNC-R-SCA-312-03 Unlabeled Line 1: SUBJECT field contains terms BARN, ARENA, POND or STABLES and LOCATION box is checked URBAN or SUBURBAN FNC-R-SCA-312-04 Unlabeled Line 1: Field for more than 1 comparable contains POOL, GUEST, ACCESSORY or TENNIS and SUBJECT field does not contain same FNC-R-SCA-312-05 Unlabeled Line 1: Subject: Contains terms UPGRADE, UPDATE or REMODEL FNC-R-SCA-315-01 Unlabeled Line 1: Comparables: Field for any comparable contains BARN, ARENA, POND or STABLES and LOCATION box is checked URBAN or SUBURBAN FNC-R-SCA-315-02 Unlabeled Line 1: Comparables: Contains terms UPGRADE, UPGRD, UPDATE, EXTRAS or REMODEL FNC-R-SCA-318-01 Unlabeled Line 1: Comparables: Line item adjustment for any comparable is greater than 10% of the comparable's sale price FNC-R-SCA-318-02 Unlabeled Line 1: Comparables: Comparables 1-3 contain POSITIVE (+) adjustments across the board FNC-R-SCA-318-03 Unlabeled Line 1: Comparables: Comparables 1-3 contain NEGATIVE (−) adjustments across the board FNC-R-SCA-324-01 Unlabeled Line 2: SUBJECT field contains POOL and a minimum of 1 of first 3 comparables does not contain POOL FNC-R-SCA-324-02 Unlabeled Line 2: SUBJECT field contains terms BARN, ARENA, POND or STABLES and a minimum of 1 of first 3 COMPARABLES does not contain same terms FNC-R-SCA-324-03 Unlabeled Line 2: SUBJECT field contains terms BARN, ARENA, POND or STABLES and LOCATION box is checked URBAN or SUBURBAN FNC-R-SCA-324-04 Unlabeled Line 2: Field for more than 1 comparable contains POOL, GUEST, ACCESSORY or TENNIS and SUBJECT field does not contain same FNC-R-SCA-324-05 Unlabeled Line 2: Subject: Contains terms UPGRADE, UPDATE or REMODEL FNC-R-SCA-327-01 Unlabeled Line 2: Comparables: Field for any comparable contains BARN, ARENA, POND or STABLES and LOCATION box is checked URBAN or SUBURBAN FNC-R-SCA-327-02 Unlabeled Line 2: Comparables: Contains terms UPGRADE, UPGRD, UPDATE, EXTRAS or REMODEL FNC-R-SCA-330-01 Unlabeled Line 2: Comparables: Line item adjustment for any comparable is greater than 10% of the comparable's sale price FNC-R-SCA-330-02 Unlabeled Line 2: Comparables: Comparables 1-3 contain POSITIVE (+) adjustments across the board FNC-R-SCA-330-03 Unlabeled Line 2: Comparables: Comparables 1-3 contain NEGATIVE (−) adjustments across the board FNC-R-SCA-336-01 Unlabeled Line 3: SUBJECT field contains POOL and a minimum of 1 of first 3 comparables does not contain POOL FNC-R-SCA-336-02 Unlabeled Line 3: SUBJECT field contains terms BARN, ARENA, POND or STABLES and a minimum of 1 of first 3 COMPARABLES does not contain same terms FNC-R-SCA-336-03 Unlabeled Line 3: SUBJECT field contains terms BARN, ARENA, POND or STABLES and LOCATION box is checked URBAN or SUBURBAN FNC-R-SCA-336-04 Unlabeled Line 3: Field for more than 1 comparable contains POOL, GUEST, ACCESSORY or TENNIS and SUBJECT field does not contain same FNC-R-SCA-336-05 Unlabeled Line 3: Subject: Contains terms UPGRADE, UPDATE or REMODEL FNC-R-SCA-339-01 Unlabeled Line 3: Comparables: Field for any comparable contains BARN, ARENA, POND or STABLES and LOCATION box is checked URBAN or SUBURBAN FNC-R-SCA-339-02 Unlabeled Line 3: Comparables: Contains terms UPGRADE, UPGRD, UPDATE, EXTRAS or REMODEL FNC-R-SCA-342-01 Unlabeled Line 3: Comparables: Line item adjustment for any comparable is greater than 10% of the comparable's sale price FNC-R-SCA-342-02 Unlabeled Line 3: Comparables: Comparables 1-3 contain POSITIVE (+) adjustments across the board FNC-R-SCA-342-03 Unlabeled Line 3: Comparables: Comparables 1-3 contain NEGATIVE (−) adjustments across the board FNC-R-SCA-414-01 Subject: Bedrooms: For each unique numeric count in the bedroom count field at least two of the first three comparables must contain same unique bedroom count FNC-R-SCA-417-01 Subject: Baths: For each unique numeric count in the bathroom count field at least two of the first three comparables must contain same unique bathroom count FNC-R-SCAHIS-027-01 Price of Prior Sale/Transfer: SUBJECT: Prior Sales Price is less than the OPINION OF MARKET VALUE by more than 10 percent and PROPERTY VALUES box is checked STABLE or DECLINING FNC-R-SCAHIS-027-02 Price of Prior Sale/Transfer: SUBJECT: Prior Sales Price is higher than the OPINION OF MARKET VALUE FNC-R-SCAHIS-030-01 Price of Prior Sale/Transfer: COMPARABLES: Prior Sales Price is HIGHER than COMPARABLE'S PRICE reported in appraisal FNC-R-MKTVALUE-000-01 Opinion of Market Value: For PURCHASE TRANSACTIONS, the OPINION OF MARKET VALUE is less than the CONTRACT PRICE FNC-R-MKTVALUE-000-02 Opinion of Market Value: For PURCHASE TRANSACTIONS, the OPINION OF MARKET VALUE is greater than 105% of the CONTRACT PRICE FNC-R-MKTVALUE-000-04 Opinion of Market Value: The OPINION OF MARKET VALUE is not bracketed by the adjusted sales prices of the comparables FNC-R-RECDATE-000-01 Date of Inspection and the Effective Date of the Appraisal: Contains date after the DATE OF SIGNATURE AND REPORT FNC-R-CA-102-01 Depreciation: Functional: Field contains a value and comparables do not contain same rating as SUBJECT or terms SAME or SIMILAR for FUNCTIONAL UTILITY, and Adjustment field in SCA does not reflect negative adjustment FNC-R-CA-105-01 Depreciation: External: Field contains a value and comparables do not contain same rating as SUBJECT or terms SAME or SIMILAR for LOCATION and/or SITE and/or VIEW, and Adjustment field in SCA does not reflect negative Adjustment FNC-R-CA-123-01 Indicated Value by Cost Approach: Field contains value less than OPINION OF MARKET VALUE by more than 5 percent FNC-R-PUDINFO-009-00 Legal Name of Project: Field is blank and the DEVELOPER/BUILDER in control of HOA box is checked YES and the UNIT TYPE(S) box is checked ATTACHED FNC-R-PUDINFO-012-00 Total number of phases: Field is blank or does not contain a numeric value, and the DEVELOPER/BUILDER in control of HOA box is checked YES and the UNIT TYPE(S) box is checked ATTACHED FNC-R-PUDINFO-015-00 Total number of units: Field is blank or does not contain a numeric value, and the DEVELOPER/BUILDER in control of HOA box is checked YES and the UNIT TYPE(S) box is checked ATTACHED FNC-R-PUDINFO-018-00 Total number of units sold: Field is blank or does not contain a numeric value, and the DEVELOPER/BUILDER in control of HOA box is checked YES and the UNIT TYPE(S) box is checked ATTACHED FNC-R-PUDINFO-021-00 Total number of units rented: Field is blank or does not contain a numeric value, and the DEVELOPER/BUILDER in control of HOA box is checked YES and the UNIT TYPE(S) box is checked ATTACHED FNC-R-PUDINFO-024-00 Total number of units for sale: Field is blank or does not contain a numeric value, and the DEVELOPER/BUILDER in control of HOA box is checked YES and the UNIT TYPE(S) box is checked ATTACHED FNC-R-PUDINFO-027-00 Total Number of units rented/for sale: Data source(s): Field is blank and the DEVELOPER/BUILDER in control of HOA box is checked YES and the UNIT TYPE(S) box is checked ATTACHED FNC-R-PUDINFO-030-00 Was the project created by the conversion of an existing building(s) into a PUD?: There is no box checked and the DEVELOPER/BUILDER in control of HOA box is checked YES and the UNIT TYPE(S) box is checked ATTACHED FNC-R-PUDINFO-030-01 Was the project created by the conversion of an existing building(s) into a PUD?: The YES box is checked and the DEVELOPER/BUILDER in control of HOA box is checked YES and the UNIT TYPE(S) box is checked ATTACHED FNC-R-PUDINFO-033-01 Was the project created by the conversion of an existing building(s) into PUD: The YES box is checked and DATE OF CONVERSION field does not contain a valid date FNC-R-PUDINFO-036-00 Does the project contain any multi-family dwelling units? There is no box checked and the DEVELOPER/BUILDER in control of HOA box is checked YES and the UNIT TYPE(S) box is checked ATTACHED FNC-R-PUDINFO-036-01 Does the project contain any multi-family dwelling units?: The YES box is Checked FNC-R-PUDINFO-039-00 Does the project contain any multi-family dwelling units? DATA SOURCE(S) field is blank and the DEVELOPER/BUILDER in control of HOA box is checked YES and the UNIT TYPE(S) box is checked ATTACHED FNC-R-PUDINFO-042-00 Are the units, common elements, and recreation facilities complete?: There is no box checked and the DEVELOPER/BUILDER in control of HOA box is checked YES and the UNIT TYPE(S) box is checked ATTACHED FNC-R-PUDINFO-045-01 Are the units, common elements, and recreation facilities complete?: The NO box is checked and DESCRIBE THE STATUS OF COMPLETION field is blank FNC-R-PUDINFO-048-00 Are the units, common elements, and recreation facilities complete?: There is no box checked; Field is blank and the DEVELOPER/BUILDER in control of HOA box is checked YES and the UNIT TYPE(S) box is checked ATTACHED FNC-R-PUDINFO-048-01 Are the common elements leased to or by the Homeowner's Association?: The YES box is checked FNC-R-PUDINFO-051-01 Are the common elements leased to or by the Homeowner's Association?: The YES box is checked and field DESCRIBE THE RENTAL TERMS AND OPTIONS is blank FNC-R-PUDINFO-054-00 Describe common elements and recreation facilities: Field is blank and the DEVELOPER/BUILDER in control of HOA box is checked YES and the UNIT TYPE(S) box is checked ATTACHED

FNMA 1004C/FHLMC 70B:

FNC-R-CMS-000-01 Opinion of Market Value: Appraised value is less than the sale's price in CMS FNC-R-CMS-000-02 Opinion of Market Value: For sales transactions, the final value of the SUBJECT is greater than 105% of the sale's price in CMS FNC-R-SUB-003-01 Property Address: Property street includes term: RR, County, C.R. or CR and SITE is reported in acres and LOCATION is not checked RURAL FNC-R-SUB-039-00 Neighborhood Name: Field is blank FNC-R-SUB-048-01 Occupant: ASSIGNMENT TYPE is not a PURCHASE TRANSACTION and TENANT or VACANT box is checked FNC-R-SUB-060-01 HOA$: Per year; per month: Field contains value and there is no box checked FNC-R-SUB-063-01 Property Rights Appraised: OTHER box is checked and DESCRIBE field is blank FNC-R-SUB-069-01 Assignment Type: OTHER box is checked and DESCRIBE field is blank FNC-R-SUB-081-01 Is the subject property currently offered for sale or has it been offered for sale in the twelve months prior to the effective date of the appraisal? The YES box is checked FNC-R-SUB-084-01 Is the SUBJECT currently offered for sale or has it been offered for sale in the 12 months prior to the effective date of the appraisal? The YES box is checked and value contained in REPORT DATA SOURCE(S) USED, OFFERING PRICE(S) AND DATE(S) is less than the CONTRACT PRICE or MARKET VALUE FNC-R-SUB-084-02 Report data source(s) used, offering price(s), and date(s): does not contain term(s) ML, M.L, MRIS, MULTI, REALTRANS, REALLINK or REDLINK"

FNC-R-CONT-009-01 Contract Price $: For sales transactions, OPINION OF MARKET VALUE is less than the CONTRACT PRICE FNC-R-CONT-009-02 Contract Price $: For sales transactions, the OPINION OF MARKET VALUE is greater than 105% of the CONTRACT PRICE FNC-R-CONT-012-01 Contract Date: Field reflects DATE OF SALE after the EFFECTIVE DATE OF APPRAISAL FNC-R-CONT-024-01 Is there any financial assistance (loan charges, sale concessions, gift downpayment assistance, etc.) to be paid by any party on behalf of the borrower? The YES box is checked and field for REPORT THE DOLLAR AMOUNT AND DESCRIBE THE ITEMS TO BE PAID contains numeric value greater than $500

FNC-R-N-012-01 Property Values: INCREASING box is checked and DATE OF SALE/TIME of 2 of the first 3 comparables is greater than 90 days old FNC-R-N-012-02 Property Values: INCREASING box is checked and DATE OF SALE for 2 of the first 3 comps is greater than 90 days old and DATE OF SALE/TIME field does not contain a positive time adjustment FNC-R-N-012-03 Property Values: INCREASING box is checked and terms STABLE or STABILIZED found in NEIGHBORHOOD DESCRIPTION or MARKET CONDITIONS fields FNC-R-N-045-01 Manufactured Housing PRICE: The OPINION OF MARKET VALUE and/or SALES PRICE of the SUBJECT exceeds the predominant MANUFACTURED HOUSING price by more than 5 percent FNC-R-N-075-01 Present Land Use: ONE-UNIT field contains value less than 60%

FNC-R-N-093-01 Neighborhood Description: Contains terms: PRIDE, POOR, CRIME, BULLETS, GRAFFITI or DESIRABLE FNC-R-N-096-01 Market Conditions: Contains terms: PRIDE, POOR, CRIME, BULLETS, GRAFFITI or DESIRABLE FNC-R-S-006-01 Subject Site Size (Site Area): Field contains exactly 5 acres (217,800 sq ft)

FNC-R-S-009-00 Shape: Field is blank

FNC-R-S-042-01 Is the Highest and Best Use of the subject property as improved (or as proposed in the plans and specifications) the present use? The NO box is checked and DESCRIBE field is blank FNC-R-S-048-01 Utilities: Electricity: OTHER BOX is checked and SITE is reported in acres and LOCATION box is checked URBAN or SUBURBAN FNC-R-S-051-01 Utilities: Electricity: OTHER box is checked and DESCRIBE field is blank FNC-R-S-066-01 Utilities: Water: OTHER box is checked and SITE is reported in acres and LOCATION box is checked URBAN or SUBURBAN FNC-R-S-069-01 Utilities: Water: OTHER box is checked and DESCRIBE field is blank FNC-R-S-075-01 Utilities: Sanitary Sewer: OTHER box is checked and SITE is reported in acres and LOCATION box is checked URBAN or SUBURBAN FNC-R-S-078-01 Utilities: Sanitary Sewer: OTHER box is checked and DESCRIBE field is blank FNC-R-S-081-01 Off Site Improvements: Street: Field contains DIRT, GRAVEL or SHELL FNC-R-S-084-01 Off-Site Improvements: Street: PRIVATE box is checked and SITE is reported in acres and Location box is checked URBAN or SUBURBAN FNC-R-S-108-01 Are the utilities and off-site improvements typical for the market area? The NO box is checked and DESCRIBE field is blank FNC-R-S-114-01 Is the size, shape, and topography generally conforming to and acceptable in the market area? The NO box is checked and DESCRIBE field is blank FNC-R-S-120-01 Is there adequate vehicular access to the subject property? The NO box is checked and DESCRIBE field is blank FNC-R-S-126-01 Is the street properly maintained? The NO box is checked and DESCRIBE field is blank FNC-R-S-126-02 Is the street properly maintained? Describe field contains terms: POOR, FAIR, DIRT, GRAVEL, SHELL or MUD FNC-R-HUDPLATE-033-01 Do the Wind, Roof Load, and Thermal Zones meet the minimum HUD requirements for the location of the subject property? The NO box is checked and explain field is blank FNC-R-IMP-014-01 GENERAL DESCRIPTION: # of SECTIONS: 3 box is checked FNC-R-IMP-021-01 GENERAL DESCRIPTION: PROPOSED OR UNDER CONSTRUCTION box is checked and AS IS box is checked in RECONCILIATION FNC-R-IMP-027-04 GENERAL DESCRIPTION: Age: SUBJECT is greater than 1 year but less than or equal to 5 years and the difference between the ACTUAL and EFFECTIVE ages is more than 2 years FNC-R-IMP-027-05 GENERAL DESCRIPTION: Age: SUBJECT is greater than 5 years but less than or equal to 10 years and the difference between the ACTUAL and EFFECTIVE ages is more than 4 years FNC-R-IMP-027-06 GENERAL DESCRIPTION: Age: SUBJECT is greater than 10 years but less than or equal to 15 years and the difference between the ACTUAL and EFFECTIVE ages is more than 5 years FNC-R-IMP-027-07 GENERAL DESCRIPTION: Age: SUBJECT is greater than 15 years but less than or equal to 20 years and the difference between the ACTUAL and EFFECTIVE ages is more than 6 years FNC-R-IMP-027-08 GENERAL DESCRIPTION: Age: SUBJECT is greater than 20 years and the difference between the ACTUAL and EFFECTIVE ages is more than 7 years FNC-R-IMP-027-09 GENERAL DESCRIPTION: Age: SUBJECT is greater than 25

FNC-R-IMP-043-01 Foundation: Basement: FULL BASEMENT or PARTIAL BASEMENT box is checked and more than 1 of the first 3 comparables contains upward adjustment for BASEMENT AND FINISHED ROOMS BELOW GRADE FNC-R-IMP-048-01 FOUNDATION: Basement Area: Field does not contain numeric entry and FULL BASEMENT or PARTIAL BASEMENT box is checked FNC-R-IMP-051-01 FOUNDATION: Basement Finish: Field does not contain numeric entry and FULL BASEMENT or PARTIAL BASEMENT box is checked FNC-R-IMP-063-01 Foundation: SUMP PUMP box is checked FNC-R-IMP-066-01 Foundation: Evidence of INFESTATION or DAMPNESS or SETTLEMENT box is checked and AS IS box is checked in RECONCILIATION FNC-R-IMP-078-01 Exterior Description: Skirting: Materials/Condition: Field contains terms: POOR, FAIR, BELOW, CRACKS, SEE ATT and AS IS box is checked in RECONCILIATION FNC-R-IMP-081-01 Exterior Description: Exterior Walls: Field contains terms: POOR, FAIR, BELOW, CRACKS or SEE ATT and AS IS box is checked in RECONCILIATION FNC-R-IMP-084-01 Exterior Description: Roof Surface: Field contains terms: POOR, FAIR, BELOW, WORN, LEAK, CRACKS or SEE ATT and AS IS box is checked in RECONCILIATION FNC-R-IMP-087-01 Exterior Description: Gutters and Downspouts: Field contains terms: POOR, FAIR, BELOW or SEE ATT and AS IS box is checked in RECONCILIATION FNC-R-IMP-090-01 Exterior Description: Window Type: Field contains terms: POOR, FAIR, BELOW, ROT, LEAK, BROKEN, CRACKS, BOARDED or SEE ATT and AS IS box is checked in RECONCILIATION FNC-R-IMP-093-01 Exterior Description: Storm Sash/Insulated: Field contains terms: POOR, FAIR, BELOW, ROT, LEAK, BROKEN, CRACKS, BOARDED or SEE ATT and AS IS box is checked in RECONCILIATION FNC-R-IMP-096-01 Exterior Description: Screens: Field contains terms: POOR, FAIR, BELOW, TORN, HOLES, TEARS, RIPS or SEE ATT and AS IS box is checked in RECONCILIATION FNC-R-IMP-099-01 Exterior Description: Doors: Field contains terms: POOR, FAIR, BELOW, TORN, HOLES, TEARS, RIPS, RUSTED or SEE ATT and AS IS box is checked in RECONCILIATION FNC-R-IMP-102-01 Interior Description: Floors: Field contains terms: POOR, FAIR, BELOW, WORN, STAINED, TORN, CRACKS or SEE ATT and AS IS box is checked in RECONCILIATION FNC-R-IMP-105-01 Interior Description: Walls: Field contains terms: POOR, FAIR, BELOW, WORN, HOLES, CRACKS or SEE ATT and AS IS box is checked in RECONCILIATION FNC-R-IMP-108-01 Interior Description: Trim/Finish: Field contains terms: POOR, FAIR, BELOW, INFERIOR or SEE ATT and AS IS box is checked in RECONCILIATION FNC-R-IMP-111-01 Interior Description: Bath Floor: Field contains terms: POOR, FAIR, BELOW, WORN or SEE ATT and AS IS box is checked in RECONCILIATION FNC-R-IMP-114-01 Interior Description: Bath Wainscot: Field contains terms: POOR, FAIR, BELOW or SEE ATT and AS IS box is checked in RECONCILIATION FNC-R-IMP-153-01 Heating: Fuel: Field contains terms: WD, WOOD, PROP, UNK, NO, NN, N.N.

FNC-R-IMP-198-00 CAR STORAGE: There is no box checked

FNC-R-IMP-204-01 CAR STORAGE: DRIVEWAY box is checked and field for # of Cars is blank FNC-R-IMP-207-01 CAR STORAGE: Driveway Surface: Field is blank and DRIVEWAY box is checked FNC-R-IMP-213-01 CAR STORAGE: GARAGE box is checked and field for # of Cars is blank FNC-R-IMP-219-01 CAR STORAGE: CARPORT box is checked and field for # of Cars is blank FNC-R-IMP-222-01 CAR STORAGE: GARAGE or CARPORT box is checked and no box for ATTACHED, DETACHED OR BUILT-IN is checked FNC-R-IMP-252-01 APPLIANCES: OTHER box is checked and field is blank FNC-R-IMP-258-01 Finished area above grade: Bedrooms: Field does not contain 1 to 5 bedrooms FNC-R-IMP-261-01 Finished area above grade: Bathrooms: Field contains less than one bathroom FNC-R-IMP-264-01 Finished Area: Square Feet of Gross Living Area: Square footage contained in IMP does not equal square footage contained in GROSS LIVING AREA in SCA FNC-R-IMP-279-01 Is the manufactured home attached to a permanent foundation system? The NO box is checked and describe field is blank FNC-R-IMP-285-01 Have the towing hitch, wheels, and axles been removed? The NO box is checked and explain field is blank FNC-R-IMP-291-01 Is the manufactured home permanently connected to a septic tank or sewage system and other utilities? The NO box is checked and explain field is blank FNC-R-IMP-297-01 Does the dwelling have sufficient gross living area and room dimensions to be acceptable in the market? The NO box is checked and explain field is blank FNC-R-IMP-309-02 Describe the condition of the property (including needed repairs, deterioration, renovations, remodeling, etc.): Field contains terms: FAIR, POOR, BELOW, ROT, DAMAGE, RUST, STAIN, LEAK, CRACK, SETTLE, WATER, DAMP, ODOR or MOLD and AS IS box is checked in RECONCILIATION FNC-R-IMP-312-01 Are there any physical deficiencies or adverse conditions that affect the livability, soundness, or structural integrity of the property? The YES box is checked and AS IS box is checked in RECONCILIATION FNC-R-IMP-315-01 Are there any physical deficiencies or adverse conditions that affect the livability, soundness, or structural integrity of the property? The YES box is checked and DESCRIBE field is blank FNC-R-IMP-315-02 Are there any physical deficiencies or adverse conditions that affect the livability, soundness, or structural integrity of the property? Field contains terms: FAIR, POOR, BELOW, ROT, DAMAGE, STAIN, LEAK, CRACK, SETTLE, WATER, DAMP, ODOR or MOLD and AS IS box is checked in RECONCILIATION FNC-R-IMP-321-01 Does the property generally conform to the neighborhood (functional utility, style, condition, use, construction, etc.)? The NO box is checked and DESCRIBE field is blank FNC-R-CA-102-01 Depreciation: Functional: Field contains a value and comparables do not contain same rating as SUBJECT or terms SAME or SIMILAR for FUNCTIONAL UTILITY, and Adjustment field in SCA does not reflect negative adjustment FNC-R-CA-105-01 Depreciation: External: Field contains a value and comparables do not contain same rating as SUBJECT or terms SAME or SIMILAR for LOCATION and/or SITE and/or VIEW, and Adjustment field in SCA does not reflect negative adjustment FNC-R-CA-123-01 Indicated Value by Cost Approach: Field contains value less than OPINION OF MARKET VALUE by more than 5 percent FNC-R-SCA-003-01 There are _____ COMPARABLE PROPERTIES CURRENTLY OFFERED FOR SALE in the subject neighborhood ranging in price ranging in price from $_____ to $_____: Numeric entry in field for number of PROPERTIES OFFERED FOR SALE is greater than numeric entry in field for number of COMPARABLE SALES FNC-R-SCA-006-01 There are _____ COMPARABLE PROPERTIES CURRENTLY OFFERED FOR SALE in the subject neighborhood ranging in price ranging in price from $_____ to $_____: The SUBJECT'S OPINION OF MARKET VALUE is outside (lower or higher) the numeric entries in field for range of PROPERTIES OFFERED FOR SALE FNC-R-SCA-015-01 There are _____ COMPARABLE SALES in the subject neighborhood within the past twelve months ranging in SALE PRICE from $_____ to $_____: The SUBJECT'S OPINION OF MARKET VALUE is outside (lower or higher) the numeric entries in field for range of COMPARABLE SALES FNC-R-SCA-063-00 Proximity: Field must have a value for all comparables FNC-R-SCA-063-01 Proximity to Subject: Any of the comparables indicate proximity to SUBJECT is greater than 12 blocks or 1 mile and neighborhood LOCATION box is checked URBAN FNC-R-SCA-063-02 Proximity to Subject: Any of the comparables indicate proximity to SUBJECT is greater than 5 miles and the neighborhood LOCATION box is checked URBAN or SUBURBAN FNC-R-SCA-063-03 Proximity to Subject: More than 2 of the COMPARABLES are greater than 2 miles from subject and LOCATION box is checked URBAN or SUBURBAN FNC-R-SCA-063-04 Proximity to Subject: Any of the comparables indicate proximity to SUBJECT is greater than 10 miles and the neighborhood LOCATION box is checked RURAL FNC-R-SCA-069-01 Sales Price: Unadjusted sales prices of 1st 3 comparables do not bracket subject's OPINION OF MARKET VALUE FNC-R-SCA-069-02 Sales Price: 2 of 1st 3 comparables have sales prices less than subject's OPINION OF MARKET VALUE by more than 10 percent FNC-R-SCA-078-01 Manufactured Home: Minimum of 2 of the 1st 3 comparables YES box is not checked FNC-R-SCA-081-01 Data Source(s) and/or Verification Source(s): IMP: Year built field indicates age greater than 0 and at least 2 of the first 3 comparables do not contain any of the following terms as data source: ML, MLS, M.L., MRIS, MULTI, REALTRANS, REALLINK, REDLINK, AIRD, CMDC, FNC, or NDC FNC-R-SCA-081-02 Data Source(s) and/or Verification Source(s): More than 1 of the first 3 comparables reflects the term APPRAISERS FILES FNC-R-SCA-081-03 Data Source(s) and/or Verification Source(s): Field contains UNK, N/A, NA, TYP, CONF, NN, NONE or NORMAL for any comp FNC-R-SCA-081-04 Data Source(s) and/or Verification Source(s): Any of the 1st of the first 3 comparables contains the term PRIVATE SALE FNC-R-SCA-081-05 Data Source(s) and/or Verification Source(s): IMP: Year built field indicates age 0, NEW or PROPOSED and more than 2 of the first 3 comparables reflect terms SALES OFFICE, MANAGER, MGMNT, DEVELOPER, BUILDER or APPRAISAL FILES FNC-R-SCA-081-06 Data Source(s) and/or Verification Source(s): SCA: Age field contains numeric value greater than 0 and at least 2 of the first 3 comparables do not contain any of the following terms as data source: ML, MLS, M.L., MRIS, MULTI, REALTRANS, REALLINK, REDLINK, AIRD, CMDC, FNC, or NDC FNC-R-SCA-087-01 Concessions: A numeric value between 1000 and 20000 is found in Sales or Financing fields, and negative adjustment is not found in Adjustment field for Sales or Financing Concessions FNC-R-SCA-090-01 Sale or Financing Concessions: Comparables: Line item adjustment for any comparable is greater than 10% of the comparable's sale price FNC-R-SCA-090-02 Sales or Financing Adjustments: Comparables: Comparables 1-3 contain NEGATIVE (−) adjustments across the board FNC-R-SCA-099-01 Date of Sale/Time: Comparables: Fields for any comparables contain NEGATIVE adjustments and are closed sales FNC-R-SCA-102-01 Date of Sale/Time: Comparables: Line item adjustment for any comparable is greater than 10% of the comparable's sale price FNC-R-SCA-102-02 Date of Sale/Time: Comparables: Comparables 1-3 contain POSITIVE (+) adjustment across the board FNC-R-SCA-102-03 Date of Sale/Time: Comparables: Comparables 1-3 contain NEGATIVE (−) adjustments across the board FNC-R-SCA-105-01 Location: SUBJECT contains terms GOOD, AVERAGE or SUPERIOR and minimum of 2 of the first 3 comparables do not contain same terms FNC-R-SCA-111-01 Location: Comparables: Line item adjustment for any comparable is greater than 10% of the comparable's sale price FNC-R-SCA-111-02 Location: Comparables: Comparables 1-3 contain POSITIVE (+) adjustments across the board FNC-R-SCA-111-03 Location: Comparables: Comparables 1-3 contain NEGATIVE (−) adjustments across the board
FNC-R-SCA-120-01 Leasehold/Fee Simple: Comparables: Line item adjustment for any comparable is greater than 10% of the comparable's sale price
FNC-R-SCA-120-02 Leasehold/Fee Simple: Comparables: Comparables 1-3 contain POSITIVE (+) adjustments across the board
FNC-R-SCA-120-03 Leasehold/Fee Simple: Comparables: Comparables 1-3 contain NEGATIVE (−) adjustments across the board
FNC-R-SCA-159-01 Site: Comparables: Size of 2 of the 1st 3 comparables are not within 30 percent of the SUBJECT'S site size
FNC-R-SCA-159-02 Site: SUBJECT: Site size is greater than 1 acre and is not bracketed by comparables 1-3
FNC-R-SCA-159-03 Site: SUBJECT: Site size is 1 acre or greater and 2 of the 1st 3 comparables do not contain a site size of 0.5 acre or more
FNC-R-SCA-159-04 Site: SUBJECT: Site size is 1-5 acres and the site size of 2 of the 1st 3 comparables vary by more than 2 acres
FNC-R-SCA-159-05 Site: SUBJECT: Site size is greater than 5 acres and less than or equal to 10 acres and 2 of the 1st 3 comparables vary by more than 3 acres
FNC-R-SCA-159-06 Site: SUBJECT: Site size is greater than 10 acres and less than or equal to 20 acres and 2 of the 1st 3 comparables vary by more than 5 acres
FNC-R-SCA-159-07 Site: SUBJECT: Site size is greater than 20 acres and 2 of the 1st 3 comparables vary by more than 7.5 acres
FNC-R-SCA-159-08 Site: SUBJECT field contains terms GOOD, AVERAGE or SUPERIOR and minimum of 2 of the first 3 comparables do not contain same terms
FNC-R-SCA-159-09 Site: COMPARABLES field contains terms: GOLF, WATER, RIVER, OCEAN, CREEK, MOUNTAIN, LAKE, INTRA, POND, BEACH, GULF and none of these words is found in SUBJECT'S SITE
FNC-R-SCA-165-01 Site: Comparables: Line item adjustment for any comparable is greater than 10% of the comparable's sale price
FNC-R-SCA-165-02 Site: Comparables: Comparables 1-3 contain POSITIVE (+) adjustments across the board
FNC-R-SCA-165-03 Site: Comparables: Comparables 1-3 contain NEGATIVE (−) adjustments across the board
FNC-R-SCA-168-01 View: SUBJECT field contains terms GOOD, AVERAGE or SUPERIOR and minimum of 2 of the first 3 comparables do not contain same terms
FNC-R-SCA-168-02 View: COMPARABLES field contains terms: GOLF, WATER, RIVER, OCEAN, CREEK, MOUNTAIN, LAKE, INTRA, POND, BEACH, GULF and none of these words is found in SUBJECT'S SITE
FNC-R-SCA-174-01 View: 2 of the first 3 comparables contain positive or negative adjustments for VIEW
FNC-R-SCA-174-02 View: Comparables: Line item adjustment for any comparable is greater than 10% of the comparable's sale price
FNC-R-SCA-174-03 View: Comparables: Comparables 1-3 contain POSITIVE (+) adjustments across the board
FNC-R-SCA-174-04 View: Comparables: Comparables 1-3 contain NEGATIVE (−) adjustments across the board
FNC-R-SCA-177-01 Design (Style): SUBJECT field contains terms GOOD, AVERAGE or SUPERIOR and minimum of 2 of the first 3 comparables do not contain same terms
FNC-R-SCA-180-01 GENERAL DESCRIPTION: Type: ATT or S-DET/END UNIT box is checked and more than 1 of the first 3 comparables does not contain terms: ATT or S-DET or TH, TOWNHOME in SCA DESIGN (STYLE) field
FNC-R-SCA-183-01 Design (Style): 2 of the first 3 comparables contain positive or negative adjustments for DESIGN
FNC-R-SCA-183-02 Design (Style): Comparables: Line item adjustment for any comparable is greater than 10% of the comparable's sale price
FNC-R-SCA-183-03 Design (Style): Comparables: Comparables 1-3 contain POSITIVE (+) adjustments across the board
FNC-R-SCA-183-04 Design (Style): Comparables: Comparables 1-3 contain NEGATIVE (−) adjustments across the board
FNC-R-SCA-183-05 GENERAL DESCRIPTION: Type: ATT or S-DET/END UNIT box is checked and 2 of the first 3 comparables contain adjustments for DESIGN (STYLE)
FNC-R-SCA-186-01 Quality of Construction: SUBJECT field contains terms GOOD, AVERAGE or SUPERIOR and minimum of 2 of the first 3 comparables do not contain same terms
FNC-R-SCA-186-02 Quality of Construction: SUBJECT contains term BRICK and at least 2 of the first 3 comparables do not contain same term
FNC-R-SCA-186-03 Quality of Construction: SUBJECT contains term CONC, BLOCK, BLK, WOOD, WD, FRAME, ALUMINIUM or VINYL and more than 1 of first three comparables contain term BRICK or STUCCO
FNC-R-SCA-192-01 Quality of Construction: 2 of the first 3 comparables contain positive or negative adjustments for QUALITY OF CONSTRUCTION
FNC-R-SCA-192-02 Quality of Construction: Comparables: Line item adjustment for any comparable is greater than 10% of the comparable's sale price
FNC-R-SCA-192-03 Quality of Construction: Comparables: Comparables 1-3 contain POSITIVE (+) adjustments across the board
FNC-R-SCA-192-04 Quality of Construction: Comparables: Comparables 1-3 contain NEGATIVE (−) adjustments across the board
FNC-R-SCA-195-00 Actual Age: Field for SUBJECT does not contain numeric entries or terms NEW, PROPOSED or UNDER CONSTRUCTION
FNC-R-SCA-195-01 Actual Age: SUBJECT is greater than 2 years old and more than 1 comparable contains term NEW or O
FNC-R-SCA-195-04 Actual Age: SUBJECT: Field contains 0, NEW, PROPOSED, U/C and age of any comparable is greater than 5 years
FNC-R-SCA-195-05 Actual Age: SUBJECT: Field contains 1-5 years and age of 2 of 1st 3 comparables are 0 or NEW
FNC-R-SCA-195-07 Actual Age: SUBJECT: Field contains 1-2 years and age of any comparable is greater than 6 years
FNC-R-SCA-195-08 Actual Age: SUBJECT: Field contains 3-5 years and age of 2 of 1st 3 comparables are less than 2 years or greater than 8 years FNC-R-SCA-195-10 Actual Age: SUBJECT: Field contains 6 years or greater and age of any comparable is 0 or NEW FNC-R-SCA-195-11 Actual Age: SUBJECT: Field contains 6-10 years and age of 2 of the 1st 3 comparables are less than 4 years or greater than 12 years FNC-R-SCA-195-12 Actual Age: SUBJECT: Field contains 6-10 years and age of any comparable is greater than 15 years FNC-R-SCA-195-13 Actual Age: SUBJECT: Field contains 11-15 years and age of 2 of the 1st 3 comparables are less than 6 years or greater than 18 years FNC-R-SCA-195-15 Actual Age: SUBJECT: Field contains 16-20 years and age of 2 of 1st 3 comparables is less than 10 years or greater than 25 years FNC-R-SCA-195-16 Actual Age: SUBJECT: Field contains 16-20 years and age of any comparable is greater than 28 years FNC-R-SCA-195-17 Actual Age: SUBJECT: Field contains 21-30 years and age of 2 of 1st 3 comparables is less than 12 years or greater than 35 years FNC-R-SCA-195-28 Actual Age: SUBJECT: Field contains 0, NEW, PROPOSED, U/C and age of 2 of the 1st 3 comparables is greater than 2 years FNC-R-SCA-195-29 Actual Age: SUBJECT: Field contains 3-5 years and age of any of comparable is greater than 10 years FNC-R-SCA-195-30 Actual Age: SUBJECT: Field contains 11-15 years and age of any comparable is greater than 20 years FNC-R-SCA-195-31 Actual Age: SUBJECT: Field contains 30 years or older FNC-R-SCA-198-01 Actual Age: Comparables: Comparables 1-3 contains terms: NEW or 0

FNC-R-SCA-198-02 Actual Age: Comparables: Field of any COMPARABLE contains terms NEW or 0 and positive adjustments are found in AGE field FNC-R-SCA-198-03 Actual Age: Comparables: Field of any COMPARABLE contains terms NEW or 0 and positive adjustments are found in CONDITION field FNC-R-SCA-201-01 Actual Age: Comparables: Line item adjustment for any comparable is greater than 10% of the comparable's sale price FNC-R-SCA-201-02 Actual Age: Comparables: Comparables 1-3 contain POSITIVE (+) adjustments across the board FNC-R-SCA-201-03 Actual Age: Comparables: Comparables 1-3 contain NEGATIVE (−) adjustments across the board FNC-R-SCA-204-01 Condition: SUBJECT: Field contains terms GOOD, AVERAGE or SUPERIOR and minimum of 2 of the first 3 comparables do not contain same term FNC-R-SCA-210-01 Condition: 2 of the first 3 comparables contain positive or negative adjustments for CONDITION FNC-R-SCA-210-02 Condition: Comparables: Line item adjustment for any comparable is greater than 10% of the comparable's sale price FNC-R-SCA-210-03 Condition: Comparables: Comparables 1-3 contain POSITIVE (+) adjustments across the board FNC-R-SCA-210-04 Condition: Comparables: Comparables 1-3 contain NEGATIVE (−) adjustments across the board FNC-R-SCA-213-01 Above Grade: Comparables: Line item adjustment for any comparable is greater than 10% of the comparable's sale price FNC-R-SCA-213-02 Above Grade: Comparables: Comparables 1-3 contain POSITIVE (+) adjustments across the board FNC-R-SCA-213-03 Above Grade: Comparables: Comparables 1-3 contain NEGATIVE (−) adjustments across the board FNC-R-SCA-219-01 Bedrooms: SUBJECT: Field contains numeric entry less than 1 or greater than 5 bedrooms FNC-R-SCA-219-02 Bedrooms: SUBJECT: For 1 bedroom, 2 of the first 3 comparables have more than 1 bedroom FNC-R-SCA-219-03 Bedrooms: SUBJECT: For 1 bedroom any of the comparables exceeds 2 bedrooms FNC-R-SCA-219-04 Bedrooms: SUBJECT: For 2 bedroom, 2 of the first 3 comparables have less than 2 bedrooms FNC-R-SCA-219-05 Bedrooms: SUBJECT: For 2 bedroom, any of the comparables exceeds 3 bedrooms FNC-R-SCA-219-06 Bedrooms: SUBJECT: For 3 bedroom, any of the comparables has 1 bedroom FNC-R-SCA-219-07 Bedrooms: SUBJECT: For 3 bedroom, 2 of the first 3 comparables have less than 3 bedrooms FNC-R-SCA-219-08 Bedrooms: SUBJECT: For 3 bedroom, 2 of the first 3 comparables have more than 3 bedrooms FNC-R-SCA-219-09 Bedrooms: SUBJECT: For 4 bedroom, any of the comparables has less than 3 bedrooms FNC-R-SCA-219-10 Bedrooms: SUBJECT: For 4 bedroom, 2 of the first 3 comparables have less than 4 bedrooms FNC-R-SCA-219-11 Bedrooms: SUBJECT: For 4 bedroom, 2 of the first 3 comparables have more than 4 bedrooms FNC-R-SCA-219-14 Bedrooms: SUBJECT: For 4 Bedroom, BATHROOM field contains 1

FNC-R-SCA-219-15 Bedrooms: SUBJECT: For 5 Bedroom, BATHROOM field contains 2 or less FNC-R-SCA-222-01 Bathrooms: SUBJECT: For 1 bathroom, 2 of the first 3 comparables have more than 1 bathroom FNC-R-SCA-222-02 Bathrooms: SUBJECT: For 1 bathroom, any of the comparables has more than 2 bathrooms FNC-R-SCA-222-03 Bathrooms: SUBJECT: For 1.5 bathrooms, 2 of the first 3 comparables have more than 1.5 bathrooms FNC-R-SCA-222-04 Bathrooms: SUBJECT: For 1.5 bathrooms, any of the first 3 comparables has more than 2 bathrooms FNC-R-SCA-222-05 Bathrooms: SUBJECT: For 2 bathrooms, 2 of 1st 3 comparables has less than 2 bathrooms FNC-R-SCA-222-06 Bathrooms: SUBJECT: For 2 bathrooms, any of the 1st 3 comparables has less than 1.5 or greater than 3 bathrooms FNC-R-SCA-222-07 Bathrooms: SUBJECT: For 2.5 bathrooms, any of the first 3 comparables has less than 2 or more than 3.5 bathrooms FNC-R-SCA-222-08 Bathrooms: SUBJECT: For 3 bathrooms, any of 1st 3 comparables has less than 2 or more than 4 bathrooms FNC-R-SCA-222-11 Bathrooms: SUBJECT: Field contains 3.5 bathrooms or greater FNC-R-SCA-234-01 Room Count: Comparables: Line item adjustment for any comparable is greater than 10% of the comparable's sale price FNC-R-SCA-234-02 Room Count: Comparables: Comparables 1-3 contain POSITIVE (+) adjustments across the board FNC-R-SCA-234-03 Room Count: Comparables: Comparables 1-3 contain NEGATIVE (−) adjustments across the board FNC-R-SCA-237-14 Gross Living Area of Comparables: Subject Property's gross living area is not bracketed by the 1st 3 comparables' gross living area FNC-R-SCA-237-15 Gross Living Area: Comparables: GLA of the first 3 COMPARABLES is larger than the subject's GLA FNC-R-SCA-237-16 Gross Living Area: Comparables: GLA of the first 3 COMPARABLES is smaller than the subject's GLA FNC-R-SCA-237-17 Gross Living Area: Subject: Field contains less than 500 sq ft FNC-R-SCA-237-18 Gross Living Area: Subject: Greater than or equal to 500 sq ft and less than 750 sq ft, variance for 2 of the 1st 3 comparables is greater than 100 sq ft FNC-R-SCA-237-19 Gross Living Area: Subject: Greater than or equal to 750 sq ft and less than 1000 sq ft, variance for 2 of the 1st 3 comparables is greater than 150 sq ft FNC-R-SCA-237-20 Gross Living Area: Subject: Greater than or equal to 1000 sq ft and less than 1250 sq ft, variance for 2 of the 1st 3 comparables is greater than 200 sq ft FNC-R-SCA-237-21 Gross Living Area: Subject: Greater than or equal to 1250 sq ft and less than 1500 sq ft, variance for 2 of the 1st 3 comparables is greater than 250 sq ft FNC-R-SCA-237-22 Gross Living Area: Subject: Greater than or equal to 1500 sq ft and less than 1750 sq ft, variance for 2 of the 1st 3 comparables is greater than 300 sq ft FNC-R-SCA-237-23 Gross Living Area: Subject: Greater than or equal to 1750 sq ft and less than 2000 sq ft, variance for 2 of the 1st 3 comparables is greater than 350 sq ft FNC-R-SCA-237-24 Gross Living Area: Subject: Greater than or equal to 2000 sq ft and less than 2500 sq ft, variance for 2 of the 1st 3 comparables is greater than 400 sq ft FNC-R-SCA-237-25 Gross Living Area: Subject: Greater than 2500 sq ft FNC-R-SCA-243-01 Gross Living Area: Adjustments for all comparables vary more than 2 dollars per square foot FNC-R-SCA-243-02 Gross Living Area: Comparables: Line item adjustment for any comparable is greater than 10% of the comparable's sale price FNC-R-SCA-243-03 Gross Living Area: Comparables: Comparables 1-3 contain POSITIVE (+) adjustments across the board FNC-R-SCA-243-04 Gross Living Area: Comparables: Comparables 1-3 contain NEGATIVE (−) adjustments across the board FNC-R-SCA-246-01 Basement and Finished Rooms Below Grade: SUBJECT contains terms BASEMENT, FINISHED or PARTIAL and minimum of 2 of the first three comparables do not contain same FNC-R-SCA-252-01 Basement and Finished Rooms Below Grade: Comparables: Line item adjustment for any comparable is greater than 10% of the comparable's sale price FNC-R-SCA-252-02 Basement and Finished Rooms Below Grade: Comparables: Comparables 1-3 contain POSITIVE (+) adjustments across the board FNC-R-SCA-252-03 Basement and Finished Rooms Below Grade: Comparables: Comparables 1-3 contain NEGATIVE (−) adjustments across the board FNC-R-SCA-264-01 Functional Utility: SUBJECT: Field contains terms GOOD, AVERAGE or SUPERIOR and minimum of 2 of the first 3 comparables do not contain same term FNC-R-SCA-270-01 Functional Utility: 2 of the first 3 comparables contain positive or negative adjustments for FUNCTIONAL UTILITY FNC-R-SCA-270-02 Functional Utility: Comparables: Line item adjustment for any comparable is greater than 10% of the comparable's sale price FNC-R-SCA-270-03 Functional Utility: Comparables: Comparables 1-3 contain POSITIVE (+) adjustments across the board FNC-R-SCA-270-04 Functional Utility: Comparables: Comparables 1-3 contain NEGATIVE (−) adjustments across the board FNC-R-SCA-279-01 Heating/Cooling: Comparables: Line item adjustment for any comparable is greater than 10% of the comparable's sale price FNC-R-SCA-279-02 Heating/Cooling: Comparables: Comparables 1-3 contain POSITIVE (+) adjustments across the board FNC-R-SCA-279-03 Heating/Cooling: Comparables: Comparables 1-3 contain NEGATIVE (−) adjustments across the board FNC-R-SCA-288-01 Energy Efficient Items: Comparables: Line item adjustment for any comparable is greater than 10% of the comparable's sale price FNC-R-SCA-288-02 Energy Efficient Items: Comparables: Comparables 1-3 contain POSITIVE (+) adjustments across the board FNC-R-SCA-288-03 Energy Efficient Items: Comparables: Comparables 1-3 contain NEGATIVE (−) adjustments across the board FNC-R-SCA-297-01 Garage/Carport: Comparables: Line item adjustment for any comparable is greater than 10% of the comparable's sale price FNC-R-SCA-297-02 Garage/Carport: Comparables: Comparables 1-3 contain POSITIVE (+) adjustments across the board FNC-R-SCA-297-03 Garage/Carport: Comparables: Comparables 1-3 contain NEGATIVE (−) adjustments across the board FNC-R-SCA-306-01 Porch/Patio/Deck: Comparables: Line item adjustment for any comparable is greater than 10% of the comparable's sale price FNC-R-SCA-306-02 Porch/Patio/Deck: Comparables: Comparables 1-3 contain POSITIVE (+) adjustments across the board FNC-R-SCA-306-03 Porch/Patio/Deck: Comparables: Comparables 1-3 contain NEGATIVE (−) adjustments across the board FNC-R-SCA-312-01 Unlabeled Line 1: SUBJECT field contains POOL and a minimum of 1 of first 3 comparables does not contain POOL FNC-R-SCA-312-02 Unlabeled Line 1: SUBJECT field contains terms BARN, ARENA, POND or STABLES and a minimum of 1 of first 3 COMPARABLES does not contain same terms FNC-R-SCA-312-03 Unlabeled Line 1: SUBJECT field contains terms BARN, ARENA or STABLES and LOCATION box is checked URBAN or SUBURBAN FNC-R-SCA-312-04 Unlabeled Line 1: Field for more than 1 comparable contains POOL, GUEST, ACCESSORY or TENNIS and SUBJECT field does not contain same FNC-R-SCA-312-05 Unlabeled Line 1: Subject: Contains terms UPGRADE, UPDATE or REMODEL FNC-R-SCA-315-01 Unlabeled Line 1: Comparables: Field for any comparable contains BARN, ARENA or STABLES and LOCATION box is checked URBAN or SUBURBAN FNC-R-SCA-315-02 Unlabeled Line 1: Comparables: Contains terms UPGRADE, UPGRD, UPDATE, EXTRAS or REMODEL FNC-R-SCA-318-01 Unlabeled Line 1: Comparables: Line item adjustment for any comparable is greater than 10% of the comparable's sale price FNC-R-SCA-318-02 Unlabeled Line 1: Comparables: Comparables 1-3 contain POSITIVE (+) adjustments across the board FNC-R-SCA-318-03 Unlabeled Line 1: Comparables: Comparables 1-3 contain NEGATIVE (−) adjustments across the board FNC-R-SCA-324-01 Unlabeled Line 2: SUBJECT field contains POOL and a minimum of 1 of first 3 comparables does not contain POOL FNC-R-SCA-324-02 Unlabeled Line 2: SUBJECT field contains terms BARN, ARENA, POND or STABLES and a minimum of 1 of first 3 COMPARABLES does not contain same terms FNC-R-SCA-324-03 Unlabeled Line 2: SUBJECT field contains terms BARN, ARENA or STABLES and LOCATION box is checked URBAN or SUBURBAN FNC-R-SCA-324-04 Unlabeled Line 2: Field for more than 1 comparable contains POOL, GUEST, ACCESSORY or TENNIS and SUBJECT field does not contain same FNC-R-SCA-324-05 Unlabeled Line 2: Subject: Contains terms UPGRADE, UPDATE or REMODEL FNC-R-SCA-327-01 Unlabeled Line 2: Comparables: Field for any comparable contains BARN, ARENA or STABLES and LOCATION box is checked URBAN or SUBURBAN FNC-R-SCA-327-02 Unlabeled Line 2: Comparables: Contains terms UPGRADE, UPGRD, UPDATE, EXTRAS or REMODEL FNC-R-SCA-330-01 Unlabeled Line 2: Comparables: Line item adjustment for any comparable is greater than 10% of the comparable's sale price FNC-R-SCA-330-02 Unlabeled Line 2: Comparables: Comparables 1-3 contain POSITIVE (+) adjustments across the board FNC-R-SCA-330-03 Unlabeled Line 2: Comparables: Comparables 1-3 contain NEGATIVE (−) adjustments across the board FNC-R-SCA-336-01 Unlabeled Line 3: SUBJECT field contains POOL and a minimum of 1 of first 3 comparables does not contain POOL FNC-R-SCA-336-02 Unlabeled Line 3: SUBJECT field contains terms BARN, ARENA, POND or STABLES and a minimum of 1 of first 3 COMPARABLES does not contain same terms FNC-R-SCA-336-03 Unlabeled Line 3: SUBJECT field contains terms BARN, ARENA or STABLES and LOCATION box is checked URBAN or SUBURBAN FNC-R-SCA-336-04 Unlabeled Line 3: Field for more than 1 comparable contains POOL, GUEST, ACCESSORY or TENNIS and SUBJECT field does not contain same FNC-R-SCA-336-05 Unlabeled Line 3: Subject: Contains terms UPGRADE, UPDATE or REMODEL FNC-R-SCA-339-01 Unlabeled Line 3: Comparables: Field for any comparable contains BARN, ARENA or STABLES and LOCATION box is checked URBAN or SUBURBAN FNC-R-SCA-339-02 Unlabeled Line 3: Comparables: Contains terms UPGRADE, UPGRD, UPDATE, EXTRAS or REMODEL FNC-R-SCA-342-01 Unlabeled Line 3: Comparables: Line item adjustment for any comparable is greater than 10% of the comparable's sale price FNC-R-SCA-342-02 Unlabeled Line 3: Comparables: Comparables 1-3 contain POSITIVE (+) adjustments across the board FNC-R-SCA-342-03 Unlabeled Line 3: Comparables: Comparables 1-3 contain NEGATIVE (−) adjustments across the board FNC-R-SCAHIS-027-01 Price of Prior Sale/Transfer: SUBJECT: Prior Sales Price is less than the OPINION OF MARKET VALUE by more than 10 percent and PROPERTY VALUES box is checked STABLE or DECLINING FNC-R-SCAHIS-027-02 Price of Prior Sale/Transfer: SUBJECT: Prior Sales Price is higher than the OPINION OF MARKET VALUE FNC-R-SCAHIS-030-01 Price of Prior Sale/Transfer: COMPARABLES: Prior Sales Price is HIGHER than COMPARABLE'S PRICE reported in appraisal FNC-R-MKTVALUE-000-01 Opinion of Market Value: For PURCHASE TRANSACTIONS, the OPINION OF MARKET VALUE is less than the CONTRACT PRICE FNC-R-MKTVALUE-000-02 Opinion of Market Value: For PURCHASE TRANSACTIONS, the OPINION OF MARKET VALUE is greater than 105% of the CONTRACT PRICE FNC-R-MKTVALUE-000-04 Opinion of Market Value: The OPINION OF MARKET VALUE is not bracketed by the adjusted sales prices of the comparables FNC-R-RECDATE-000-01 Date of Inspection and the Effective Date of the Appraisal: Contains date after the DATE OF SIGNATURE AND REPORT FNC-R-PUDINFO-009-00 Legal Name of Project: Field is blank and the DEVELOPER/BUILDER in control of HOA box is checked YES and the UNIT TYPE(S) box is checked ATTACHED FNC-R-PUDINFO-012-00 Total number of phases: Field is blank or does not contain a numeric value, and the DEVELOPER/BUILDER in control of HOA box is checked YES and the UNIT TYPE(S) box is checked ATTACHED FNC-R-PUDINFO-015-00 Total number of units: Field is blank or does not contain a numeric value, and the DEVELOPER/BUILDER in control of HOA box is checked YES and the UNIT TYPE(S) box is checked ATTACHED FNC-R-PUDINFO-018-00 Total number of units sold: Field is blank or does not contain a numeric value, and the DEVELOPER/BUILDER in control of HOA box is checked YES and the UNIT TYPE(S) box is checked ATTACHED FNC-R-PUDINFO-021-00 Total number of units rented: Field is blank or does not contain a numeric value, and the DEVELOPER/BUILDER in control of HOA box is checked YES and the UNIT TYPE(S) box is checked ATTACHED FNC-R-PUDINFO-024-00 Total number of units for sale: Field is blank or does not contain a numeric value, and the DEVELOPER/BUILDER in control of HOA box is checked YES and the UNIT TYPE(S) box is checked ATTACHED FNC-R-PUDINFO-027-00 Total Number of units rented/for sale: Data source(s): Field is blank and the DEVELOPER/BUILDER in control of HOA box is checked YES and the UNIT TYPE(S) box is checked ATTACHED FNC-R-PUDINFO-030-00 Was the project created by the conversion of an existing building(s) into a PUD?: There is no box checked and the DEVELOPER/BUILDER in control of HOA box is checked YES and the UNIT TYPE(S) box is checked ATTACHED FNC-R-PUDINFO-030-01 Was the project created by the conversion of an existing building(s) into a PUD?: The YES box is checked and the DEVELOPER/BUILDER in control of HOA box is checked YES and the UNIT TYPE(S) box is checked ATTACHED FNC-R-PUDINFO-033-01 Was the project created by the conversion of an existing building(s) into PUD: The YES box is checked and DATE OF CONVERSION field does not contain a valid date FNC-R-PUDINFO-036-00 Does the project contain any multi-family dwelling units? There is no box checked and the DEVELOPER/BUILDER in control of HOA box is checked YES and the UNIT TYPE(S) box is checked ATTACHED FNC-R-PUDINFO-036-01 Does the project contain any multi-family dwelling units?: The YES box is checked FNC-R-PUDINFO-039-00 Does the project contain any multi-family dwelling units? DATA SOURCE(S) field is blank and the DEVELOPER/BUILDER in control of HOA box is checked YES and the UNIT TYPE(S) box is checked ATTACHED FNC-R-PUDINFO-042-00 Are the units, common elements, and recreation facilities complete?: There is no box checked and the DEVELOPER/BUILDER in control of HOA box is checked YES and the UNIT TYPE(S) box is checked ATTACHED FNC-R-PUDINFO-045-01 Are the units, common elements, and recreation facilities complete?: The NO box is checked and DESCRIBE THE STATUS OF COMPLETION field is blank FNC-R-PUDINFO-048-00 Are the units, common elements, and recreation facilities complete?: There is no box checked; Field is blank and the DEVELOPER/BUILDER in control of HOA box is checked YES and the UNIT TYPE(S) box is checked ATTACHED FNC-R-PUDINFO-048-01 Are the common elements leased to or by the Homeowner's Association?: The YES box is checked FNC-R-PUDINFO-051-01 Are the common elements leased to or by the Homeowner's Association?: The YES box is checked and field DESCRIBE THE RENTAL TERMS AND OPTIONS is blank FNC-R-PUDINFO-054-00 Describe common elements and recreation facilities: Field is blank and the DEVELOPER/BUILDER in control of HOA box is checked YES and the UNIT TYPE(S) box is checked ATTACHED

FNMA/FHLMC 2055:

FNC-R-CMS-000-01 Opinion of Market Value: Appraised value is less than the sale's price in CMS FNC-R-CMS-000-02 Opinion of Market Value: For sales transactions, the final value of the SUBJECT is greater than 105% of the sale's price in CMS FNC-R-SUB-003-01 Property Address: Property street includes term: RR, County, C.R. or CR and SITE is reported in acres and LOCATION is not checked RURAL FNC-R-SUB-039-00 Neighborhood Name: Field is blank FNC-R-SUB-048-01 Occupant: ASSIGNMENT TYPE is not a PURCHASE TRANSACTION and TENANT or VACANT box is checked FNC-R-SUB-060-01 HOA$: Per year; per month: Field contains value and there is no box checked FNC-R-SUB-063-01 Property Rights Appraised: OTHER box is checked and DESCRIBE field is blank FNC-R-SUB-069-01 Assignment Type: OTHER box is checked and DESCRIBE field is blank FNC-R-SUB-081-01 Is the subject property currently offered for sale or has it been offered for sale in the twelve months prior to the effective date of the appraisal? The YES box is checked FNC-R-SUB-084-01 Is the SUBJECT currently offered for sale or has it been offered for sale in the 12 months prior to the effective date of the appraisal? The YES box is checked and value contained in REPORT DATA SOURCE(S) USED, OFFERING PRICE(S) AND DATE(S) is less than the CONTRACT PRICE or MARKET VALUE FNC-R-SUB-084-02 Report data source(s) used, offering price(s), and date(s): does not contain term(s) ML, M.L, MRIS, MULTI, REALTRANS, REALLINK or REDLINK FNC-R-CONT-009-01 Contract Price $: For sales transactions, OPINION OF MARKET VALUE is less than the CONTRACT PRICE FNC-R-CONT-009-02 Contract Price $: For sales transactions, the OPINION OF MARKET VALUE is greater than 105% of the CONTRACT PRICE FNC-R-CONT-012-01 Contract Date: Field reflects DATE OF SALE after the EFFECTIVE DATE OF APPRAISAL FNC-R-CONT-024-01 Is there any financial assistance (loan charges, sale concessions, gift downpayment assistance, etc.) to be paid by any party on behalf of the borrower? The YES box is checked and field for REPORT THE DOLLAR AMOUNT AND DESCRIBE THE ITEMS TO BE PAID contains numeric value greater than $500

FNC-R-N-012-01 Property Values: INCREASING box is checked and DATE OF SALE/TIME of 2 of the first 3 comparables is greater than 90 days old FNC-R-N-012-02 Property Values: INCREASING box is checked and DATE OF SALE for 2 of the first 3 comps is greater than 90 days old and DATE OF SALE/TIME field does not contain a positive time adjustment FNC-R-N-012-03 Property Values: INCREASING box is checked and terms STABLE or STABILIZED found in NEIGHBORHOOD DESCRIPTION or MARKET CONDITIONS fields FNC-R-N-027-01 Single Family Housing PRICE: The OPINION OF MARKET VALUE and/or SALES PRICE of the SUBJECT exceeds the predominant ONE-UNIT HOUSING price by more than 5 percent FNC-R-N-075-01 Present Land Use: ONE-UNIT field contains value less than 60%

FNC-R-N-093-01 Neighborhood Description: Contains terms: PRIDE, POOR, CRIME, BULLETS, GRAFFITI or DESIRABLE FNC-R-N-096-01 Market Conditions: Contains terms: PRIDE, POOR, CRIME, BULLETS, GRAFFITI or DESIRABLE FNC-R-S-006-01 Subject Site Size (Site Area): Field contains exactly 5 acres (217,800 sq ft)

FNC-R-S-009-00 Shape: Field is blank

FNC-R-S-042-01 Is the Highest and Best Use of the subject property as improved (or as proposed in the plans and specifications) the present use? The NO box is checked and DESCRIBE field is blank FNC-R-S-048-01 Utilities: Electricity: OTHER BOX is checked and SITE is reported in acres and LOCATION box is checked URBAN or SUBURBAN FNC-R-S-051-01 Utilities: Electricity: OTHER box is checked and DESCRIBE field is blank FNC-R-S-066-01 Utilities: Water: OTHER box is checked and SITE is reported in acres and LOCATION box is checked URBAN or SUBURBAN FNC-R-S-069-01 Utilities: Water: OTHER box is checked and DESCRIBE field is blank FNC-R-S-075-01 Utilities: Sanitary Sewer: OTHER box is checked and SITE is reported in acres and LOCATION box is checked URBAN or SUBURBAN FNC-R-S-078-01 Utilities: Sanitary Sewer: OTHER box is checked and DESCRIBE field is blank FNC-R-S-081-01 Off Site Improvements: Street: Field contains DIRT, GRAVEL or SHELL FNC-R-S-084-01 Off-Site Improvements: Street: PRIVATE box is checked and SITE is reported in acres and Location box is checked URBAN or SUBURBAN FNC-R-S-108-01 Are the utilities and off-site improvements typical for the market area? The NO box is checked and DESCRIBE field is blank FNC-R-IMP-001-01 Source: PROPERTY OWNER box(s) and/or OTHER boxes are checked and no other boxes are checked FNC-R-IMP-012-00 GENERAL DESCRIPTION: # of Stories: Field is blank FNC-R-IMP-021-01 GENERAL DESCRIPTION: PROPOSED OR UNDER CONSTRUCTION box is checked and AS IS box is checked in RECONCILIATION FNC-R-IMP-027-01 GENERAL DESCRIPTION: Age: SUBJECT is less than 30 years old and the difference between the ACTUAL and EFFECTIVE ages is more than 10 years FNC-R-IMP-027-02 GENERAL DESCRIPTION: Age: SUBJECT is greater than 30 years and less than or equal to 60 years and the difference between the ACTUAL and EFFECTIVE ages is more than 15 years FNC-R-IMP-027-03 GENERAL DESCRIPTION: Age: SUBJECT is greater than 60 years and there is more than a 20 year difference between the ACTUAL and EFFECTIVE ages FNC-R-IMP-043-01 Foundation: Basement: FULL BASEMENT or PARTIAL BASEMENT box is checked and more than 1 of the first 3 comparables contains upward adjustment for BASEMENT AND FINISHED ROOMS BELOW GRADE FNC-R-IMP-081-02 General Description: Exterior Walls: Field contains terms: POOR, FAIR, BELOW, CRACKS or SEE ATT and AS IS box is checked in RECONCILIATION FNC-R-IMP-084-02 General Description: Roof Surface: Field contains terms: POOR, FAIR, BELOW, WORN, LEAK, CRACKS or SEE ATT and AS IS box is checked in RECONCILIATION FNC-R-IMP-087-02 General Description: Gutters and Downspouts: Field contains terms: POOR, FAIR, BELOW or SEE ATT and AS IS box is checked in RECONCILIATION FNC-R-IMP-090-02 General Description: Window Type: Field contains terms: POOR, FAIR, BELOW, ROT, LEAK, BROKEN, CRACKS, BOARDED or SEE ATT and AS IS box is checked in RECONCILIATION FNC-R-IMP-153-01 Heating: Fuel: Field contains terms: WD, WOOD, PROP, UNK, NO, NN, N.N.

FNC-R-IMP-198-00 CAR STORAGE: There is no box checked

FNC-R-IMP-204-01 CAR STORAGE: DRIVEWAY box is checked and field for # of Cars is blank FNC-R-IMP-207-01 CAR STORAGE: Driveway Surface: Field is blank and DRIVEWAY box is checked FNC-R-IMP-213-01 CAR STORAGE: GARAGE box is checked and field for # of Cars is blank FNC-R-IMP-219-01 CAR STORAGE: CARPORT box is checked and field for # of Cars is blank FNC-R-IMP-222-01 CAR STORAGE: GARAGE or CARPORT box is checked and no box for ATTACHED, DETACHED OR BUILT-IN is checked FNC-R-IMP-252-01 APPLIANCES: OTHER box is checked and field is blank FNC-R-IMP-258-01 Finished area above grade: Bedrooms: Field does not contain 1 to 5 bedrooms FNC-R-IMP-261-01 Finished area above grade: Bathrooms: Field contains less than one bathroom FNC-R-IMP-264-01 Finished Area: Square Feet of Gross Living Area: Square footage contained in IMP does not equal square footage contained in GROSS LIVING AREA in SCA FNC-R-IMP-309-01 Describe the condition of the property (including needed repairs, deterioration, renovations, remodeling, etc.): Field contains terms: FAIR, POOR, BELOW, ROT, DAMAGE, STAIN, LEAK, CRACK, SETTLE, WATER, DAMP, ODOR or MOLD and AS IS box is checked in RECONCILIATION FNC-R-IMP-312-01 Are there any physical deficiencies or adverse conditions that affect the livability, soundness, or structural integrity of the property? The YES box is checked and AS IS box is checked in RECONCILIATION FNC-R-IMP-315-01 Are there any physical deficiencies or adverse conditions that affect the livability, soundness, or structural integrity of the property? The YES box is checked and DESCRIBE field is blank FNC-R-IMP-315-02 Are there any physical deficiencies or adverse conditions that affect the livability, soundness, or structural integrity of the property? Field contains terms: FAIR, POOR, BELOW, ROT, DAMAGE, STAIN, LEAK, CRACK, SETTLE, WATER, DAMP, ODOR or MOLD and AS IS box is checked in RECONCILIATION FNC-R-IMP-321-01 Does the property generally conform to the neighborhood (functional utility, style, condition, use, construction, etc.)? The NO box is checked and DESCRIBE field is blank FNC-R-SCA-003-01 There are _____ COMPARABLE PROPERTIES CURRENTLY OFFERED FOR SALE in the subject neighborhood ranging in price ranging in price from $_____ to $_____: Numeric entry in field for number of PROPERTIES OFFERED FOR SALE is greater than numeric entry in field for number of COMPARABLE SALES FNC-R-SCA-006-01 There are _____ COMPARABLE PROPERTIES CURRENTLY OFFERED FOR SALE in the subject neighborhood ranging in price ranging in price from $_____ to $_____: The SUBJECT'S OPINION OF MARKET VALUE is outside (lower or higher) the numeric entries in field for range of PROPERTIES OFFERED FOR SALE FNC-R-SCA-015-01 There are _____ COMPARABLE SALES in the subject neighborhood within the past twelve months ranging in SALE PRICE from $_____ to $_____: The SUBJECT'S OPINION OF MARKET VALUE is outside (lower or higher) the numeric entries in field for range of COMPARABLE SALES FNC-R-SCA-063-00 Proximity: Field must have a value for all comparables FNC-R-SCA-063-01 Proximity to Subject: Any of the comparables indicate proximity to SUBJECT is greater than 12 blocks or 1 mile and neighborhood LOCATION box is checked URBAN FNC-R-SCA-063-02 Proximity to Subject: Any of the comparables indicate proximity to SUBJECT is greater than 5 miles and the neighborhood LOCATION box is checked URBAN or SUBURBAN FNC-R-SCA-063-03 Proximity to Subject: More than 2 of the COMPARABLES are greater than 2 miles from subject and LOCATION box is checked URBAN or SUBURBAN FNC-R-SCA-063-04 Proximity to Subject: Any of the comparables indicate proximity to SUBJECT is greater than 10 miles and the neighborhood LOCATION box is checked RURAL FNC-R-SCA-069-01 Sales Price: Unadjusted sales prices of 1st 3 comparables do not bracket subject's OPINION OF MARKET VALUE FNC-R-SCA-069-02 Sales Price: 2 of 1st 3 comparables have sales prices less than subject's OPINION OF MARKET VALUE by more than 10 percent FNC-R-SCA-081-01 Data Source(s) and/or Verification Source(s): IMP: Year built field indicates age greater than 0 and at least 2 of the first 3 comparables do not contain any of the following terms as data source: ML, MLS, M.L., MRIS, MULTI, REALTRANS, REALLINK, REDLINK, AIRD, CMDC, FNC, or NDC FNC-R-SCA-081-02 Data Source(s) and/or Verification Source(s): More than 1 of the first 3 comparables reflects the term APPRAISERS FILES FNC-R-SCA-081-03 Data Source(s) and/or Verification Source(s): Field contains UNK, N/A, NA, TYP, CONF, NN, NONE or NORMAL for any comp FNC-R-SCA-081-04 Data Source(s) and/or Verification Source(s): Any of the 1st of the first 3 comparables contains the term PRIVATE SALE FNC-R-SCA-081-05 Data Source(s) and/or Verification Source(s): IMP: Year built field indicates age 0, NEW or PROPOSED and more than 2 of the first 3 comparables reflect terms SALES OFFICE, MANAGER, MGMNT, DEVELOPER, BUILDER or APPRAISAL FILES FNC-R-SCA-081-06 Data Source(s) and/or Verification Source(s): SCA: Age field contains numeric value greater than 0 and at least 2 of the first 3 comparables do not contain any of the following terms as data source: ML, MLS, M.L., MRIS, MULTI, REALTRANS, REALLINK, REDLINK, AIRD, CMDC, FNC, or NDC FNC-R-SCA-087-01 Concessions: A numeric value between 1000 and 20000 is found in Sales or Financing fields, and negative adjustment is not found in Adjustment field for Sales or Financing Concessions FNC-R-SCA-090-01 Sale or Financing Concessions: Comparables: Line item adjustment for any comparable is greater than 10% of the comparable's sale price FNC-R-SCA-090-02 Sales or Financing Adjustments: Comparables: Comparables 1-3 contain NEGATIVE (−) adjustments across the board FNC-R-SCA-099-01 Date of Sale/Time: Comparables: Fields for any comparables contain NEGATIVE adjustments and are closed sales FNC-R-SCA-102-01 Date of Sale/Time: Comparables: Line item adjustment for any comparable is greater than 10% of the comparable's sale price FNC-R-SCA-102-02 Date of Sale/Time: Comparables: Comparables 1-3 contain POSITIVE (+) adjustments across the board FNC-R-SCA-102-03 Date of Sale/Time: Comparables: Comparables 1-3 contain NEGATIVE (−) adjustments across the board FNC-R-SCA-105-01 Location: SUBJECT contains terms GOOD, AVERAGE or SUPERIOR and minimum of 2 of the first 3 comparables do not contain same terms FNC-R-SCA-111-01 Location: Comparables: Line item adjustment for any comparable is greater than 10% of the comparable's sale price FNC-R-SCA-111-02 Location: Comparables: Comparables 1-3 contain POSITIVE (+) adjustments across the board FNC-R-SCA-111-03 Location: Comparables: Comparables 1-3 contain NEGATIVE (−) adjustments across the board FNC-R-SCA-120-01 Leasehold/Fee Simple: Comparables: Line item adjustment for any comparable is greater than 10% of the comparable's sale price FNC-R-SCA-120-02 Leasehold/Fee Simple: Comparables: Comparables 1-3 contain POSITIVE (+) adjustments across the board FNC-R-SCA-120-03 Leasehold/Fee Simple: Comparables: Comparables 1-3 contain NEGATIVE (−) adjustments across the board FNC-R-SCA-159-01 Site: Comparables: Size of 2 of the 1st 3 comparables are not within 30 percent of the SUBJECT'S site size FNC-R-SCA-159-02 Site: SUBJECT: Site size is greater than 1 acre and is not bracketed by comparables 1-3

FNC-R-SCA-159-03 Site: SUBJECT: Site size is 1 acre or greater and 2 of the 1st 3 comparables do not contain a site size of 0.5 acre or more FNC-R-SCA-159-04 Site: SUBJECT: Site size is 1-5 acres and the site size of 2 of the 1st 3 comparables vary by more than 2 acres FNC-R-SCA-159-05 Site: SUBJECT: Site size is greater than 5 acres and less than or equal to 10 acres and 2 of the 1st 3 comparables vary by more than 3 acres FNC-R-SCA-159-06 Site: SUBJECT: Site size is greater than 10 acres and less than or equal to 20 acres and 2 of the 1st 3 comparables vary by more than 5 acres FNC-R-SCA-159-07 Site: SUBJECT: Site size is greater than 20 acres and 2 of the 1st 3 comparables vary by more than 7.5 acres FNC-R-SCA-159-08 Site: SUBJECT field contains terms GOOD, AVERAGE or SUPERIOR and minimum of 2 of the first 3 comparables do not contain same terms FNC-R-SCA-159-09 Site: COMPARABLES field contains terms: GOLF, WATER, RIVER, OCEAN, CREEK, MOUNTAIN, LAKE, INTRA, POND, BEACH, GULF and none of these words is found in SUBJECT'S SITE FNC-R-SCA-165-01 Site: Comparables: Line item adjustment for any comparable is greater than 10% of the comparable's sale price FNC-R-SCA-165-02 Site: Comparables: Comparables 1-3 contain POSITIVE (+) adjustments across the board FNC-R-SCA-165-03 Site: Comparables: Comparables 1-3 contain NEGATIVE (−) adjustments across the board FNC-R-SCA-168-01 View: SUBJECT field contains terms GOOD, AVERAGE or SUPERIOR and minimum of 2 of the first 3 comparables do not contain same terms FNC-R-SCA-168-02 View: COMPARABLES field contains terms: GOLF, WATER, RIVER, OCEAN, CREEK, MOUNTAIN, LAKE, INTRA, POND, BEACH, GULF and none of these words is found in SUBJECT'S SITE FNC-R-SCA-174-01 View: 2 of the first 3 comparables contain positive or negative adjustments for VIEW FNC-R-SCA-174-02 View: Comparables: Line item adjustment for any comparable is greater than 10% of the comparable's sale price FNC-R-SCA-174-03 View: Comparables: Comparables 1-3 contain POSITIVE (+) adjustments across the board FNC-R-SCA-174-04 View: Comparables: Comparables 1-3 contain NEGATIVE (−) adjustments across the board FNC-R-SCA-177-01 Design (Style): SUBJECT field contains terms GOOD, AVERAGE or SUPERIOR and minimum of 2 of the first 3 comparables do not contain same terms FNC-R-SCA-180-01 GENERAL DESCRIPTION: Type: ATT or S-DET/END UNIT box is checked and more than 1 of the first 3 comparables does not contain terms: ATT or S-DET, ROW, or TH, TOWNHOME in SCA DESIGN (STYLE) field FNC-R-SCA-183-01 Design (Style): 2 of the first 3 comparables contain positive or negative adjustments for DESIGN FNC-R-SCA-183-02 Design (Style): Comparables: Line item adjustment for any comparable is greater than 10% of the comparable's sale price FNC-R-SCA-183-03 Design (Style): Comparables: Comparables 1-3 contain POSITIVE (+) adjustments across the board FNC-R-SCA-183-04 Design (Style): Comparables: Comparables 1-3 contain NEGATIVE (−) adjustments across the board FNC-R-SCA-183-05 GENERAL DESCRIPTION: Type: ATT or S-DET/END UNIT box is checked and 2 of the first 3 comparables contain adjustments for DESIGN (STYLE)

FNC-R-SCA-186-01 Quality of Construction: SUBJECT field contains terms GOOD, AVERAGE or SUPERIOR and minimum of 2 of the first 3 comparables do not contain same terms FNC-R-SCA-186-02 Quality of Construction: SUBJECT contains term BRICK and at least 2 of the first 3 comparables do not contain same term FNC-R-SCA-186-03 Quality of Construction: SUBJECT contains term CONC, BLOCK, BLK, WOOD, WD, FRAME, ALUMINIUM or VINYL and more than 1 of first three comparables contain term BRICK or STUCCO FNC-R-SCA-192-01 Quality of Construction: 2 of the first 3 comparables contain positive or negative adjustments for QUALITY OF CONSTRUCTION FNC-R-SCA-192-02 Quality of Construction: Comparables: Line item adjustment for any comparable is greater than 10% of the comparable's sale price FNC-R-SCA-192-03 Quality of Construction: Comparables: Comparables 1-3 contain POSITIVE (+) adjustments across the board FNC-R-SCA-192-04 Quality of Construction: Comparables: Comparables 1-3 contain NEGATIVE (−) adjustments across the board FNC-R-SCA-195-00 Actual Age: Field for SUBJECT does not contain numeric entries or terms NEW, PROPOSED or UNDER CONSTRUCTION FNC-R-SCA-195-01 Actual Age: SUBJECT is greater than 2 years old and more than 1 comparable contains term NEW or O FNC-R-SCA-195-02 Actual Age: SUBJECT is greater than 10 years old and any of the 1st 3 comparables contains terms NEW or O FNC-R-SCA-195-03 Actual Age: SUBJECT: Field contains 0, NEW, PROPOSED, U/C and age of 2 of 1st 3 comparables are greater than 1 year FNC-R-SCA-195-04 Actual Age: SUBJECT: Field contains 0, NEW, PROPOSED, U/C and age of any comparable is greater than 5 years FNC-R-SCA-195-05 Actual Age: SUBJECT: Field contains 1-5 years and age of 2 of 1st 3 comparables are 0 or NEW FNC-R-SCA-195-06 Actual Age: SUBJECT: Field contains 1-2 years and age of 2 of 1st 3 comparables are greater than 4 years FNC-R-SCA-195-07 Actual Age: SUBJECT: Field contains 1-2 years and age of any comparable is greater than 6 years FNC-R-SCA-195-08 Actual Age: SUBJECT: Field contains 3-5 years and age of 2 of 1st 3 comparables are less than 2 years or greater than 8 years FNC-R-SCA-195-09 Actual Age: SUBJECT: Field contains 3-5 years and age of any of comparable is greater than 12 years FNC-R-SCA-195-10 Actual Age: SUBJECT: Field contains 6 years or greater and age of any comparable is 0 or NEW FNC-R-SCA-195-11 Actual Age: SUBJECT: Field contains 6-10 years and age of 2 of the 1st 3 comparables are less than 4 years or greater than 12 years FNC-R-SCA-195-12 Actual Age: SUBJECT: Field contains 6-10 years and age of any comparable is greater than 15 years FNC-R-SCA-195-13 Actual Age: SUBJECT: Field contains 11-15 years and age of 2 of the 1st 3 comparables are less than 6 years or greater than 18 years FNC-R-SCA-195-14 Actual Age: SUBJECT: Field contains 11-15 years and age of any comparable is greater than 22 years FNC-R-SCA-195-15 Actual Age: SUBJECT: Field contains 16-20 years and age of 2 of 1st 3 comparables is less than 10 years or greater than 25 years FNC-R-SCA-195-16 Actual Age: SUBJECT: Field contains 16-20 years and age of any comparable is greater than 28 years FNC-R-SCA-195-17 Actual Age: SUBJECT: Field contains 21-30 years and age of 2 of 1st 3 comparables is less than 12 years or greater than 35 years
FNC-R-SCA-195-18 Actual Age: SUBJECT: Field contains 21-30 years and age of any comparable is greater than 39 years
FNC-R-SCA-195-19 Actual Age: SUBJECT: Field contains 31-40 years and age of 2 of 1st 3 comparables is less than 15 years or greater than 48 years
FNC-R-SCA-195-20 Actual Age: SUBJECT: Field contains 31-40 years and age of any comparable is greater than 50 years
FNC-R-SCA-195-21 Actual Age: SUBJECT: Field contains 41-55 years and age of 2 of 1st 3 comparables is less than 25 years or greater than 62 years
FNC-R-SCA-195-22 Actual Age: SUBJECT: Field contains 41-55 years and age of any comparable is greater than 65 years
FNC-R-SCA-195-23 Actual Age: SUBJECT: Field contains 56-69 years and age of 2 of 1st 3 comparables is less than 40 years or greater than 76 years
FNC-R-SCA-195-24 Actual Age: SUBJECT: Field contains 56-69 years and age of any comparable is greater than 79 years
FNC-R-SCA-195-25 Actual Age: SUBJECT: Field contains 70-90 years and age of any comparable has variance of more than 20 years
FNC-R-SCA-195-26 Actual Age: SUBJECT: Field contains 91-105 years and age of any comparable has variance of more than 25 years
FNC-R-SCA-195-27 Actual Age: SUBJECT: Field contains 106 years or greater and age of any comparable has variance of more than 30 years
FNC-R-SCA-198-01 Actual Age: Comparables: Comparables 1-3 contains terms: NEW or 0
FNC-R-SCA-198-02 Actual Age: Comparables: Field of any COMPARABLE contains terms NEW or 0 and positive adjustments are found in AGE field
FNC-R-SCA-198-03 Actual Age: Comparables: Field of any COMPARABLE contains terms NEW or 0 and positive adjustments are found in CONDITION field
FNC-R-SCA-201-01 Actual Age: Comparables: Line item adjustment for any comparable is greater than 10% of the comparable's sale price
FNC-R-SCA-201-02 Actual Age: Comparables: Comparables 1-3 contain POSITIVE (+) adjustments across the board
FNC-R-SCA-201-03 Actual Age: Comparables: Comparables 1-3 contain NEGATIVE (−) adjustments across the board
FNC-R-SCA-204-01 Condition: SUBJECT: Field contains terms GOOD, AVERAGE or SUPERIOR and minimum of 2 of the first 3 comparables do not contain same term
FNC-R-SCA-210-01 Condition: 2 of the first 3 comparables contain positive or negative adjustments for CONDITION
FNC-R-SCA-210-02 Condition: Comparables: Line item adjustment for any comparable is greater than 10% of the comparable's sale price
FNC-R-SCA-210-03 Condition: Comparables: Comparables 1-3 contain POSITIVE (+) adjustments across the board
FNC-R-SCA-210-04 Condition: Comparables: Comparables 1-3 contain NEGATIVE (−) adjustments across the board
FNC-R-SCA-213-01 Above Grade: Comparables: Line item adjustment for any comparable is greater than 10% of the comparable's sale price
FNC-R-SCA-213-02 Above Grade: Comparables: Comparables 1-3 contain POSITIVE (+) adjustments across the board
FNC-R-SCA-213-03 Above Grade: Comparables: Comparables 1-3 contain NEGATIVE (−) adjustments across the board
FNC-R-SCA-219-01 Bedrooms: SUBJECT: Field contains numeric entry less than 1 or greater than 5 bedrooms
FNC-R-SCA-219-02 Bedrooms: SUBJECT: For 1 bedroom, 2 of the first 3 comparables have more than 1 bedroom
FNC-R-SCA-219-03 Bedrooms: SUBJECT: For 1 bedroom any of the comparables exceeds 2 bedrooms
FNC-R-SCA-219-04 Bedrooms: SUBJECT: For 2 bedroom, 2 of the first 3 comparables have less than 2 bedrooms
FNC-R-SCA-219-05 Bedrooms: SUBJECT: For 2 bedroom, any of the comparables exceeds 3 bedrooms
FNC-R-SCA-219-06 Bedrooms: SUBJECT: For 3 bedroom, any of the comparables has 1 bedroom
FNC-R-SCA-219-07 Bedrooms: SUBJECT: For 3 bedroom, 2 of the first 3 comparables have less than 3 bedrooms
FNC-R-SCA-219-08 Bedrooms: SUBJECT: For 3 bedroom, 2 of the first 3 comparables have more than 3 bedrooms
FNC-R-SCA-219-09 Bedrooms: SUBJECT: For 4 bedroom, any of the comparables has less than 3 bedrooms
FNC-R-SCA-219-10 Bedrooms: SUBJECT: For 4 bedroom, 2 of the first 3 comparables have less than 4 bedrooms
FNC-R-SCA-219-11 Bedrooms: SUBJECT: For 4 bedroom, 2 of the first 3 comparables have more than 4 bedrooms
FNC-R-SCA-219-12 Bedrooms: SUBJECT: For 5 Bedroom, 2 of the first 3 comparables has less than 4 bedrooms
FNC-R-SCA-219-13 Bedrooms: SUBJECT: For 5 Bedroom, 2 of the first 3 comparables has more than 6 bedrooms
FNC-R-SCA-219-14 Bedrooms: SUBJECT: For 4 Bedroom, BATHROOM field contains 1
FNC-R-SCA-219-15 Bedrooms: SUBJECT: For 5 Bedroom, BATHROOM field contains 2 or less
FNC-R-SCA-222-01 Bathrooms: SUBJECT: For 1 bathroom, 2 of the first 3 comparables have more than 1 bathroom
FNC-R-SCA-222-02 Bathrooms: SUBJECT: For 1 bathroom, any of the comparables has more than 2 bathrooms
FNC-R-SCA-222-03 Bathrooms: SUBJECT: For 1.5 bathrooms, 2 of the first 3 comparables have more than 1.5 bathrooms
FNC-R-SCA-222-04 Bathrooms: SUBJECT: For 1.5 bathrooms, any of the first 3 comparables has more than 2 bathrooms
FNC-R-SCA-222-05 Bathrooms: SUBJECT: For 2 bathrooms, 2 of 1st 3 comparables has less than 2 bathrooms
FNC-R-SCA-222-06 Bathrooms: SUBJECT: For 2 bathrooms, any of the 1st 3 comparables has less than 1.5 or greater than 3 bathrooms FNC-R-SCA-222-07 Bathrooms: SUBJECT: For 2.5 bathrooms, any of the first 3 comparables has less than 2 or more than 3.5 bathrooms FNC-R-SCA-222-08 Bathrooms: SUBJECT: For 3 bathrooms, any of 1st 3 comparables has less than 2 or more than 4 bathrooms FNC-R-SCA-222-09 Bathrooms: SUBJECT: For 3.5 bathrooms, any of the 1st 3 comparables has less than 2.5 or more than 4.5 bathrooms FNC-R-SCA-222-10 Bathrooms: SUBJECT: For 4 bathrooms or greater, any comparable has variance of more than 2 bathrooms FNC-R-SCA-234-01 Room Count: Comparables: Line item adjustment for any comparable is greater than 10% of the comparable's sale price FNC-R-SCA-234-02 Room Count: Comparables: Comparables 1-3 contain POSITIVE (+) adjustments across the board FNC-R-SCA-234-03 Room Count: Comparables: Comparables 1-3 contain NEGATIVE (−) adjustments across the board FNC-R-SCA-237-01 Gross Living Area: Subject: Less then 750 sq ft, variance for 2 of the 1st 3 comparables is greater than 100 sq ft FNC-R-SCA-237-02 Gross Living Area: Subject: Greater than or equal to 750 sq ft and less than 1000 sq ft, variance for 2 of the 1st 3 comparables is greater than 200 sq ft FNC-R-SCA-237-03 Gross Living Area: Subject: Greater than or equal to 1000 sq ft and less than 1250 sq ft, variance for 2 of the 1st 3 comparables is greater than 250 sq ft FNC-R-SCA-237-04 Gross Living Area: Subject: Greater than or equal to 1250 sq ft and less than 1500 sq ft, variance for 2 of the 1st 3 comparables is greater than 300 sq ft FNC-R-SCA-237-05 Gross Living Area: Subject: Greater than or equal to 1500 sq ft and less than 1800 sq ft, variance for 2 of the 1st 3 comparables is greater than 350 sq ft FNC-R-SCA-237-06 Gross Living Area: Subject: Greater than or equal to 1800 sq ft and less than 2200 sq ft, variance for 2 of the 1st 3 comparables is greater than 400 sq ft FNC-R-SCA-237-07 Gross Living Area: Subject: Greater than or equal to 2200 sq ft and less than 3000 sq ft, variance for 2 of the 1st 3 comparables is greater than 450 sq ft FNC-R-SCA-237-08 Gross Living Area: Subject: Greater than or equal to 3000 sq ft and less than 4000 sq ft, variance for 2 of the 1st 3 comparables is greater than 500 sq ft FNC-R-SCA-237-09 Gross Living Area: Subject: Greater than or equal to 4000 sq ft and less than 5000 sq ft, variance for 2 of the 1st 3 comparables is greater than 750 sq ft FNC-R-SCA-237-10 Gross Living Area: Subject: Greater than or equal to 5000 sq ft and less than 6000 sq ft, variance for 2 of the 1st 3 comparables is greater than 1000 sq ft FNC-R-SCA-237-11 Gross Living Area: Subject: Greater than or equal to 6000 sq ft and less than 7500 sq ft, variance for 2 of the 1st 3 comparables is greater than 1250 sq ft FNC-R-SCA-237-12 Gross Living Area: Subject: Greater than or equal to 7500 sq ft and less than 10000 sq ft, variance for 2 of the 1st 3 comparables is greater than 1500 sq ft FNC-R-SCA-237-13 Gross Living Area: Subject: 10,000 sq ft or greater variance for 2 of the 1st 3 comparables is greater than 2000 sq ft FNC-R-SCA-237-14 Gross Living Area of Comparables: Subject Property's gross living area is not bracketed by the 1st 3 comparables' gross living area FNC-R-SCA-237-15 Gross Living Area: Comparables: GLA of the first 3 COMPARABLES is larger than the subject's GLA FNC-R-SCA-237-16 Gross Living Area: Comparables: GLA of the first 3 COMPARABLES is smaller than the subject's GLA FNC-R-SCA-243-01 Gross Living Area: Adjustments for all comparables vary more than 2 dollars per square foot FNC-R-SCA-243-02 Gross Living Area: Comparables: Line item adjustment for any comparable is greater than 10% of the comparable's sale price FNC-R-SCA-243-03 Gross Living Area: Comparables: Comparables 1-3 contain POSITIVE (+) adjustments across the board FNC-R-SCA-243-04 Gross Living Area: Comparables: Comparables 1-3 contain NEGATIVE (−) adjustments across the board FNC-R-SCA-246-01 Basement and Finished Rooms Below Grade: SUBJECT contains terms BASEMENT, FINISHED or PARTIAL and minimum of 2 of the first three comparables do not contain same FNC-R-SCA-252-01 Basement and Finished Rooms Below Grade: Comparables: Line item adjustment for any comparable is greater than 10% of the comparable's sale price FNC-R-SCA-252-02 Basement and Finished Rooms Below Grade: Comparables: Comparables 1-3 contain POSITIVE (+) adjustments across the board FNC-R-SCA-252-03 Basement and Finished Rooms Below Grade: Comparables: Comparables 1-3 contain NEGATIVE (−) adjustments across the board FNC-R-SCA-252-04 GENERAL DESCRIPTION: Units: ONE WITH ACCESSORY UNIT box is checked and more than 1 of the first 3 comparables contains upward adjustment for BASEMENTS AND FINISHED ROOMS BELOW GRADE FNC-R-SCA-264-01 Functional Utility: SUBJECT: Field contains terms GOOD, AVERAGE or SUPERIOR and minimum of 2 of the first 3 comparables do not contain same term FNC-R-SCA-270-01 Functional Utility: 2 of the first 3 comparables contain positive or negative adjustments for FUNCTIONAL UTILITY FNC-R-SCA-270-02 Functional Utility: Comparables: Line item adjustment for any comparable is greater than 10% of the comparable's sale price FNC-R-SCA-270-03 Functional Utility: Comparables: Comparables 1-3 contain POSITIVE (+) adjustments across the board FNC-R-SCA-270-04 Functional Utility: Comparables: Comparables 1-3 contain NEGATIVE (−) adjustments across the board FNC-R-SCA-279-01 Heating/Cooling: Comparables: Line item adjustment for any comparable is greater than 10% of the comparable's sale price FNC-R-SCA-279-02 Heating/Cooling: Comparables: Comparables 1-3 contain POSITIVE (+) adjustments across the board FNC-R-SCA-279-03 Heating/Cooling: Comparables: Comparables 1-3 contain NEGATIVE (−) adjustments across the board FNC-R-SCA-288-01 Energy Efficient Items: Comparables: Line item adjustment for any comparable is greater than 10% of the comparable's sale price FNC-R-SCA-288-02 Energy Efficient Items: Comparables: Comparables 1-3 contain POSITIVE (+) adjustments across the board FNC-R-SCA-288-03 Energy Efficient Items: Comparables: Comparables 1-3 contain NEGATIVE (−) adjustments across the board FNC-R-SCA-297-01 Garage/Carport: Comparables: Line item adjustment for any comparable is greater than 10% of the comparable's sale price FNC-R-SCA-297-02 Garage/Carport: Comparables: Comparables 1-3 contain POSITIVE (+) adjustments across the board FNC-R-SCA-297-03 Garage/Carport: Comparables: Comparables 1-3 contain NEGATIVE (−) adjustments across the board FNC-R-SCA-306-01 Porch/Patio/Deck: Comparables: Line item adjustment for any comparable is greater than 10% of the comparable's sale price FNC-R-SCA-306-02 Porch/Patio/Deck: Comparables: Comparables 1-3 contain POSITIVE (+) adjustments across the board FNC-R-SCA-306-03 Porch/Patio/Deck: Comparables: Comparables 1-3 contain NEGATIVE (−) adjustments across the board FNC-R-SCA-312-01 Unlabeled Line 1: SUBJECT field contains POOL and a minimum of 1 of first 3 comparables does not contain POOL FNC-R-SCA-312-02 Unlabeled Line 1: SUBJECT field contains terms BARN, ARENA, POND or STABLES and a minimum of 1 of first 3 COMPARABLES does not contain same terms FNC-R-SCA-312-03 Unlabeled Line 1: SUBJECT field contains terms BARN, ARENA or STABLES and LOCATION box is checked URBAN or SUBURBAN FNC-R-SCA-312-04 Unlabeled Line 1: Field for more than 1 comparable contains POOL, GUEST, ACCESSORY or TENNIS and SUBJECT field does not contain same FNC-R-SCA-312-05 Unlabeled Line 1: Subject: Contains terms UPGRADE, UPDATE or REMODEL FNC-R-SCA-315-01 Unlabeled Line 1: Comparables: Field for any comparable contains BARN, ARENA or STABLES and LOCATION box is checked URBAN or SUBURBAN FNC-R-SCA-315-02 Unlabeled Line 1: Comparables: Contains terms UPGRADE, UPGRD, UPDATE, EXTRAS or REMODEL FNC-R-SCA-318-01 Unlabeled Line 1: Comparables: Line item adjustment for any comparable is greater than 10% of the comparable's sale price FNC-R-SCA-318-02 Unlabeled Line 1: Comparables: Comparables 1-3 contain POSITIVE (+) adjustments across the board FNC-R-SCA-318-03 Unlabeled Line 1: Comparables: Comparables 1-3 contain NEGATIVE (−) adjustments across the board FNC-R-SCA-324-01 Unlabeled Line 2: SUBJECT field contains POOL and a minimum of 1 of first 3 comparables does not contain POOL FNC-R-SCA-324-02 Unlabeled Line 2: SUBJECT field contains terms BARN, ARENA, POND or STABLES and a minimum of 1 of first 3 COMPARABLES does not contain same terms FNC-R-SCA-324-03 Unlabeled Line 2: SUBJECT field contains terms BARN, ARENA or STABLES and LOCATION box is checked URBAN or SUBURBAN FNC-R-SCA-324-04 Unlabeled Line 2: Field for more than 1 comparable contains POOL, GUEST, ACCESSORY or TENNIS and SUBJECT field does not contain same FNC-R-SCA-324-05 Unlabeled Line 2: Subject: Contains terms UPGRADE, UPDATE or REMODEL FNC-R-SCA-327-01 Unlabeled Line 2: Comparables: Field for any comparable contains BARN, ARENA or STABLES and LOCATION box is checked URBAN or SUBURBAN FNC-R-SCA-327-02 Unlabeled Line 2: Comparables: Contains terms UPGRADE, UPGRD, UPDATE, EXTRAS or REMODEL FNC-R-SCA-330-01 Unlabeled Line 2: Comparables: Line item adjustment for any comparable is greater than 10% of the comparable's sale price FNC-R-SCA-330-02 Unlabeled Line 2: Comparables: Comparables 1-3 contain POSITIVE (+) adjustments across the board FNC-R-SCA-330-03 Unlabeled Line 2: Comparables: Comparables 1-3 contain NEGATIVE (−) adjustments across the board FNC-R-SCA-336-01 Unlabeled Line 3: SUBJECT field contains POOL and a minimum of 1 of first 3 comparables does not contain POOL FNC-R-SCA-336-02 Unlabeled Line 3: SUBJECT field contains terms BARN, ARENA, POND or STABLES and a minimum of 1 of first 3 COMPARABLES does not contain same terms FNC-R-SCA-336-03 Unlabeled Line 3: SUBJECT field contains terms BARN, ARENA or STABLES and LOCATION box is checked URBAN or SUBURBAN FNC-R-SCA-336-04 Unlabeled Line 3: Field for more than 1 comparable contains POOL, GUEST, ACCESSORY or TENNIS and SUBJECT field does not contain same FNC-R-SCA-336-05 Unlabeled Line 3: Subject: Contains terms UPGRADE, UPDATE or REMODEL FNC-R-SCA-339-01 Unlabeled Line 3: Comparables: Field for any comparable contains BARN, ARENA or STABLES and LOCATION box is checked URBAN or SUBURBAN FNC-R-SCA-339-02 Unlabeled Line 3: Comparables: Contains terms UPGRADE, UPGRD, UPDATE, EXTRAS or REMODEL FNC-R-SCA-342-01 Unlabeled Line 3: Comparables: Line item adjustment for any comparable is greater than 10% of the comparable's sale price FNC-R-SCA-342-02 Unlabeled Line 3: Comparables: Comparables 1-3 contain POSITIVE (+) adjustments across the board FNC-R-SCA-342-03 Unlabeled Line 3: Comparables: Comparables 1-3 contain NEGATIVE (−) adjustments across the board FNC-R-SCAHIS-027-01 Price of Prior Sale/Transfer: SUBJECT: Prior Sales Price is less than the OPINION OF MARKET VALUE by more than 10 percent and PROPERTY VALUES box is checked STABLE or DECLINING FNC-R-SCAHIS-027-02 Price of Prior Sale/Transfer: SUBJECT: Prior Sales Price is higher than the OPINION OF MARKET VALUE FNC-R-SCAHIS-030-01 Price of Prior Sale/Transfer: COMPARABLES: Prior Sales Price is HIGHER than COMPARABLE'S PRICE reported in appraisal FNC-R-MKTVALUE-000-01 Opinion of Market Value: For PURCHASE TRANSACTIONS, the OPINION OF MARKET VALUE is less than the CONTRACT PRICE FNC-R-MKTVALUE-000-02 Opinion of Market Value: For PURCHASE TRANSACTIONS, the OPINION OF MARKET VALUE is greater than 105% of the CONTRACT PRICE FNC-R-MKTVALUE-000-04 Opinion of Market Value: The OPINION OF MARKET VALUE is not bracketed by the adjusted sales prices of the comparables FNC-R-RECDATE-000-01 Date of Inspection and the Effective Date of the Appraisal: Contains date after the DATE OF SIGNATURE AND REPORT FNC-R-CA-102-01 Depreciation: Functional: Field contains a value and comparables do not contain same rating as SUBJECT or terms SAME or SIMILAR for FUNCTIONAL UTILITY, and Adjustment field in SCA does not reflect negative adjustment FNC-R-CA-105-01 Depreciation: External: Field contains a value and comparables do not contain same rating as SUBJECT or terms SAME or SIMILAR for LOCATION and/or SITE and/or VIEW, and Adjustment field in SCA does not reflect negative adjustment FNC-R-CA-123-01 Indicated Value by Cost Approach: Field contains value less than OPINION OF MARKET VALUE by more than 5 percent FNC-R-PUDINFO-009-00 Legal Name of Project: Field is blank and the DEVELOPER/BUILDER in control of HOA box is checked YES and the UNIT TYPE(S) box is checked ATTACHED FNC-R-PUDINFO-012-00 Total number of phases: Field is blank or does not contain a numeric value, and the DEVELOPER/BUILDER in control of HOA box is checked YES and the UNIT TYPE(S) box is checked ATTACHED FNC-R-PUDINFO-015-00 Total number of units: Field is blank or does not contain a numeric value, and the DEVELOPER/BUILDER in control of HOA box is checked YES and the UNIT TYPE(S) box is checked ATTACHED FNC-R-PUDINFO-018-00 Total number of units sold: Field is blank or does not contain a numeric value, and the DEVELOPER/BUILDER in control of HOA box is checked YES and the UNIT TYPE(S) box is checked ATTACHED FNC-R-PUDINFO-021-00 Total number of units rented: Field is blank or does not contain a numeric value, and the DEVELOPER/BUILDER in control of HOA box is checked YES and the UNIT TYPE(S) box is checked ATTACHED FNC-R-PUDINFO-024-00 Total number of units for sale: Field is blank or does not contain a numeric value, and the DEVELOPER/BUILDER in control of HOA box is checked YES and the UNIT TYPE(S) box is checked ATTACHED FNC-R-PUDINFO-027-00 Total Number of units rented/for sale: Data source(s): Field is blank and the DEVELOPER/BUILDER in control of HOA box is checked YES and the UNIT TYPE(S) box is checked ATTACHED FNC-R-PUDINFO-030-00 Was the project created by the conversion of an existing building(s) into a PUD?: There is no box checked and the DEVELOPER/BUILDER in control of HOA box is checked YES and the UNIT TYPE(S) box is checked ATTACHED FNC-R-PUDINFO-030-01 Was the project created by the conversion of an existing building(s) into a PUD?: The YES box is checked and the DEVELOPER/BUILDER in control of HOA box is checked YES and the UNIT TYPE(S) box is checked ATTACHED FNC-R-PUDINFO-033-01 Was the project created by the conversion of an existing building(s) into PUD: The YES box is checked and DATE OF CONVERSION field does not contain a valid date FNC-R-PUDINFO-036-00 Does the project contain any multi-family dwelling units? There is no box checked and the DEVELOPER/BUILDER in control of HOA box is checked YES and the UNIT TYPE(S) box is checked ATTACHED FNC-R-PUDINFO-036-01 Does the project contain any multi-family dwelling units?: The YES box is checked FNC-R-PUDINFO-039-00 Does the project contain any multi-family dwelling units? DATA SOURCE(S) field is blank and the DEVELOPER/BUILDER in control of HOA box is checked YES and the UNIT TYPE(S) box is checked ATTACHED FNC-R-PUDINFO-042-00 Are the units, common elements, and recreation facilities complete?: There is no box checked and the DEVELOPER/BUILDER in control of HOA box is checked YES and the UNIT TYPE(S) box is checked ATTACHED FNC-R-PUDINFO-045-01 Are the units, common elements, and recreation facilities complete?: The NO box is checked and DESCRIBE THE STATUS OF COMPLETION field is blank FNC-R-PUDINFO-048-00 Are the units, common elements, and recreation facilities complete?: There is no box checked; Field is blank and the DEVELOPER/BUILDER in control of HOA box is checked YES and the UNIT TYPE(S) box is checked ATTACHED FNC-R-PUDINFO-048-01 Are the common elements leased to or by the Homeowner's Association?: The YES box is checked FNC-R-PUDINFO-051-01 Are the common elements leased to or by the Homeowner's Association?: The YES box is checked and field DESCRIBE THE RENTAL TERMS AND OPTIONS is blank FNC-R-PUDINFO-054-00 Describe common elements and recreation facilities: Field is blank and the DEVELOPER/BUILDER in control of HOA box is checked YES and the UNIT TYPE(S) box is checked ATTACHED

FNMA 1073/FHLMC 465:

FNC-R-CMS-000-01 Opinion of Market Value: Appraised value is less than the sale's price in CMS FNC-R-CMS-000-02 Opinion of Market Value: For sales transactions, the final value of the SUBJECT is greater than 105% of the sale's price in CMS FNC-R-SUB-048-01 Occupant: ASSIGNMENT TYPE is not a PURCHASE TRANSACTION and TENANT or VACANT box is checked FNC-R-SUB-069-01 Assignment Type: OTHER box is checked and DESCRIBE field is blank FNC-R-SUB-081-01 Is the subject property currently offered for sale or has it been offered for sale in the twelve months prior to the effective date of the appraisal? The YES box is checked FNC-R-SUB-084-01 Is the SUBJECT currently offered for sale or has it been offered for sale in the 12 months prior to the effective date of the appraisal? The YES box is checked and value contained in REPORT DATA SOURCE(S) USED, OFFERING PRICE(S) AND DATE(S) is less than the CONTRACT PRICE or MARKET VALUE FNC-R-SUB-084-02 Report data source(s) used, offering price(s), and date(s): does not contain term(s) ML, M.L, MRIS, MULTI, REALTRANS, REALLINK or REDLINK FNC-R-CONT-009-01 Contract Price $: For sales transactions, OPINION OF MARKET VALUE is less than the CONTRACT PRICE FNC-R-CONT-009-02 Contract Price $: For sales transactions, the OPINION OF MARKET VALUE is greater than 105% of the CONTRACT PRICE FNC-R-CONT-012-01 Contract Date: Field reflects DATE OF SALE after the EFFECTIVE DATE OF APPRAISAL FNC-R-CONT-024-01 Is there any financial assistance (loan charges, sale concessions, gift downpayment assistance, etc.) to be paid by any party on behalf of the borrower? The YES box is checked and field for REPORT THE DOLLAR AMOUNT AND DESCRIBE THE ITEMS TO BE PAID contains numeric value greater than $500

FNC-R-N-012-01 Property Values: INCREASING box is checked and DATE OF SALE/TIME of 2 of the first 3 comparables is greater than 90 days old FNC-R-N-012-02 Property Values: INCREASING box is checked and DATE OF SALE for 2 of the first 3 comps is greater than 90 days old and DATE OF SALE/TIME field does not contain a positive time adjustment FNC-R-N-012-03 Property Values: INCREASING box is checked and terms STABLE or STABILIZED found in NEIGHBORHOOD DESCRIPTION or MARKET CONDITIONS fields FNC-R-N-063-01 Condominium Housing PRICE: The OPINION OF MARKET VALUE and/or SALES PRICE of the SUBJECT exceeds the predominant CONDOMINIUM HOUSING price by more than 5%

FNC-R-N-075-02 Present Land Use: ONE-UNIT field contains value less than 40%

FNC-R-N-093-01 Neighborhood Description: Contains terms: PRIDE, POOR, CRIME, BULLETS, GRAFFITI or DESIRABLE FNC-R-N-096-01 Market Conditions: Contains terms: PRIDE, POOR, CRIME, BULLETS, GRAFFITI or DESIRABLE FNC-R-S-012-00 Topography: Field is blank FNC-R-S-018-00 Density: Field is blank FNC-R-S-042-01 Is the Highest and Best Use of the subject property as improved (or as proposed in the plans and specifications) the present use? The NO box is checked and DESCRIBE field is blank FNC-R-S-051-01 Utilities: Electricity: OTHER box is checked and DESCRIBE field is blank FNC-R-S-069-01 Utilities: Water: OTHER box is checked and DESCRIBE field is blank FNC-R-S-078-01 Utilities: Sanitary Sewer: OTHER box is checked and DESCRIBE field is blank FNC-R-S-108-01 Are the utilities and off-site improvements typical for the market area? The NO box is checked and DESCRIBE field is blank FNC-R-PROJINFO-010-01 GENERAL DESCRIPTION: GENERAL DESCRIPTION: # of Stories is greater than 3 and # of Elevators is less than 1

FNC-R-PROJINFO-012-01 GENERAL DESCRIPTION: PROPOSED OR UNDER CONSTRUCTION box is checked and AS IS box is checked in RECONCILIATION FNC-R-PROJINFO-014-01 GENERAL DESCRIPTION: Age: SUBJECT is less than or equal to 15 years and the difference between the ACTUAL and EFFECTIVE ages is more than 5 years FNC-R-PROJINFO-014-02 GENERAL DESCRIPTION: Age: SUBJECT is greater than 15 years and less than or equal to 25 years and the difference between the ACTUAL and EFFECTIVE ages is more than 8 years FNC-R-PROJINFO-014-03 GENERAL DESCRIPTION: Age: SUBJECT is greater than 25 years and less than or equal to 35 years and the difference between the ACTUAL and EFFECTIVE ages is more than 10 years FNC-R-PROJINFO-014-04 GENERAL DESCRIPTION: Age: SUBJECT is greater than 35 years and less than or equal to 45 years and the difference between the ACTUAL and EFFECTIVE ages is more than 12 years FNC-R-PROJINFO-014-05 GENERAL DESCRIPTION: Age: SUBJECT is greater than 45 years and less than or equal to 58 years and the difference between the ACTUAL and EFFECTIVE ages is more than 15 years FNC-R-PROJINFO-014-06 GENERAL DESCRIPTION: Age: SUBJECT is greater than 58 years and less than or equal to 70 years and the difference between the ACTUAL and EFFECTIVE ages is more than 18 years FNC-R-PROJINFO-014-07 GENERAL DESCRIPTION: Age: SUBJECT is greater than 70 years and the difference between the ACTUAL and EFFECTIVE ages is more than 20 years FNC-R-PROJINFO-018-01 General Description: Exterior Walls: Field contains terms: POOR, FAIR, BELOW, CRACKS or SEE ATT and AS IS box is checked in RECONCILIATION FNC-R-PROJINFO-021-01 General Description: Roof Surface: Field contains terms: POOR, FAIR, BELOW, WORN, LEAK, CRACKS or SEE ATT and AS IS box is checked in RECONCILIATION FNC-R-PROJINFO-060-01 If Project Completed: Total No. of Units for Sale cannot be greater than 10 percent of total number of units in the project FNC-R-PROJINFO-066-01 If Project Completed: Total No. of Units Rented cannot be greater than 60 percent of total number of units in the project FNC-R-PROJINFO-105-01 Does any single entity (the same individual, investor group, corporation, etc.) own more than 10% of the total units in the project? The YES box is checked and DESCRIBE field is blank FNC-R-PROJINFO-111-01 Was the project created by the conversion of an existing building(s) into a condominium? The YES box is checked and DESCRIBE THE ORIGINAL USE AND THE DATE OF CONVERSION field is blank FNC-R-PROJINFO-117-01 Are the units, common elements, and recreation facilities complete (including any planned rehabilitation for a condominium conversion)? The NO box is checked and DESCRIBE field is blank FNC-R-PROJINFO-123-01 Is there any commercial space in the project? The YES box is checked and DESCRIBE AND INDICATE THE OVERALL PERCENTAGE OF THE COMMERCIAL SPACE field is blank FNC-R-PROJINFO-135-01 Are any common elements leased to or by the Homeowners' Association? The YES box is checked and DESCRIBE THE RENTAL TERMS AND OPTIONS field is blank FNC-R-PROJINFO-144-01 Is the project subject to ground rent? The YES box is checked and DESCRIBE TERMS AND CONDITIONS field is blank FNC-R-PROJINFO-150-01 Are the parking facilities adequate for the project size and type? The NO box is checked and DESCRIBE AND COMMENT ON THE EFFECT ON VALUE AND MARKETABILITY field is blank FNC-R-PROJA-012-01 Are there any other fees (other than regular HOA charges) for the use of the project facilities? The YES box is checked and REPORT THE CHARGES AND DESCRIBE field is blank FNC-R-PROJA-018-01 Compared to other competitive projects of similar quality and design, the subject unit charges appears: HIGH or LOW box is checked and DESCRIBE field is blank FNC-R-PROJA-024-01 Are there any special or unusual characteristics of the project (based on the condominium documents, HOA meetings, or other information) known to the appraiser? The YES box is checked and DESCRIBE AND EXPLAIN THE EFFECT ON VALUE AND MARKETABILITY field is blank FNC-R-UNITDESC-039-01 Utilities included in the unit monthly assessment: OTHER box is checked and DESCRIBE field is blank FNC-R-UNITDESC-075-01 Heating: Fuel: Field contains terms: WD, WOOD, PROP, UNK, NO, NN, N.N.

FNC-R-UNITDESC-087-01 General Description: AC: OTHER box is checked and DESCRIBE field is blank FNC-R-UNITDESC-090-01 Interior materials/condition: Floors: Field contains terms: POOR, FAIR, BELOW, WORN, STAINED, TORN, CRACKS or SEE ATT and AS IS box is checked in RECONCILIATION FNC-R-UNITDESC-093-01 Interior materials/condition: Walls: Field contains terms: POOR, FAIR, BELOW, WORN, HOLES, CRACKS or SEE ATT and AS IS box is checked in RECONCILIATION FNC-R-UNITDESC-096-01 Interior materials/condition: Trim/Finish: Field contains terms: POOR, FAIR, BELOW, INFERIOR or SEE ATT and AS IS box is checked in RECONCILIATION FNC-R-UNITDESC-099-01 Interior materials/condition: Bath Wainscot: Field contains terms: POOR, FAIR, BELOW or SEE ATT and AS IS box is checked in RECONCILIATION FNC-R-UNITDESC-102-01 Interior materials/condition: Doors: Field contains terms: POOR, FAIR, BELOW, TORN, HOLES, TEARS, RIPS or SEE ATT and AS IS box is checked in RECONCILIATION FNC-R-UNITDESC-147-01 CAR STORAGE: NONE, GARAGE, COVERED, OPEN: There is no box checked FNC-R-UNITDESC-159-01 CAR STORAGE: GARAGE, COVERED OR OPEN box is checked and field for # of Cars is blank FNC-R-UNITDESC-174-01 Finished area above grade: Bedrooms: Field does not contain 1 to 3 bedrooms FNC-R-UNITDESC-177-01 Finished area above grade: Bathrooms: Field does not contain 1 to 3 bathrooms FNC-R-UNITDESC-180-01 Finished Area: Square Feet of Gross Living Area: Square footage contained in IMP does not equal square footage contained in GROSS LIVING AREA in SCA FNC-R-UNITDESC-186-01 Are the heating and cooling for the individual units separately metered? The NO box is checked and DESCRIBE AND COMMENT ON COMPATIBILITY TO OTHER PROJECTS IN THE MARKET AREA field is blank FNC-R-UNITDESC-192-01 Describe the condition of the property (including needed repairs, deterioration, renovations, remodeling, etc.): Field contains terms: FAIR, POOR, BELOW, ROT, DAMAGE, STAIN, LEAK, CRACK, SETTLE, WATER, DAMP, ODOR MOLD, or COST TO CURE and AS IS box is checked in RECONCILIATION FNC-R-UNITDESC-195-01 Are there any physical deficiencies or adverse conditions that affect the livability, soundness, or structural integrity of the property? The YES box is checked and AS IS box is checked in RECONCILIATION FNC-R-UNITDESC-195-02 Are there any physical deficiencies or adverse conditions that affect the livability, soundness, or structural integrity of the property? Field contains terms: FAIR, POOR, BELOW, ROT, DAMAGE, STAIN, LEAK, CRACK, SETTLE, WATER, DAMP, ODOR or MOLD and AS IS box is checked in RECONCILIATION FNC-R-UNITDESC-204-01 Does the property generally conform to the neighborhood (functional utility, style, condition, use, construction, etc.)? The NO box is checked and DESCRIBE field is blank FNC-R-SCAHIS-027-01 Price of Prior Sale/Transfer: SUBJECT: Prior Sales Price is less than the OPINION OF MARKET VALUE by more than 10 percent and PROPERTY VALUES box is checked STABLE or DECLINING FNC-R-SCAHIS-027-02 Price of Prior Sale/Transfer: SUBJECT: Prior Sales Price is higher than the OPINION OF MARKET VALUE FNC-R-SCAHIS-030-01 Price of Prior Sale/Transfer: COMPARABLES: Prior Sales Price is HIGHER than COMPARABLE'S PRICE reported in appraisal FNC-R-SCA-003-01 There are _____ COMPARABLE PROPERTIES CURRENTLY OFFERED FOR SALE in the subject neighborhood ranging in price ranging in price from $_____ to $_____: Numeric entry in field for number of PROPERTIES OFFERED FOR SALE is greater than numeric entry in field for number of COMPARABLE SALES FNC-R-SCA-006-01 There are _____ COMPARABLE PROPERTIES CURRENTLY OFFERED FOR SALE in the subject neighborhood ranging in price ranging in price from $_____ to $_____: The SUBJECT'S OPINION OF MARKET VALUE is outside (lower or higher) the numeric entries in field for range of PROPERTIES OFFERED FOR SALE FNC-R-SCA-015-01 There are _____ COMPARABLE SALES in the subject neighborhood within the past twelve months ranging in SALE PRICE from $_____ to $_____: The SUBJECT'S OPINION OF MARKET VALUE is outside (lower or higher) the numeric entries in field for range of COMPARABLE SALES FNC-R-SCA-063-00 Proximity: Field must have a value for all comparables FNC-R-SCA-063-01 Proximity to Subject: Any of the comparables indicate proximity to SUBJECT is greater than 12 blocks or 1 mile and neighborhood LOCATION box is checked URBAN FNC-R-SCA-063-02 Proximity to Subject: Any of the comparables indicate proximity to SUBJECT is greater than 5 miles and the neighborhood LOCATION box is checked URBAN or SUBURBAN FNC-R-SCA-063-03 Proximity to Subject: More than 2 of the COMPARABLES are greater than 2 miles from subject and LOCATION box is checked URBAN or SUBURBAN FNC-R-SCA-063-04 Proximity to Subject: Any of the comparables indicate proximity to SUBJECT is greater than 10 miles and the neighborhood LOCATION box is checked RURAL FNC-R-SCA-069-01 Sales Price: Unadjusted sales prices of 1st 3 comparables do not bracket subject's OPINION OF MARKET VALUE FNC-R-SCA-069-02 Sales Price: 2 of 1st 3 comparables have sales prices less than subject's OPINION OF MARKET VALUE by more than 10 percent FNC-R-SCA-081-01 Data Source(s) and/or Verification Source(s): IMP: Year built field indicates age greater than 0 and at least 2 of the first 3 comparables do not contain any of the following terms as data source: ML, MLS, M.L., MRIS, MULTI, REALTRANS, REALLINK, REDLINK, AIRD, CMDC, FNC, or NDC FNC-R-SCA-081-02 Data Source(s) and/or Verification Source(s): More than 1 of the first 3 comparables reflects the term APPRAISERS FILES FNC-R-SCA-081-03 Data Source(s) and/or Verification Source(s): Field contains UNK, N/A, NA, TYP, CONF, NN, NONE or NORMAL for any comp FNC-R-SCA-081-04 Data Source(s) and/or Verification Source(s): Any of the 1st of the first 3 comparables contains the term PRIVATE SALE FNC-R-SCA-081-05 Data Source(s) and/or Verification Source(s): IMP: Year built field indicates age 0, NEW or PROPOSED and more than 2 of the first 3 comparables reflect terms SALES OFFICE, MANAGER, MGMNT, DEVELOPER, BUILDER or APPRAISAL FILES FNC-R-SCA-081-06 Data Source(s) and/or Verification Source(s): SCA: Age field contains numeric value greater than 0 and at least 2 of the first 3 comparables do not contain any of the following terms as data source: ML, MLS, M.L., MRIS, MULTI, REALTRANS, REALLINK, REDLINK, AIRD, CMDC, FNC, or NDC FNC-R-SCA-087-01 Concessions: A numeric value between 1000 and 20000 is found in Sales or Financing fields, and negative adjustment is not found in Adjustment field for Sales or Financing Concessions FNC-R-SCA-090-01 Sale or Financing Concessions: Comparables: Line item adjustment for any comparable is greater than 10% of the comparable's sale price FNC-R-SCA-090-02 Sales or Financing Adjustments: Comparables: Comparables 1-3 contain NEGATIVE (−) adjustments across the board FNC-R-SCA-099-01 Date of Sale/Time: Comparables: Fields for any comparables contain NEGATIVE adjustments and are closed sales FNC-R-SCA-102-01 Date of Sale/Time: Comparables: Line item adjustment for any comparable is greater than 10% of the comparable's sale price FNC-R-SCA-102-02 Date of Sale/Time: Comparables: Comparables 1-3 contain POSITIVE (+) adjustments across the board FNC-R-SCA-102-03 Date of Sale/Time: Comparables: Comparables 1-3 contain NEGATIVE (−) adjustments across the board FNC-R-SCA-105-01 Location: SUBJECT contains terms GOOD, AVERAGE or SUPERIOR and minimum of 2 of the first 3 comparables do not contain same terms FNC-R-SCA-111-01 Location: Comparables: Line item adjustment for any comparable is greater than 10% of the comparable's sale price FNC-R-SCA-111-02 Location: Comparables: Comparables 1-3 contain POSITIVE (+) adjustments across the board FNC-R-SCA-111-03 Location: Comparables: Comparables 1-3 contain NEGATIVE (−) adjustments across the board FNC-R-SCA-120-01 Leasehold/Fee Simple: Comparables: Line item adjustment for any comparable is greater than 10% of the comparable's sale price FNC-R-SCA-120-02 Leasehold/Fee Simple: Comparables: Comparables 1-3 contain POSITIVE (+) adjustments across the board FNC-R-SCA-120-03 Leasehold/Fee Simple: Comparables: Comparables 1-3 contain NEGATIVE (−) adjustments across the board FNC-R-SCA-123-01 HOA Mo. Assessment: HOA Mo. Assessment of 2 of the 1st 3 comparables is not within 20% of the Subject's HOA Mo. Assessment FNC-R-SCA-129-01 HOA Mo. Assessment: Comparables: Line item adjustment for any comparable is greater than 10% of the comparable's sale price FNC-R-SCA-129-02 HOA Mo. Assessment: Comparables: Comparables 1-3 contain POSITIVE (+) adjustments across the board FNC-R-SCA-129-03 HOA Mo. Assessment: Comparables: Comparables 1-3 contain NEGATIVE (−) adjustments across the board FNC-R-SCA-132-01 Common Elements and Rec Facilities: SUBJECT field contains POOL, TENNIS or CLUB and a minimum of 2 of first 3 comparables does not contain same FNC-R-SCA-135-01 Common Elements and Rec Facilities: Comparables: Field for more than 1 of comparables 1-3 contains POOL, TENNIS or CLUB and SUBJECT field does not contain same FNC-R-SCA-138-01 Common Elements and Rec Facilities: 2 of the first 3 comparables contains a positive or negative adjustment for Common Elements and Rec Facilities FNC-R-SCA-138-02 Common Elements and Rec. Facilities: Comparables: Line item adjustment for any comparable is greater than 10% of the comparable's sale price FNC-R-SCA-138-03 Common Elements and Rec. Facilities: Comparables: Comparables 1-3 contain POSITIVE (+) adjustments across the board FNC-R-SCA-138-04 Common Elements and Rec. Facilities: Comparables: Comparables 1-3 contain NEGATIVE (−) adjustments across the board FNC-R-SCA-150-02 Floor location: Comparables: 2 of 1st three comparables' floor locations are not within 4 floors of the SUBJECT's floor location FNC-R-SCA-156-01 Floor Location: 2 of the first 3 comparables contains a positive or negative adjustment for FLOORLOCATION FNC-R-SCA-156-02 Floor Location: Comparables: Line item adjustment for any comparable is greater than 10% of the comparable's sale price FNC-R-SCA-156-03 Floor Location: Comparables: Comparables 1-3 contain POSITIVE (+) adjustments across the board FNC-R-SCA-156-04 Floor Location: Comparables: Comparables 1-3 contain NEGATIVE (−) adjustments across the board FNC-R-SCA-168-01 View: SUBJECT field contains terms GOOD, AVERAGE or SUPERIOR and minimum of 2 of the first 3 comparables do not contain same terms FNC-R-SCA-168-02 View: COMPARABLES field contains terms: GOLF, WATER, RIVER, OCEAN, CREEK, MOUNTAIN, LAKE, INTRA, POND, BEACH, GULF and none of these words is found in SUBJECT'S SITE FNC-R-SCA-174-01 View: 2 of the first 3 comparables contain positive or negative adjustments for VIEW FNC-R-SCA-174-02 View: Comparables: Line item adjustment for any comparable is greater than 10% of the comparable's sale price FNC-R-SCA-174-03 View: Comparables: Comparables 1-3 contain POSITIVE (+) adjustments across the board FNC-R-SCA-174-04 View: Comparables: Comparables 1-3 contain NEGATIVE (−) adjustments across the board FNC-R-SCA-177-01 Design (Style): SUBJECT field contains terms GOOD, AVERAGE or SUPERIOR and minimum of 2 of the first 3 comparables do not contain same terms FNC-R-SCA-183-01 Design (Style): 2 of the first 3 comparables contain positive or negative adjustments for DESIGN FNC-R-SCA-183-02 Design (Style): Comparables: Line item adjustment for any comparable is greater than 10% of the comparable's sale price FNC-R-SCA-183-03 Design (Style): Comparables: Comparables 1-3 contain POSITIVE (+) adjustments across the board FNC-R-SCA-183-04 Design (Style): Comparables: Comparables 1-3 contain NEGATIVE (−) adjustments across the board FNC-R-SCA-186-01 Quality of Construction: SUBJECT field contains terms GOOD, AVERAGE or SUPERIOR and minimum of 2 of the first 3 comparables do not contain same terms FNC-R-SCA-186-02 Quality of Construction: SUBJECT contains term BRICK and at least 2 of the first 3 comparables do not contain same term FNC-R-SCA-186-03 Quality of Construction: SUBJECT contains term CONC, BLOCK, BLK, WOOD, WD, FRAME, ALUMINIUM or VINYL and more than 1 of first three comparables contain term BRICK or STUCCO FNC-R-SCA-192-01 Quality of Construction: 2 of the first 3 comparables contain positive or negative adjustments for QUALITY OF CONSTRUCTION FNC-R-SCA-192-02 Quality of Construction: Comparables: Line item adjustment for any comparable is greater than 10% of the comparable's sale price FNC-R-SCA-192-03 Quality of Construction: Comparables: Comparables 1-3 contain POSITIVE (+) adjustments across the board FNC-R-SCA-192-04 Quality of Construction: Comparables: Comparables 1-3 contain NEGATIVE (−) adjustments across the board FNC-R-SCA-195-00 Actual Age: Field for SUBJECT does not contain numeric entries or terms NEW, PROPOSED or UNDER CONSTRUCTION FNC-R-SCA-195-01 Actual Age: SUBJECT is greater than 2 years old and more than 1 comparable contains term NEW or O FNC-R-SCA-195-02 Actual Age: SUBJECT is greater than 10 years old and any of the 1st 3 comparables contains terms NEW or O FNC-R-SCA-195-03 Actual Age: SUBJECT: Field contains 0, NEW, PROPOSED, U/C and age of 2 of 1st 3 comparables are greater than 1 year FNC-R-SCA-195-04 Actual Age: SUBJECT: Field contains 0, NEW, PROPOSED, U/C and age of any comparable is greater than 5 years FNC-R-SCA-195-05 Actual Age: SUBJECT: Field contains 1-5 years and age of 2 of 1st 3 comparables are 0 or NEW FNC-R-SCA-195-06 Actual Age: SUBJECT: Field contains 1-2 years and age of 2 of 1st 3 comparables are greater than 4 years FNC-R-SCA-195-07 Actual Age: SUBJECT: Field contains 1-2 years and age of any comparable is greater than 6 years FNC-R-SCA-195-08 Actual Age: SUBJECT: Field contains 3-5 years and age of 2 of 1st 3 comparables are less than 2 years or greater than 8 years FNC-R-SCA-195-10 Actual Age: SUBJECT: Field contains 6 years or greater and age of any comparable is 0 or NEW FNC-R-SCA-195-32 Actual Age: SUBJECT: Field contains 3-5 years and age of any of comparable is greater than 10 years FNC-R-SCA-195-33 Actual Age: SUBJECT: Field contains 6-8 years and age of 2 of the 1st 3 comparables are less than 4 years or greater than 12 years FNC-R-SCA-195-34 Actual Age: SUBJECT: Field contains 6-8 years and age of any comparable is greater than 12 years FNC-R-SCA-195-35 Actual Age: SUBJECT: Field contains 9-12 years and age of 2 of the 1st 3 comparables are less than 6 years or greater than 15 years FNC-R-SCA-195-36 Actual Age: SUBJECT: Field contains 9-12 years and age of any comparable is greater than 17 years FNC-R-SCA-195-37 Actual Age: SUBJECT: Field contains 13-18 years and age of 2 of the 1st 3 comparables are less than 10 years or greater than 20 years FNC-R-SCA-195-38 Actual Age: SUBJECT: Field contains 13-18 years and age of any comparable is greater than 25 years FNC-R-SCA-195-39 Actual Age: SUBJECT: Field contains 19-25 years and age of 2 of the 1st 3 comparables are less than 15 years or greater than 30 years FNC-R-SCA-195-40 Actual Age: SUBJECT: Field contains 19-25 years and age of any comparable is greater than 32 years FNC-R-SCA-195-41 Actual Age: SUBJECT: Field contains 26-32 years and age of 2 of the 1st 3 comparables are less than 21 years or greater than 38 years FNC-R-SCA-195-42 Actual Age: SUBJECT: Field contains 26-32 years and age of any comparable is greater than 40 years FNC-R-SCA-195-43 Actual Age: SUBJECT: Field contains 33-40 years and age of 2 of the 1st 3 comparables are less than 28 years or greater than 45 years FNC-R-SCA-195-44 Actual Age: SUBJECT: Field contains 33-40 years and age of any comparable is greater than 48 years FNC-R-SCA-195-45 Actual Age: SUBJECT: Field contains 41-50 years and age of 2 of the 1st 3 comparables are less than 35 years or greater than 55 years FNC-R-SCA-195-46 Actual Age: SUBJECT: Field contains 41-50 years and age of any comparable is greater than 60 years FNC-R-SCA-195-47 Actual Age: SUBJECT: Field contains 51-64 years and age of any comparable has variance of more than 15 years FNC-R-SCA-195-48 Actual Age: SUBJECT: Field contains 65-84 years and age of any comparable has variance of more than 20 years FNC-R-SCA-195-49 Actual Age: SUBJECT: Field contains 85 years or greater and age of any comparable has variance of more than 25 years FNC-R-SCA-198-01 Actual Age: Comparables: Comparables 1-3 contains terms: NEW or 0

FNC-R-SCA-198-02 Actual Age: Comparables: Field of any COMPARABLE contains terms NEW or 0 and positive adjustments are found in AGE field FNC-R-SCA-198-03 Actual Age: Comparables: Field of any COMPARABLE contains terms NEW or 0 and positive adjustments are found in CONDITION field FNC-R-SCA-201-01 Actual Age: Comparables: Line item adjustment for any comparable is greater than 10% of the comparable's sale price FNC-R-SCA-201-02 Actual Age: Comparables: Comparables 1-3 contain POSITIVE (+) adjustments across the board FNC-R-SCA-201-03 Actual Age: Comparables: Comparables 1-3 contain NEGATIVE (−) adjustments across the board FNC-R-SCA-204-01 Condition: SUBJECT: Field contains terms GOOD, AVERAGE or SUPERIOR and minimum of 2 of the first 3 comparables do not contain same term FNC-R-SCA-210-01 Condition: 2 of the first 3 comparables contain positive or negative adjustments for CONDITION FNC-R-SCA-210-02 Condition: Comparables: Line item adjustment for any comparable is greater than 10% of the comparable's sale price FNC-R-SCA-210-03 Condition: Comparables: Comparables 1-3 contain POSITIVE (+) adjustments across the board FNC-R-SCA-210-04 Condition: Comparables: Comparables 1-3 contain NEGATIVE (−) adjustments across the board FNC-R-SCA-213-01 Above Grade: Comparables: Line item adjustment for any comparable is greater than 10% of the comparable's sale price FNC-R-SCA-213-02 Above Grade: Comparables: Comparables 1-3 contain POSITIVE (+) adjustments across the board FNC-R-SCA-213-03 Above Grade: Comparables: Comparables 1-3 contain NEGATIVE (−) adjustments across the board FNC-R-SCA-219-02 Bedrooms: SUBJECT: For 1 bedroom, 2 of the first 3 comparables have more than 1 bedroom FNC-R-SCA-219-03 Bedrooms: SUBJECT: For 1 bedroom any of the comparables exceeds 2 bedrooms FNC-R-SCA-219-04 Bedrooms: SUBJECT: For 2 bedroom, 2 of the first 3 comparables have less than 2 bedrooms FNC-R-SCA-219-05 Bedrooms: SUBJECT: For 2 bedroom, any of the comparables exceeds 3 bedrooms FNC-R-SCA-219-06 Bedrooms: SUBJECT: For 3 bedroom, any of the comparables has 1 bedroom FNC-R-SCA-219-07 Bedrooms: SUBJECT: For 3 bedroom, 2 of the first 3 comparables have less than 3 bedrooms FNC-R-SCA-219-08 Bedrooms: SUBJECT: For 3 bedroom, 2 of the first 3 comparables have more than 3 bedrooms FNC-R-SCA-219-09 Bedrooms: SUBJECT: For 4 bedroom, any of the comparables has less than 3 bedrooms FNC-R-SCA-219-10 Bedrooms: SUBJECT: For 4 bedroom, 2 of the first 3 comparables have less than 4 bedrooms FNC-R-SCA-219-11 Bedrooms: SUBJECT: For 4 bedroom, 2 of the first 3 comparables have more than 4 bedrooms FNC-R-SCA-219-16 Bedrooms: SUBJECT: Field contains numeric entry less than 1 or greater than 3 bedrooms FNC-R-SCA-219-17 Bedrooms: SUBJECT: For 2 bedroom, 2 of the first 3 comparables has more than 2 bedrooms FNC-R-SCA-222-01 Bathrooms: SUBJECT: For 1 bathroom, 2 of the first 3 comparables have more than 1 bathroom FNC-R-SCA-222-02 Bathrooms: SUBJECT: For 1 bathroom, any of the comparables has more than 2 bathrooms FNC-R-SCA-222-03 Bathrooms: SUBJECT: For 1.5 bathrooms, 2 of the first 3 comparables have more than 1.5 bathrooms FNC-R-SCA-222-04 Bathrooms: SUBJECT: For 1.5 bathrooms, any of the first 3 comparables has more than 2 bathrooms FNC-R-SCA-222-05 Bathrooms: SUBJECT: For 2 bathrooms, 2 of 1st 3 comparables has less than 2 bathrooms FNC-R-SCA-222-06 Bathrooms: SUBJECT: For 2 bathrooms, any of the 1st 3 comparables has less than 1.5 or greater than 3 bathrooms FNC-R-SCA-222-08 Bathrooms: SUBJECT: For 3 bathrooms, any of 1st 3 comparables has less than 2 or more than 4 bathrooms FNC-R-SCA-222-10 Bathrooms: SUBJECT: For 4 bathrooms or greater, any comparable has variance of more than 2 bathrooms FNC-R-SCA-222-12 Bathrooms: SUBJECT: Field contains numeric entry less than 1 or greater than 3 bathrooms FNC-R-SCA-222-13 Bathrooms: SUBJECT: For 2.5 bathrooms, 2 of the 1st 3 comparables has less than 2 or greater than 3 bathrooms FNC-R-SCA-222-14 Bathrooms: SUBJECT: For 2.5 bathrooms, any of the first 3 comparables has more than 3.5 bathrooms FNC-R-SCA-222-15 Bathrooms: SUBJECT: For 3 bathrooms, 2 of the 1st 3 comparables has less than 2.5 or greater than 3.5 bathrooms FNC-R-SCA-222-16 Bathrooms: SUBJECT: For 3.5 bathrooms, any of the 1st 3 comparables has less than 2.5 or greater than 4 bathrooms FNC-R-SCA-234-01 Room Count: Comparables: Line item adjustment for any comparable is greater than 10% of the comparable's sale price FNC-R-SCA-234-02 Room Count: Comparables: Comparables 1-3 contain POSITIVE (+) adjustments across the board FNC-R-SCA-234-03 Room Count: Comparables: Comparables 1-3 contain NEGATIVE (−) adjustments across the board FNC-R-SCA-237-14 Gross Living Area of Comparables: Subject Property's gross living area is not bracketed by the 1st 3 comparables' gross living area FNC-R-SCA-237-15 Gross Living Area: Comparables: GLA of the first 3 COMPARABLES is larger than the subject's GLA FNC-R-SCA-237-16 Gross Living Area: Comparables: GLA of the first 3 COMPARABLES is smaller than the subject's GLA FNC-R-SCA-237-26 Gross Living Area: Subject Property: Condo: Condo: Less than 500 sq ft, variance for 2 of the 1st 3 comparables is greater than 100 sq ft FNC-R-SCA-237-27 Gross Living Area: Subject Property: Condo: Greater than or equal to 500 sq ft and less than 750 sq ft, variance for 2 of the 1st 3 comparables is greater than 150 sq ft FNC-R-SCA-237-28 Gross Living Area: Subject Property: Condo: Greater than or equal to 750 sq ft and less than 1000 sq ft, variance for 2 of the 1st 3 comparables is greater than 200 sq ft FNC-R-SCA-237-29 Gross Living Area: Subject Property: Condo: Greater than or equal to 1000 sq ft and less than 1250 sq ft, variance for 2 of the 1st 3 comparables is greater than 250 sq ft FNC-R-SCA-237-30 Gross Living Area: Subject Property: Condo: Greater than or equal to 1250 sq ft and less than 1500 sq ft, variance for 2 of the 1st 3 comparables is greater than 300 sq ft FNC-R-SCA-237-31 Gross Living Area: Subject Property: Condo: Greater than or equal to 1500 sq ft and less than 1800 sq ft, variance for 2 of the 1st 3 comparables is greater than 350 sq ft FNC-R-SCA-237-32 Gross Living Area: Subject Property: Condo: Greater than or equal to 1800 sq ft and less than 2200 sq ft, variance for 2 of the 1st 3 comparables is greater than 400 sq ft FNC-R-SCA-237-33 Gross Living Area: Subject Property: Condo: Greater than or equal to 2200 sq ft and less than 3000 sq ft, variance for 2 of the 1st 3 comparables is greater than 450 sq ft FNC-R-SCA-237-34 Gross Living Area: Subject Property: Condo: Greater than or equal to 3000 sq ft, variance for 2 of the 1st 3 comparables is greater than 500 sq ft FNC-R-SCA-243-01 Gross Living Area: Adjustments for all comparables vary more than 2 dollars per square foot FNC-R-SCA-243-02 Gross Living Area: Comparables: Line item adjustment for any comparable is greater than 10% of the comparable's sale price FNC-R-SCA-243-03 Gross Living Area: Comparables: Comparables 1-3 contain POSITIVE (+) adjustments across the board FNC-R-SCA-243-04 Gross Living Area: Comparables: Comparables 1-3 contain NEGATIVE (−) adjustments across the board FNC-R-SCA-246-01 Basement and Finished Rooms Below Grade: SUBJECT contains terms BASEMENT, FINISHED or PARTIAL and minimum of 2 of the first three comparables do not contain same FNC-R-SCA-252-01 Basement and Finished Rooms Below Grade: Comparables: Line item adjustment for any comparable is greater than 10% of the comparable's sale price FNC-R-SCA-252-02 Basement and Finished Rooms Below Grade: Comparables: Comparables 1-3 contain POSITIVE (+) adjustments across the board FNC-R-SCA-252-03 Basement and Finished Rooms Below Grade: Comparables: Comparables 1-3 contain NEGATIVE (−) adjustments across the board FNC-R-SCA-264-01 Functional Utility: SUBJECT: Field contains terms GOOD, AVERAGE or SUPERIOR and minimum of 2 of the first 3 comparables do not contain same term FNC-R-SCA-270-01 Functional Utility: 2 of the first 3 comparables contain positive or negative adjustments for FUNCTIONAL UTILITY FNC-R-SCA-270-02 Functional Utility: Comparables: Line item adjustment for any comparable is greater than 10% of the comparable's sale price FNC-R-SCA-270-03 Functional Utility: Comparables: Comparables 1-3 contain POSITIVE (+) adjustments across the board FNC-R-SCA-270-04 Functional Utility: Comparables: Comparables 1-3 contain NEGATIVE (−) adjustments across the board FNC-R-SCA-279-01 Heating/Cooling: Comparables: Line item adjustment for any comparable is greater than 10% of the comparable's sale price FNC-R-SCA-279-02 Heating/Cooling: Comparables: Comparables 1-3 contain POSITIVE (+) adjustments across the board FNC-R-SCA-279-03 Heating/Cooling: Comparables: Comparables 1-3 contain NEGATIVE (−) adjustments across the board FNC-R-SCA-288-01 Energy Efficient Items: Comparables: Line item adjustment for any comparable is greater than 10% of the comparable's sale price FNC-R-SCA-288-02 Energy Efficient Items: Comparables: Comparables 1-3 contain POSITIVE (+) adjustments across the board FNC-R-SCA-288-03 Energy Efficient Items: Comparables: Comparables 1-3 contain NEGATIVE (−) adjustments across the board FNC-R-SCA-297-01 Garage/Carport: Comparables: Line item adjustment for any comparable is greater than 10% of the comparable's sale price FNC-R-SCA-297-02 Garage/Carport: Comparables: Comparables 1-3 contain POSITIVE (+) adjustments across the board FNC-R-SCA-297-03 Garage/Carport: Comparables: Comparables 1-3 contain NEGATIVE (−) adjustments across the board FNC-R-SCA-306-01 Porch/Patio/Deck: Comparables: Line item adjustment for any comparable is greater than 10% of the comparable's sale price FNC-R-SCA-306-02 Porch/Patio/Deck: Comparables: Comparables 1-3 contain POSITIVE (+) adjustments across the board FNC-R-SCA-306-03 Porch/Patio/Deck: Comparables: Comparables 1-3 contain NEGATIVE (−) adjustments across the board FNC-R-SCA-312-01 Unlabeled Line 1: SUBJECT field contains POOL and a minimum of 1 of first 3 comparables does not contain POOL FNC-R-SCA-312-05 Unlabeled Line 1: Subject: Contains terms UPGRADE, UPDATE or REMODEL FNC-R-SCA-312-06 Unlabeled Line 1: SUBJECT field contains TENNIS and/or COURT and a minimum of 1 of first 3 comparables does not contain TENNIS and/or COURT FNC-R-SCA-312-07 Unlabeled Line 1: SUBJECT field contains REC, CLUB or CENTER and a minimum of 1 of first 3 comparables does not contain REC, CLUB or CENTER FNC-R-SCA-312-08 Unlabeled Line 1: Field for more than 1 comparable contains POOL and SUBJECT field does not contain same FNC-R-SCA-312-09 Unlabeled Line 1: Field for more than 1 comparable contains TENNIS and/or COURT and SUBJECT field does not contain same FNC-R-SCA-312-10 Unlabeled Line 1: Field for more than 1 comparable contains REC, CLUB or CENTER and SUBJECT field does not contain same FNC-R-SCA-315-02 Unlabeled Line 1: Comparables: Contains terms UPGRADE, UPGRD, UPDATE, EXTRAS or REMODEL FNC-R-SCA-318-01 Unlabeled Line 1: Comparables: Line item adjustment for any comparable is greater than 10% of the comparable's sale price FNC-R-SCA-318-02 Unlabeled Line 1: Comparables: Comparables 1-3 contain POSITIVE (+) adjustments across the board FNC-R-SCA-318-03 Unlabeled Line 1: Comparables: Comparables 1-3 contain NEGATIVE (−) adjustments across the board FNC-R-SCA-324-01 Unlabeled Line 2: SUBJECT field contains POOL and a minimum of 1 of first 3 comparables does not contain POOL FNC-R-SCA-324-05 Unlabeled Line 2: Subject: Contains terms UPGRADE, UPDATE or REMODEL FNC-R-SCA-324-06 Unlabeled Line 2: SUBJECT field contains TENNIS and/or COURT and a minimum of 1 of first 3 comparables does not contain TENNIS and/or COURT FNC-R-SCA-324-07 Unlabeled Line 2: SUBJECT field contains REC, CLUB or CENTER and a minimum of 1 of first 3 comparables does not contain REC, CLUB or CENTER FNC-R-SCA-324-08 Unlabeled Line 2: Field for more than 1 comparable contains POOL and SUBJECT field does not contain same FNC-R-SCA-324-09 Unlabeled Line 2: Field for more than 1 comparable contains TENNIS and/or COURT and SUBJECT field does not contain same FNC-R-SCA-324-10 Unlabeled Line 2: Field for more than 1 comparable contains REC, CLUB or CENTER and SUBJECT field does not contain same FNC-R-SCA-327-02 Unlabeled Line 2: Comparables: Contains terms UPGRADE, UPGRD, UPDATE, EXTRAS or REMODEL FNC-R-SCA-330-01 Unlabeled Line 2: Comparables: Line item adjustment for any comparable is greater than 10% of the comparable's sale price FNC-R-SCA-330-02 Unlabeled Line 2: Comparables: Comparables 1-3 contain POSITIVE (+) adjustments across the board FNC-R-SCA-330-03 Unlabeled Line 2: Comparables: Comparables 1-3 contain NEGATIVE (−) adjustments across the board FNC-R-SCA-336-01 Unlabeled Line 3: SUBJECT field contains POOL and a minimum of 1 of first 3 comparables does not contain POOL FNC-R-SCA-336-05 Unlabeled Line 3: Subject: Contains terms UPGRADE, UPDATE or REMODEL FNC-R-SCA-336-06 Unlabeled Line 3: SUBJECT field contains TENNIS and/or COURT and a minimum of 1 of first 3 comparables does not contain TENNIS and/or COURT FNC-R-SCA-336-07 Unlabeled Line 3: SUBJECT field contains REC, CLUB or CENTER and a minimum of 1 of first 3 comparables does not contain REC, CLUB or CENTER FNC-R-SCA-336-08 Unlabeled Line 3: Field for more than 1 comparable contains POOL and SUBJECT field does not contain same FNC-R-SCA-336-09 Unlabeled Line 3: Field for more than 1 comparable contains TENNIS and/or COURT and SUBJECT field does not contain same FNC-R-SCA-336-10 Unlabeled Line 3: Field for more than 1 comparable contains REC, CLUB or CENTER and SUBJECT field does not contain same FNC-R-SCA-339-02 Unlabeled Line 3: Comparables: Contains terms UPGRADE, UPGRD, UPDATE, EXTRAS or REMODEL FNC-R-SCA-342-01 Unlabeled Line 3: Comparables: Line item adjustment for any comparable is greater than 10% of the comparable's sale price FNC-R-SCA-342-02 Unlabeled Line 3: Comparables: Comparables 1-3 contain POSITIVE (+) adjustments across the board FNC-R-SCA-342-03 Unlabeled Line 3: Comparables: Comparables 1-3 contain NEGATIVE (−) adjustments across the board FNC-R-MKTVALUE-000-01 Opinion of Market Value: For PURCHASE TRANSACTIONS, the OPINION OF MARKET VALUE is less than the CONTRACT PRICE FNC-R-MKTVALUE-000-02 Opinion of Market Value: For PURCHASE TRANSACTIONS, the OPINION OF MARKET VALUE is greater than 105% of the CONTRACT PRICE FNC-R-MKTVALUE-000-04 Opinion of Market Value: The OPINION OF MARKET VALUE is not bracketed by the adjusted sales prices of the comparables FNC-R-RECDATE-000-01 Date of Inspection and the Effective Date of the Appraisal: Contains date after the DATE OF SIGNATURE AND REPORT

FNMA 1075/FHLMC 466:

FNC-R-CMS-000-01 Opinion of Market Value: Appraised value is less than the sale's price in CMS FNC-R-CMS-000-02 Opinion of Market Value: For sales transactions, the final value of the SUBJECT is greater than 105% of the sale's price in CMS FNC-R-SUB-048-01 Occupant: ASSIGNMENT TYPE is not a PURCHASE TRANSACTION and TENANT or VACANT box is checked FNC-R-SUB-069-01 Assignment Type: OTHER box is checked and DESCRIBE field is blank FNC-R-SUB-081-01 Is the subject property currently offered for sale or has it been offered for sale in the twelve months prior to the effective date of the appraisal? The YES box is checked FNC-R-SUB-084-01 Is the SUBJECT currently offered for sale or has it been offered for sale in the 12 months prior to the effective date of the appraisal? The YES box is checked and value contained in REPORT DATA SOURCE(S) USED, OFFERING PRICE(S) AND DATE(S) is less than the CONTRACT PRICE or MARKET VALUE FNC-R-SUB-084-02 Report data source(s) used, offering price(s), and date(s): does not contain term(s) ML, M.L, MRIS, MULTI, REALTRANS, REALLINK or REDLINK FNC-R-CONT-009-01 Contract Price $: For sales transactions, OPINION OF MARKET VALUE is less than the CONTRACT PRICE FNC-R-CONT-009-02 Contract Price $: For sales transactions, the OPINION OF MARKET VALUE is greater than 105% of the CONTRACT PRICE FNC-R-CONT-012-01 Contract Date: Field reflects DATE OF SALE after the EFFECTIVE DATE OF APPRAISAL FNC-R-CONT-024-01 Is there any financial assistance (loan charges, sale concessions, gift downpayment assistance, etc.) to be paid by any party on behalf of the borrower? The YES box is checked and field for REPORT THE DOLLAR AMOUNT AND DESCRIBE THE ITEMS TO BE PAID contains numeric value greater than $500

FNC-R-N-012-01 Property Values: INCREASING box is checked and DATE OF SALE/TIME of 2 of the first 3 comparables is greater than 90 days old FNC-R-N-012-02 Property Values: INCREASING box is checked and DATE OF SALE for 2 of the first 3 comps is greater than 90 days old and DATE OF SALE/TIME field does not contain a positive time adjustment FNC-R-N-012-03 Property Values: INCREASING box is checked and terms STABLE or STABILIZED found in NEIGHBORHOOD DESCRIPTION or MARKET CONDITIONS fields FNC-R-N-063-01 Condominium Housing PRICE: The OPINION OF MARKET VALUE and/or SALES PRICE of the SUBJECT exceeds the predominant CONDOMINIUM HOUSING price by more than 5%

FNC-R-N-075-02 Present Land Use: ONE-UNIT field contains value less than 40%

FNC-R-N-093-01 Neighborhood Description: Contains terms: PRIDE, POOR, CRIME, BULLETS, GRAFFITI or DESIRABLE FNC-R-N-096-01 Market Conditions: Contains terms: PRIDE, POOR, CRIME, BULLETS, GRAFFITI or DESIRABLE FNC-R-S-012-00 Topography: Field is blank FNC-R-S-018-00 Density: Field is blank FNC-R-S-042-01 Is the Highest and Best Use of the subject property as improved (or as proposed in the plans and specifications) the present use? The NO box is checked and DESCRIBE field is blank FNC-R-S-051-01 Utilities: Electricity: OTHER box is checked and DESCRIBE field is blank FNC-R-S-069-01 Utilities: Water: OTHER box is checked and DESCRIBE field is blank FNC-R-S-078-01 Utilities: Sanitary Sewer: OTHER box is checked and DESCRIBE field is blank FNC-R-S-108-01 Are the utilities and off-site improvements typical for the market area? The NO box is checked and DESCRIBE field is blank FNC-R-PROJINFO-010-01 GENERAL DESCRIPTION: GENERAL DESCRIPTION: # of Stories is greater than 3 and # of Elevators is less than 1

FNC-R-PROJINFO-012-01 GENERAL DESCRIPTION: PROPOSED OR UNDER CONSTRUCTION box is checked and AS IS box is checked in RECONCILIATION FNC-R-PROJINFO-014-01 GENERAL DESCRIPTION: Age: SUBJECT is less than or equal to 15 years and the difference between the ACTUAL and EFFECTIVE ages is more than 5 years FNC-R-PROJINFO-014-02 GENERAL DESCRIPTION: Age: SUBJECT is greater than 15 years and less than or equal to 25 years and the difference between the ACTUAL and EFFECTIVE ages is more than 8 years FNC-R-PROJINFO-014-03 GENERAL DESCRIPTION: Age: SUBJECT is greater than 25 years and less than or equal to 35 years and the difference between the ACTUAL and EFFECTIVE ages is more than 10 years FNC-R-PROJINFO-014-04 GENERAL DESCRIPTION: Age: SUBJECT is greater than 35 years and less than or equal to 45 years and the difference between the ACTUAL and EFFECTIVE ages is more than 12 years FNC-R-PROJINFO-014-05 GENERAL DESCRIPTION: Age: SUBJECT is greater than 45 years and less than or equal to 58 years and the difference between the ACTUAL and EFFECTIVE ages is more than 15 years FNC-R-PROJINFO-014-06 GENERAL DESCRIPTION: Age: SUBJECT is greater than 58 years and less than or equal to 70 years and the difference between the ACTUAL and EFFECTIVE ages is more than 18 years FNC-R-PROJINFO-014-07 GENERAL DESCRIPTION: Age: SUBJECT is greater than 70 years and the difference between the ACTUAL and EFFECTIVE ages is more than 20 years FNC-R-PROJINFO-018-01 General Description: Exterior Walls: Field contains terms: POOR, FAIR, BELOW, CRACKS or SEE ATT and AS IS box is checked in RECONCILIATION FNC-R-PROJINFO-021-01 General Description: Roof Surface: Field contains terms: POOR, FAIR, BELOW, WORN, LEAK, CRACKS or SEE ATT and AS IS box is checked in RECONCILIATION FNC-R-PROJINFO-060-01 If Project Completed: Total No. of Units for Sale cannot be greater than 10 percent of total number of units in the project FNC-R-PROJINFO-066-01 If Project Completed: Total No. of Units Rented cannot be greater than 60 percent of total number of units in the project FNC-R-PROJINFO-105-01 Does any single entity (the same individual, investor group, corporation, etc.) own more than 10% of the total units in the project? The YES box is checked and DESCRIBE field is blank FNC-R-PROJINFO-111-01 Was the project created by the conversion of an existing building(s) into a condominium? The YES box is checked and DESCRIBE THE ORIGINAL USE AND THE DATE OF CONVERSION field is blank FNC-R-PROJINFO-117-01 Are the units, common elements, and recreation facilities complete (including any planned rehabilitation for a condominium conversion)? The NO box is checked and DESCRIBE field is blank FNC-R-PROJINFO-123-01 Is there any commercial space in the project? The YES box is checked and DESCRIBE AND INDICATE THE OVERALL PERCENTAGE OF THE COMMERCIAL SPACE field is blank FNC-R-PROJINFO-135-01 Are any common elements leased to or by the Homeowners' Association? The YES box is checked and DESCRIBE THE RENTAL TERMS AND OPTIONS field is blank FNC-R-PROJINFO-144-01 Is the project subject to ground rent? The YES box is checked and DESCRIBE TERMS AND CONDITIONS field is blank FNC-R-PROJINFO-150-01 Are the parking facilities adequate for the project size and type? The NO box is checked and DESCRIBE AND COMMENT ON THE EFFECT ON VALUE AND MARKETABILITY field is blank FNC-R-PROJA-012-01 Are there any other fees (other than regular HOA charges) for the use of the project facilities? The YES box is checked and REPORT THE CHARGES AND DESCRIBE field is blank FNC-R-PROJA-018-01 Compared to other competitive projects of similar quality and design, the subject unit charges appears: HIGH or LOW box is checked and DESCRIBE field is blank FNC-R-PROJA-024-01 Are there any special or unusual characteristics of the project (based on the condominium documents, HOA meetings, or other information) known to the appraiser? The YES box is checked and DESCRIBE AND EXPLAIN THE EFFECT ON VALUE AND MARKETABILITY field is blank FNC-R-UNITDESC-042-01 Source: PROPERTY OWNER box(s) and/or OTHER boxes are checked and no other boxes are checked FNC-R-UNITDESC-075-01 Heating: Fuel: Field contains terms: WD, WOOD, PROP, UNK, NO, NN, N.N.

FNC-R-UNITDESC-087-01 General Description: AC: OTHER box is checked and DESCRIBE field is blank FNC-R-UNITDESC-147-01 CAR STORAGE: NONE, GARAGE, COVERED, OPEN: There is no box checked FNC-R-UNITDESC-159-01 CAR STORAGE: GARAGE, COVERED OR OPEN box is checked and field for # of Cars is blank FNC-R-UNITDESC-174-01 Finished area above grade: Bedrooms: Field does not contain 1 to 3 bedrooms FNC-R-UNITDESC-177-01 Finished area above grade: Bathrooms: Field does not contain 1 to 3 bathrooms FNC-R-UNITDESC-180-01 Finished Area: Square Feet of Gross Living Area: Square footage contained in IMP does not equal square footage contained in GROSS LIVING AREA in SCA FNC-R-UNITDESC-186-01 Are the heating and cooling for the individual units separately metered? The NO box is checked and DESCRIBE AND COMMENT ON COMPATIBILITY TO OTHER PROJECTS IN THE MARKET AREA field is blank FNC-R-UNITDESC-192-01 Describe the condition of the property (including needed repairs, deterioration, renovations, remodeling, etc.): Field contains terms: FAIR, POOR, BELOW, ROT, DAMAGE, STAIN, LEAK, CRACK, SETTLE, WATER, DAMP, ODOR or MOLD and AS IS box is checked in RECONCILIATION FNC-R-UNITDESC-195-01 Are there any physical deficiencies or adverse conditions that affect the livability, soundness, or structural integrity of the property? The YES box is checked and AS IS box is checked in RECONCILIATION FNC-R-UNITDESC-195-02 Are there any physical deficiencies or adverse conditions that affect the livability, soundness, or structural integrity of the property? Field contains terms: FAIR, POOR, BELOW, ROT, DAMAGE, STAIN, LEAK, CRACK, SETTLE, WATER, DAMP, ODOR or MOLD and AS IS box is checked in RECONCILIATION FNC-R-UNITDESC-204-01 Does the property generally conform to the neighborhood (functional utility, style, condition, use, construction, etc.)? The NO box is checked and DESCRIBE field is blank FNC-R-SCAHIS-027-01 Price of Prior Sale/Transfer: SUBJECT: Prior Sales Price is less than the OPINION OF MARKET VALUE by more than 10 percent and PROPERTY VALUES box is checked STABLE or DECLINING FNC-R-SCAHIS-027-02 Price of Prior Sale/Transfer: SUBJECT: Prior Sales Price is higher than the OPINION OF MARKET VALUE FNC-R-SCAHIS-030-01 Price of Prior Sale/Transfer: COMPARABLES: Prior Sales Price is HIGHER than COMPARABLE'S PRICE reported in appraisal FNC-R-SCA-003-01 There are _____ COMPARABLE PROPERTIES CURRENTLY OFFERED FOR SALE in the subject neighborhood ranging in price ranging in price from $_____ to $_____: Numeric entry in field for number of PROPERTIES OFFERED FOR SALE is greater than numeric entry in field for number of COMPARABLE SALES FNC-R-SCA-006-01 There are _____ COMPARABLE PROPERTIES CURRENTLY OFFERED FOR SALE in the subject neighborhood ranging in price ranging in price from $_____ to $_____: The SUBJECT'S OPINION OF MARKET VALUE is outside (lower or higher) the numeric entries in field for range of PROPERTIES OFFERED FOR SALE FNC-R-SCA-015-01 There are _____ COMPARABLE SALES in the subject neighborhood within the past twelve months ranging in SALE PRICE from $_____ to $_____: The SUBJECT'S OPINION OF MARKET VALUE is outside (lower or higher) the numeric entries in field for range of COMPARABLE SALES FNC-R-SCA-063-00 Proximity: Field must have a value for all comparables FNC-R-SCA-063-01 Proximity to Subject: Any of the comparables indicate proximity to SUBJECT is greater than 12 blocks or 1 mile and neighborhood LOCATION box is checked URBAN FNC-R-SCA-063-02 Proximity to Subject: Any of the comparables indicate proximity to SUBJECT is greater than 5 miles and the neighborhood LOCATION box is checked URBAN or SUBURBAN FNC-R-SCA-063-03 Proximity to Subject: More than 2 of the COMPARABLES are greater than 2 miles from subject and LOCATION box is checked URBAN or SUBURBAN FNC-R-SCA-063-04 Proximity to Subject: Any of the comparables indicate proximity to SUBJECT is greater than 10 miles and the neighborhood LOCATION box is checked RURAL FNC-R-SCA-069-01 Sales Price: Unadjusted sales prices of 1st 3 comparables do not bracket subject's OPINION OF MARKET VALUE FNC-R-SCA-069-02 Sales Price: 2 of 1st 3 comparables have sales prices less than subject's OPINION OF MARKET VALUE by more than 10 percent FNC-R-SCA-081-01 Data Source(s) and/or Verification Source(s): IMP: Year built field indicates age greater than 0 and at least 2 of the first 3 comparables do not contain any of the following terms as data source: ML, MLS, M.L., MRIS, MULTI, REALTRANS, REALLINK, REDLINK, AIRD, CMDC, FNC, or NDC FNC-R-SCA-081-02 Data Source(s) and/or Verification Source(s): More than 1 of the first 3 comparables reflects the term APPRAISERS FILES FNC-R-SCA-081-03 Data Source(s) and/or Verification Source(s): Field contains UNK, N/A, NA, TYP, CONF, NN, NONE or NORMAL for any comp FNC-R-SCA-081-04 Data Source(s) and/or Verification Source(s): Any of the 1st of the first 3 comparables contains the term PRIVATE SALE FNC-R-SCA-081-05 Data Source(s) and/or Verification Source(s): IMP: Year built field indicates age 0, NEW or PROPOSED and more than 2 of the first 3 comparables reflect terms SALES OFFICE, MANAGER, MGMNT, DEVELOPER, BUILDER or APPRAISAL FILES FNC-R-SCA-081-06 Data Source(s) and/or Verification Source(s): SCA: Age field contains numeric value greater than 0 and at least 2 of the first 3 comparables do not contain any of the following terms as data source: ML, MLS, M.L., MRIS, MULTI, REALTRANS, REALLINK, REDLINK, AIRD, CMDC, FNC, or NDC FNC-R-SCA-087-01 Concessions: A numeric value between 1000 and 20000 is found in Sales or Financing fields, and negative adjustment is not found in Adjustment field for Sales or Financing Concessions FNC-R-SCA-090-01 Sale or Financing Concessions: Comparables: Line item adjustment for any comparable is greater than 10% of the comparable's sale price FNC-R-SCA-090-02 Sales or Financing Adjustments: Comparables: Comparables 1-3 contain NEGATIVE (−) adjustments across the board FNC-R-SCA-099-01 Date of Sale/Time: Comparables: Fields for any comparables contain NEGATIVE adjustments and are closed sales FNC-R-SCA-102-01 Date of Sale/Time: Comparables: Line item adjustment for any comparable is greater than 10% of the comparable's sale price FNC-R-SCA-102-02 Date of Sale/Time: Comparables: Comparables 1-3 contain POSITIVE (+) adjustments across the board FNC-R-SCA-102-03 Date of Sale/Time: Comparables: Comparables 1-3 contain NEGATIVE (−) adjustments across the board FNC-R-SCA-105-01 Location: SUBJECT contains terms GOOD, AVERAGE or SUPERIOR and minimum of 2 of the first 3 comparables do not contain same terms FNC-R-SCA-111-01 Location: Comparables: Line item adjustment for any comparable is greater than 10% of the comparable's sale price FNC-R-SCA-111-02 Location: Comparables: Comparables 1-3 contain POSITIVE (+) adjustments across the board FNC-R-SCA-111-03 Location: Comparables: Comparables 1-3 contain NEGATIVE (−) adjustments across the board FNC-R-SCA-120-01 Leasehold/Fee Simple: Comparables: Line item adjustment for any comparable is greater than 10% of the comparable's sale price FNC-R-SCA-120-02 Leasehold/Fee Simple: Comparables: Comparables 1-3 contain POSITIVE (+) adjustments across the board FNC-R-SCA-120-03 Leasehold/Fee Simple: Comparables: Comparables 1-3 contain NEGATIVE (−) adjustments across the board FNC-R-SCA-123-01 HOA Mo. Assessment: HOA Mo. Assessment of 2 of the 1st 3 comparables is not within 20% of the Subject's HOA Mo. Assessment FNC-R-SCA-129-01 HOA Mo. Assessment: Comparables: Line item adjustment for any comparable is greater than 10% of the comparable's sale price FNC-R-SCA-129-02 HOA Mo. Assessment: Comparables: Comparables 1-3 contain POSITIVE (+) adjustments across the board FNC-R-SCA-129-03 HOA Mo. Assessment: Comparables: Comparables 1-3 contain NEGATIVE (−) adjustments across the board FNC-R-SCA-132-01 Common Elements and Rec Facilities: SUBJECT field contains POOL, TENNIS or CLUB and a minimum of 2 of first 3 comparables does not contain same FNC-R-SCA-135-01 Common Elements and Rec Facilities: Comparables: Field for more than 1 of comparables 1-3 contains POOL, TENNIS or CLUB and SUBJECT field does not contain same FNC-R-SCA-138-01 Common Elements and Rec Facilities: 2 of the first 3 comparables contains a positive or negative adjustment for Common Elements and Rec Facilities FNC-R-SCA-138-02 Common Elements and Rec. Facilities: Comparables: Line item adjustment for any comparable is greater than 10% of the comparable's sale price FNC-R-SCA-138-03 Common Elements and Rec. Facilities: Comparables: Comparables 1-3 contain POSITIVE (+) adjustments across the board FNC-R-SCA-138-04 Common Elements and Rec. Facilities: Comparables: Comparables 1-3 contain NEGATIVE (−) adjustments across the board FNC-R-SCA-150-02 Floor location: Comparables: 2 of 1st three comparables' floor locations are not within 4 floors of the SUBJECT's floor location FNC-R-SCA-156-01 Floor Location: 2 of the first 3 comparables contains a positive or negative adjustment for FLOORLOCATION FNC-R-SCA-156-02 Floor Location: Comparables: Line item adjustment for any comparable is greater than 10% of the comparable's sale price FNC-R-SCA-156-03 Floor Location: Comparables: Comparables 1-3 contain POSITIVE (+) adjustments across the board FNC-R-SCA-156-04 Floor Location: Comparables: Comparables 1-3 contain NEGATIVE (−) adjustments across the board FNC-R-SCA-168-01 View: SUBJECT field contains terms GOOD, AVERAGE or SUPERIOR and minimum of 2 of the first 3 comparables do not contain same terms FNC-R-SCA-168-02 View: COMPARABLES field contains terms: GOLF, WATER, RIVER, OCEAN, CREEK, MOUNTAIN, LAKE, INTRA, POND, BEACH, GULF and none of these words is found in SUBJECT'S SITE FNC-R-SCA-174-01 View: 2 of the first 3 comparables contain positive or negative adjustments for VIEW FNC-R-SCA-174-02 View: Comparables: Line item adjustment for any comparable is greater than 10% of the comparable's sale price FNC-R-SCA-174-03 View: Comparables: Comparables 1-3 contain POSITIVE (+) adjustments across the board FNC-R-SCA-174-04 View: Comparables: Comparables 1-3 contain NEGATIVE (−) adjustments across the board FNC-R-SCA-177-01 Design (Style): SUBJECT field contains terms GOOD, AVERAGE or SUPERIOR and minimum of 2 of the first 3 comparables do not contain same terms FNC-R-SCA-183-01 Design (Style): 2 of the first 3 comparables contain positive or negative adjustments for DESIGN FNC-R-SCA-183-02 Design (Style): Comparables: Line item adjustment for any comparable is greater than 10% of the comparable's sale price FNC-R-SCA-183-03 Design (Style): Comparables: Comparables 1-3 contain POSITIVE (+) adjustments across the board FNC-R-SCA-183-04 Design (Style): Comparables: Comparables 1-3 contain NEGATIVE (−) adjustments across the board FNC-R-SCA-186-01 Quality of Construction: SUBJECT field contains terms GOOD, AVERAGE or SUPERIOR and minimum of 2 of the first 3 comparables do not contain same terms FNC-R-SCA-186-02 Quality of Construction: SUBJECT contains term BRICK and at least 2 of the first 3 comparables do not contain same term FNC-R-SCA-186-03 Quality of Construction: SUBJECT contains term CONC, BLOCK, BLK, WOOD, WD, FRAME, ALUMINIUM or VINYL and more than 1 of first three comparables contain term BRICK or STUCCO FNC-R-SCA-192-01 Quality of Construction: 2 of the first 3 comparables contain positive or negative adjustments for QUALITY OF CONSTRUCTION FNC-R-SCA-192-02 Quality of Construction: Comparables: Line item adjustment for any comparable is greater than 10% of the comparable's sale price FNC-R-SCA-192-03 Quality of Construction: Comparables: Comparables 1-3 contain POSITIVE (+) adjustments across the board FNC-R-SCA-192-04 Quality of Construction: Comparables: Comparables 1-3 contain NEGATIVE (−) adjustments across the board FNC-R-SCA-195-00 Actual Age: Field for SUBJECT does not contain numeric entries or terms NEW, PROPOSED or UNDER CONSTRUCTION FNC-R-SCA-195-01 Actual Age: SUBJECT is greater than 2 years old and more than 1 comparable contains term NEW or O FNC-R-SCA-195-02 Actual Age: SUBJECT is greater than 10 years old and any of the 1st 3 comparables contains terms NEW or O FNC-R-SCA-195-03 Actual Age: SUBJECT: Field contains 0, NEW, PROPOSED, U/C and age of 2 of 1st 3 comparables are greater than 1 year FNC-R-SCA-195-04 Actual Age: SUBJECT: Field contains 0, NEW, PROPOSED, U/C and age of any comparable is greater than 5 years FNC-R-SCA-195-05 Actual Age: SUBJECT: Field contains 1-5 years and age of 2 of 1st 3 comparables are 0 or NEW FNC-R-SCA-195-06 Actual Age: SUBJECT: Field contains 1-2 years and age of 2 of 1st 3 comparables are greater than 4 years FNC-R-SCA-195-07 Actual Age: SUBJECT: Field contains 1-2 years and age of any comparable is greater than 6 years FNC-R-SCA-195-08 Actual Age: SUBJECT: Field contains 3-5 years and age of 2 of 1st 3 comparables are less than 2 years or greater than 8 years FNC-R-SCA-195-10 Actual Age: SUBJECT: Field contains 6 years or greater and age of any comparable is 0 or NEW FNC-R-SCA-195-32 Actual Age: SUBJECT: Field contains 3-5 years and age of any of comparable is greater than 10 years FNC-R-SCA-195-33 Actual Age: SUBJECT: Field contains 6-8 years and age of 2 of the 1st 3 comparables are less than 4 years or greater than 12 years FNC-R-SCA-195-34 Actual Age: SUBJECT: Field contains 6-8 years and age of any comparable is greater than 12 years FNC-R-SCA-195-35 Actual Age: SUBJECT: Field contains 9-12 years and age of 2 of the 1st 3 comparables are less than 6 years or greater than 15 years FNC-R-SCA-195-36 Actual Age: SUBJECT: Field contains 9-12 years and age of any comparable is greater than 17 years FNC-R-SCA-195-37 Actual Age: SUBJECT: Field contains 13-18 years and age of 2 of the 1st 3 comparables are less than 10 years or greater than 20 years FNC-R-SCA-195-38 Actual Age: SUBJECT: Field contains 13-18 years and age of any comparable is greater than 25 years FNC-R-SCA-195-39 Actual Age: SUBJECT: Field contains 19-25 years and age of 2 of the 1st 3 comparables are less than 15 years or greater than 30 years FNC-R-SCA-195-40 Actual Age: SUBJECT: Field contains 19-25 years and age of any comparable is greater than 32 years FNC-R-SCA-195-41 Actual Age: SUBJECT: Field contains 26-32 years and age of 2 of the 1st 3 comparables are less than 21 years or greater than 38 years FNC-R-SCA-195-42 Actual Age: SUBJECT: Field contains 26-32 years and age of any comparable is greater than 40 years FNC-R-SCA-195-43 Actual Age: SUBJECT: Field contains 33-40 years and age of 2 of the 1st 3 comparables are less than 28 years or greater than 45 years FNC-R-SCA-195-44 Actual Age: SUBJECT: Field contains 33-40 years and age of any comparable is greater than 48 years FNC-R-SCA-195-45 Actual Age: SUBJECT: Field contains 41-50 years and age of 2 of the 1st 3 comparables are less than 35 years or greater than 55 years FNC-R-SCA-195-46 Actual Age: SUBJECT: Field contains 41-50 years and age of any comparable is greater than 60 years FNC-R-SCA-195-47 Actual Age: SUBJECT: Field contains 51-64 years and age of any comparable has variance of more than 15 years FNC-R-SCA-195-48 Actual Age: SUBJECT: Field contains 65-84 years and age of any comparable has variance of more than 20 years FNC-R-SCA-195-49 Actual Age: SUBJECT: Field contains 85 years or greater and age of any comparable has variance of more than 25 years FNC-R-SCA-198-01 Actual Age: Comparables: Comparables 1-3 contains terms: NEW or 0

FNC-R-SCA-198-02 Actual Age: Comparables: Field of any COMPARABLE contains terms NEW or 0 and positive adjustments are found in AGE field FNC-R-SCA-198-03 Actual Age: Comparables: Field of any COMPARABLE contains terms NEW or 0 and positive adjustments are found in CONDITION field FNC-R-SCA-201-01 Actual Age: Comparables: Line item adjustment for any comparable is greater than 10% of the comparable's sale price FNC-R-SCA-201-02 Actual Age: Comparables: Comparables 1-3 contain POSITIVE (+) adjustments across the board FNC-R-SCA-201-03 Actual Age: Comparables: Comparables 1-3 contain NEGATIVE (−) adjustments across the board FNC-R-SCA-204-01 Condition: SUBJECT: Field contains terms GOOD, AVERAGE or SUPERIOR and minimum of 2 of the first 3 comparables do not contain same term FNC-R-SCA-210-01 Condition: 2 of the first 3 comparables contain positive or negative adjustments for CONDITION FNC-R-SCA-210-02 Condition: Comparables: Line item adjustment for any comparable is greater than 10% of the comparable's sale price FNC-R-SCA-210-03 Condition: Comparables: Comparables 1-3 contain POSITIVE (+) adjustments across the board FNC-R-SCA-210-04 Condition: Comparables: Comparables 1-3 contain NEGATIVE (−) adjustments across the board FNC-R-SCA-213-01 Above Grade: Comparables: Line item adjustment for any comparable is greater than 10% of the comparable's sale price FNC-R-SCA-213-02 Above Grade: Comparables: Comparables 1-3 contain POSITIVE (+) adjustments across the board FNC-R-SCA-213-03 Above Grade: Comparables: Comparables 1-3 contain NEGATIVE (−) adjustments across the board FNC-R-SCA-219-02 Bedrooms: SUBJECT: For 1 bedroom, 2 of the first 3 comparables have more than 1 bedroom FNC-R-SCA-219-03 Bedrooms: SUBJECT: For 1 bedroom any of the comparables exceeds 2 bedrooms FNC-R-SCA-219-04 Bedrooms: SUBJECT: For 2 bedroom, 2 of the first 3 comparables have less than 2 bedrooms FNC-R-SCA-219-05 Bedrooms: SUBJECT: For 2 bedroom, any of the comparables exceeds 3 bedrooms FNC-R-SCA-219-06 Bedrooms: SUBJECT: For 3 bedroom, any of the comparables has 1 bedroom FNC-R-SCA-219-07 Bedrooms: SUBJECT: For 3 bedroom, 2 of the first 3 comparables have less than 3 bedrooms FNC-R-SCA-219-08 Bedrooms: SUBJECT: For 3 bedroom, 2 of the first 3 comparables have more than 3 bedrooms FNC-R-SCA-219-09 Bedrooms: SUBJECT: For 4 bedroom, any of the comparables has less than 3 bedrooms FNC-R-SCA-219-10 Bedrooms: SUBJECT: For 4 bedroom, 2 of the first 3 comparables have less than 4 bedrooms FNC-R-SCA-219-11 Bedrooms: SUBJECT: For 4 bedroom, 2 of the first 3 comparables have more than 4 bedrooms FNC-R-SCA-219-16 Bedrooms: SUBJECT: Field contains numeric entry less than 1 or greater than 3 bedrooms FNC-R-SCA-219-17 Bedrooms: SUBJECT: For 2 bedroom, 2 of the first 3 comparables has more than 2 bedrooms FNC-R-SCA-222-01 Bathrooms: SUBJECT: For 1 bathroom, 2 of the first 3 comparables have more than 1 bathroom FNC-R-SCA-222-02 Bathrooms: SUBJECT: For 1 bathroom, any of the comparables has more than 2 bathrooms FNC-R-SCA-222-03 Bathrooms: SUBJECT: For 1.5 bathrooms, 2 of the first 3 comparables have more than 1.5 bathrooms FNC-R-SCA-222-04 Bathrooms: SUBJECT: For 1.5 bathrooms, any of the first 3 comparables has more than 2 bathrooms FNC-R-SCA-222-05 Bathrooms: SUBJECT: For 2 bathrooms, 2 of 1st 3 comparables has less than 2 bathrooms FNC-R-SCA-222-06 Bathrooms: SUBJECT: For 2 bathrooms, any of the 1st 3 comparables has less than 1.5 or greater than 3 bathrooms FNC-R-SCA-222-08 Bathrooms: SUBJECT: For 3 bathrooms, any of 1st 3 comparables has less than 2 or more than 4 bathrooms FNC-R-SCA-222-10 Bathrooms: SUBJECT: For 4 bathrooms or greater, any comparable has variance of more than 2 bathrooms FNC-R-SCA-222-12 Bathrooms: SUBJECT: Field contains numeric entry less than 1 or greater than 3 bathrooms FNC-R-SCA-222-13 Bathrooms: SUBJECT: For 2.5 bathrooms, 2 of the 1st 3 comparables has less than 2 or greater than 3 bathrooms FNC-R-SCA-222-14 Bathrooms: SUBJECT: For 2.5 bathrooms, any of the first 3 comparables has more than 3.5 bathrooms FNC-R-SCA-222-15 Bathrooms: SUBJECT: For 3 bathrooms, 2 of the 1st 3 comparables has less than 2.5 or greater than 3.5 bathrooms FNC-R-SCA-222-16 Bathrooms: SUBJECT: For 3.5 bathrooms, any of the 1st 3 comparables has less than 2.5 or greater than 4 bathrooms FNC-R-SCA-234-01 Room Count: Comparables: Line item adjustment for any comparable is greater than 10% of the comparable's sale price FNC-R-SCA-234-02 Room Count: Comparables: Comparables 1-3 contain POSITIVE (+) adjustments across the board FNC-R-SCA-234-03 Room Count: Comparables: Comparables 1-3 contain NEGATIVE (−) adjustments across the board FNC-R-SCA-237-14 Gross Living Area of Comparables: Subject Property's gross living area is not bracketed by the 1st 3 comparables' gross living area FNC-R-SCA-237-15 Gross Living Area: Comparables: GLA of the first 3 COMPARABLES is larger than the subject's GLA FNC-R-SCA-237-16 Gross Living Area: Comparables: GLA of the first 3 COMPARABLES is smaller than the subject's GLA FNC-R-SCA-237-26 Gross Living Area: Subject Property: Condo: Condo: Less than 500 sq ft, variance for 2 of the 1st 3 comparables is greater than 100 sq ft FNC-R-SCA-237-27 Gross Living Area: Subject Property: Condo: Greater than or equal to 500 sq ft and less than 750 sq ft, variance for 2 of the 1st 3 comparables is greater than 150 sq ft FNC-R-SCA-237-28 Gross Living Area: Subject Property: Condo: Greater than or equal to 750 sq ft and less than 1000 sq ft, variance for 2 of the 1st 3 comparables is greater than 200 sq ft FNC-R-SCA-237-29 Gross Living Area: Subject Property: Condo: Greater than or equal to 1000 sq ft and less than 1250 sq ft, variance for 2 of the 1st 3 comparables is greater than 250 sq ft FNC-R-SCA-237-30 Gross Living Area: Subject Property: Condo: Greater than or equal to 1250 sq ft and less than 1500 sq ft, variance for 2 of the 1st 3 comparables is greater than 300 sq ft FNC-R-SCA-237-31 Gross Living Area: Subject Property: Condo: Greater than or equal to 1500 sq ft and less than 1800 sq ft, variance for 2 of the 1st 3 comparables is greater than 350 sq ft FNC-R-SCA-237-32 Gross Living Area: Subject Property: Condo: Greater than or equal to 1800 sq ft and less than 2200 sq ft, variance for 2 of the 1st 3 comparables is greater than 400 sq ft FNC-R-SCA-237-33 Gross Living Area: Subject Property: Condo: Greater than or equal to 2200 sq ft and less than 3000 sq ft, variance for 2 of the 1st 3 comparables is greater than 450 sq ft FNC-R-SCA-237-34 Gross Living Area: Subject Property: Condo: Greater than or equal to 3000 sq ft, variance for 2 of the 1st 3 comparables is greater than 500 sq ft FNC-R-SCA-243-01 Gross Living Area: Adjustments for all comparables vary more than 2 dollars per square foot FNC-R-SCA-243-02 Gross Living Area: Comparables: Line item adjustment for any comparable is greater than 10% of the comparable's sale price FNC-R-SCA-243-03 Gross Living Area: Comparables: Comparables 1-3 contain POSITIVE (+) adjustments across the board FNC-R-SCA-243-04 Gross Living Area: Comparables: Comparables 1-3 contain NEGATIVE (−) adjustments across the board FNC-R-SCA-246-01 Basement and Finished Rooms Below Grade: SUBJECT contains terms BASEMENT, FINISHED or PARTIAL and minimum of 2 of the first three comparables do not contain same FNC-R-SCA-252-01 Basement and Finished Rooms Below Grade: Comparables: Line item adjustment for any comparable is greater than 10% of the comparable's sale price FNC-R-SCA-252-02 Basement and Finished Rooms Below Grade: Comparables: Comparables 1-3 contain POSITIVE (+) adjustments across the board FNC-R-SCA-252-03 Basement and Finished Rooms Below Grade: Comparables: Comparables 1-3 contain NEGATIVE (−) adjustments across the board FNC-R-SCA-264-01 Functional Utility: SUBJECT: Field contains terms GOOD, AVERAGE or SUPERIOR and minimum of 2 of the first 3 comparables do not contain same term FNC-R-SCA-270-01 Functional Utility: 2 of the first 3 comparables contain positive or negative adjustments for FUNCTIONAL UTILITY FNC-R-SCA-270-02 Functional Utility: Comparables: Line item adjustment for any comparable is greater than 10% of the comparable's sale price FNC-R-SCA-270-03 Functional Utility: Comparables: Comparables 1-3 contain POSITIVE (+) adjustments across the board FNC-R-SCA-270-04 Functional Utility: Comparables: Comparables 1-3 contain NEGATIVE (−) adjustments across the board FNC-R-SCA-279-01 Heating/Cooling: Comparables: Line item adjustment for any comparable is greater than 10% of the comparable's sale price FNC-R-SCA-279-02 Heating/Cooling: Comparables: Comparables 1-3 contain POSITIVE (+) adjustments across the board FNC-R-SCA-279-03 Heating/Cooling: Comparables: Comparables 1-3 contain NEGATIVE (−) adjustments across the board FNC-R-SCA-288-01 Energy Efficient Items: Comparables: Line item adjustment for any comparable is greater than 10% of the comparable's sale price FNC-R-SCA-288-02 Energy Efficient Items: Comparables: Comparables 1-3 contain POSITIVE (+) adjustments across the board FNC-R-SCA-288-03 Energy Efficient Items: Comparables: Comparables 1-3 contain NEGATIVE (−) adjustments across the board FNC-R-SCA-297-01 Garage/Carport: Comparables: Line item adjustment for any comparable is greater than 10% of the comparable's sale price FNC-R-SCA-297-02 Garage/Carport: Comparables: Comparables 1-3 contain POSITIVE (+) adjustments across the board FNC-R-SCA-297-03 Garage/Carport: Comparables: Comparables 1-3 contain NEGATIVE (−) adjustments across the board FNC-R-SCA-306-01 Porch/Patio/Deck: Comparables: Line item adjustment for any comparable is greater than 10% of the comparable's sale price FNC-R-SCA-306-02 Porch/Patio/Deck: Comparables: Comparables 1-3 contain POSITIVE (+) adjustments across the board FNC-R-SCA-306-03 Porch/Patio/Deck: Comparables: Comparables 1-3 contain NEGATIVE (−) adjustments across the board FNC-R-SCA-312-01 Unlabeled Line 1: SUBJECT field contains POOL and a minimum of 1 of first 3 comparables does not contain POOL FNC-R-SCA-312-05 Unlabeled Line 1: Subject: Contains terms UPGRADE, UPDATE or REMODEL FNC-R-SCA-312-06 Unlabeled Line 1: SUBJECT field contains TENNIS and/or COURT and a minimum of 1 of first 3 comparables does not contain TENNIS and/or COURT FNC-R-SCA-312-07 Unlabeled Line 1: SUBJECT field contains REC, CLUB or CENTER and a minimum of 1 of first 3 comparables does not contain REC, CLUB or CENTER FNC-R-SCA-312-08 Unlabeled Line 1: Field for more than 1 comparable contains POOL and SUBJECT field does not contain same FNC-R-SCA-312-09 Unlabeled Line 1: Field for more than 1 comparable contains TENNIS and/or COURT and SUBJECT field does not contain same FNC-R-SCA-312-10 Unlabeled Line 1: Field for more than 1 comparable contains REC, CLUB or CENTER and SUBJECT field does not contain same FNC-R-SCA-315-02 Unlabeled Line 1: Comparables: Contains terms UPGRADE, UPGRD, UPDATE, EXTRAS or REMODEL FNC-R-SCA-318-01 Unlabeled Line 1: Comparables: Line item adjustment for any comparable is greater than 10% of the comparable's sale price FNC-R-SCA-318-02 Unlabeled Line 1: Comparables: Comparables 1-3 contain POSITIVE (+) adjustments across the board FNC-R-SCA-318-03 Unlabeled Line 1: Comparables: Comparables 1-3 contain NEGATIVE (−) adjustments across the board FNC-R-SCA-324-01 Unlabeled Line 2: SUBJECT field contains POOL and a minimum of 1 of first 3 comparables does not contain POOL FNC-R-SCA-324-05 Unlabeled Line 2: Subject: Contains terms UPGRADE, UPDATE or REMODEL FNC-R-SCA-324-06 Unlabeled Line 2: SUBJECT field contains TENNIS and/or COURT and a minimum of 1 of first 3 comparables does not contain TENNIS and/or COURT FNC-R-SCA-324-07 Unlabeled Line 2: SUBJECT field contains REC, CLUB or CENTER and a minimum of 1 of first 3 comparables does not contain REC, CLUB or CENTER FNC-R-SCA-324-08 Unlabeled Line 2: Field for more than 1 comparable contains POOL and SUBJECT field does not contain same FNC-R-SCA-324-09 Unlabeled Line 2: Field for more than 1 comparable contains TENNIS and/or COURT and SUBJECT field does not contain same FNC-R-SCA-324-10 Unlabeled Line 2: Field for more than 1 comparable contains REC, CLUB or CENTER and SUBJECT field does not contain same FNC-R-SCA-327-02 Unlabeled Line 2: Comparables: Contains terms UPGRADE, UPGRD, UPDATE, EXTRAS or REMODEL FNC-R-SCA-330-01 Unlabeled Line 2: Comparables: Line item adjustment for any comparable is greater than 10% of the comparable's sale price FNC-R-SCA-330-02 Unlabeled Line 2: Comparables: Comparables 1-3 contain POSITIVE (+) adjustments across the board FNC-R-SCA-330-03 Unlabeled Line 2: Comparables: Comparables 1-3 contain NEGATIVE (−) adjustments across the board FNC-R-SCA-336-01 Unlabeled Line 3: SUBJECT field contains POOL and a minimum of 1 of first 3 comparables does not contain POOL FNC-R-SCA-336-05 Unlabeled Line 3: Subject: Contains terms UPGRADE, UPDATE or REMODEL FNC-R-SCA-336-06 Unlabeled Line 3: SUBJECT field contains TENNIS and/or COURT and a minimum of 1 of first 3 comparables does not contain TENNIS and/or COURT FNC-R-SCA-336-07 Unlabeled Line 3: SUBJECT field contains REC, CLUB or CENTER and a minimum of 1 of first 3 comparables does not contain REC, CLUB or CENTER FNC-R-SCA-336-08 Unlabeled Line 3: Field for more than 1 comparable contains POOL and SUBJECT field does not contain same FNC-R-SCA-336-09 Unlabeled Line 3: Field for more than 1 comparable contains TENNIS and/or COURT and SUBJECT field does not contain same FNC-R-SCA-336-10 Unlabeled Line 3: Field for more than 1 comparable contains REC, CLUB or CENTER and SUBJECT field does not contain same FNC-R-SCA-339-02 Unlabeled Line 3: Comparables: Contains terms UPGRADE, UPGRD, UPDATE, EXTRAS or REMODEL FNC-R-SCA-342-01 Unlabeled Line 3: Comparables: Line item adjustment for any comparable is greater than 10% of the comparable's sale price FNC-R-SCA-342-02 Unlabeled Line 3: Comparables: Comparables 1-3 contain POSITIVE (+) adjustments across the board FNC-R-SCA-342-03 Unlabeled Line 3: Comparables: Comparables 1-3 contain NEGATIVE (−) adjustments across the board FNC-R-MKTVALUE-000-01 Opinion of Market Value: For PURCHASE TRANSACTIONS, the OPINION OF MARKET VALUE is less than the CONTRACT PRICE FNC-R-MKTVALUE-000-02 Opinion of Market Value: For PURCHASE TRANSACTIONS, the OPINION OF MARKET VALUE is greater than 105% of the CONTRACT PRICE FNC-R-MKTVALUE-000-04 Opinion of Market Value: The OPINION OF MARKET VALUE is not bracketed by the adjusted sales prices of the comparables FNC-R-RECDATE-000-01 Date of Inspection and the Effective Date of the Appraisal: Contains date after the DATE OF SIGNATURE AND REPORT

FNMA 1025/FHLMC 72:

FNC-R-CMS-000-01 Opinion of Market Value: Appraised value is less than the sale's price in CMS FNC-R-CMS-000-02 Opinion of Market Value: For sales transactions, the final value of the SUBJECT is greater than 105% of the sale's price in CMS FNC-R-SUB-003-01 Property Address: Property street includes term: RR, County, C.R. or CR and SITE is reported in acres and LOCATION is not checked RURAL FNC-R-SUB-039-00 Neighborhood Name: Field is blank FNC-R-SUB-048-02 Occupant: ASSIGNMENT TYPE is not a PURCHASE TRANSACTION and VACANT box is checked FNC-R-SUB-060-01 HOA$: Per year; per month: Field contains value and there is no box checked FNC-R-SUB-063-01 Property Rights Appraised: OTHER box is checked and DESCRIBE field is blank FNC-R-SUB-069-01 Assignment Type: OTHER box is checked and DESCRIBE field is blank FNC-R-SUB-081-01 Is the subject property currently offered for sale or has it been offered for sale in the twelve months prior to the effective date of the appraisal? The YES box is checked FNC-R-SUB-084-01 Is the SUBJECT currently offered for sale or has it been offered for sale in the 12 months prior to the effective date of the appraisal? The YES box is checked and value contained in REPORT DATA SOURCE(S) USED, OFFERING PRICE(S) AND DATE(S) is less than the CONTRACT PRICE or MARKET VALUE FNC-R-SUB-084-02 Report data source(s) used, offering price(s), and date(s): does not contain term(s) ML, M.L, MRIS, MULTI, REALTRANS, REALLINK or REDLINK FNC-R-CONT-009-01 Contract Price $: For sales transactions, OPINION OF MARKET VALUE is less than the CONTRACT PRICE FNC-R-CONT-009-02 Contract Price $: For sales transactions, the OPINION OF MARKET VALUE is greater than 105% of the CONTRACT PRICE FNC-R-CONT-012-01 Contract Date: Field reflects DATE OF SALE after the EFFECTIVE DATE OF APPRAISAL FNC-R-CONT-024-01 Is there any financial assistance (loan charges, sale concessions, gift downpayment assistance, etc.) to be paid by any party on behalf of the borrower? The YES box is checked and field for REPORT THE DOLLAR AMOUNT AND DESCRIBE THE ITEMS TO BE PAID contains numeric value greater than $500

FNC-R-N-012-01 Property Values: INCREASING box is checked and DATE OF SALE/TIME of 2 of the first 3 comparables is greater than 90 days old FNC-R-N-012-02 Property Values: INCREASING box is checked and DATE OF SALE for 2 of the first 3 comps is greater than 90 days old and DATE OF SALE/TIME field does not contain a positive time adjustment FNC-R-N-012-03 Property Values: INCREASING box is checked and terms STABLE or STABILIZED found in NEIGHBORHOOD DESCRIPTION or MARKET CONDITIONS fields FNC-R-N-040-012-4 Unit Housing PRICE: The OPINION OF MARKET VALUE and/or SALES PRICE of the SUBJECT exceeds the predominant ONE-UNIT HOUSING price by more than 5 percent FNC-R-N-075-01 Present Land Use: ONE-UNIT field contains value less than 60%

FNC-R-N-093-01 Neighborhood Description: Contains terms: PRIDE, POOR, CRIME, BULLETS, GRAFFITI or DESIRABLE FNC-R-N-096-01 Market Conditions: Contains terms: PRIDE, POOR, CRIME, BULLETS, GRAFFITI or DESIRABLE FNC-R-S-006-01 Subject Site Size (Site Area): Field contains exactly 5 acres (217,800 sq ft)

FNC-R-S-009-00 Shape: Field is blank

FNC-R-S-042-01 Is the Highest and Best Use of the subject property as improved (or as proposed in the plans and specifications) the present use? The NO box is checked and DESCRIBE field is blank FNC-R-S-048-01 Utilities: Electricity: OTHER BOX is checked and SITE is reported in acres and LOCATION box is checked URBAN or SUBURBAN FNC-R-S-051-01 Utilities: Electricity: OTHER box is checked and DESCRIBE field is blank FNC-R-S-066-01 Utilities: Water: OTHER box is checked and SITE is reported in acres and LOCATION box is checked URBAN or SUBURBAN FNC-R-S-069-01 Utilities: Water: OTHER box is checked and DESCRIBE field is blank FNC-R-S-075-01 Utilities: Sanitary Sewer: OTHER box is checked and SITE is reported in acres and LOCATION box is checked URBAN or SUBURBAN FNC-R-S-078-01 Utilities: Sanitary Sewer: OTHER box is checked and DESCRIBE field is blank FNC-R-S-081-01 Off Site Improvements: Street: Field contains DIRT, GRAVEL or SHELL FNC-R-S-084-01 Off-Site Improvements: Street: PRIVATE box is checked and SITE is reported in acres and Location box is checked URBAN or SUBURBAN FNC-R-S-108-01 Are the utilities and off-site improvements typical for the market area? The NO box is checked and DESCRIBE field is blank FNC-R-IMP-012-00 GENERAL DESCRIPTION: # of Stories: Field is blank FNC-R-IMP-016-01 GENERAL DESCRIPTION: # of Buildings: Field contains numeric entry greater than 1 or alpha entry other than ONE FNC-R-IMP-021-01 GENERAL DESCRIPTION: PROPOSED OR UNDER CONSTRUCTION box is checked and AS IS box is checked in RECONCILIATION FNC-R-IMP-027-10 GENERAL DESCRIPTION: Age: SUBJECT is greater than 1 year but less than or equal to 5 years and the difference between the ACTUAL and EFFECTIVE ages is more than 2 years FNC-R-IMP-027-11 GENERAL DESCRIPTION: Age: SUBJECT is greater than 5 years but less than or equal to 10 years and the difference between the ACTUAL and EFFECTIVE ages is more than 4 years FNC-R-IMP-027-12 GENERAL DESCRIPTION: Age: SUBJECT is greater than years but less than or equal to 15 years and the difference between the ACTUAL and EFFECTIVE ages is more than 5 years FNC-R-IMP-027-13 GENERAL DESCRIPTION: Age: SUBJECT is greater than years but less than or equal to 20 years and the difference between the ACTUAL and EFFECTIVE ages is more than 6 years FNC-R-IMP-027-14 GENERAL DESCRIPTION: Age: SUBJECT is greater than 20 years and the difference between the ACTUAL and EFFECTIVE ages is more than 7 years FNC-R-IMP-043-01 Foundation: Basement: FULL BASEMENT or PARTIAL BASEMENT box is checked and more than 1 of the first 3 comparables contains upward adjustment for BASEMENT AND FINISHED ROOMS BELOW GRADE FNC-R-IMP-048-01 FOUNDATION: Basement Area: Field does not contain numeric entry and FULL BASEMENT or PARTIAL BASEMENT box is checked FNC-R-IMP-051-01 FOUNDATION: Basement Finish: Field does not contain numeric entry and FULL BASEMENT or PARTIAL BASEMENT box is checked FNC-R-IMP-063-01 Foundation: SUMP PUMP box is checked FNC-R-IMP-066-01 Foundation: Evidence of INFESTATION or DAMPNESS or SETTLEMENT box is checked and AS IS box is checked in RECONCILIATION FNC-R-IMP-075-01 Exterior Description: Foundation Walls: Field contains terms: POOR, FAIR, BELOW, CRACKS, SEE ATT and AS IS box is checked in RECONCILIATION FNC-R-IMP-081-01 Exterior Description: Exterior Walls: Field contains terms: POOR, FAIR, BELOW, CRACKS or SEE ATT and AS IS box is checked in RECONCILIATION FNC-R-IMP-084-01 Exterior Description: Roof Surface: Field contains terms: POOR, FAIR, BELOW, WORN, LEAK, CRACKS or SEE ATT and AS IS box is checked in RECONCILIATION FNC-R-IMP-087-01 Exterior Description: Gutters and Downspouts: Field contains terms: POOR, FAIR, BELOW or SEE ATT and AS IS box is checked in RECONCILIATION FNC-R-IMP-090-01 Exterior Description: Window Type: Field contains terms: POOR, FAIR, BELOW, ROT, LEAK, BROKEN, CRACKS, BOARDED or SEE ATT and AS IS box is checked in RECONCILIATION FNC-R-IMP-093-01 Exterior Description: Storm Sash/Insulated: Field contains terms: POOR, FAIR, BELOW, ROT, LEAK, BROKEN, CRACKS, BOARDED or SEE ATT and AS IS box is checked in RECONCILIATION FNC-R-IMP-096-01 Exterior Description: Screens: Field contains terms: POOR, FAIR, BELOW, TORN, HOLES, TEARS, RIPS or SEE ATT and AS IS box is checked in RECONCILIATION FNC-R-IMP-102-01 Interior Description: Floors: Field contains terms: POOR, FAIR, BELOW, WORN, STAINED, TORN, CRACKS or SEE ATT and AS IS box is checked in RECONCILIATION FNC-R-IMP-105-01 Interior Description: Walls: Field contains terms: POOR, FAIR, BELOW, WORN, HOLES, CRACKS or SEE ATT and AS IS box is checked in RECONCILIATION FNC-R-IMP-108-01 Interior Description: Trim/Finish: Field contains terms: POOR, FAIR, BELOW, INFERIOR or SEE ATT and AS IS box is checked in RECONCILIATION FNC-R-IMP-111-01 Interior Description: Bath Floor: Field contains terms: POOR, FAIR, BELOW, WORN or SEE ATT and AS IS box is checked in RECONCILIATION FNC-R-IMP-114-01 Interior Description: Bath Wainscot: Field contains terms: POOR, FAIR, BELOW or SEE ATT and AS IS box is checked in RECONCILIATION FNC-R-IMP-153-01 Heating: Fuel: Field contains terms: WD, WOOD, PROP, UNK, NO, NN, N.N.

FNC-R-IMP-198-00 CAR STORAGE: There is no box checked

FNC-R-IMP-204-01 CAR STORAGE: DRIVEWAY box is checked and field for # of Cars is blank FNC-R-IMP-207-01 CAR STORAGE: Driveway Surface: Field is blank and DRIVEWAY box is checked FNC-R-IMP-213-01 CAR STORAGE: GARAGE box is checked and field for # of Cars is blank FNC-R-IMP-219-01 CAR STORAGE: CARPORT box is checked and field for # of Cars is blank FNC-R-IMP-222-01 CAR STORAGE: GARAGE or CARPORT box is checked and no box for ATTACHED, DETACHED OR BUILT-IN is checked FNC-R-IMP-271-01 GENERAL DESCRIPTION UNITS TWO box is checked and UNIT 1 and 2 BEDROOMS does not contain 1 to 3 bedrooms FNC-R-IMP-271-02 GENERAL DESCRIPTION UNITS THREE box is checked and UNIT 1, 2, and 3 BEDROOMS does not contain 1 to 3 bedrooms FNC-R-IMP-271-03 GENERAL DESCRIPTION UNITS FOUR box is checked and UNIT 1, 2, 3, and 4 BEDROOMS does not contain 1 to 3 bedrooms FNC-R-IMP-272-01 GENERAL DESCRIPTION UNITS TWO box is checked and UNIT 1 and 2 BATHS does not contain 1 to 3 BATHS FNC-R-IMP-272-02 GENERAL DESCRIPTION UNITS THREE box is checked and UNIT 1, 2, and 3 BATHS does not contain 1 to 3 BATHS FNC-R-IMP-272-03 GENERAL DESCRIPTION UNITS FOUR box is checked and UNIT 1, 2, 3, and 4 BATHS does not contain 1 to 3 BATHS FNC-R-IMP-309-01 Describe the condition of the property (including needed repairs, deterioration, renovations, remodeling, etc.): Field contains terms: FAIR, POOR, BELOW, ROT, DAMAGE, STAIN, LEAK, CRACK, SETTLE, WATER, DAMP, ODOR or MOLD and AS IS box is checked in RECONCILIATION FNC-R-IMP-312-01 Are there any physical deficiencies or adverse conditions that affect the livability, soundness, or structural integrity of the property? The YES box is checked and AS IS box is checked in RECONCILIATION FNC-R-IMP-315-01 Are there any physical deficiencies or adverse conditions that affect the livability, soundness, or structural integrity of the property? The YES box is checked and DESCRIBE field is blank FNC-R-IMP-315-02 Are there any physical deficiencies or adverse conditions that affect the livability, soundness, or structural integrity of the property? Field contains terms: FAIR, POOR, BELOW, ROT, DAMAGE, STAIN, LEAK, CRACK, SETTLE, WATER, DAMP, ODOR or MOLD and AS IS box is checked in RECONCILIATION FNC-R-IMP-321-01 Does the property generally conform to the neighborhood (functional utility, style, condition, use, construction, etc.)? The NO box is checked and DESCRIBE field is blank FNC-R-IMP-324-01 Is the property subject to rent control? The YES box is checked FNC-R-IMP-327-01 Is the property subject to rent control? The YES box is checked and describe field is blank FNC-R-COMPRENT-025-01 Proximity: Field must have a value for all comparables FNC-R-COMPRENT-025-02 Proximity to Subject: Any of the comparable rentals indicate proximity to SUBJECT is greater than 12 blocks or 1 mile and neighborhood LOCATION box is checked URBAN FNC-R-COMPRENT-025-03 Proximity to Subject: Any of the COMPARABLE RENTALS indicates proximity to SUBJECT is greater than 12 blocks or 1 mile and PRESENT LAND USE % indicates 2-4 Unit % as greater than 30%

FNC-R-COMPRENT-025-04 Proximity to Subject: Any of the COMPARABLE RENTALS indicate proximity to SUBJECT is greater than 5 miles and the neighborhood LOCATION box is checked URBAN or SUBURBAN FNC-R-COMPRENT-025-05 Proximity to Subject: Any of the COMPARABLE RENTALS indicates proximity to SUBJECT is greater than 5 miles and the neighborhood LOCATION box is checked URBAN or SUBURBAN and PRESENT LAND USE % indicates 2-4 Unit % as greater than 20%

FNC-R-COMPRENT-025-06 Proximity to Subject: More than 1 COMPARABLE RENTAL is greater than 2 miles from subject and LOCATION box is checked URBAN or SUBURBAN FNC-R-COMPRENT-025-07 Proximity to Subject: Any of the comparable rentals indicate proximity to SUBJECT is greater than 10 miles and the neighborhood LOCATION box is checked RURAL FNC-R-COMPRENT-027-01 Current Monthly Rent: Subject's CURRENT MONTHLY RENT is not bracketed by 1st 3 COMPARABLE RENTALS FNC-R-COMPRENT-027-02 Current Monthly Rent: 2 of 1st 3 COMPARABLE RENTALS have CURRENT MONTHLY RENT less than subject's CURRENT MONTHLY RENT by more than 10 percent FNC-R-COMPRENT-033-01 Rent/Gross Building Area: Rent Per Square Feet of Gross Living Area of 1st 3 rental comparables do not bracket subject's RENT/GROSS BUILDING AREA $_____ Sq. FT. (Rent Per Square Foot of Gross Building Area)

FNC-R-COMPRENT-039-01 Rent Control: SUBJECT'S box is marked YES and 2 of 1st 3 COMPARABLE RENTALS not marked as YES FNC-R-COMPRENT-039-02 Rent Control: More than one of the comparables not marked the same as the subject FNC-R-COMPRENT-045-01 Data Source(s): SUBJECT field contains NA, N/A, NONE, NN, UNK or PRIVATE FNC-R-COMPRENT-048-01 Data Source(s): At least 2 of the first 3 rent comparables do not contain any of the following terms: ML, MLS, M.L, MRIS, MULTI, REALTRANS, REALLINK, REDLINK, TENANT, PROPERTY MANAGER, LEASES FNC-R-COMPRENT-048-02 Data Sources: COMPARABLE RENTALS fields contain NA, N/A, NONE, NN, UNK or PRIVATE FNC-R-COMPRENT-075-01 Gross Building Area of Comparable Rentals: Subject Property's Gross Building Area is not bracketed by 1st 3 COMPARABLE RENTALS FNC-R-COMPRENT-075-02 Gross Building Area: GROSS BUILDING AREA FOR SUBJECT does not equal Gross Building Area for Subject in comparable rentals FNC-R-COMPRENT-075-03 Gross Building Area of Comparable Rentals: Gross Building Area of 1st 3 COMPARABLE RENTALS is larger than the subject's Gross Building Area FNC-R-COMPRENT-075-04 Gross Building Area of Comparable Rentals: Gross Building Area of 1st 3 COMPARABLE RENTALS is smaller than the subject's Gross Building Area FNC-R-COMPRENT-081-01 Unit #1 IMPROVEMENTS SECTION: CONTAINS: ROOMS, BEDROOM(S), BATH(S) or SQUARE FEET OF GROSS LIVING AREA does not equal TOT, BR, BATH or SIZE SQ. FT. in COMPRENT FNC-R-COMPRENT-084-01 Subject: Bedrooms: For each numeric count in the bedroom count field at least two of the first three comparables must contain same unique bedroom count FNC-R-COMPRENT-087-01 Subject: Baths: For each numeric count in the bathroom count field at least two of the first three comparables must contain same unique bathroom count FNC-R-COMPRENT-108-01 Unit #2 IMPROVEMENTS SECTION: CONTAINS: ROOMS, BEDROOM(S), BATH(S) or SQUARE FEET OF GROSS LIVING AREA does not equal TOT, BR, BATH or SIZE SQ. FT. in COMPRENT FNC-R-COMPRENT-135-01 Unit #3 IMPROVEMENTS SECTION: CONTAINS: ROOMS, BEDROOM(S), BATH(S) or SQUARE FEET OF GROSS LIVING AREA does not equal TOT, BR, BATH or SIZE SQ. FT. in COMPRENT FNC-R-COMPRENT-159-01 Unit #4 IMPROVEMENTS SECTION: CONTAINS: ROOMS, BEDROOM(S), BATH(S) or SQUARE FEET OF GROSS LIVING AREA does not equal TOT, BR, BATH or SIZE SQ. FT. in COMPRENT FNC-R-SRENTSCH-030-01 Actual Rent: FURNISHED COLUMN contains a numeric entry greater than 0

FNC-R-SRENTSCH-066-01 Opinion of Market Rent: FURNISHED COLUMN contains a numeric entry greater than 0

FNC-R-SRENTSCH-105-01 Actual Rent: OTHER MONTHLY INCOME (ITEMIZE): Contains a numeric entry greater than 0

FNC-R-SRENTSCH-108-01 TOTAL ACTUAL MONTHLY INCOME is greater than TOTAL ESTIMATED MONTHLY INCOME FNC-R-SRENTSCH-108-02 TOTAL ESTIMATED MONTHLY RENT: TOTAL ACTUAL MONTHLY INCOME varies by greater than 10 percent from TOTAL ESTIMATED MONTHLY INCOME FNC-R-SRENTSCH-114-01 Opinion of Market Rent: OTHER MONTHLY INCOME (ITEMIZE): Contains a numeric entry greater than 0

FNC-R-SRENTSCH-144-01 Utilities include in estimated rents: OTHER box is checked and describe field is blank FNC-R-SCAHIS-027-01 Price of Prior Sale/Transfer: SUBJECT: Prior Sales Price is less than the OPINION OF MARKET VALUE by more than 10 percent and PROPERTY VALUES box is checked STABLE or DECLINING FNC-R-SCAHIS-027-02 Price of Prior Sale/Transfer: SUBJECT: Prior Sales Price is higher than the OPINION OF MARKET VALUE FNC-R-SCAHIS-030-01 Price of Prior Sale/Transfer: COMPARABLES: Prior Sales Price is HIGHER than COMPARABLE'S PRICE reported in appraisal FNC-R-SCA-003-01 There are _____ COMPARABLE PROPERTIES CURRENTLY OFFERED FOR SALE in the subject neighborhood ranging in price ranging in price from $_____ to $_____: Numeric entry in field for number of PROPERTIES OFFERED FOR SALE is greater than numeric entry in field for number of COMPARABLE SALES FNC-R-SCA-006-01 There are _____ COMPARABLE PROPERTIES CURRENTLY OFFERED FOR SALE in the subject neighborhood ranging in price ranging in price from $_____ to $_____: The SUBJECT'S OPINION OF MARKET VALUE is outside (lower or higher) the numeric entries in field for range of PROPERTIES OFFERED FOR SALE FNC-R-SCA-015-01 There are _____ COMPARABLE SALES in the subject neighborhood within the past twelve months ranging in SALE PRICE from $_____ to $_____: The SUBJECT'S OPINION OF MARKET VALUE is outside (lower or higher) the numeric entries in field for range of COMPARABLE SALES FNC-R-SCA-063-00 Proximity: Field must have a value for all comparables FNC-R-SCA-063-01 Proximity to Subject: Any of the comparables indicate proximity to SUBJECT is greater than 12 blocks or 1 mile and neighborhood LOCATION box is checked URBAN FNC-R-SCA-063-02 Proximity to Subject: Any of the comparables indicate proximity to SUBJECT is greater than 2 miles and the neighborhood LOCATION box is checked URBAN or SUBURBAN FNC-R-SCA-063-03 Proximity to Subject: More than 2 of the COMPARABLES are greater than 2 miles from subject and LOCATION box is checked URBAN or SUBURBAN FNC-R-SCA-063-04 Proximity to Subject: Any of the comparables indicate proximity to SUBJECT is greater than 5 miles and the neighborhood LOCATION box is checked RURAL FNC-R-SCA-069-01 Sales Price: Unadjusted sales prices of 1st 3 comparables do not bracket subject's OPINION OF MARKET VALUE FNC-R-SCA-069-02 Sales Price: 2 of 1st 3 comparables have sales prices less than subject's OPINION OF MARKET VALUE by more than 10 percent FNC-R-SCA-069-03 Sales Price: 2 of 1st 3 comparables have sales prices less than subject's OPINION OF MARKET VALUE FNC-R-SCA-069-04 Sales Price: 2 of 1st 3 comparables have sales prices greater than subject's OPINION OF MARKET VALUE FNC-R-SCA-081-01 Data Source(s) and/or Verification Sources: IMP: Year built field indicates age greater than 0 and at least 2 of 1st 3 comparables do not contain any of the following terms as data source: ML, MULTI, M.L., MRIS, REALTRANS, REALLINK, REDLINK, FARES, NDC, REALQUEST, METROSCAN, FIRSTAM, DATAQUICK, BOARD, NCD, AIRESIDENTIAL, FNC, CMDC or NATIONAL COLLATERAL FNC-R-SCA-081-06 Data Source(s) and/or Verification Sources: SCA: Age field indicates age greater than 0 and at least 2 of 1st 3 comparables do not contain any of the following terms as data source: ML, MULTI, M.L., MRIS, REALTRANS, REALLINK, REDLINK, FARES, NDC, REALQUEST, METROSCAN, FIRSTAM, DATAQUICK, BOARD, NCD, AIRESIDENTIAL, FNC, CMDC or NATIONAL COLLATERAL FNC-R-SCA-087-01 Concessions: A numeric value between 1000 and 20000 or points or percent is found in Sales or Financing fields, and negative adjustment is not found in Adjustment field for Sales or Financing Concessions FNC-R-SCA-180-01 GENERAL DESCRIPTION: Type: ATT or S-DET/END UNIT box is checked and more than 1 of 1st 3 comparables does not contain terms: ATT, S-DET, ROW OR TH, TOWNHOME in SCA DESIGN (STYLE) field FNC-R-SCA-372-01 Gross Rent Multiplier: Unadjusted Gross Rent Multiplier of 1st 3 Comparables do not bracket SUBJECT Gross Rent Multiplier FNC-R-SCA-378-01 Price Per Unit: Unadjusted Price Per Unit of 1st 3 Comparables do not bracket SUBJECT Price Per Unit FNC-R-SCA-384-01 Price Per Room: Unadjusted Price Per Room of 1st 3 Comparables do not bracket SUBJECT Price Per Room FNC-R-SCA-390-01 Price Per Bedroom: Unadjusted Price Per Bedroom of 1st 3 Comparables do not bracket SUBJECT Price Per Bedroom FNC-R-SCA-081-01 Data Source(s) and/or Verification Source(s): IMP: Year built field indicates age greater than 0 and at least 2 of the first 3 comparables do not contain any of the following terms as data source: ML, MLS, M.L., MRIS, MULTI, REALTRANS, REALLINK, REDLINK, AIRD, CMDC, FNC, or NDC FNC-R-SCA-081-02 Data Source(s) and/or Verification Source(s): More than 1 of the first 3 comparables reflects the term APPRAISERS FILES FNC-R-SCA-081-03 Data Source(s) and/or Verification Source(s): Field contains UNK, N/A, NA, TYP, CONF, NN, NONE or NORMAL for any comp FNC-R-SCA-081-04 Data Source(s) and/or Verification Source(s): Any of the 1st of the first 3 comparables contains the term PRIVATE SALE FNC-R-SCA-081-05 Data Source(s) and/or Verification Source(s): IMP: Year built field indicates age 0, NEW or PROPOSED and more than 2 of the first 3 comparables reflect terms SALES OFFICE, MANAGER, MGMNT, DEVELOPER, BUILDER or APPRAISAL FILES FNC-R-SCA-081-06 Data Source(s) and/or Verification Source(s): SCA: Age field contains numeric value greater than 0 and at least 2 of the first 3 comparables do not contain any of the following terms as data source: ML, MLS, M.L., MRIS, MULTI, REALTRANS, REALLINK, REDLINK, AIRD, CMDC, FNC, or NDC FNC-R-SCA-087-01 Concessions: A numeric value between 1000 and 20000 is found in Sales or Financing fields, and negative adjustment is not found in Adjustment field for Sales or Financing Concessions FNC-R-SCA-090-01 Sale or Financing Concessions: Comparables: Line item adjustment for any comparable is greater than 10% of the comparable's sale price FNC-R-SCA-090-02 Sales or Financing Adjustments: Comparables: Comparables 1-3 contain NEGATIVE (−) adjustments across the board FNC-R-SCA-099-01 Date of Sale/Time: Comparables: Fields for any comparables contain NEGATIVE adjustments and are closed sales FNC-R-SCA-102-01 Date of Sale/Time: Comparables: Line item adjustment for any comparable is greater than 10% of the comparable's sale price FNC-R-SCA-102-02 Date of Sale/Time: Comparables: Comparables 1-3 contain POSITIVE (+) adjustments across the board FNC-R-SCA-102-03 Date of Sale/Time: Comparables: Comparables 1-3 contain NEGATIVE (−) adjustments across the board FNC-R-SCA-105-01 Location: SUBJECT contains terms GOOD, AVERAGE or SUPERIOR and minimum of 2 of the first 3 comparables do not contain same terms FNC-R-SCA-111-01 Location: Comparables: Line item adjustment for any comparable is greater than 10% of the comparable's sale price FNC-R-SCA-111-02 Location: Comparables: Comparables 1-3 contain POSITIVE (+) adjustments across the board FNC-R-SCA-111-03 Location: Comparables: Comparables 1-3 contain NEGATIVE (−) adjustments across the board FNC-R-SCA-120-01 Leasehold/Fee Simple: Comparables: Line item adjustment for any comparable is greater than 10% of the comparable's sale price FNC-R-SCA-120-02 Leasehold/Fee Simple: Comparables: Comparables 1-3 contain POSITIVE (+) adjustments across the board FNC-R-SCA-120-03 Leasehold/Fee Simple: Comparables: Comparables 1-3 contain NEGATIVE (−) adjustments across the board FNC-R-SCA-159-08 Site: SUBJECT field contains terms GOOD, AVERAGE or SUPERIOR and minimum of 2 of the first 3 comparables do not contain same terms FNC-R-SCA-159-09 Site: COMPARABLES field contains terms: GOLF, WATER, RIVER, OCEAN, CREEK, MOUNTAIN, LAKE, INTRA, POND, BEACH, GULF and none of these words is found in SUBJECT'S SITE FNC-R-SCA-159-10 Site: Comparables: Size of 2 of the 1st 3 comparables are not within 20 percent of the SUBJECT'S site size FNC-R-SCA-165-01 Site: Comparables: Line item adjustment for any comparable is greater than 10% of the comparable's sale price FNC-R-SCA-165-02 Site: Comparables: Comparables 1-3 contain POSITIVE (+) adjustments across the board FNC-R-SCA-165-03 Site: Comparables: Comparables 1-3 contain NEGATIVE (−) adjustments across the board FNC-R-SCA-168-01 View: SUBJECT field contains terms GOOD, AVERAGE or SUPERIOR and minimum of 2 of the first 3 comparables do not contain same terms FNC-R-SCA-168-02 View: COMPARABLES field contains terms: GOLF, WATER, RIVER, OCEAN, CREEK, MOUNTAIN, LAKE, INTRA, POND, BEACH, GULF and none of these words is found in SUBJECT'S SITE FNC-R-SCA-174-01 View: 2 of the first 3 comparables contain positive or negative adjustments for VIEW FNC-R-SCA-174-02 View: Comparables: Line item adjustment for any comparable is greater than 10% of the comparable's sale price FNC-R-SCA-174-03 View: Comparables: Comparables 1-3 contain POSITIVE (+) adjustments across the board FNC-R-SCA-174-04 View: Comparables: Comparables 1-3 contain NEGATIVE (−) adjustments across the board FNC-R-SCA-177-01 Design (Style): SUBJECT field contains terms GOOD, AVERAGE or SUPERIOR and minimum of 2 of the first 3 comparables do not contain same terms FNC-R-SCA-180-01 GENERAL DESCRIPTION: Type: ATT or S-DET/END UNIT box is checked and more than 1 of the first 3 comparables does not contain terms: ATT or S-DET or TH, TOWNHOME in SCA DESIGN (STYLE) field FNC-R-SCA-183-01 Design (Style): 2 of the first 3 comparables contain positive or negative adjustments for DESIGN FNC-R-SCA-183-02 Design (Style): Comparables: Line item adjustment for any comparable is greater than 10% of the comparable's sale price FNC-R-SCA-183-03 Design (Style): Comparables: Comparables 1-3 contain POSITIVE (+) adjustments across the board FNC-R-SCA-183-04 Design (Style): Comparables: Comparables 1-3 contain NEGATIVE (−) adjustments across the board FNC-R-SCA-183-05 GENERAL DESCRIPTION: Type: ATT or S-DET/END UNIT box is checked and 2 of the first 3 comparables contain adjustments for DESIGN (STYLE)

FNC-R-SCA-186-01 Quality of Construction: SUBJECT field contains terms GOOD, AVERAGE or SUPERIOR and minimum of 2 of the first 3 comparables do not contain same terms FNC-R-SCA-186-02 Quality of Construction: SUBJECT contains term BRICK and at least 2 of the first 3 comparables do not contain same term FNC-R-SCA-186-03 Quality of Construction: SUBJECT contains term CONC, BLOCK, BLK, WOOD, WD, FRAME, ALUMINIUM or VINYL and more than 1 of first three comparables contain term BRICK or STUCCO FNC-R-SCA-192-01 Quality of Construction: 2 of the first 3 comparables contain positive or negative adjustments for QUALITY OF CONSTRUCTION FNC-R-SCA-192-02 Quality of Construction: Comparables: Line item adjustment for any comparable is greater than 10% of the comparable's sale price FNC-R-SCA-192-03 Quality of Construction: Comparables: Comparables 1-3 contain POSITIVE (+) adjustments across the board FNC-R-SCA-192-04 Quality of Construction: Comparables: Comparables 1-3 contain NEGATIVE (−) adjustments across the board FNC-R-SCA-198-01 Actual Age: Comparables: Comparables 1-3 contains terms: NEW or 0

FNC-R-SCA-198-02 Actual Age: Comparables: Field of any COMPARABLE contains terms NEW or 0 and positive adjustments are found in AGE field FNC-R-SCA-198-03 Actual Age: Comparables: Field of any COMPARABLE contains terms NEW or 0 and positive adjustments are found in CONDITION field FNC-R-SCA-201-01 Actual Age: Comparables: Line item adjustment for any comparable is greater than 10% of the comparable's sale price FNC-R-SCA-201-02 Actual Age: Comparables: Comparables 1-3 contain POSITIVE (+) adjustments across the board FNC-R-SCA-201-03 Actual Age: Comparables: Comparables 1-3 contain NEGATIVE (−) adjustments across the board FNC-R-SCA-204-01 Condition: SUBJECT: Field contains terms GOOD, AVERAGE or SUPERIOR and minimum of 2 of the first 3 comparables do not contain same term FNC-R-SCA-210-01 Condition: 2 of the first 3 comparables contain positive or negative adjustments for CONDITION FNC-R-SCA-210-02 Condition: Comparables: Line item adjustment for any comparable is greater than 10% of the comparable's sale price FNC-R-SCA-210-03 Condition: Comparables: Comparables 1-3 contain POSITIVE (+) adjustments across the board FNC-R-SCA-210-04 Condition: Comparables: Comparables 1-3 contain NEGATIVE (−) adjustments across the board FNC-R-SCA-402-01 Gross Building Area of Comparables: Subject Property's gross building area is not bracketed by the 1st 3 comparables' gross building area FNC-R-SCA-402-02 Gross Building Area: Comparables: GBA of the first 3 COMPARABLES is larger than the subject's GBA FNC-R-SCA-402-03 Gross Building Area: Comparables: GBA of the first 3 COMPARABLES is smaller than the subject's GBA FNC-R-SCA-408-01 Gross Building Area: Comparables: Line item adjustment for any comparable is greater than 10% of the comparable's sale price FNC-R-SCA-408-02 Gross Building Area: Comparables: Comparables 1-3 contain POSITIVE (+) adjustments across the board FNC-R-SCA-408-03 Gross Building Area: Comparables: Comparables 1-3 contain NEGATIVE (−) adjustments across the board FNC-R-SCA-408-04 Gross Building Area: Adjustments for all comparables vary more than 2 dollars per square foot FNC-R-SCA-411-01 Unit #1 IMPROVEMENTS SECTION: CONTAINS: ROOMS, BEDROOM(S), BATH (S) does not equal TOT, BR, BATH in SCA FNC-R-SCA-420-01 Unit Breakdown: SUBJECT: for 2 Unit, 2 of the first 3 comparables has more than 2 units FNC-R-SCA-420-02 Unit Breakdown: SUBJECT: for 3 Unit, 2 of the first 3 comparables has less than 3 units FNC-R-SCA-420-03 Unit Breakdown: SUBJECT: for 4 Unit, 2 of the first 3 comparables has less than 4 units FNC-R-SCA-429-01 Unit Breakdown: Line item adjustment for any comparable is greater than 10% of the comparable's sale price FNC-R-SCA-429-02 Unit Breakdown: Comparables: Comparables 1-3 contain POSITIVE (+) adjustments across the board FNC-R-SCA-429-03 Unit Breakdown: Comparables: Comparables 1-3 contain NEGATIVE (−) adjustments across the board FNC-R-SCA-432-01 Unit #2 IMPROVEMENTS SECTION: CONTAINS: ROOMS, BEDROOM(S), BATH (S) does not equal TOT, BR, BATH in SCA FNC-R-SCA-453-01 Unit #3 IMPROVEMENTS SECTION: CONTAINS: ROOMS, BEDROOM(S), BATH (S) does not equal TOT, BR, BATH in SCA FNC-R-SCA-474-01 Unit #4 IMPROVEMENTS SECTION: CONTAINS: ROOMS, BEDROOM(S), BATH(S) does not equal TOT, BR, BATH in SCA FNC-R-SCA-246-02 Basement Description: SUBJECT contains terms BASEMENT, FINISHED, PARTIAL, APARTMENT, APT, REC, RR, DEN, DN, FR, FAMILY, BED, BR, BATH or BTH and minimum of 2 of the first three comparables do not contain same FNC-R-SCA-252-05 Basement Description: Comparables: Line item adjustment for any comparable is greater than 10% of the comparable's sale price FNC-R-SCA-252-06 Basement Description: Comparables: Comparables 1-3 contain POSITIVE (+) adjustments across the board FNC-R-SCA-252-07 Basement Description: Comparables: Comparables 1-3 contain NEGATIVE (−) adjustments across the board FNC-R-SCA-255-01 Basement Finished Rooms: SUBJECT contains terms BASEMENT, FINISHED, PARTIAL, APARTMENT, APT, REC, RR, DEN, DN, FR, FAMILY, BED, BR, BATH or BTH and minimum of 2 of the first three comparables do not contain same FNC-R-SCA-261-01 Basement Finished Rooms: Comparables: Line item adjustment for any comparable is greater than 10% of the comparable's sale price FNC-R-SCA-261-02 Basement Finished Rooms: Comparables: Comparables 1-3 contain POSITIVE (+) adjustments across the board FNC-R-SCA-261-03 Basement Finished Rooms: Comparables: Comparables 1-3 contain NEGATIVE (−) adjustments across the board FNC-R-SCA-264-01 Functional Utility: SUBJECT: Field contains terms GOOD, AVERAGE or SUPERIOR and minimum of 2 of the first 3 comparables do not contain same term FNC-R-SCA-270-01 Functional Utility: 2 of the first 3 comparables contain positive or negative adjustments for FUNCTIONAL UTILITY FNC-R-SCA-270-02 Functional Utility: Comparables: Line item adjustment for any comparable is greater than 10% of the comparable's sale price FNC-R-SCA-270-03 Functional Utility: Comparables: Comparables 1-3 contain POSITIVE (+) adjustments across the board FNC-R-SCA-270-04 Functional Utility: Comparables: Comparables 1-3 contain NEGATIVE (−) adjustments across the board FNC-R-SCA-279-01 Heating/Cooling: Comparables: Line item adjustment for any comparable is greater than 10% of the comparable's sale price FNC-R-SCA-279-02 Heating/Cooling: Comparables: Comparables 1-3 contain POSITIVE (+) adjustments across the board FNC-R-SCA-279-03 Heating/Cooling: Comparables: Comparables 1-3 contain NEGATIVE (−) adjustments across the board FNC-R-SCA-288-01 Energy Efficient Items: Comparables: Line item adjustment for any comparable is greater than 10% of the comparable's sale price FNC-R-SCA-288-02 Energy Efficient Items: Comparables: Comparables 1-3 contain POSITIVE (+) adjustments across the board FNC-R-SCA-288-03 Energy Efficient Items: Comparables: Comparables 1-3 contain NEGATIVE (−) adjustments across the board FNC-R-SCA-501-01 Parking On/Off Site: Comparables: Line item adjustment for any comparable is greater than 10% of the comparable's sale price FNC-R-SCA-501-02 Parking On/Off Site: Comparables: Comparables 1-3 contain POSITIVE (+) adjustments across the board FNC-R-SCA-501-03 Parking On/Off Site: Comparables: Comparables 1-3 contain NEGATIVE (−) adjustments across the board FNC-R-SCA-306-01 Porch/Patio/Deck: Comparables: Line item adjustment for any comparable is greater than 10% of the comparable's sale price FNC-R-SCA-306-02 Porch/Patio/Deck: Comparables: Comparables 1-3 contain POSITIVE (+) adjustments across the board FNC-R-SCA-306-03 Porch/Patio/Deck: Comparables: Comparables 1-3 contain NEGATIVE (−) adjustments across the board FNC-R-SCA-312-01 Unlabeled Line 1: SUBJECT field contains POOL and a minimum of 1 of first 3 comparables does not contain POOL FNC-R-SCA-312-05 Unlabeled Line 1: Subject: Contains terms UPGRADE, UPDATE or REMODEL FNC-R-SCA-312-11 Unlabeled Line 1: Field for more than 1 comparable contains POOL, GUEST or ACCESSORY and SUBJECT field does not contain same FNC-R-SCA-315-02 Unlabeled Line 1: Comparables: Contains terms UPGRADE, UPGRD, UPDATE, EXTRAS or REMODEL FNC-R-SCA-318-01 Unlabeled Line 1: Comparables: Line item adjustment for any comparable is greater than 10% of the comparable's sale price FNC-R-SCA-318-02 Unlabeled Line 1: Comparables: Comparables 1-3 contain POSITIVE (+) adjustments across the board FNC-R-SCA-318-03 Unlabeled Line 1: Comparables: Comparables 1-3 contain NEGATIVE (−) adjustments across the board FNC-R-SCA-324-01 Unlabeled Line 2: SUBJECT field contains POOL and a minimum of 1 of first 3 comparables does not contain POOL FNC-R-SCA-324-05 Unlabeled Line 2: Subject: Contains terms UPGRADE, UPDATE or REMODEL FNC-R-SCA-324-11 Unlabeled Line 2: Field for more than 1 comparable contains POOL, GUEST or ACCESSORY and SUBJECT field does not contain same FNC-R-SCA-327-02 Unlabeled Line 2: Comparables: Contains terms UPGRADE, UPGRD, UPDATE, EXTRAS or REMODEL FNC-R-SCA-330-01 Unlabeled Line 2: Comparables: Line item adjustment for any comparable is greater than 10% of the comparable's sale price FNC-R-SCA-330-02 Unlabeled Line 2: Comparables: Comparables 1-3 contain POSITIVE (+) adjustments across the board FNC-R-SCA-330-03 Unlabeled Line 2: Comparables: Comparables 1-3 contain NEGATIVE (−) adjustments across the board FNC-R-SCA-336-01 Unlabeled Line 3: SUBJECT field contains POOL and a minimum of 1 of first 3 comparables does not contain POOL FNC-R-SCA-336-05 Unlabeled Line 3: Subject: Contains terms UPGRADE, UPDATE or REMODEL FNC-R-SCA-336-11 Unlabeled Line 3: Field for more than 1 comparable contains POOL, GUEST or ACCESSORY and SUBJECT field does not contain same FNC-R-SCA-339-02 Unlabeled Line 3: Comparables: Contains terms UPGRADE, UPGRD, UPDATE, EXTRAS or REMODEL FNC-R-SCA-342-01 Unlabeled Line 3: Comparables: Line item adjustment for any comparable is greater than 10% of the comparable's sale price FNC-R-SCA-342-02 Unlabeled Line 3: Comparables: Comparables 1-3 contain POSITIVE (+) adjustments across the board FNC-R-SCA-342-03 Unlabeled Line 3: Comparables: Comparables 1-3 contain NEGATIVE (−) adjustments across the board FNC-R-SCA-504-01 Adj. Price Per Unit: The Value Per Unit of the SUBJECT is not bracketed by the adjusted price per unit of comparables 1-3

FNC-R-SCA-510-01 Adj. Price Per Bedroom: The Value Per Bdrms. of the SUBJECT is not bracketed by the adjusted price per bedroom of comparables 1-3

FNC-R-INCOME-009-01 Indicated Value by Income Approach: Field contains value less than OPINION OF MARKET VALUE by more than 5 percent FNC-R-SCAVALUE-000-01 Indicated Value by: Sales Comparison Approach and Income Approach vary by greater than 10%

FNC-R-MKTVALUE-000-01 Opinion of Market Value: For PURCHASE TRANSACTIONS, the OPINION OF MARKET VALUE is less than the CONTRACT PRICE FNC-R-MKTVALUE-000-02 Opinion of Market Value: For PURCHASE TRANSACTIONS, the OPINION OF MARKET VALUE is greater than 105% of the CONTRACT PRICE FNC-R-MKTVALUE-000-04 Opinion of Market Value: The OPINION OF MARKET VALUE is not bracketed by the adjusted sales prices of the comparables FNC-R-MKTVALUE-000-05 Indicated Value by Income Approach: Field contains value less than OPINION OF MARKET VALUE by more than five percent FNC-R-RECDATE-000-01 Date of Inspection and the Effective Date of the Appraisal: Contains date after the DATE OF SIGNATURE AND REPORT FNC-R-CA-102-01 Depreciation: Functional: Field contains a value and comparables do not contain same rating as SUBJECT or terms SAME or SIMILAR for FUNCTIONAL UTILITY, and Adjustment field in SCA does not reflect negative adjustment FNC-R-CA-105-01 Depreciation: External: Field contains a value and comparables do not contain same rating as SUBJECT or terms SAME or SIMILAR for LOCATION and/or SITE and/or VIEW, and Adjustment field in SCA does not reflect negative adjustment FNC-R-CA-123-01 Indicated Value by Cost Approach: Field contains value less than OPINION OF MARKET VALUE by more than 5 percent FNC-R-PUDINFO-009-00 Legal Name of Project: Field is blank and the DEVELOPER/BUILDER in control of HOA box is checked YES and the UNIT TYPE(S) box is checked ATTACHED FNC-R-PUDINFO-012-00 Total number of phases: Field is blank or does not contain a numeric value, and the DEVELOPER/BUILDER in control of HOA box is checked YES and the UNIT TYPE(S) box is checked ATTACHED FNC-R-PUDINFO-015-00 Total number of units: Field is blank or does not contain a numeric value, and the DEVELOPER/BUILDER in control of HOA box is checked YES and the UNIT TYPE(S) box is checked ATTACHED FNC-R-PUDINFO-018-00 Total number of units sold: Field is blank or does not contain a numeric value, and the DEVELOPER/BUILDER in control of HOA box is checked YES and the UNIT TYPE(S) box is checked ATTACHED FNC-R-PUDINFO-021-00 Total number of units rented: Field is blank or does not contain a numeric value, and the DEVELOPER/BUILDER in control of HOA box is checked YES and the UNIT TYPE(S) box is checked ATTACHED FNC-R-PUDINFO-024-00 Total number of units for sale: Field is blank or does not contain a numeric value, and the DEVELOPER/BUILDER in control of HOA box is checked YES and the UNIT TYPE(S) box is checked ATTACHED FNC-R-PUDINFO-027-00 Total Number of units rented/for sale: Data source(s): Field is blank and the DEVELOPER/BUILDER in control of HOA box is checked YES and the UNIT TYPE(S) box is checked ATTACHED FNC-R-PUDINFO-030-00 Was the project created by the conversion of an existing building(s) into a PUD?: There is no box checked and the DEVELOPER/BUILDER in control of HOA box is checked YES and the UNIT TYPE(S) box is checked ATTACHED FNC-R-PUDINFO-030-01 Was the project created by the conversion of an existing building(s) into a PUD?: The YES box is checked and the DEVELOPER/BUILDER in control of HOA box is checked YES and the UNIT TYPE(S) box is checked ATTACHED FNC-R-PUDINFO-033-01 Was the project created by the conversion of an existing building(s) into PUD: The YES box is checked and DATE OF CONVERSION field does not contain a valid date FNC-R-PUDINFO-036-00 Does the project contain any multi-family dwelling units? There is no box checked and the DEVELOPER/BUILDER in control of HOA box is checked YES and the UNIT TYPE(S) box is checked ATTACHED FNC-R-PUDINFO-036-01 Does the project contain any multi-family dwelling units?: The YES box is checked FNC-R-PUDINFO-039-00 Does the project contain any multi-family dwelling units? DATA SOURCE(S) field is blank and the DEVELOPER/BUILDER in control of HOA box is checked YES and the UNIT TYPE(S) box is checked ATTACHED FNC-R-PUDINFO-042-00 Are the units, common elements, and recreation facilities complete?: There is no box checked and the DEVELOPER/BUILDER in control of HOA box is checked YES and the UNIT TYPE(S) box is checked ATTACHED FNC-R-PUDINFO-045-01 Are the units, common elements, and recreation facilities complete?: The NO box is checked and DESCRIBE THE STATUS OF COMPLETION field is blank FNC-R-PUDINFO-048-00 Are the units, common elements, and recreation facilities complete?: There is no box checked; Field is blank and the DEVELOPER/BUILDER in control of HOA box is checked YES and the UNIT TYPE(S) box is checked ATTACHED GAAR Score In an exemplary embodiment of a system for calculating a GAAR Score, each of the above rules is coded so that data (including but not limited to XML data) that is extracted from an appraisal (and that may be delivered from a data extraction source) can be run by an independent program. Rules may be designed so that rules will run exactly the same regardless of the source of the data, which may include, but is not limited to, OCR (Optical Character Recognition), PDF extraction, or AI Ready files.

Once the rules are coded or created, their performance is tested and evaluated by a series of test runs using data files and sources representing extracted appraisal data containing a number of known issues, including issues that result from feedback from evaluation of production appraisals. Each rule for each appraisal form is tested and evaluated to ensure that it is performing correctly. Test files and scripts are built or adjusted over time to include a wide variety of issues to ensure robust performance of the system. Production appraisal evaluations also may be reviewed to identify rules or coding that results in errors or "false positives," such as may result from variations in styles used by appraisers in the field, so that the rules or coding may be modified appropriately.

Additional testing may also be performed using a large data set of production appraisals. The "firing rate" (or the rate where a particular rule is violated or results in a "positive" hit) for each rule may be tabulated, and rules that appear to be firing too frequently can be examined. This examination may include comparisons with the actual appraisals that caused a positive hit to determine whether or not the rule should have fired. If the implementation of the rule is causing inappropriate firing, then the rule may be modified appropriately.

There are additional ways in which rules can be identified for modification. For example, a number of appraisals may be randomly selected from production, and compared to the rules to ensure that none fired inappropriately, and that there were no issues in the appraisal that should have caused a rule to fire when none were fired. It also is possible that issues might be identified that are potential problems in the appraisal for which no rules exist. Problems with the rules also may be identified by reviewers in the production environment and reported back. If any of these issues or problems are identified, then rules can be added, modified, or changed as appropriate. This allows an ongoing review of the rules to ensure that the rules are up-to-date and the evaluation system is functioning properly.

Figure 7:
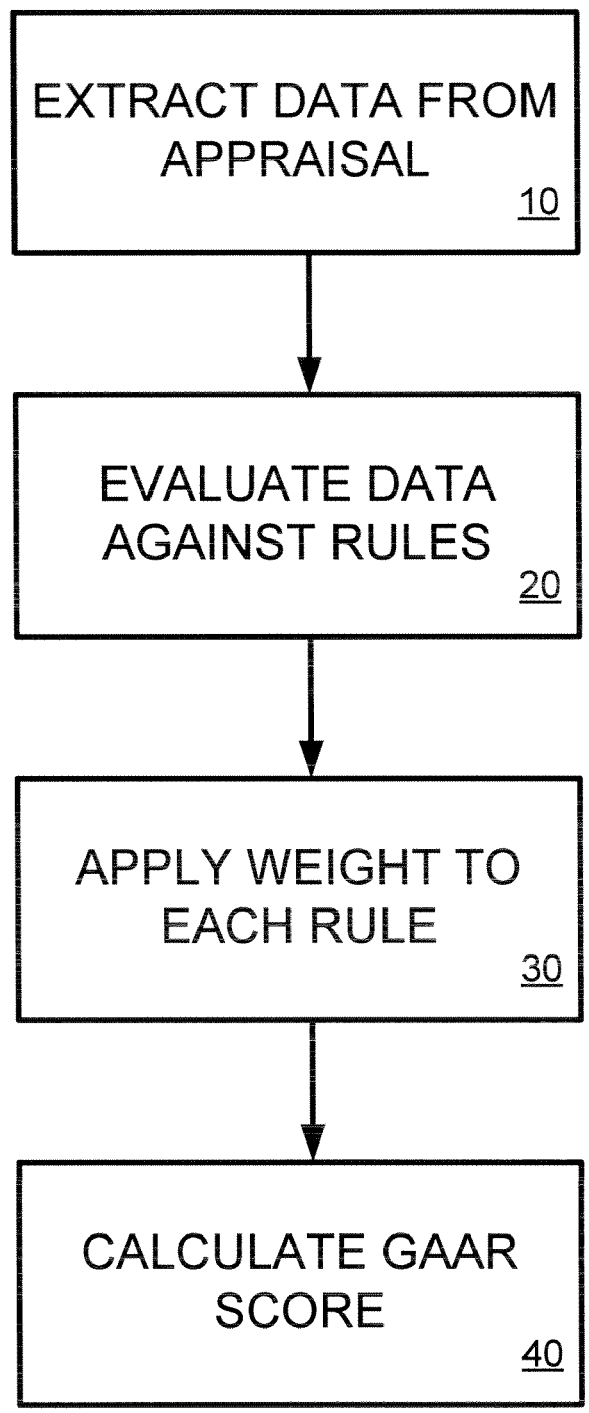
FIG. 7 shows a diagram of steps in one exemplary method in accordance with one embodiment of the present invention.

In an exemplary embodiment, a GAAR Score for an appraisal is based on all of the rules in GAAR in each form, both compliance and risk rules. As shown in FIG. 7, the data from the appraisal is extracted or entered into the system 10, and then is evaluated against each rule 20. A weight is applied to each rule 30, with the total score calculated by adding the weights associated with each rule that "fires" 40. This summation may also be transformed by an appropriate formula; FIG. 1 shows a formula for one exemplary embodiment of the invention. With this formula, in general, the higher the score, the more likely the appraisal is in compliance with accepted standards and guidelines. The particular formula shown in FIG. 1 gives a score from 0 to 1000, with low scores being generated by those appraisals with many rules that fire. Of course, the scale can be inverted so that high scores are generated by those appraisals with many rules that fire, and the scale can also be changed to any scale desired (e.g., 0 to 1,000; −500 to 500).

It should be noted that the weight applicable to a particular rule may be adjusted periodically in any embodiment of the present invention.

An Appraiser Score may also be calculated in a similar manner, using a select subset of the rules in GAAR. This may help evaluate the appraiser's performance and diligence in completing a particular appraisal.

The development of weights to be used for each rule can vary depending on a number of factors. For example, when new forms are introduced by governmental agencies or other sources, there is often no history on how these forms have been used in the past. Thus, there is no data to identify how appraisers will use them in the future, nor is there any data associated with appraisals that have resulted in bad valuations or losses to a lender. Accordingly, statistical approaches may not be appropriate since there is little or no data to work with to estimate appropriate weights. Experts may be called upon to assign initial weights for rules, based upon the seriousness of the rule.

As another example, statistical analysis can be used to re-evaluate and re-estimate appropriate weights for rules based on experience with production appraisals with problems (e.g., appraisals that may have resulted in bad valuations or losses). This allows the system to better differentiate between appraisals with value problems and the remaining production volume. In one embodiment, the appraisals are divided into two groups: those with bad valuations and those with good valuations. The rules that fire for each appraisal are used as the explanatory variable, and the two groups are used to create the dependent variable.

The optimization problem for developing the score can then be summarized as follows:

Let the number of files be designated as N with the number of bad valuations equal to B. $\delta$ is a vector taking a value of 1 when the observation has a bad value and 0 otherwise. The total number of rules can be indicated as R and the matrix r has N rows and R columns with each component $r_{ij}$ taking the value of 1 if the jth rule fires on the ith observation and zero otherwise. Let K and $\Gamma$ be constants. The optimization problem then is as shown in FIG. 2. A genetic algorithm may be used to estimate the appropriate weights.

With every set of weights developed, a large number of production appraisals can be scored and the distribution of resulting scores computed. Samples may be taken from both tails of the distribution and analyzed to see if the scores accurately reflect the quality of the appraisals. Distribution of the scores also may assist in defining rules for automation of the appraisal review process.

In one exemplary embodiment, each rule in the system being used to evaluate production appraisals may be assigned its own version number. Thus, any report about any specific appraisal can be documented and reproduced as to the details of the specific rule or rules that fired. Archives may be maintained of past rules so that the coding of the specific rule can be reviewed as needed.

FIGS. 3-7 show an example of a distribution of GAAR Scores for an aggregate of appraisal data from many different lenders, thousands of appraisers, and an extensive distribution of geographical locations, including all major metropolitan markets. In this particular example, 20,027 recent form 1004 production appraisals were combined with 88 "bad" appraisals known to have significant valuation problems after a detailed review. All data was extracted from the appraisals and run through the system to result in the distribution of GAAR Scores shown.

In one exemplary embodiment, a lender or other user of appraisals can use the present invention to automatically pull data from appraisals and determine a GAAR Score for that appraisal. The GAAR Score can then be used to determine whether further action or review is required with regard to that appraisal or matter. The distribution of GAAR scores for all appraisals may be monitored periodically, such as on a weekly basis, to determine consistency.

The system for calculating a GAAR Score also may be located on one or more servers on the Internet, and used by multiple lenders or users thereby.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

We claim:

1. A computer-implemented method for evaluating a real estate appraisal, comprising the steps of:
    extracting data from the appraisal;
    in a computer processor or microprocessor, evaluating the extracted data against a plurality of rules applicable to the type of appraisal, wherein each rule is assigned a particular weight; and
    automatically calculating in a computer processor or microprocessor an appraisal score based on the evaluation, wherein the appraisal score is calculated by summing the total of each rule that is triggered multiplied by the weight assigned to that rule, according to the following formula:

$$\text{Score} = \frac{K}{1 + e^{\frac{\sum_{j=1}^{N} w_{ij} r_j}{\Gamma}}}$$

where N rules are evaluated, K is a constant, $\Gamma$ is a constant, w is the weight of a rule, and r is a variable that defaults to 0 but takes on the value 1 if the rule triggers or fires.

2. The method of claim 1, wherein the rules address whether the appraisal complies with an applicable standard.

3. The method of claim 1, wherein the rules address the presence of certain risk factors in the appraisal.

4. The method of claim 1, wherein one or more weights are determined by statistical analysis of appraisals.

5. The method of claim 1, wherein one or more weights may be adjusted over time.

6. The method of claim 1, wherein one or more weights are set or adjusted based on statistical analysis of a plurality of appraisals being subjected to the method.

7. A computer-implemented method for evaluating a real estate appraiser, comprising the steps of:
    extracting data from an appraisal performed by the appraiser;
    in a computer processor or microprocessor, evaluating the extracted data against a plurality of rules applicable to the type of appraisal, wherein each rule is assigned a particular weight; and
    automatically calculating in a computer processor or microprocessor an appraisal score based on the evaluation, wherein the appraisal score is calculated by summing the total of each rule that is triggered multiplied by the weight assigned to that rule, according to the following formula:

$$\text{Score} = \frac{K}{1 + e^{\frac{\sum_{j=1}^{N} w_{ij} r_j}{\Gamma}}}$$

where N rules are evaluated, K is a constant, $\Gamma$ is a constant, w is the weight of a rule, and r is a variable that defaults to 0 but takes on the value 1 if the rule triggers or fires.

8. The method of claim 7, wherein the rules address whether the appraisal complies with an applicable standard.

9. A machine for evaluating a real estate appraisal, comprising:
    a processor or microprocessor coupled to a memory, wherein the processor or microprocessor is programmed to evaluate a real estate appraisal by:
    extracting data from the appraisal;
    evaluating the extracted data against a plurality of rules applicable to the type of appraisal, wherein each rule is assigned a particular weight; and
    calculating an appraisal score based on the evaluation, wherein the appraisal score is calculated by summing the total of each rule that is triggered multiplied by the weight assigned to that rule, according to the following formula:

$$\text{Score} = \frac{K}{1 + e^{\frac{\sum_{j=1}^{N} w_{ij} r_j}{\Gamma}}}$$

where N rules are evaluated, K is a constant, $\Gamma$ is a constant, w is the weight of a rule, and r is a variable that defaults to 0 but takes on the value 1 if the rule triggers or fires.

10. The machine of claim 9, wherein the rules address whether the appraisal complies with an applicable standard.

11. The machine of claim 9, wherein the rules address the presence of certain risk factors in the appraisal.

12. The machine of claim 9, wherein one or more weights may be adjusted over time.

13. The machine of claim 9, wherein one or more weights are set or adjusted based on statistical analysis of a plurality of appraisals being subjected to the method.

* * * * *